(12) United States Patent
Hussell et al.

(10) Patent No.: US 11,792,898 B2
(45) Date of Patent: *Oct. 17, 2023

(54) ENHANCED FIXTURES FOR AREA LIGHTING

(71) Applicant: IDEAL Industries Lighting LLC, Racine, WI (US)

(72) Inventors: Christopher P. Hussell, Raleigh, NC (US); Brian Carrigan, Carrboro, NC (US); John J. Trainor, Durham, NC (US); Joseph P. Chobot, State College, PA (US); Matthew Deese, Raleigh, NC (US); Keith Bryan, Raleigh, NC (US)

(73) Assignee: IDEAL Industries Lighting LLC, Racine, WI (US)

( * ) Notice: Subject to any disclaimer, the term of this patent is extended or adjusted under 35 U.S.C. 154(b) by 20 days.

This patent is subject to a terminal disclaimer.

(21) Appl. No.: 17/501,113

(22) Filed: Oct. 14, 2021

(65) Prior Publication Data

US 2022/0070982 A1 Mar. 3, 2022

Related U.S. Application Data

(63) Continuation-in-part of application No. 16/993,456, filed on Aug. 14, 2020, which is a continuation of
(Continued)

(51) Int. Cl.
*H05B 45/00* (2022.01)
*H05B 47/19* (2020.01)
(Continued)

(52) U.S. Cl.
CPC ............ *H05B 45/00* (2020.01); *H05B 45/10* (2020.01); *H05B 45/12* (2020.01); *H05B 47/105* (2020.01);
(Continued)

(58) Field of Classification Search
CPC ........ H05B 45/00; H05B 45/10; H05B 45/12; H05B 45/20; H05B 45/3725;
(Continued)

(56) References Cited

U.S. PATENT DOCUMENTS

| 4,319,070 A | 3/1982 | Imai et al. |
| 5,955,747 A | 9/1999 | Ogihara et al. |

(Continued)

FOREIGN PATENT DOCUMENTS

| CN | 101894851 A | 11/2010 |
| CN | 102737555 A | 10/2012 |

(Continued)

OTHER PUBLICATIONS

Non-Final Office Action for U.S. Appl. No. 17/152,127, dated Oct. 5, 2022, 9 pages.
(Continued)

*Primary Examiner* — Raymond R Chai
(74) *Attorney, Agent, or Firm* — Withrow & Terranova, P.L.L.C.

(57) ABSTRACT

An area lamp includes an emitter array and driver circuitry. The emitter array includes a number of solid-state light emitters. Each one of the solid-state light emitters is configured to provide light suitable for general illumination within a field of view such that light emitted from a first subset of the number of solid-state light emitters is provided to a different portion of the field of view than light emitted from a second subset of the number of solid-state light emitters. The driver circuitry is coupled to the emitter array and configured to provide drive signals to the emitter array such that the light provided from each one of the solid-state light emitters is independently controllable and a number of drive signals is less than the number of solid-state light emitters.

20 Claims, 76 Drawing Sheets

Related U.S. Application Data application No. 16/241,492, filed on Jan. 7, 2019, now abandoned, which is a continuation of application No. 15/830,406, filed on Dec. 4, 2017, now Pat. No. 10,206,270, application No. 17/501,113 is a continuation-in-part of application No. 15/621,731, filed on Jun. 13, 2017, now Pat. No. 11,160,148, said application No. 15/830,406 is a continuation of application No. 14/498,168, filed on Sep. 26, 2014, now Pat. No. 9,872,367, which is a continuation-in-part of application No. 13/782,040, filed on Mar. 1, 2013, now Pat. No. 8,975,827, which is a continuation-in-part of application No. 13/589,899, filed on Aug. 20, 2012, now Pat. No. 10,219,338, and a continuation-in-part of application No. 13/589,928, filed on Aug. 20, 2012, now Pat. No. 10,506,678.

(60) Provisional application No. 61/932,058, filed on Jan. 27, 2014, provisional application No. 61/923,999, filed on Jan. 6, 2014, provisional application No. 61/738,749, filed on Dec. 18, 2012, provisional application No. 61/666,920, filed on Jul. 1, 2012.

(51) Int. Cl.
  *H05B 47/18* (2020.01)
  *H05B 47/11* (2020.01)
  *H05B 47/105* (2020.01)
  *H05B 45/12* (2020.01)
  *H05B 45/10* (2020.01)
  *H05B 47/115* (2020.01)
  *H05B 45/3725* (2020.01)

(52) U.S. Cl.
  CPC ............ *H05B 47/11* (2020.01); *H05B 47/18* (2020.01); *H05B 47/19* (2020.01); *H05B 45/3725* (2020.01); *H05B 47/115* (2020.01)

(58) Field of Classification Search
  CPC .... H05B 47/105; H05B 47/11; H05B 47/115; H05B 47/16; H05B 47/18; H05B 47/19; H05B 47/40
  See application file for complete search history.

(56) References Cited

U.S. PATENT DOCUMENTS

| | | |
|---|---|---|
| 6,160,354 A | 12/2000 | Ruvinskiy et al. |
| 6,657,236 B1 | 12/2003 | Thibeault et al. |
| 6,747,298 B2 | 6/2004 | Slater, Jr. et al. |
| 6,791,119 B2 | 9/2004 | Slater, Jr. et al. |
| 6,821,804 B2 | 11/2004 | Thibeault et al. |
| 6,888,167 B2 | 5/2005 | Slater, Jr. et al. |
| 7,211,803 B1 | 5/2007 | Dhurjaty et al. |
| 7,829,906 B2 | 11/2010 | Donofrio |
| 8,212,297 B1 | 7/2012 | Law et al. |
| 8,716,724 B2 | 5/2014 | von Malm et al. |
| 8,835,959 B2 | 9/2014 | Nakamura et al. |
| 8,940,561 B2 | 1/2015 | Donofrio et al. |
| 8,963,121 B2 | 2/2015 | Odnoblyudov et al. |
| 8,969,897 B2 | 3/2015 | Choi |
| 8,981,395 B2 | 3/2015 | Choi et al. |
| 9,048,368 B2 | 6/2015 | Jeong |
| 9,099,575 B2 | 8/2015 | Medendorp, Jr. et al. |
| 9,123,864 B2 | 9/2015 | Tomonari et al. |
| 9,129,977 B2 | 9/2015 | Marchand et al. |
| 9,130,127 B2 | 9/2015 | Katsuno et al. |
| 9,130,128 B2 | 9/2015 | Shinohara |
| 9,130,137 B2 | 9/2015 | Lin et al. |
| 9,136,432 B2 | 9/2015 | Yun et al. |
| 9,136,433 B2 | 9/2015 | Park et al. |
| 9,142,725 B1 | 9/2015 | Suzuki |
| 9,153,750 B2 | 10/2015 | Seo et al. |
| 9,159,894 B2 | 10/2015 | Cho et al. |
| 9,166,107 B2 | 10/2015 | Park |
| 9,166,108 B2 | 10/2015 | Unosawa |
| 9,166,110 B2 | 10/2015 | Aihara |
| 9,166,111 B2 | 10/2015 | Matsui et al. |
| 9,171,882 B2 | 10/2015 | Akimoto et al. |
| 9,172,002 B2 | 10/2015 | Wang et al. |
| 9,172,021 B2 | 10/2015 | Sugizaki et al. |
| 9,178,121 B2 | 11/2015 | Edmond et al. |
| 9,196,653 B2 | 11/2015 | Leatherdale |
| 9,209,223 B2 | 12/2015 | Lee et al. |
| 9,219,196 B2 | 12/2015 | Seo et al. |
| 9,219,200 B2 | 12/2015 | Erchak et al. |
| 9,231,037 B2 | 1/2016 | Shimayama |
| 9,236,526 B2 | 1/2016 | Choi et al. |
| 9,240,433 B2 | 1/2016 | Kim et al. |
| 9,252,345 B2 | 2/2016 | Cho et al. |
| 9,263,643 B2 | 2/2016 | Huang et al. |
| 9,263,652 B2 | 2/2016 | Yoon et al. |
| 9,269,858 B2 | 2/2016 | Schubert et al. |
| 9,277,618 B2 | 3/2016 | Odnoblyudov et al. |
| 9,281,448 B1 | 3/2016 | Choi et al. |
| 9,281,449 B2 | 3/2016 | Kim et al. |
| 9,287,457 B2 | 3/2016 | Jeong et al. |
| 9,293,664 B2 | 3/2016 | Seo et al. |
| 9,293,674 B2 | 3/2016 | Kususe et al. |
| 9,293,675 B2 | 3/2016 | Yang et al. |
| 9,299,889 B2 | 3/2016 | Katsuno et al. |
| 9,299,893 B2 | 3/2016 | Chen et al. |
| 9,300,111 B2 | 3/2016 | Lee et al. |
| 9,318,529 B2 | 4/2016 | Jang et al. |
| 9,324,765 B2 | 4/2016 | An |
| 9,337,175 B2 | 5/2016 | Seo et al. |
| 9,362,335 B2 | 6/2016 | von Malm |
| 9,362,337 B1 | 6/2016 | Wu et al. |
| 9,373,756 B2 | 6/2016 | Lee et al. |
| 9,653,643 B2 | 5/2017 | Bergmann et al. |
| 9,729,676 B2 | 8/2017 | Kobayashi et al. |
| 9,748,309 B2 | 8/2017 | von Malm |
| 9,754,926 B2 | 9/2017 | Donofrio et al. |
| 9,831,220 B2 | 11/2017 | Donofrio et al. |
| 10,317,787 B2 | 6/2019 | Graves et al. |
| 10,903,265 B2 | 1/2021 | Andrews et al. |
| 2003/0015959 A1 | 1/2003 | Tomoda et al. |
| 2005/0023550 A1 | 2/2005 | Eliashevich et al. |
| 2005/0253492 A1 | 11/2005 | Besshi et al. |
| 2006/0012588 A1 | 1/2006 | Shinohara |
| 2006/0281203 A1 | 12/2006 | Epler et al. |
| 2007/0001943 A1 | 1/2007 | Lee et al. |
| 2008/0055555 A1 | 3/2008 | Nakamura et al. |
| 2008/0179611 A1 | 7/2008 | Chitnis et al. |
| 2008/0211416 A1 | 9/2008 | Negley et al. |
| 2008/0290351 A1 | 11/2008 | Ajiki et al. |
| 2009/0052171 A1* | 2/2009 | Li .............. F21K 9/00 362/234 |
| 2009/0179843 A1 | 7/2009 | Ackermann et al. |
| 2009/0241390 A1* | 10/2009 | Roberts ............ H05B 33/02 40/553 |
| 2010/0015574 A1 | 1/2010 | Van der Zel et al. |
| 2010/0051785 A1 | 3/2010 | Dai et al. |
| 2010/0052574 A1* | 3/2010 | Blakeley ............ G08B 29/181 315/307 |
| 2010/0123386 A1 | 5/2010 | Chen |
| 2010/0163887 A1 | 7/2010 | Kim et al. |
| 2010/0163900 A1 | 7/2010 | Seo et al. |
| 2010/0241255 A1* | 9/2010 | Benetz ................ H05B 47/10 700/90 |
| 2010/0296285 A1* | 11/2010 | Chemel ................ F21V 21/00 362/249.1 |
| 2011/0049545 A1 | 3/2011 | Basin et al. |
| 2011/0084294 A1 | 4/2011 | Yao |
| 2011/0121732 A1 | 5/2011 | Tsutsumi |
| 2011/0220934 A1 | 9/2011 | Gotoda et al. |
| 2011/0291143 A1 | 12/2011 | Kim et al. |
| 2011/0294240 A1 | 12/2011 | Kim |
| 2011/0297979 A1 | 12/2011 | Diana et al. |
| 2011/0301776 A1* | 12/2011 | Goyal ................ H05B 47/105 307/116 |

(56) References Cited

U.S. PATENT DOCUMENTS

| | | | |
|---|---|---|---|
| 2012/0062135 A1 | 3/2012 | Tamaki et al. | |
| 2012/0119237 A1 | 5/2012 | Leatherdale et al. | |
| 2012/0130544 A1* | 5/2012 | Mohan | H05B 47/175 700/275 |
| 2012/0205634 A1 | 8/2012 | Ikeda et al. | |
| 2012/0236582 A1 | 9/2012 | Waragaya et al. | |
| 2012/0268042 A1 | 10/2012 | Shiobara et al. | |
| 2013/0181617 A1* | 7/2013 | Maddox | H05B 47/115 315/159 |
| 2013/0264592 A1 | 10/2013 | Bergmann et al. | |
| 2014/0070245 A1 | 3/2014 | Haberern et al. | |
| 2014/0110730 A1 | 4/2014 | Lee et al. | |
| 2014/0361321 A1 | 12/2014 | Saito et al. | |
| 2015/0049502 A1 | 2/2015 | Brandl et al. | |
| 2015/0207045 A1 | 7/2015 | Wada et al. | |
| 2015/0228876 A1 | 8/2015 | Place et al. | |
| 2015/0262978 A1 | 9/2015 | Shibata | |
| 2015/0279902 A1 | 10/2015 | Von Malm et al. | |
| 2015/0295009 A1 | 10/2015 | Wang et al. | |
| 2015/0311407 A1 | 10/2015 | Gootz et al. | |
| 2015/0340346 A1 | 11/2015 | Chu et al. | |
| 2015/0380622 A1 | 12/2015 | Miyoshi et al. | |
| 2016/0150614 A1 | 5/2016 | Randolph | |
| 2016/0163916 A1 | 6/2016 | Ilievski et al. | |
| 2016/0240516 A1 | 8/2016 | Chang | |
| 2016/0293811 A1 | 10/2016 | Hussell et al. | |
| 2017/0062680 A1 | 3/2017 | Yoo et al. | |
| 2017/0092820 A1 | 3/2017 | Kim et al. | |
| 2017/0098746 A1 | 4/2017 | Bergmann et al. | |
| 2017/0135177 A1 | 5/2017 | Wang et al. | |
| 2017/0141280 A1 | 5/2017 | Zhong et al. | |
| 2017/0148771 A1 | 5/2017 | Cha et al. | |
| 2017/0207284 A1 | 7/2017 | Dykaar | |
| 2017/0229431 A1 | 8/2017 | Bergmann et al. | |
| 2017/0250164 A1 | 8/2017 | Takeya et al. | |
| 2017/0271561 A1 | 9/2017 | Bergmann et al. | |
| 2017/0287887 A1 | 10/2017 | Takeya et al. | |
| 2017/0294417 A1 | 10/2017 | Edmond et al. | |
| 2017/0294418 A1 | 10/2017 | Edmond et al. | |
| 2017/0317251 A1 | 11/2017 | Sweegers et al. | |
| 2017/0318636 A1 | 11/2017 | Kums | |
| 2017/0358624 A1 | 12/2017 | Takeya et al. | |
| 2018/0012949 A1 | 1/2018 | Takeya et al. | |
| 2018/0076368 A1 | 3/2018 | Hussell | |
| 2018/0145058 A1 | 5/2018 | Meitl et al. | |
| 2018/0212108 A1 | 7/2018 | Leirer et al. | |
| 2018/0359825 A1 | 12/2018 | Hussell | |
| 2019/0044040 A1 | 2/2019 | Andrews | |
| 2020/0144460 A1 | 5/2020 | Onuma et al. | |
| 2020/0203419 A1 | 6/2020 | Andrews et al. | |
| 2021/0151422 A1 | 5/2021 | Iguchi et al. | |

FOREIGN PATENT DOCUMENTS

| | | |
|---|---|---|
| CN | 103137803 A | 6/2013 |
| CN | 105391499 A | 3/2016 |
| EP | 2197051 A2 | 6/2010 |
| EP | 2296179 A2 | 3/2011 |
| EP | 2320483 A1 | 5/2011 |
| EP | 2325883 A2 | 5/2011 |
| EP | 2393132 A2 | 12/2011 |
| EP | 3076442 A1 | 10/2016 |
| JP | 2006008956 A | 1/2006 |
| JP | 2008262993 A | 10/2008 |
| JP | 2009111098 A | 5/2009 |
| JP | 2010087292 A | 4/2010 |
| JP | 2013106048 A | 5/2013 |
| JP | 2013179197 A | 9/2013 |
| JP | 5788046 B2 | 9/2015 |
| JP | 2015201473 A | 11/2015 |
| JP | 2016072379 A | 5/2016 |
| JP | 2019016821 A | 1/2019 |
| KR | 100652133 A | 11/2006 |
| KR | 1020130086109 B1 | 3/2015 |
| WO | 2005062905 A2 | 7/2005 |
| WO | 2008005508 A2 | 1/2008 |
| WO | 2008062783 A1 | 5/2008 |
| WO | 2011014490 A2 | 2/2011 |
| WO | 2013154818 A1 | 10/2013 |
| WO | 2015063077 A1 | 5/2015 |
| WO | 2015135839 A1 | 9/2015 |
| WO | 2016087542 A1 | 6/2016 |
| WO | 2016188505 A1 | 12/2016 |

OTHER PUBLICATIONS

Intention to Grant for European Patent Application No. 17721889.8, dated Oct. 13, 2022, 8 pages.

Notice of Reasons for Rejection for Japanese Patent Application No. 2020-505841, dated Sep. 20, 2022, 6 pages.

Notice of Allowance for U.S. Appl. No. 16/983,553, dated Apr. 14, 2022, 9 pages.

Notice of Allowance and Examiner-Initiated Interview Summary for U.S. Appl. No. 17/078,733, dated Apr. 4, 2022, 9 pages.

Preliminary Examination Report for Taiwanese Patent Application No. 107127064, dated Mar. 10, 2022, 7 pages.

Invitation to Pay Additional Search Fees for European Patent Application No. 18762420.0, dated Feb. 11, 2022, 4 pages.

Carey, Julian, "New LED architectures and phosphor technologies lower costs and boost quality (Magazine)," LEDs Magazine, accessed Feb. 17, 2017, http://www.ledsmagazine.com/articles/print/volume-11/issue-7/features/manufacturing/new-led-architectures-and-phosphor-technologies-lower-costs-and-boost-quality.html, published Sep. 4, 2014, PennWell Corporation, 7 pages.

Chong, Wing et al., "1700 pixels per inch (PPI) Passive-Matrix Micro-LED Display Powered by ASIC," IEEE Compound Semiconductor Integrated Circuit Symposium (CSICs), Oct. 19-22, 2014, IEEE, 4 pages.

Dodel, Dr. Kerstin et al., "Capital Markets Day 2015," HELLA KGaA Hueck & Co, Dec. 2, 2015, London, HELLA, pp. 1-89.

Herrnsdorf, Johannes et al., "Active-Matrix GaN Micro Light-Emitting Diode Display With Unprecedented Brightness," IEEE Transactions on Electron Devices, vol. 62, Issue 6, Jun. 2015, IEEE, pp. 1918-1925.

Jiang, H. X. et al., "Nitride micro-LEDs and beyond—a decade progress review," Optics Express, vol. 21, Issue S3, Apr. 22, 2013, OSA, 10 pages.

Non-Final Office Action for U.S. Appl. No. 15/401,240, dated May 26, 2017, 7 pages.

Non-Final Office Action for U.S. Appl. No. 15/401,240, dated Jan. 17, 2018, 8 pages.

Invitation to Pay Additional Fees and Partial Search Report for International Patent Application No. PCT/US2017/026163, dated Aug. 1, 2017, 23 pages.

International Search Report and Written Opinion for International Patent Application No. PCT/US2017/026163, dated Oct. 25, 2017, 30 pages.

Author Unknown, "MBI5026: 16-bit Constant Current LED Sink Driver," Datasheet, Version 1.0, Mar. 2004, Hsinchu, Taiwan, www.DatasheetCatalog.com, Macroblock, Inc., pp. 1-15.

Non-Final Office Action for U.S. Appl. No. 15/399,729, dated Jan. 24, 2018, 12 pages.

Final Office Action for U.S. Appl. No. 15/399,729, dated Jun. 28, 2018, 9 pages.

Final Office Action for U.S. Appl. No. 15/401,240, dated Jun. 26, 2018, 11 pages.

Official Letter for Taiwanese Patent Application No. 106112033, dated Aug. 27, 2018, 19 pages.

Notice of Allowance for U.S. Appl. No. 15/399,729, dated Oct. 23, 2018, 8 pages.

Notice of Allowance for U.S. Appl. No. 15/401,240, dated Oct. 25, 2018, 7 pages.

International Preliminary Report on Patentability for International Patent Application No. PCT/US2017/026163, dated Oct. 25, 2018, 20 pages.

(56) References Cited

OTHER PUBLICATIONS

Invitation to Pay Additional Fees and Partial Search Report for International Patent Application No. PCT/US2018/045102, dated Oct. 30, 2018, 14 pages.
Quayle Action for U.S. Appl. No. 15/896,805, dated Jan. 10, 2019, 5 pages.
Non-Final Office Action for U.S. Appl. No. 15/621,731, dated Dec. 31, 2018, 43 pages.
International Search Report and Written Opinion for International Patent Application No. PCT/US2018/045102, dated Jan. 21, 2019, 23 pages.
Non-Final Office Action for U.S. Appl. No. 15/399,729, dated Mar. 27, 2019, 9 pages.
Notice of Allowance for U.S. Appl. No. 15/401,240, dated Apr. 1, 2019, 8 pages.
Final Office Action for U.S. Appl. No. 15/621,731, dated Jul. 11, 2019, 15 pages.
Non-Final Office Action for U.S. Appl. No. 16/053,980, dated Jun. 13, 2019, 7 pages.
Notice of Allowance for U.S. Appl. No. 15/896,805, dated Jun. 21, 2019, 8 pages.
Examination Report for European Patent Application No. 17721889.8, dated Apr. 26, 2019, 12 pages.
Non-Final Office Action for U.S. Appl. No. 16/414,162, dated Sep. 13, 2019, 11 pages.
Non-Final Office Action for U.S. Appl. No. 16/414,162, dated Dec. 23, 2019, 10 pages.
Final Office Action for U.S. Appl. No. 16/414,162, dated Jul. 15, 2020, 11 pages.
Notice of Allowance for U.S. Appl. No. 16/414,162, dated Sep. 23, 2020, 8 pages.
Advisory Action and AFCP 2.0 Decision for U.S. Appl. No. 15/621,731, dated Oct. 9, 2019, 4 pages.
Non-Final Office Action for U.S. Appl. No. 15/621,731, dated Dec. 30, 2019, 15 pages.
Non-Final Office Action for U.S. Appl. No. 15/621,731, dated Jul. 8, 2020, 15 pages.
Notice of Allowance for U.S. Appl. No. 16/053,980, dated Oct. 21, 2019, 9 pages.
Non-Final Office Action for U.S. Appl. No. 16/174,584, dated Oct. 21, 2019, 7 pages.
Notice of Allowance for U.S. Appl. No. 16/174,584, dated Mar. 23, 2020, 11 pages.
Notice of Allowance for U.S. Appl. No. 16/229,986, dated Sep. 24, 2020, 8 pages.
Quayle Action for U.S. Appl. No. 16/229,986, dated May 29, 2020, 6 pages.
Examination Report for European Patent Application No. 17721889.8, dated Dec. 13, 2019, 5 pages.
International Preliminary Report on Patentability for International Patent Application No. PCT/US2018/045102, dated Feb. 13, 2020, 15 pages.
International Search Report and Written Opinion for International Patent Application No. PCT/IB2019/060455, dated Feb. 7, 2020, 17 pages.
Notice of Allowance for U.S. Appl. No. 17/008,544, dated Sep. 29, 2020, 8 pages.
Notice of Reasons for Refusal for Japanese Patent Application No. 2018-553935, dated Nov. 24, 2020, 6 pages.
Office Action for Korean Patent Application No. 10-2018-7032540, dated Oct. 21, 2020, 23 pages.
Final Office Action for U.S. Appl. No. 15/621,731, dated Mar. 15, 2021, 17 pages.
Examination Report for European Patent Application No. 18762420.0, dated Jan. 28, 2021, 4 pages.
International Search Report and Written Opinion for International Patent Application No. PCT/US2020/057955, dated Feb. 12, 2021, 18 pages.
Examiner-Initiated Interview Summary for U.S. Appl. No. 17/078,733, dated May 3, 2022, 3 pages.
Notice of Reasons for Rejection for Japanese Patent Application No. 2020-505841, dated Apr. 19, 2022, 9 pages.
Decision of Dismissal of Amendment for Japanese Patent Application No. 2018-553935, dated Apr. 26, 2022, 4 pages.
Decision of Refusal for Japanese Patent Application No. 2018-553935, dated Apr. 26, 2022, 2 pages.
Written Decision on Registration for Korean Patent Application No. 10-2021-7026409, dated Jun. 27, 2022, 4 pages.
Examination Report for European Patent Application No. 18762420.0, dated Apr. 19, 2022, 10 pages.
Applicant-Initiated Interview Summary for U.S. Appl. No. 15/621,731, dated May 12, 2021, 2 pages.
Advisory Action for U.S. Appl. No. 15/621,731, dated May 28, 2021, 3 pages.
Notice of Allowance for U.S. Appl. No. 15/621,731, dated Jun. 18, 2021, 15 pages.
Examination Report for European Patent Application No. 17721889.8, dated Apr. 20, 2021, 7 pages.
Grant of Patent for Korean Patent Application No. 10-2018-7032540, dated May 21, 2021, 4 pages.
International Preliminary Report on Patentability for International Patent Application No. PCT/IB2019/060455, dated Jul. 1, 2021 10 pages.
Notice of Reasons for Refusal for Japanese Patent Application No. 2018-553935, dated Aug. 17, 2021, 8 pages.
Notice of Allowance for U.S. Appl. No. 16/950,142, dated Jan. 18, 2022, 9 pages.
Non-Final Office Action for U.S. Appl. No. 16/983,553, dated Nov. 24, 2021, 8 pages.
Notice of Reasons for Rejection for Japanese Patent Application No. 2018-553935, dated Jan. 5, 2022, 6 pages.
Office Action for Korean Patent Application No. 10-2021-7026409, dated Dec. 21, 2021, 4 pages.
First Office Action for Chinese Patent Application No. 2017800363223, dated Sep. 30, 2022, 20 page.
Office Action for Korean Patent Application No. 10-2020-7005916, dated Oct. 26, 2022, 19 pages.
Notice of Allowance for U.S. Appl. No. 17/740,982, dated May 18, 2023, 8 pages.
First Office Action for Chinese Patent Application No. 2018800567102, dated Mar. 23, 2023, 16 pages.
Final Office Action for Korean Patent Application No. 10-2020-7005916, dated Apr. 12, 2023, 9 pages.
Non-Final Office Action for U.S. Appl. No. 17/740,982, dated Jan. 27, 2023, 6 pages.
Notice of Allowance for U.S. Appl. No. 17/152,127, dated Jan. 26, 2023, 7 pages.
Non-Final Office Action for U.S. Appl. No. 17/084,194, dated Mar. 3, 2023, 33 pages.
Notice of Allowance for U.S. Appl. No. 17/084,194, dated Jul. 10, 2023, 11 pages.
Second Office Action for Chinese Patent Application No. 2017800363223, dated May 9, 2023, 12 pages.
Examination Report for European Patent Application No. 19828829.2, dated Jun. 12, 2023, 7 pages.
Examination Report for European Patent Application No. 20812168.1, dated May 23, 2023, 10 pages.

* cited by examiner

|   | A | B | C | D | E | F | G | H | I | J | K | L | M | N | O | P | Q | R |
|---|---|---|---|---|---|---|---|---|---|---|---|---|---|---|---|---|---|---|
| R |   |   |   |   |   |   |   |   | 0.1 | 0.2 |   | 0.3 | 0.6 |   |   |   | 0.5 | 1 |
| Q |   |   |   |   |   |   |   |   | 0.2 | 0.1 |   | 0.6 | 0.3 |   |   |   | 1 | 0.5 |
| P |   |   |   |   |   | 0.1 | 0.2 |   |   |   |   | 0.6 |   |   |   | 1 |   |   |
| O |   |   |   |   |   |   |   |   |   |   |   |   |   |   | 0.7 | 1 |   |   |
| N |   |   |   |   |   |   |   |   |   |   |   |   |   | 1 | 0.7 |   |   |   |
| M |   |   |   |   |   |   |   | 0.3 | 0.6 |   | 0.5 | 1 |   |   |   |   | 0.3 | 0.6 |
| L |   |   |   |   |   |   |   | 0.6 | 0.3 |   | 1 | 0.5 |   |   |   |   | 0.6 | 0.3 |
| K |   |   |   |   |   | 0.1 | 0.3 | 0.6 |   | 1 |   |   |   |   |   | 0.6 |   |   |
| J |   |   |   |   |   | 0.5 | 1 |   | 0.3 | 0.6 |   |   |   |   |   | 0.1 | 0.2 |   |
| I |   |   |   |   |   | 1 | 0.5 |   | 0.6 | 0.3 |   |   |   |   |   | 0.2 | 0.1 |   |
| H |   |   |   |   | 0.2 | 0.6 | 1 |   |   | 0.6 |   |   |   |   | 0.2 |   |   |   |
| G |   |   |   |   | 0.6 | 1 | 0.6 |   | 0.3 |   |   |   |   |   | 0.1 |   |   |   |
| F |   |   |   |   | 1 | 0.6 | 0.2 |   | 0.1 |   |   |   |   |   |   |   |   |   |
| E |   | 0.1 | 0.3 | 0.7 | 1 |   |   |   |   |   |   |   |   |   |   |   |   |   |
| D |   | 0.3 | 0.7 | 1 | 0.7 |   |   |   |   |   |   |   |   |   |   |   |   |   |
| C |   | 0.7 | 1 | 0.7 | 0.3 |   |   |   |   |   |   |   |   |   |   |   |   |   |
| B |   | 1 | 0.7 | 0.3 | 0.1 |   |   |   |   |   |   |   |   |   |   |   |   |   |
| A | 1 |   |   |   |   |   |   |   |   |   |   |   |   |   |   |   |   |   |

FIG. 21

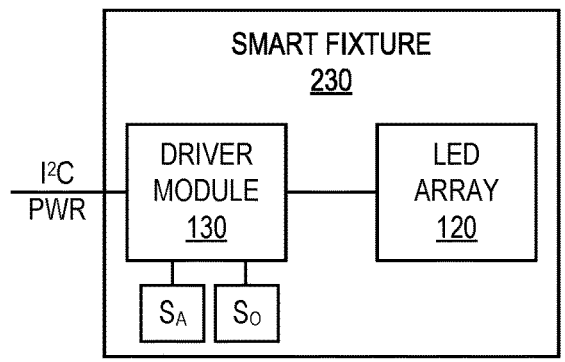
*FIG. 39*
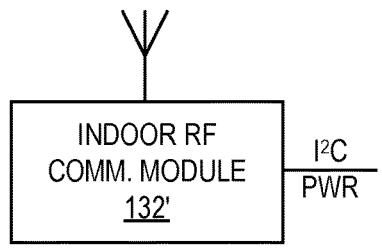
*FIG. 40*
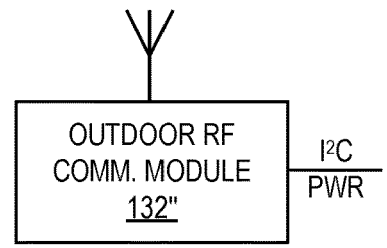
*FIG. 41*
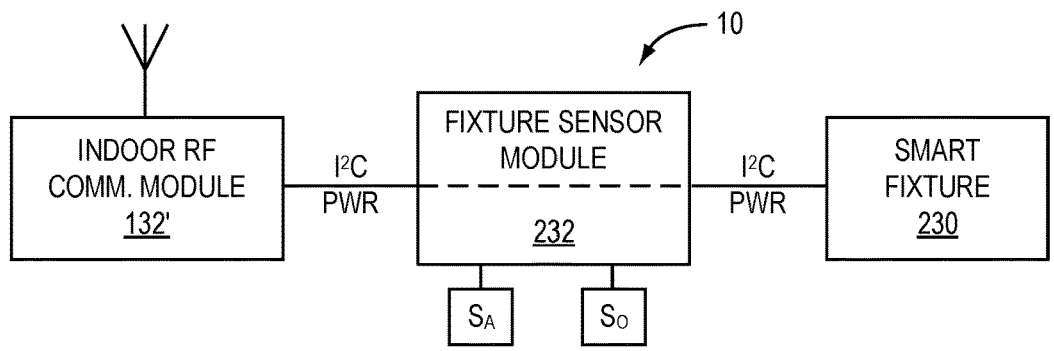
*FIG. 43*
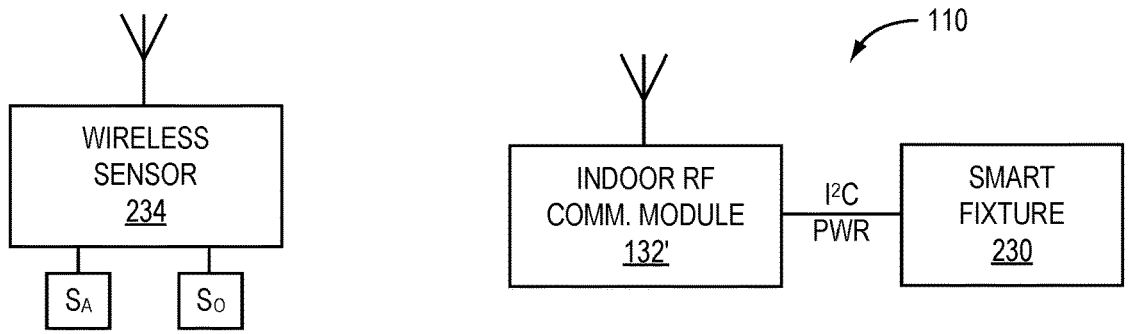
*FIG. 44*          *FIG. 42*

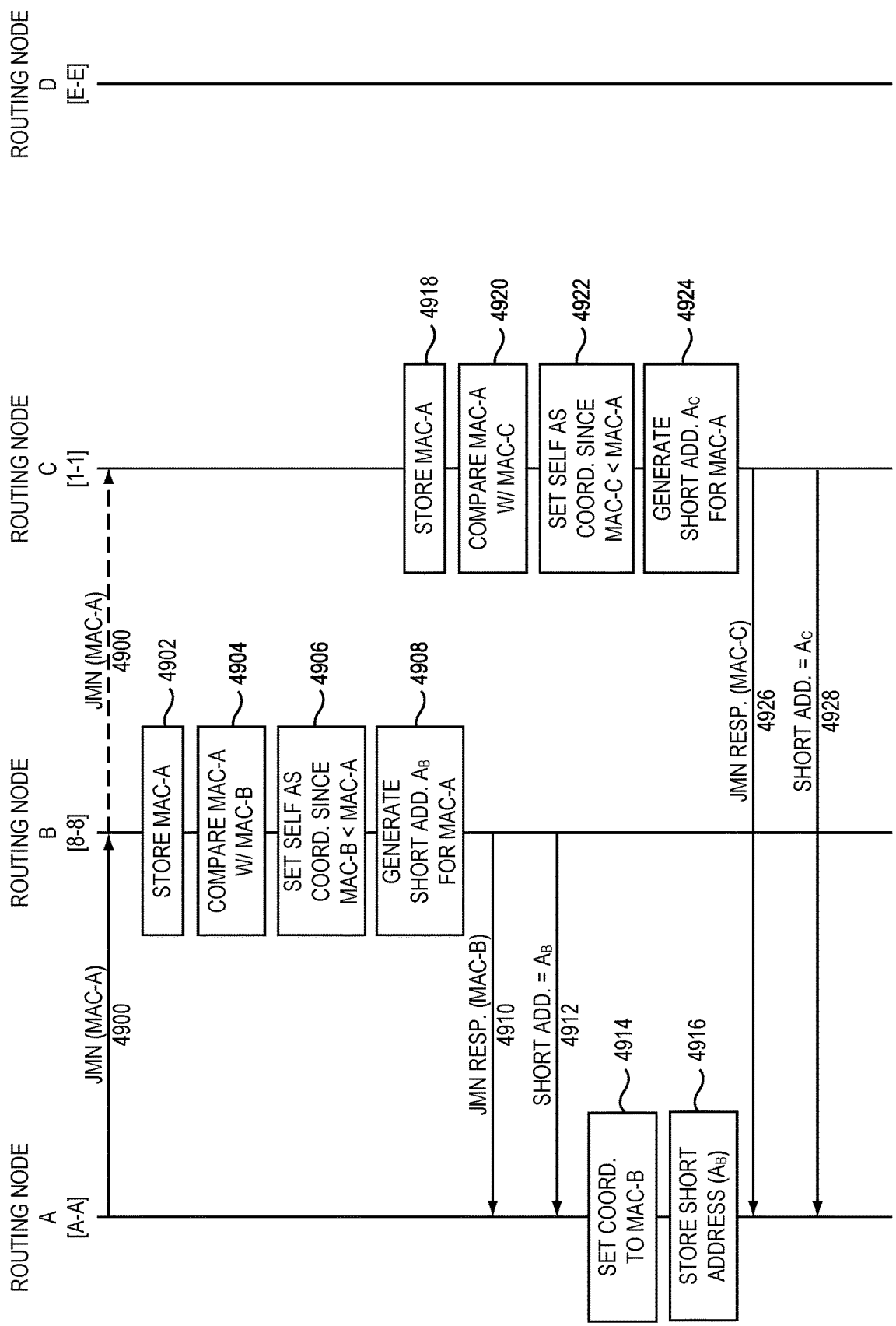

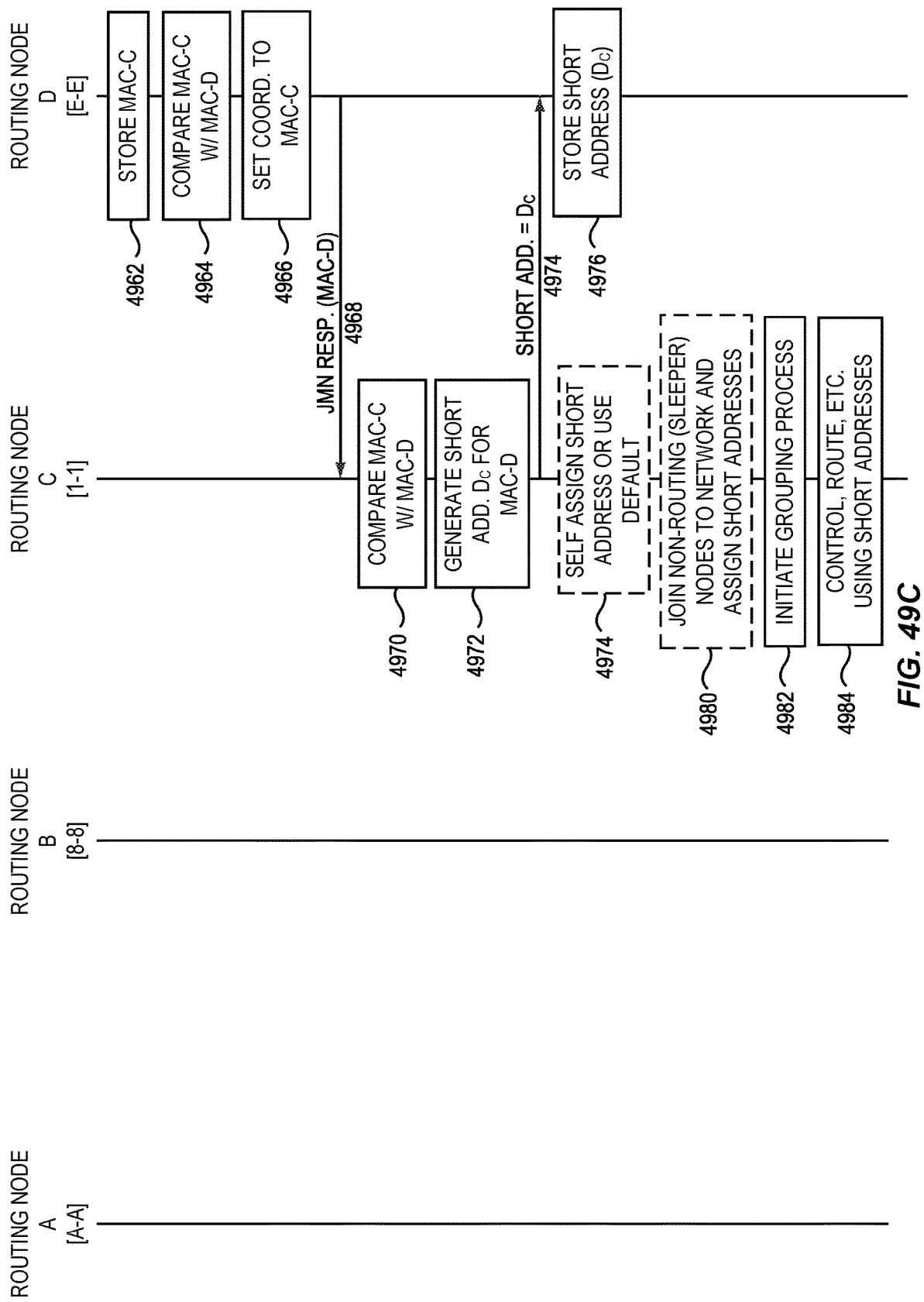

Spare-Pair Power Feed

Phantom Power Feed

ENHANCED FIXTURES FOR AREA LIGHTING

RELATED APPLICATIONS

The present application is a continuation-in-part of U.S. patent application Ser. No. 15/621,731, filed Jun. 13, 2017, now U.S. Pat. No. 11,160,148, the contents of which is incorporated herein by reference in its entirety.

The present application is a continuation-in-part of U.S. patent application Ser. No. 16/993,456, filed Aug. 14, 2020, now U.S. Patent Application Publication No. 2020/0375015 A1, which is a continuation of U.S. patent application Ser. No. 16/241,492, filed on Jan. 7, 2019, now U.S. Patent Application Publication No. 2019/0141822 A1, which is a continuation of U.S. patent application Ser. No. 15/830,406, filed on Dec. 4, 2017, issued as U.S. Pat. No. 10,206,270, which is a continuation of U.S. Pat. No. 9,872,367, issued Jan. 16, 2018, which claims the benefit of U.S. Provisional Application No. 61/923,999 filed Jan. 6, 2014 and U.S. Provisional Application No. 61/932,058 filed Jan. 27, 2014, the disclosures of which are incorporated herein by reference in their entireties.

U.S. Pat. No. 9,872,367, issued Jan. 16, 2018, is a continuation-in-part filing of U.S. Pat. No. 8,975,827, issued Mar. 10, 2015, which claims the benefit of U.S. Provisional Application No. 61/738,749, filed Dec. 18, 2012, the disclosures of which are incorporated herein by reference in their entireties.

U.S. Pat. No. 8,975,827 was further a continuation-in-part filing of U.S. patent application Ser. No. 13/589,899, filed Aug. 20, 2012, now U.S. Pat. No. 10,219,338; and Ser. No. 13/589,928, filed Aug. 20, 2012, now U.S. Pat. No. 10,506,678, each of which claims the benefit of U.S. Provisional Application No. 61/666,920, filed Jul. 1, 2012, the disclosures of which are incorporated herein by reference in their entireties.

FIELD OF THE DISCLOSURE

The present disclosure relates to area lamps, and in particular to adaptive solid-state area lamps including an emitter array configured to dynamically light different portions of a field of view.

BACKGROUND

A conventional area lamp includes a light source, which provides light within a field of view. In particular, the light source provides light to fill the entirety of the field of view. In some applications, it may be desirable to control the amount of light within different portions of a field of view of an area lamp. Such a scenario often occurs when the field of view associated with an area lamp encompasses a relatively large area, as illustrated in FIG. 1 wherein an area lamp 10 provides light that fills a large field of view 12. For example, if the field of view of an area lamp in a conference room encompasses both a seating area and a presentation area, it may be desirable to provide light within the seating area but not the presentation area during a presentation. As another example, lighting for stages may require highlighting some areas while de-emphasizing others, providing different levels of light to different areas of a stage and/or auditorium, or providing other lighting effects.

Conventionally, this problem has been solved by replacing a single area lamp with a relatively large field of view with several area lamps with a narrower field of view, as illustrated in FIG. 2 wherein a first area lamp 10A provides light that fills a first field of view 12A and a second area lamp 10B provides light that fills a second field of view 12B, wherein the first field of view 12A corresponds with a first portion of the field of view 12 illustrated in FIG. 1 and the second field of view 12B corresponds with a second portion of the field of view 12 illustrated in FIG. 1. While such a solution increases the granularity with which illumination can be provided within a space, the larger number of area lamps increases both the cost and complexity of a lighting system. Further, such a solution may become unsightly due to the large number of area lamps required to be installed in a ceiling and may decrease the energy efficiency of the lighting system.

In light of the above, there is a need for an area lamp that is capable of controlling the illumination within different portions of a field of view.

SUMMARY

In one embodiment, an area lamp includes an emitter array and driver circuitry. The emitter array includes a number of solid-state light emitters. Each one of the solid-state light emitters is configured to provide light suitable for general illumination within a field of view such that light emitted from a first subset of the number of solid-state light emitters is provided to a different portion of the field of view than light emitted from a second subset of the number of solid-state light emitters. The driver circuitry is coupled to the emitter array and configured to provide drive signals to the emitter array such that the light provided from each one of the solid-state light emitters is independently controllable and the number of drive signals is less than the number of solid-state light emitters. Using a smaller number of drive signals than there are solid-state light emitters while maintaining independent control over each one of the solid-state light emitters significantly reduces the complexity of the area lamp.

In one embodiment, an area lamp includes an emitter array and driver circuitry. The emitter array includes a number of solid-state light emitters. Each one of the solid-state light emitters is configured to provide light suitable for general illumination within a field of view such that light from each one of the solid-state light emitters is provided to a different portion of the field of view. The driver circuitry is coupled to the emitter array and configured to provide drive signals to the emitter array such that in a first mode only a first portion of the field of view is illuminated by the emitter array and in a second mode only a second portion of the field of view, which is different from the first portion, is illuminated by the emitter array. By allowing the area lamp to selectively illuminate different portions of the field of view, the area lamp may provide additional functionality and thus replace multiple conventional area lamps.

In one embodiment, an area lamp includes an emitter array and driver circuitry. The emitter array includes a number of solid-state light emitters. Each one of the solid-state light emitters is configured to provide light suitable for general illumination within a field of view such that light from each one of the solid-state light emitters is provided to a different portion of the field of view. The driver circuitry is coupled to the emitter array and configured to provide drive signals to the emitter array to provide a pattern of illumination within the field of view. By allowing the area lamp to provide a pattern of illumination, the area lamp may provide additional functionality over conventional area lamps.

In one embodiment, an area lamp includes an emitter array and driver circuitry. The emitter array includes a number of solid-state light emitters. Each one of the solid-state light emitters is configured to provide light suitable for general illumination within a field of view such that light from each one of the solid-state light emitters is provided to a different portion of the field of view. The driver circuitry is coupled to the emitter array and configured to detect a location of a person within the field of view and provide illumination only in a subsection of the field of view surrounding the location. By detecting the location of a person within the field of view of the area lamp and providing illumination only in a subsection of the field of view surrounding the location, the area lamp may provide additional functionality over conventional area lamps.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 21 is a table illustrating lightcast data for the lighting system illustrated in FIG. 20.

FIG. 39 is a block diagram of a smart fixture according to one embodiment of the disclosure.

FIG. 40 is a block diagram of an indoor RF communication module.

FIG. 41 illustrates an outdoor RF communication module according to one embodiment of the disclosure.

FIG. 42 is a block diagram of a lighting fixture comprising a smart fixture and an indoor RF communication module according to one embodiment of the disclosure.

FIG. 43 is a block diagram of a lighting fixture comprising a smart fixture, an indoor RF communication module, and a fixture sensor module according to one embodiment of the disclosure.

FIG. 44 is a block diagram of a wireless sensor according to one embodiment of the disclosure.

FIGS. 49A-49C are communication flow diagrams illustrating an iterative process for selecting a coordinator according to another embodiment of the disclosure.

DETAILED DESCRIPTION

Figure 1:
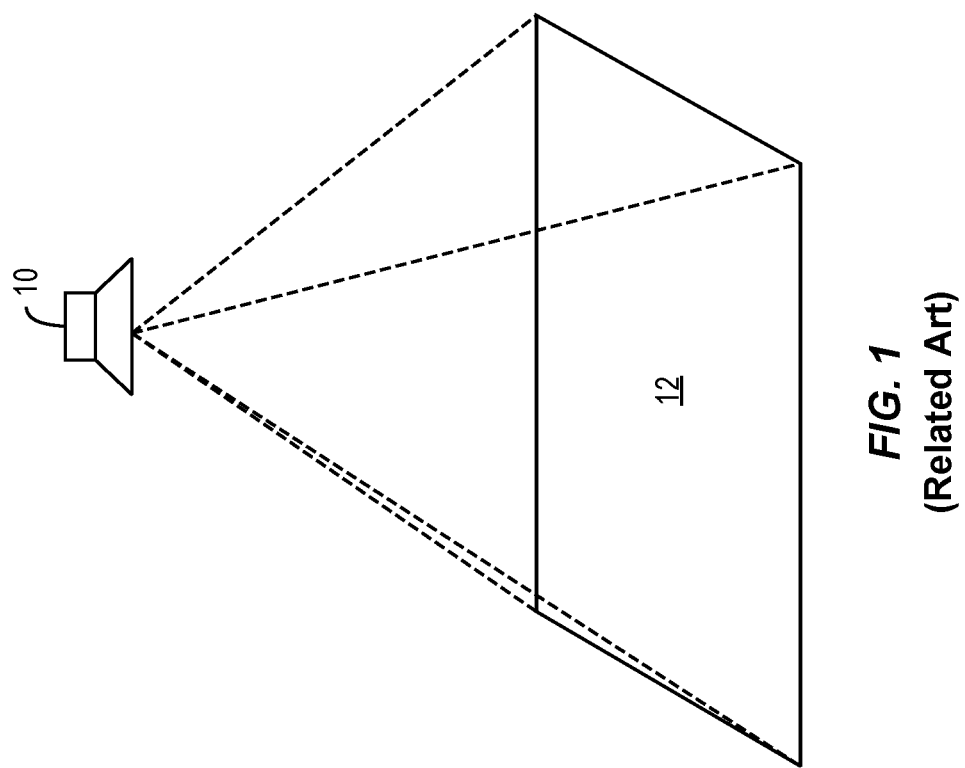
FIG. 1 illustrates a conventional area lamp and the field of view provided thereby.
Figure 2:
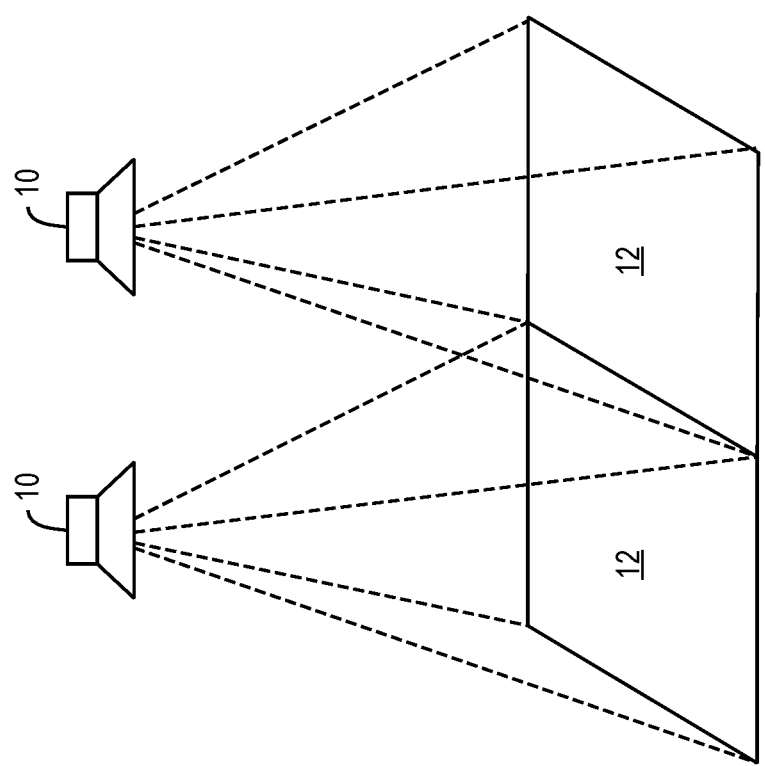
FIG. 2 illustrates a number of conventional area lamps and their corresponding fields of view.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

I. Adaptive Area Lamp

Figure 3:
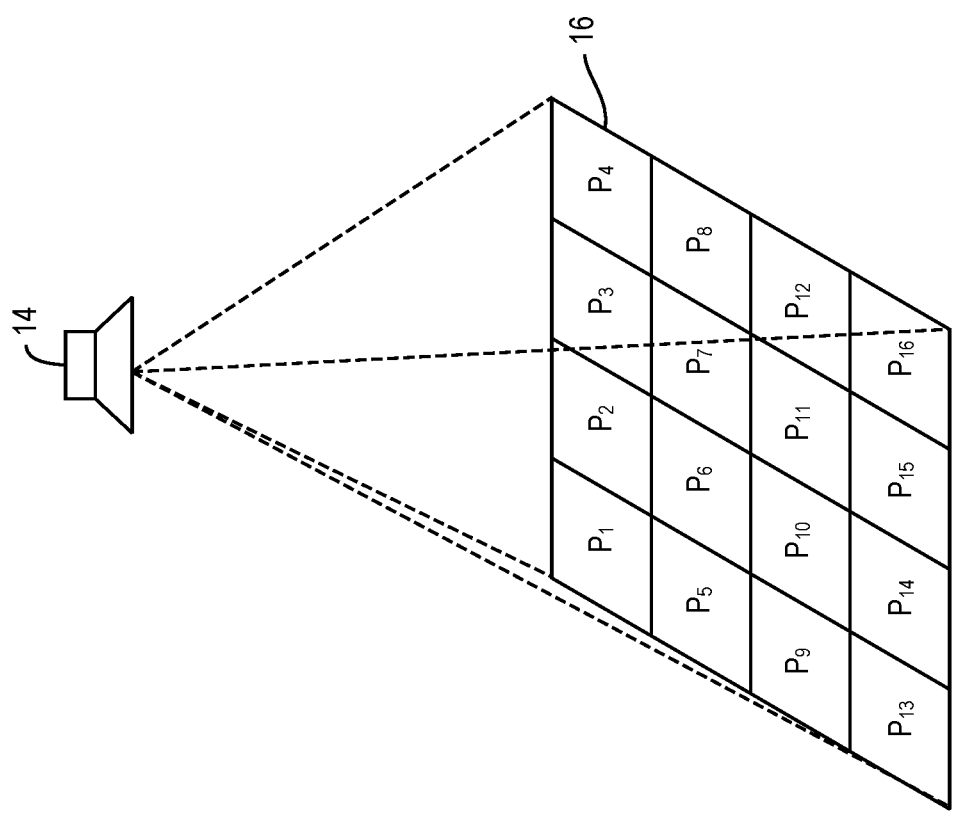
FIG. 3 illustrates an area lamp and the field of view provided thereby according to one embodiment of the present disclosure.

FIG. 3 illustrates an area lamp 14 according to one embodiment of the present disclosure. As defined herein, an area lamp is a lighting device configured to provide light for general illumination. As discussed herein, lights for general illumination are stationary lights configured to provide light within a particular indoor or outdoor space. Examples of area lamps include overhead lighting such as troffer or recessed lighting fixtures, downlights, outdoor street lamps, accent lights, stage lights, and the like. The area lamp 14 includes a light source, which is configured to illuminate a field of view 16. In particular, the light source is configured such that the area lamp 14 is capable of selectively illuminating different portions $P_1$-$P_{16}$ of the field of view 16 in a dynamic fashion. Such functionality may be enabled by an emitter array, such as an array of light emitting diodes (LEDs), which may be operated by driver circuitry as discussed in detail below. Providing an area lamp 14 that is capable of selectively illuminating different portions $P_1$-$P_{16}$ of a field of view 16 may provide several advantages over a conventional area lamp that is only capable of illuminating the entirety of a field of view as discussed in detail below.

Figure 4:
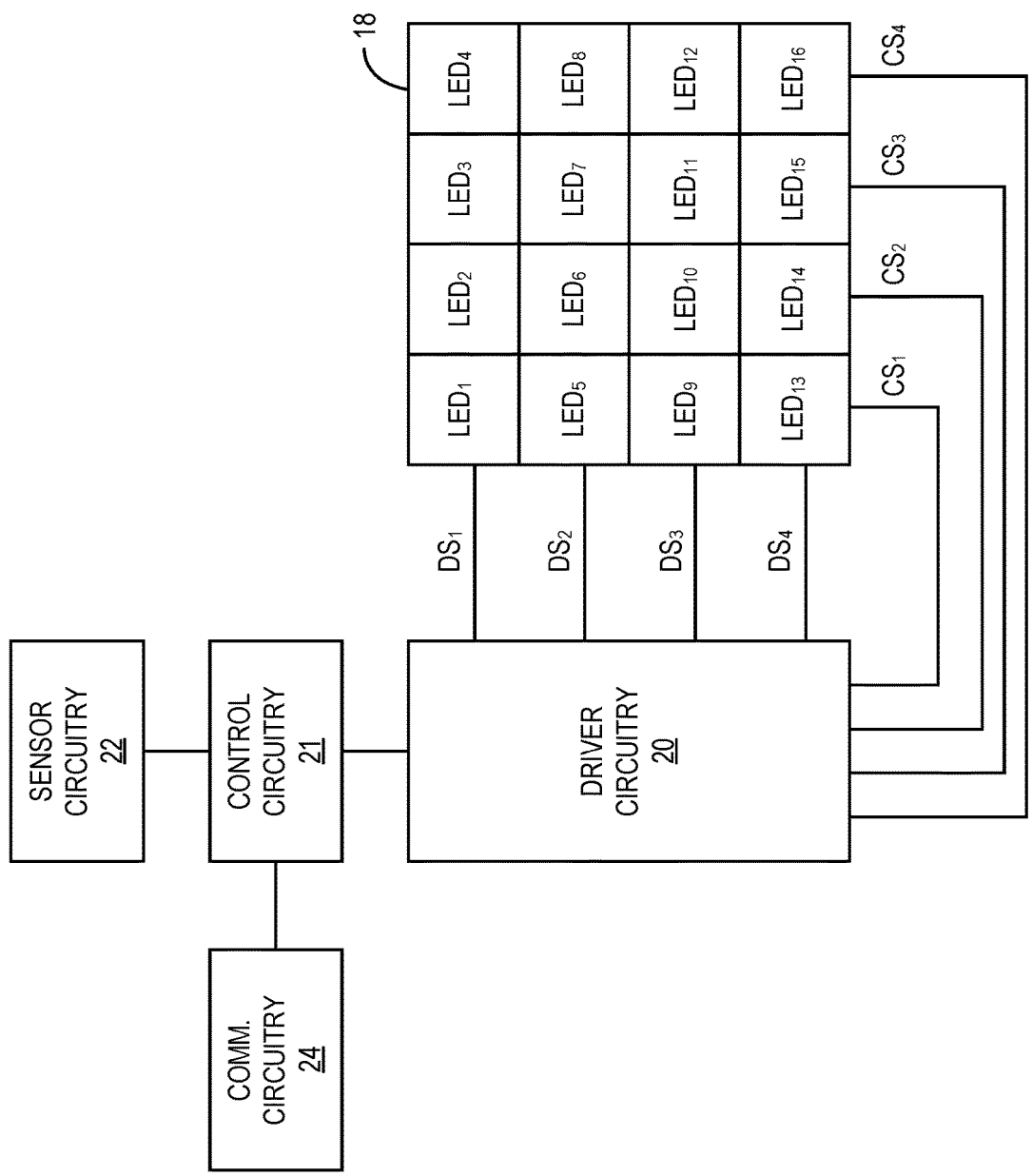
FIG. 4 illustrates details of an area lamp according to one embodiment of the present disclosure.

FIG. 4 illustrates details of the area lamp 14 according to one embodiment of the present disclosure. The area lamp 14 includes an emitter array 18, driver circuitry 20, control circuitry 21, sensor circuitry 22, and communications circuitry 24. The driver circuitry 20 is coupled to the emitter array 18. The sensor circuitry 22 and the communications circuitry 24 are coupled to the control circuitry 21, which may or may not be integrated into the driver circuitry 20. The emitter array 18 includes a number of solid-state light emitters, which in the present embodiment are LEDs (individually $LED_1$ through $LED_{16}$). In operation, the driver circuitry 20 is configured to provide one or more drive signals DS (individually $DS_1$ through $DS_4$) and/or one or more control signals CS (individually $CS_1$ through $CS_4$) to the emitter array 18. The one or more drive signals DS in combination with the one or more control signals CS provide the primary power for operation of individual LEDs in the emitter array 18. In the present embodiment, the drive signals DS and the control signals CS are provided to each one of a number of columns and/or rows in the emitter array 18 through one or more control lines coupled between the emitter array 18 and the driver circuitry 20. The driver circuitry 20 is further configured to selectively provide a path for current flow to each column in the emitter array 18.

When a path for current flow is provided by the driver circuitry 20, current from a drive signal DS provided at one of the rows may flow from the row through the column such that the LED located at the row in which the drive signal DS is provided and the column at which the path for current flow is provided by way of a control signal CS is illuminated. In various embodiments, selectively providing a path for current flow may involve connecting the column to a fixed potential such as ground. When a path for current flow is not provided, the column may be left floating, or may be connected to a different fixed potential such that a threshold voltage across the LEDs in the column is not exceeded when a drive signal DS is provided and thus the LEDs in that column do not turn on in response to a drive signal DS provided thereto.

Figure 5:
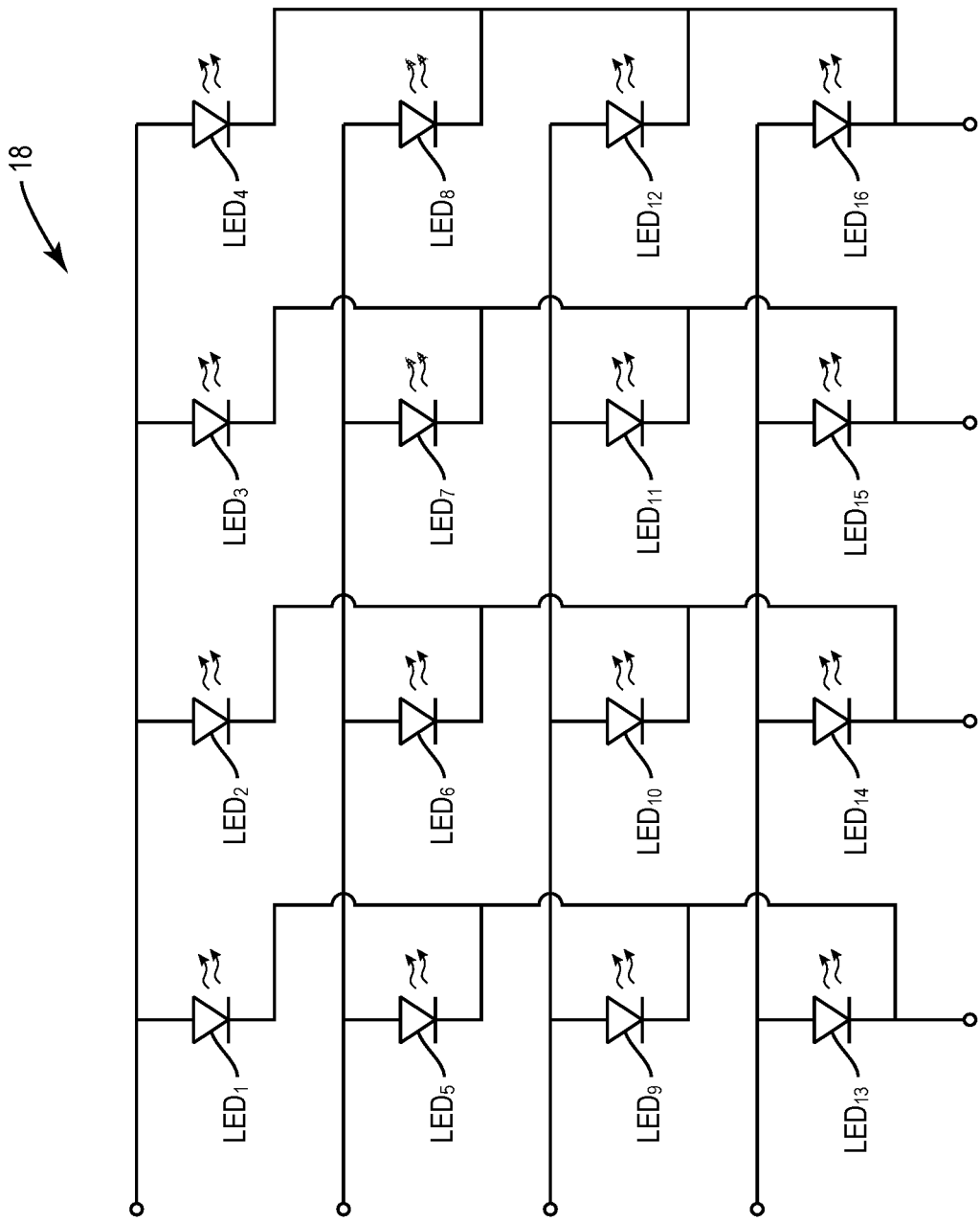
FIG. 5 illustrates details of an emitter array according to one embodiment of the present disclosure.

Details of the arrangement of the LEDs in the emitter array 18 are shown in FIG. 5. As illustrated, anodes of the LEDs in each row are coupled together, and cathodes of the LEDs in each column are coupled together. Only when a drive signal DS is provided at the row of an LED in the emitter array 18 and a path for current flow is provided at the column of the LED will the LED illuminate.

Due to the configuration of the LEDs discussed above, there are significantly less drive signals DS provided to the emitter array 18 than there are LEDs in the emitter array 18, which simplifies the circuitry of the area lamp 14. While only sixteen LEDs are shown in the emitter array 18 of FIG. 4 for purposes of illustration, the emitter array 18 may include any number of LEDs without departing from the principles herein. As the number of LEDs in the emitter array 18 increases, it quickly becomes impractical to provide an individual drive signal to each one of the LEDs. This is due to the fact that doing so would require an individual connection to each LED in the emitter array 18, thereby necessitating a large number of outputs from the driver circuitry 20 and highly dense signal routing paths from the driver circuitry 20 to the emitter array 18. At the same time, it is desirable to be able to individually control each one of the LEDs in the emitter array 18. Accordingly, a multiplexing scheme is used for controlling each one of the LEDs in the emitter array 18 wherein the drive signals DS provided to each row of the emitter array 18 are multiplexed in time (e.g., sequentially scanned). In synchrony with the drive signals DS, the driver circuitry selectively provides a path for current flow to complete a circuit path through desired ones of the LEDs in the emitter array 18. As discussed above, only those LEDs receiving a drive signal DS at the row thereof and having a path for current flow at the column thereof by way of a control signal CS will be illuminated. The multiplexing of the drive signals DS and the control signals CS may be performed such that desired ones of the LEDs appear to be constantly illuminated. That is, the illumination of the individual LEDs in the emitter array 18 may occur such that the light provided therefrom does not flicker as observed by the human eye.

Figure 6:
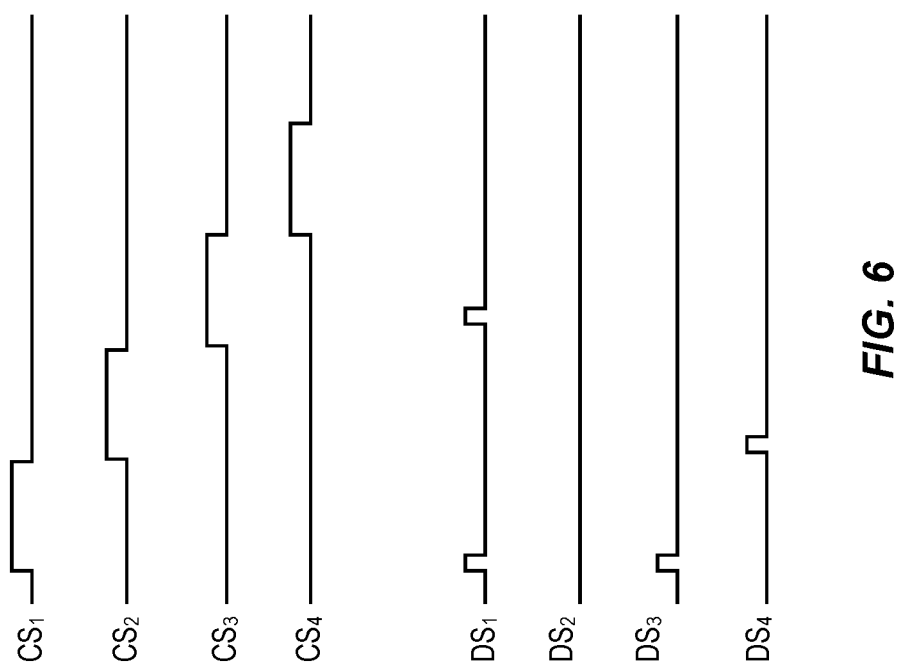
FIG. 6 is a timing diagram illustrating a control scheme for an emitter array according to one embodiment of the present disclosure.

FIG. 6 shows an exemplary multiplexing scheme for the drive signals DS and the control signals CS. As illustrated, the control signals CS may be sequentially pulsed in a repeating fashion, while the drive signals DS may be pulsed within a pulse period of a control signal CS. When both a drive signal DS and a control signal CS are high in the diagram shown in FIG. 6, a path for current flow is provided through the LED located at the column of the control signal CS and the row of the drive signal DS. Accordingly, this LED or multiple LEDs within the column are illuminated. The pulsing of the drive signals DS and the control signals CS is done at a speed such that the LEDs appear to be continuously illuminated. In other words, the drive signals DS and the control signals CS are pulsed at a speed that is imperceptible to the human eye.

The driver circuitry 20 may include the control circuitry 21, which may receive one or more measurements from the sensor circuitry 22 or other inputs (e.g., input from a user) provided via the communications circuitry 24 or otherwise. For example, the control circuitry 21 may receive measurements relating to ambient light level and occupancy from the sensor circuitry 22. The control circuitry 21 may decide which ones of the LEDs to illuminate as well as other lighting parameters such as brightness, color temperature, and the like, based on these measurements. In various embodiments, the control circuitry 21 may receive inputs from any number of different sensors and devices such as radar sensors, cameras, and the like.

The control circuitry 21 may also receive messages from remote devices such as other area lamps and/or controllers via the communications circuitry 24. In some embodiments, these messages may include input from a user. For example, a user may interact with a wall switch, a touchscreen controller, or a mobile device such as a smartphone, tablet, or computer in order to provide the messages to the control circuitry 21. A user interface may be provided to the user including an image of the area to be illuminated by the area lamp 14 or a group of lights including the area lamp 14 such that subsections of the area can be tapped and illuminated by the area lamp 14. The control circuitry 21 may similarly use data in these messages to make lighting decisions. The messages received from remote devices may include data such as sensor measurements, lighting commands, and the like. The messages may be received by the communications circuitry 24 via a wired or wireless network.

The circuitry for the area lamp 14 shown in FIGS. 4 and 5 is merely exemplary. Those skilled in the art will appreciate that functionality provided by the driver circuitry 20, the control circuitry 21, the sensor circuitry 22, the communications circuitry 24, and any other portion of the area lamp 14 may be provided by a single module or any number of different functional modules, all of which are contemplated herein. Further, those skilled in the art will appreciate that any number of different configurations for connecting the LEDs in the emitter array 18 exists for accomplishing the purposes discussed above, all of which are contemplated herein.

Operating the emitter array 18 as described above allows for the individual control over each one of the LEDs in the emitter array 18 using significantly less drive signals DS and thus connections to the emitter array 18 than the number of LEDs contained therein. Accordingly, the complexity of the area lamp 14 is reduced. In particular, the complexity of the driver circuitry 20 and the routing of connections between the driver circuitry 20 and the emitter array 18 is reduced when compared to an approach wherein each LED in the emitter array 18 has an individual connection to the driver circuitry 20.

Figure 7:
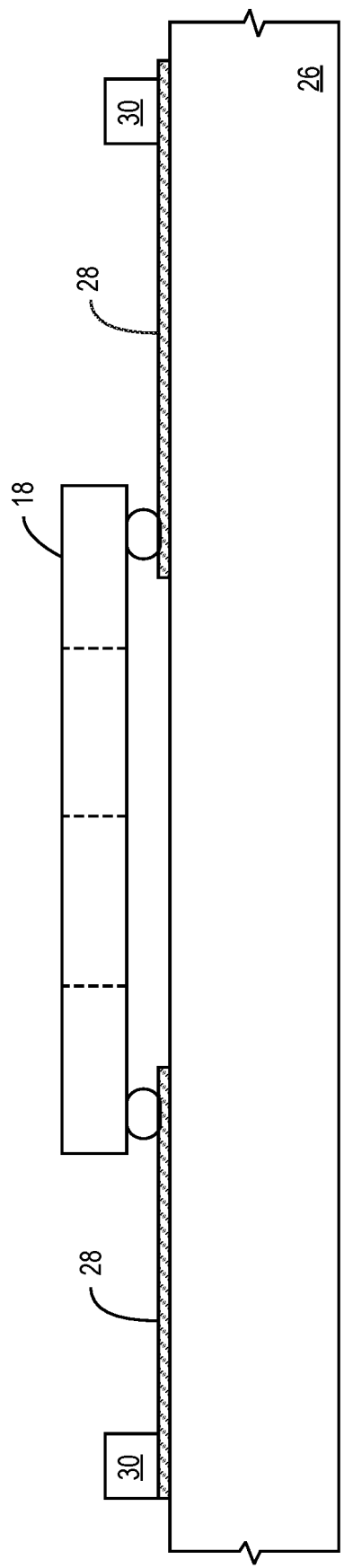
FIG. 7 illustrates details of an emitter array and a passive submount according to one embodiment of the present disclosure.

In some embodiments, the control scheme discussed above may allow for the use of a completely passive submount 26 for the emitter array 18, as illustrated in FIG. 7. The emitter array 18 may be a monolithic integrated circuit. That is, in some embodiments the LEDs of the emitter array 18 may be formed on the same semiconductor substrate. Generally, the emitter array 18 must be mounted on the submount 26 so that connections can be made to the LEDs therein. The submount 26 will generally provide a fan-out structure that allows other circuitry such as the driver circuitry 20 to connect to the LEDs in the emitter array 18 as discussed above. The operating scheme described above for the area lamp 14 may allow such a submount 26 to be free of any active components (i.e., a passive-matrix). In other words, the submount 26 on which the emitter array 18 is provided may only be used for the routing of connections, and thus may include one or more conductive traces 28 suitable for routing connections between the emitter array 18 and one or more connectors 30. The emitter array 18 may be coupled to the conductive traces 28 via any suitable technology, such as via flip-chip solder ball grid array as shown, flip-chip copper pillar, wire bond, or the like. Such a passive submount 26 may be significantly less complex than a submount requiring active components and thus may reduce the complexity and cost of the area lamp 14.

Figure 8:
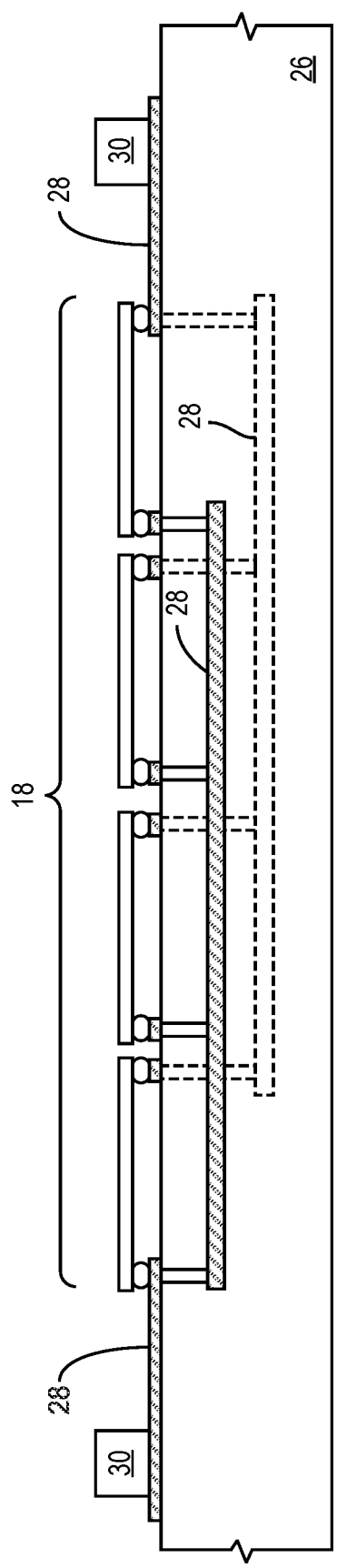
FIG. 8 illustrates details of an emitter array and a passive submount according to one embodiment of the present disclosure.

FIG. 8 illustrates the emitter array 18 according to an additional embodiment of the present disclosure wherein the LEDs are separately provided by different semiconductor die. In the embodiment shown in FIG. 7, the emitter array 18 is formed by a number of discrete LEDs mounted on the submount 26. The LEDs are connected to one another by the conductive traces 28, which are shown below a surface of the passive submount 26 (e.g., by way of a multi-layer printed circuit board). As discussed above, the operating scheme described above for the area lamp 14 may allow the submount 26 to be free of any active components, which may significantly decrease the complexity of the submount 26 and therefore the area lamp 14.

Further to the above, the control scheme discussed above may allow the emitter array 18 to be controlled using one or more off-the-shelf components for the driver circuitry 20, such as part number MBI5026 manufactured by Macroblock of Hsinchu, Taiwan or other similar display driver parts. To compensate for the fact that these parts are used to drive LEDs for displays, which provide significantly less light than LEDs used for general illumination such as the LEDs in the emitter array 18 and thus are operated at lower power, these off-the-shelf components may be adjusted to provide the drive signals DS at their maximum rated current output, may be overdriven above their maximum rated current output, or multiple off-the-shelf components may be connected in parallel to provide additional current for the drive signals DS. For example, the driver circuitry 20 may be configured to provide the driver signals DS such that the instantaneous current density of each one of the LEDs in the emitter array 18 is greater than 5 $A/mm^2$, greater than 10 $A/mm^2$, greater than 50 $A/mm^2$, and even greater than 100 $A/mm^2$ when illuminated.

Figure 9:
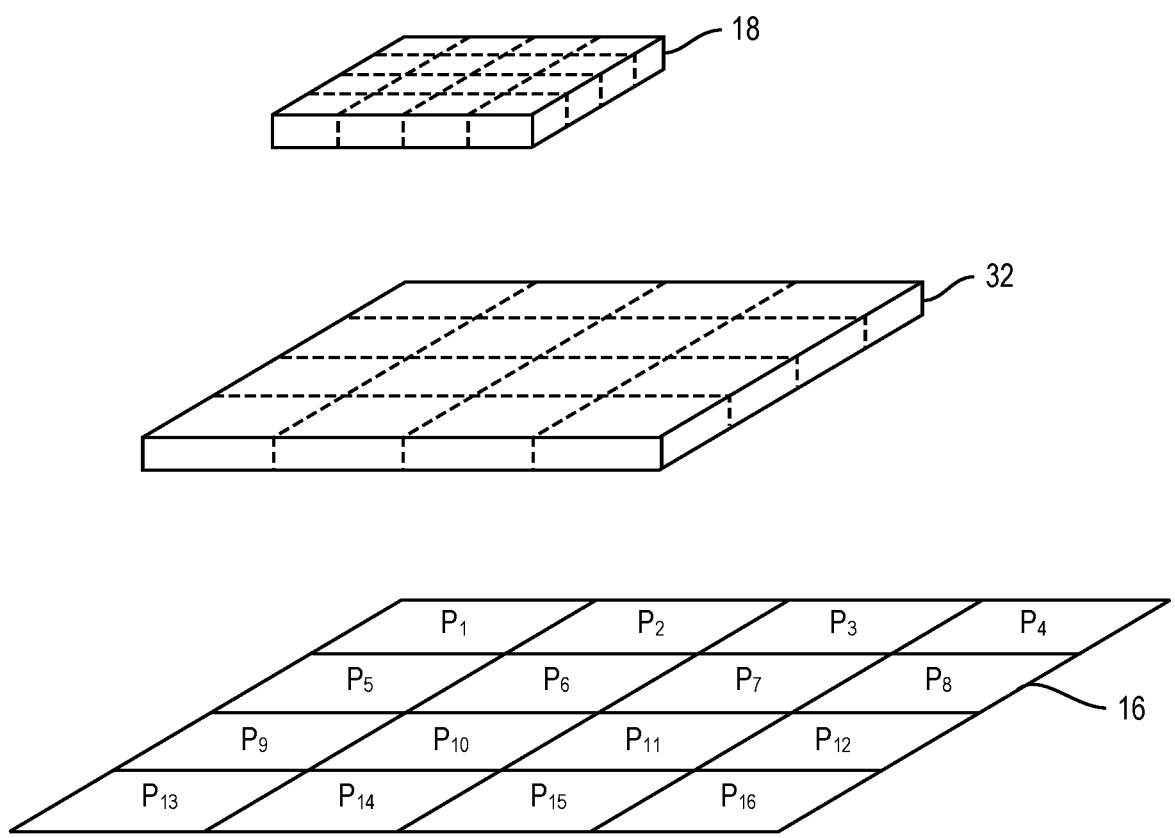
FIG. 9 illustrates details of an emitter array and corresponding lens(es) according to one embodiment of the present disclosure.

In order to enable the LEDs in the emitter array 18 to selectively illuminate different portions of the field of view 16, one or more optic elements 32 (e.g., lenses) may be provided in the area lamp 14, as illustrated in FIG. 9. The one or more optic elements 32 may be responsible for focusing or otherwise conditioning light from one or more of the LEDs in the emitter array 18 such that the light provided by the one or more of the LEDs is substantially confined to a portion P of the field of view 16. The one or more optic elements 32 may be provided in any number of configurations suitable for providing such functionality. In one embodiment, the one or more optic elements 32 may be provided as a single lens. In another embodiment, the one or more optic elements 32 may comprise a single lens having multiple lens segments. In yet another embodiment, the one or more optic elements 32 may include any number of separate or connected lens elements. Further, the optical elements 32 may include primary and/or secondary optics that work together to focus or otherwise condition the light provided by the one or more LEDs as discussed above. While the emitter array 18 and the optic elements 32 are shown as flat, rectangular components in FIG. 8, the present disclosure is not so limited. The emitter array 18 and the optic elements 32 may be provided in any number of shapes, for example, as curved or otherwise non-planar elements, in order to provide the functionality discussed herein. Providing the emitter array 18 and the one or more optic elements 32 in this manner allows the area lamp 14 to selectively illuminate different portions of the field of view 16. In one embodiment, each LED in the emitter array 18 is configured to illuminate a different portion P of the field of view 16. That is, in one embodiment there is a one-to-one relationship between the LEDs in the emitter array 18 and the number of portions within the field of view of the area lamp 14 that may be selectively illuminated. In another embodiment, different groups of LEDs in the emitter array 18 are configured to illuminate different portions P of the field of view 16. That is, in one embodiment there is a many to one relationship between the LEDs in the emitter array 18 and the number of portions within the field of view of the area lamp 14 that may be selectively illuminated. The number of LEDs in the emitter array 18 and the configuration of the one or more optic elements 32 will generally dictate the number of different portions P of the field of view 16 that can be selectively illuminated. However, the relationship between the number of LEDs in the emitter array 18 and the number of different portions P of the field of view 16 may not be one-to-one, but rather may be many-to-one, one-to-many, or any combination thereof.

Providing the area lamp 14 such that it is capable of selectively illuminating different portions P of the field of view 16 may be used to provide additional features over conventional area lamps. First, multiple area lamps 14 having a relatively narrow field of view 16 may be replaced by a single area lamp 14 according to the present disclosure, thereby simplifying a lighting system in which the area lamp 14 is provided. In applications in which area lamps 14 already provide a relatively large field of view 16 (e.g., factory lighting, outdoor lighting), additional functionality may be provided by allowing for the selective illumination of different portions of the field of view thereof.

Figure 10:
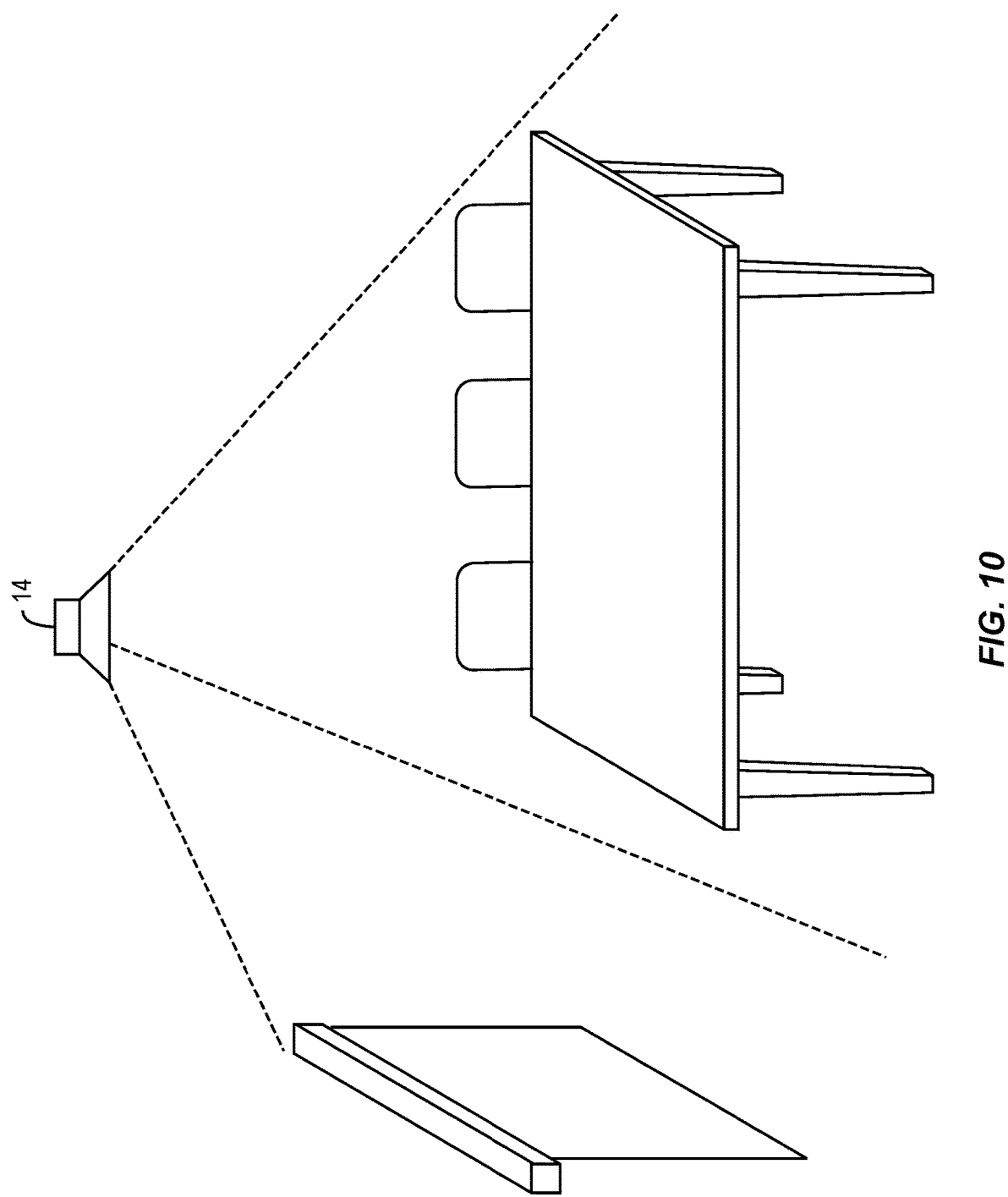
FIG. 10 illustrates an exemplary lighting application of an area lamp according to one embodiment of the present disclosure.

In one exemplary embodiment, the control circuitry 21 may be configured to illuminate a first portion of the field of view of the area lamp 14 in a first mode of operation, and illuminate a second portion of the field of view of the area lamp 14 in a second mode of operation. The first portion may include the entirety of the field of view, while the second portion may include a subset of the field of view. Such an application may be useful, for example, in an area lamp 14 provided in a conference room in which the field of view of the area lamp overlaps a seating area and a presentation area as illustrated in FIG. 10. During a presentation in the conference room, it may be undesirable to directly light the presentation area, for example, to avoid washing out images presented on a screen in the presentation area. Accordingly, the first mode of operation of the area lamp 14 may be used when a presentation is not being given in the conference room while the second mode of operation may be used when a presentation utilizing the screen is in progress in the conference room. The control circuitry 21 may interact with the sensor circuitry 22, which may include an image sensor such as a camera, in order to light dark areas more than light areas in some embodiments. In these embodiments, when the projector is turned on the light provided by the area lamp 14 in that area would automatically be reduced due to the additional brightness provided by the projector. Accordingly, such a transition may happen automatically. In other embodiments, this function may be initiated by a user (e.g., by interaction with a wall switch, a touchscreen interface, or a smartphone, tablet, or computer). Such applications may further be used to reduce the power consumption of the area lamp 14, for example, in a setting in which only a portion of the field of view is required to be illuminated. If only half of the LEDs in the emitter array 18 are required for illuminating the portion of the field of view as opposed to the entirety thereof, the power consumption of the area lamp 14 may be reduced when illumination of the entirety of the field of view is not required. For example, if nobody is in the presentation area of the conference room the area lamp 14 may not illuminate the presentation area to reduce the power consumption thereof in certain embodiments.

Figure 11:
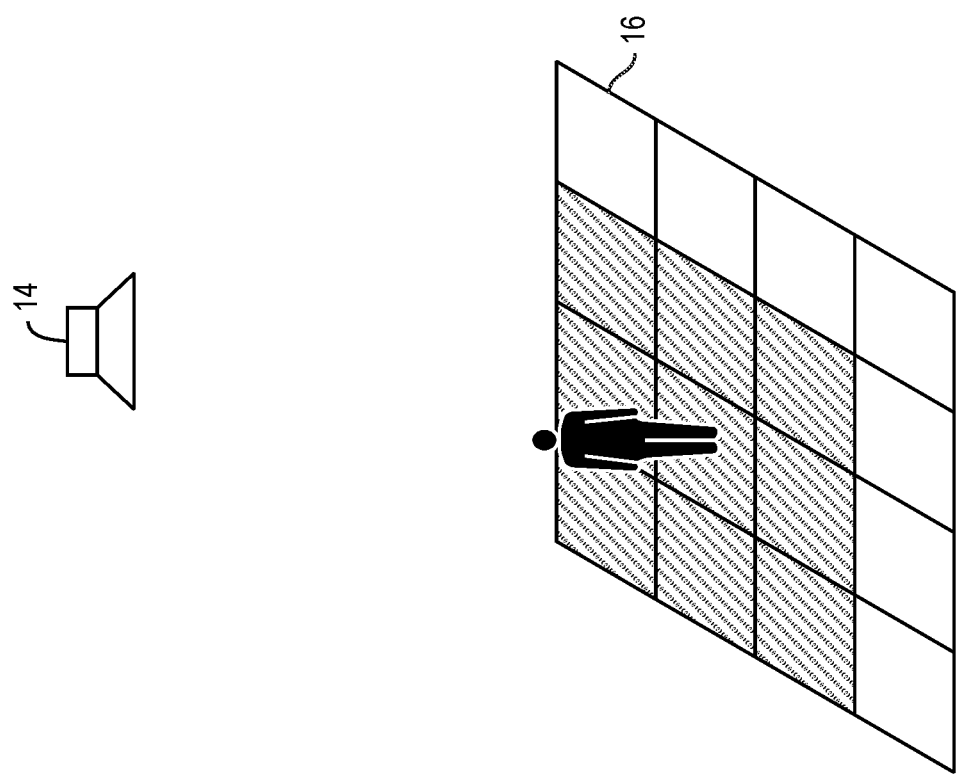
FIG. 11 illustrates an exemplary lighting application of an area lamp according to one embodiment of the present disclosure.
Figure 12:
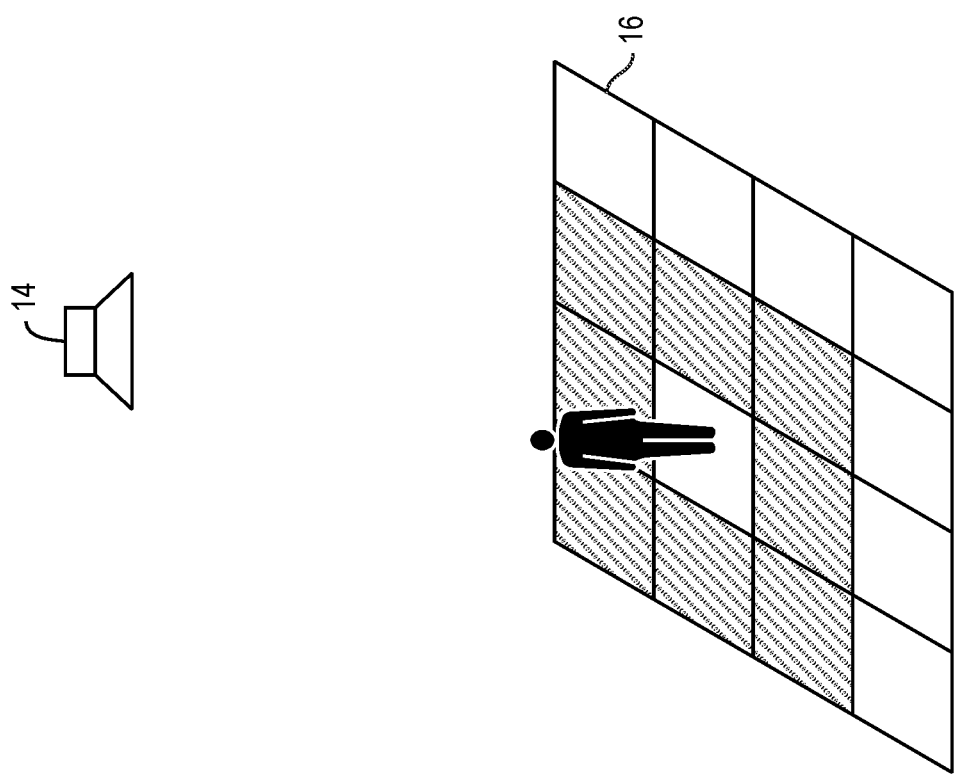
FIG. 12 illustrates an exemplary lighting application of an area lamp according to one embodiment of the present disclosure.

In another embodiment, the control circuitry 21 may be configured to use measurements from the sensor circuitry 22 to locate one or more objects within the field of view of the area lamp 14. The control circuitry 21 may then illuminate a subsection of the field of view of the area lamp 14 surrounding the object or objects. In other embodiments, it may be desirable to illuminate the area surrounding an object or objects but not the area directly in which the object or objects is located in order to avoid glare or otherwise disturbing the object or objects. Accordingly, a ring of illumination may be provided around the object or objects in some embodiments such that illumination is not provided directly over the object or objects. The object or objects may include, for example, a person, a vehicle, and/or an animal. FIG. 11 illustrates an embodiment wherein a number of portions surrounding a person in the field of view of the area lamp 14 are illuminated as indicated by the hatched lines in these portions. FIG. 12 illustrates an embodiment wherein a number of portions surrounding a person in the field of view but not the portion of the field of view in which the person is standing are illuminated as indicated by the hatched lines in these portions.

Figure 13:
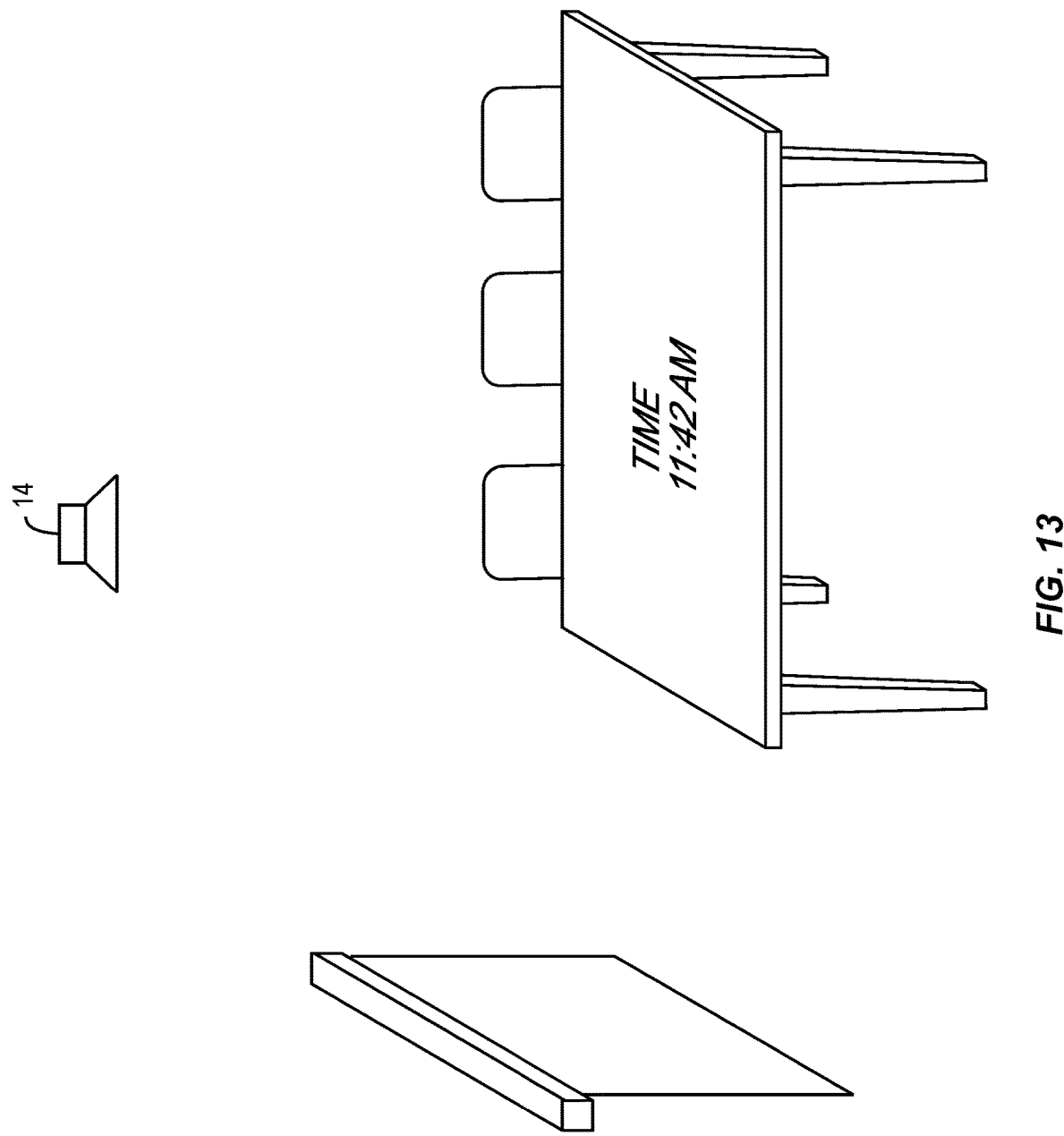
FIG. 13 illustrates an exemplary lighting application of an area lamp according to one embodiment of the present disclosure.

In another embodiment, the driver circuitry 20 may be configured to provide a pattern of illumination within the field of view of the area lamp 14. Such patterns may be dynamic and used to communicate information to a person or persons viewing the illumination pattern. For example, if a large enough number of LEDs in the emitter array 18 are provided and the one or more optic elements 32 divide the field of view into a relatively large number of portions with adequate resolution, alphanumeric characters may be selectively illuminated or not illuminated within the field of view of the area lamp 14 such that readable information can be conveyed thereby. For example, the time of day, the number of parking spots remaining in a parking garage, the weather outside, or any other information may be projected onto a surface within the field of view of the area lamp 14, effectively turning any surface within the field of view into an informational display. The information presented within the field of view is only limited by the resolution achievable by the emitter array 18 and the one or more optic elements 32 as discussed above, as well as the suitability of the surfaces for the display of information within the field of view of the area lamp 14. In various embodiments, distortions such as those due to orientation, surface shape, and the like of various surfaces in the field of view may be detected by the sensor circuitry 22, for example, using a camera or a depth-sensing camera, and corrected or otherwise compensated for by the one or more optic elements 32, which may be dynamically controlled by the driver circuitry 20. FIG. 13 illustrates an embodiment wherein the time of day is projected onto a table in a conference room by the area lamp 14.

In such an embodiment, the area lamp 14 may include a large number of LEDs in the emitter array 18 and precise optics in the one or more optic elements 32 allowing the area lamp to project the time onto the table with a desired degree of precision. In the exemplary illustration of FIG. 13, the time may be displayed by not providing light in this area; however, the opposite may also be true in various embodiments. Further, the emitter array 18 may include LEDs having different colors in various embodiments such that information may be displayed using a different color of light than that used for general illumination.

Figure 14:
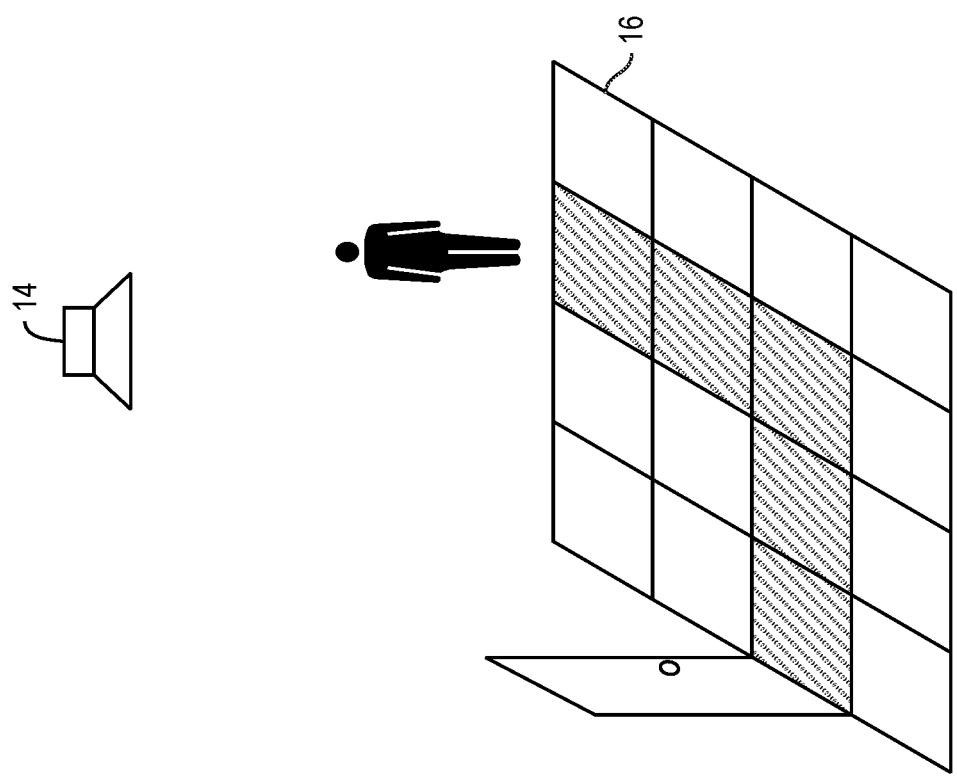
FIG. 14 illustrates an exemplary lighting application of an area lamp according to one embodiment of the present disclosure.

In another example, a desired path for traffic (e.g., foot traffic, vehicle traffic, etc.) may be illuminated through the field of view, indicating the path that should be taken by a person or persons traveling through the field of view. Such an application may be especially useful in emergency situations in which a path to the closest exit may be illuminated by the area lamp 14. Further, such an application may be useful for providing directions through a space, such as directing a vehicle into a vacant parking spot in a parking garage or directing an individual towards a reception area in a building. FIG. 14 illustrates an embodiment in which a path through the field of view 16 of the area lamp 14 to a nearby door is illuminated such that a person can follow the illuminated path and reach the door.

In various embodiments, several area lamps 14 may work together to provide light to different portions of a combined area of interest. The field of view of each one of the area lamps 14 may overlap to some extent. Accordingly, adjacent ones of the area lamps 14 may be configured to coordinate the light output thereof to selectively provide light to different portions of the overlapping fields of view thereof. Image sensors within or otherwise connected to the area lamps 14 may be used to coordinate these adjacent area lamps 14. For example, an image sensor associated with a first area lamp 14 may detect a light pattern provided by an adjacent area lamp 14 and coordinate with the adjacent area lamp in order to contribute to or not interfere with the light pattern provided thereby.

II. Intelligent Lighting Fixtures and Network

The present disclosure further relates to a lighting network where control of the lighting fixtures in the network may be distributed among the lighting fixtures. The lighting fixtures may be broken into groups that are associated with different lighting zones. At least some of the lighting fixtures will have or be associated with one or more sensors, such as occupancy sensors, ambient light sensors, and the like. Within the overall lighting network or the various lighting zones, the lighting fixtures may share sensor data from the sensors. Each lighting fixture may process sensor data provided by its own sensor, a remote standalone sensor, or lighting fixture, and process the sensor data according to the lighting fixture's own internal logic to control operation of the lighting fixture. The lighting fixtures may also receive control input from other lighting fixtures, control nodes, light switches, and commissioning tools. The control input may be processed along with the sensor data according to the internal logic to further enhance control of the lighting fixture.

Accordingly, control of the lighting network of the present disclosure may be decentralized so that each lighting fixture essentially operates independently of the lighting network; however, the internal logic in each of the lighting fixtures is configured so that the lighting fixtures may act in concert as a group. While acting in concert, each lighting fixture may operate in a different manner depending on the goals for the particular lighting application. The lighting fixtures may also respond to any user inputs that are presented.

For example, a switch may be used to turn on all of the lighting fixtures in a particular zone. However, the amount of light provided by the various lighting fixtures may vary from one lighting fixture to the next based on the amount of ambient light present or the relative occupancy in the different areas of the lighting zone. The lighting fixtures closer to windows may provide less light or light of a different color or color temperature than those lighting fixtures that are near an interior wall. Further, lighting fixtures closer to people or those proximate to larger groups of people may provide more light or light of a different color or color temperature relative to the other lighting fixtures. For example, in a long hallway, the presence of an occupant could not only turn on the hallway group of lighting fixtures, but could also dictate dimming levels for the various fixtures so that the whole hallway is lit with a low light level while the area (or areas) immediately around the occupant (or occupants) has a higher light level. The areas with more occupants could have higher light output than those with fewer or more occupants. The speed of travel could also dictate relative light output levels.

Traditional lighting control systems rely on a central controller to make all decisions and control the various lighting fixtures from afar. The distributed control approach of the present disclosure is not so limited. While a central controller may be employed, the commands from the central controller may be treated as a suggestion or just another input to be considered by each lighting fixture's internal logic. Particularly unique to the present disclosure is the ability to share sensor data between lighting fixtures. Being able to share sensor data allows otherwise independently functioning lighting fixtures to act as a group in a coordinated fashion.

For example, each lighting fixture in a lighting zone may take its own ambient light reading, but rather than acting only on its own ambient light reading, the ambient light reading is shared with the other lighting fixtures in the group. When all of the light fixtures in the lighting zone have shared their ambient light readings, each lighting fixture can independently determine an average or a minimum light output based on the ambient light readings from the entire group. As such, the lighting fixtures in the group will adjust their output consistently with one another while operating independently from one another.

Prior to delving into the details of the present disclosure, an overview of an exemplary lighting fixture in which the distributed lighting control system may be employed is described. While the concepts of the present disclosure may be employed in any type of lighting system, the immediately following description describes these concepts in a troffer-type lighting fixture, such as the lighting fixture 110 illustrated in FIGS. 15-17. While the disclosed lighting fixture 110 employs an indirect lighting configuration wherein light is initially emitted upward from a light source and then reflected downward, direct lighting configurations may also take advantage of the concepts of the present disclosure. In addition to troffer-type lighting fixtures, the concepts of the present disclosure may also be employed in recessed lighting configurations, wall mount lighting configurations, outdoor lighting configurations, and the like. Reference is made to co-assigned U.S. patent application Ser. No. 13/589,899 filed Aug. 20, 2013, now U.S. Pat. No. 10,219,338, and Ser. No. 13/649,531 filed Oct. 11, 2012, now U.S. Pat. Nos. 10,274,183, and 8,829,800, issued Sep. 9, 2014, the contents of which are incorporated herein by reference in their entireties. Further, the functionality and control techniques described below may be used to control different types of lighting fixtures, as well as different groups of the same or different types of lighting fixtures at the same time.

Figure 15:
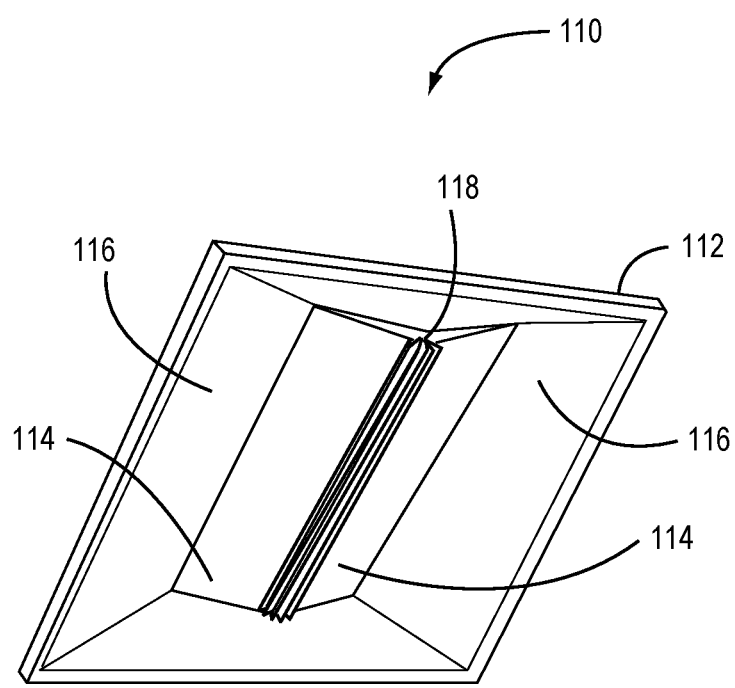
FIG. 15 is a perspective view of a troffer-based lighting fixture according to one embodiment of the disclosure.
Figure 16:
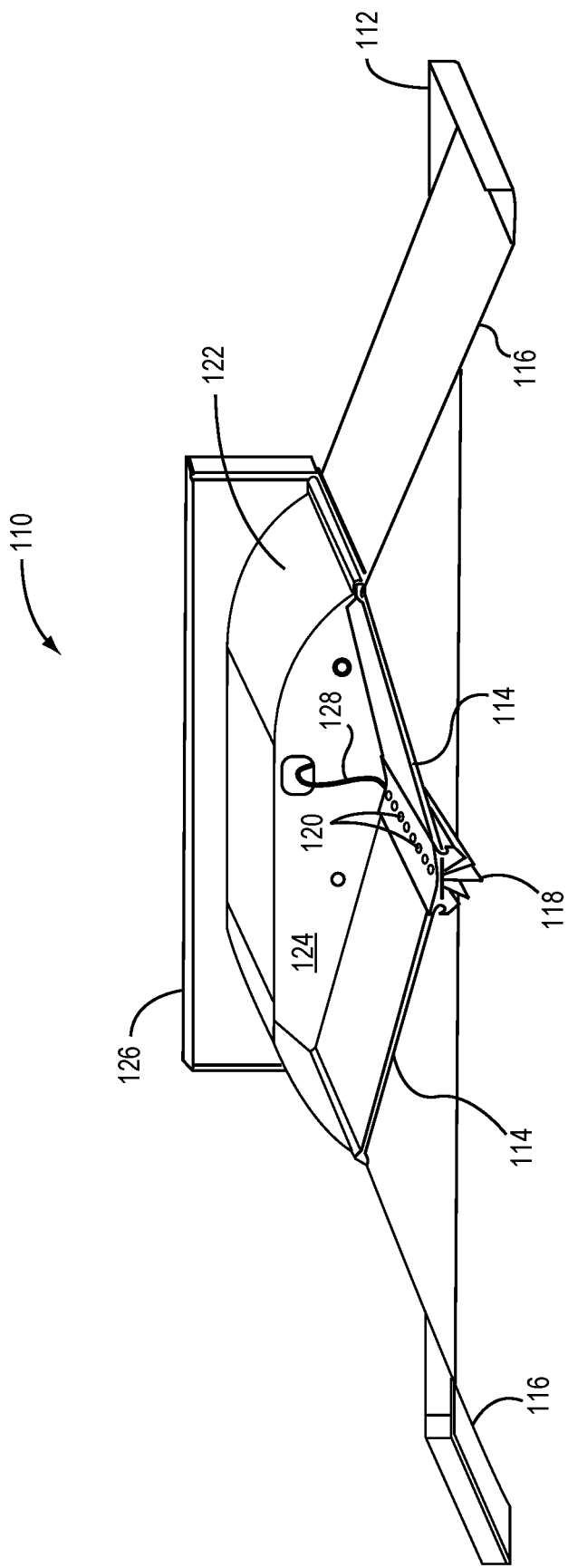
FIG. 16 is a cross section of the lighting fixture of FIG. 15.
Figure 17:
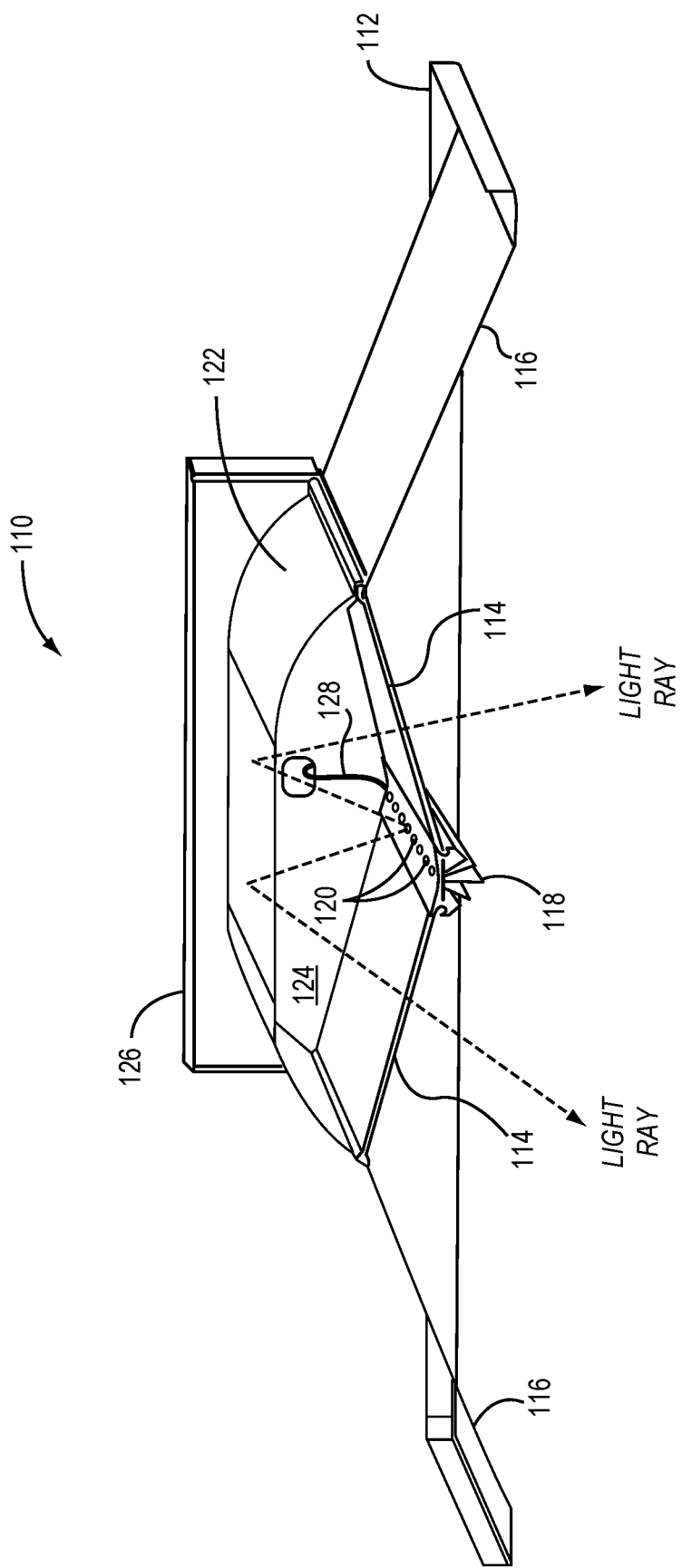
FIG. 17 is a cross section of the lighting fixture of FIG. 15 illustrating how light emanates from the LEDs of the lighting fixture and is reflected out through lenses of the lighting fixture.

In general, troffer-type lighting fixtures, such as the lighting fixture 110, are designed to mount in a ceiling. In most applications, the troffer-type lighting fixtures are mounted into a drop ceiling (not shown) of a commercial, educational, or governmental facility. As illustrated in FIGS. 15-17, the lighting fixture 110 includes a square or rectangular outer frame 112. In the central portion of the lighting fixture 110 are two rectangular lenses 114, which are generally transparent, translucent, or opaque. Reflectors 116 extend from the outer frame 112 to the outer edges of the lenses 114. The lenses 114 effectively extend between the innermost portions of the reflectors 116 to an elongated heatsink 118, which functions to join the two inside edges of the lenses 114.

Turning now to FIGS. 16 and 17 in particular, the back side of the heatsink 118 provides a mounting structure for an LED array 120, which includes one or more rows of individual LEDs mounted on an appropriate substrate. The LEDs are oriented to primarily emit light upwards toward a concave cover 122. The volume bounded by the cover 122, the lenses 114, and the back of the heatsink 118 provides a mixing chamber 124. As such, light will emanate upwards from the LEDs of the LED array 120 toward the cover 122 and will be reflected downward through the respective lenses 114, as illustrated in FIG. 17. Notably, not all light rays emitted from the LEDs will reflect directly off of the bottom of the cover 122 and back through a particular lens 114 with a single reflection. Many of the light rays will bounce around within the mixing chamber 124 and effectively mix with other light rays, such that a desirably uniform light is emitted through the respective lenses 114.

Those skilled in the art will recognize that the type of lenses 114, the type of LEDs, the shape of the cover 122, and any coating on the bottom side of the cover 122, among many other variables, will affect the quantity and quality of light emitted by the lighting fixture 110. As will be discussed in greater detail below, the LED array 120 may include LEDs of different colors, wherein the light emitted from the various LEDs mixes together to form a white light having a desired color temperature and quality based on the design parameters for the particular embodiment.

As is apparent from FIGS. 16 and 17, the elongated fins of the heatsink 118 may be visible from the bottom of the lighting fixture 110. Placing the LEDs of the LED array 120 in thermal contact along the upper side of the heatsink 118 allows any heat generated by the LEDs to be effectively transferred to the elongated fins on the bottom side of the heatsink 118 for dissipation within the room in which the lighting fixture 110 is mounted. Again, the particular configuration of the lighting fixture 110 illustrated in FIGS. 15-17 is merely one of the virtually limitless configurations for lighting fixtures 110 in which the concepts of the present disclosure are applicable.

Figure 18:
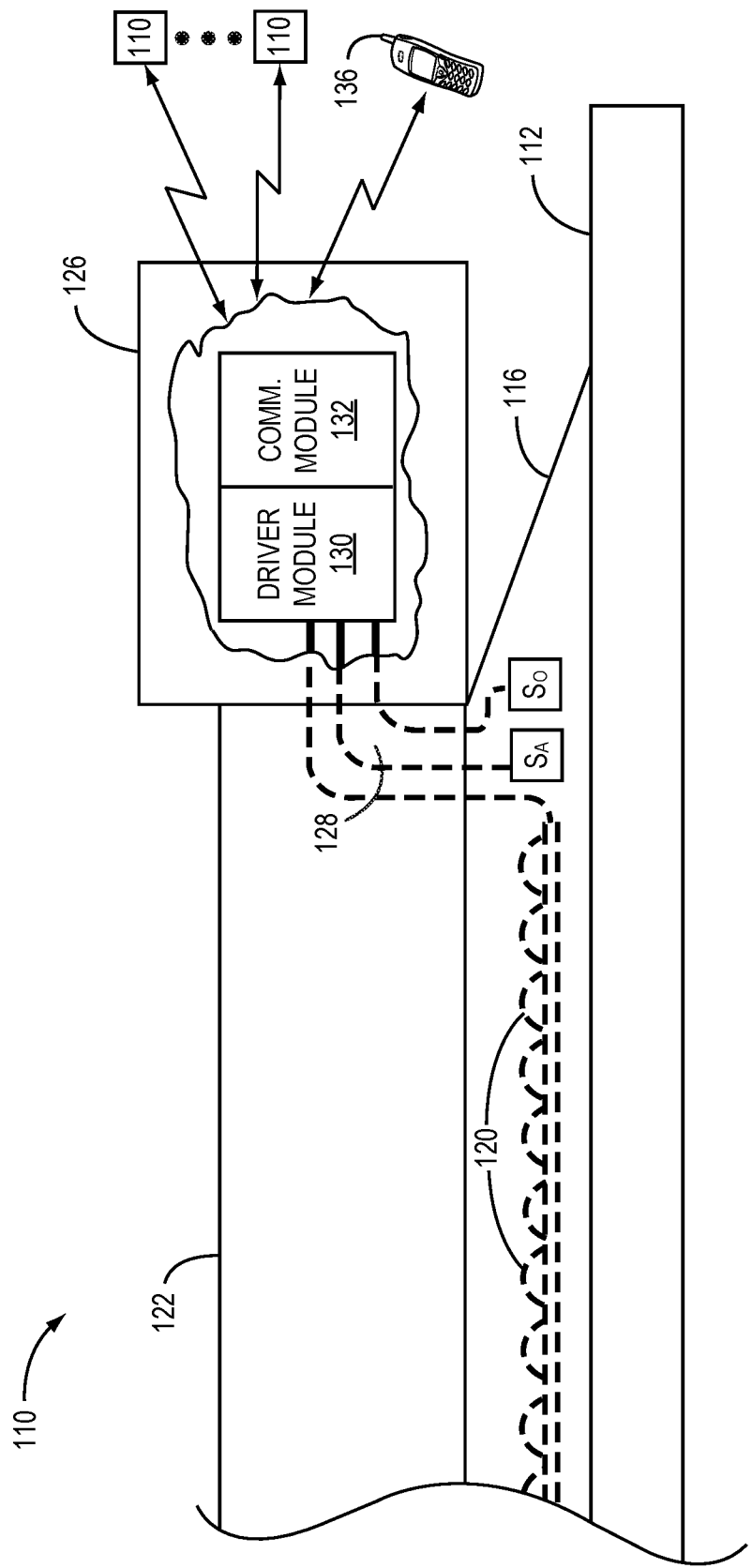
FIG. 18 illustrates a driver module and a communications module integrated within an electronics housing of the lighting fixture of FIG. 15.

With continued reference to FIGS. 16 and 17, an electronics housing 126 is shown mounted at one end of the lighting fixture 110, and is used to house all or a portion of the electronics used to power and control the LED array 120. These electronics are coupled to the LED array 120 through appropriate cabling 128. With reference to FIG. 18, the electronics provided in the electronics housing 126 may be divided into a driver module 130 and a communications module 132.

At a high level, the driver module 130 is coupled to the LED array 120 through the cabling 128 and directly drives the LEDs of the LED array 120 based on control information provided by the communications module 132. The driver module 130 provides the intelligence for the lighting fixture 110 and is capable of driving the LEDs of the LED array 120 in a desired fashion. The driver module 130 may be provided on a single, integrated module or divided into two or more sub-modules depending on the desires of the designer.

The communications module 132 acts as an intelligent communication interface that facilitates communications between the driver module 130 and other lighting fixtures 110, a remote control system (not shown), or a portable handheld commissioning tool, which may also be configured to communicate with a remote control system in a wired or wireless fashion. The commissioning tool is referred to herein as a commissioning tool 136, which may be used for a variety of functions, including the commissioning of a lighting network. As noted above, these communications may include the sharing of sensor data, instructions, and any other data between the various lighting fixtures 110 in the lighting network. In essence, the communications module 132 functions to coordinate the sharing of intelligence and data among the lighting fixtures 110.

In the embodiment of FIG. 18, the communications module 132 may be implemented on a separate printed circuit board (PCB) than the driver module 130. The respective PCBs of the driver module 130 and the communications module 132 may be configured to allow the connector of the communications module 132 to plug into the connector of the driver module 130, wherein the communications module 132 is mechanically mounted, or affixed, to the driver module 130 once the connector of the communications module 132 is plugged into the mating connector of the driver module 130.

In other embodiments, a cable may be used to connect the respective connectors of the driver module 130 and the communications module 132, other attachment mechanisms may be used to physically couple the communications module 132 to the driver module 130, or the driver module 130 and the communications module 132 may be separately affixed to the inside of the electronics housing 126. In such embodiments, the interior of the electronics housing 126 is sized appropriately to accommodate both the driver module 130 and the communications module 132. In many instances, the electronics housing 126 provides a plenum rated enclosure for both the driver module 130 and the communications module 132.

Figure 19:
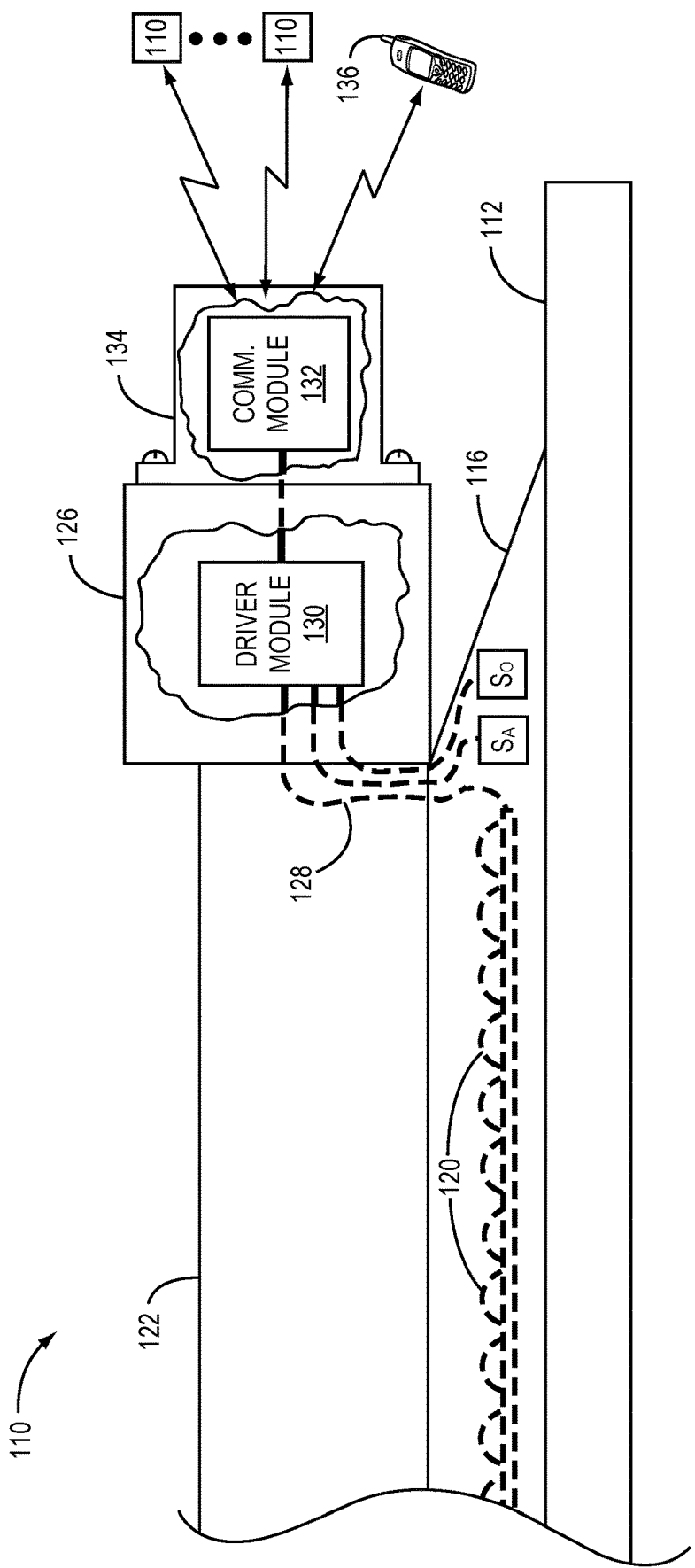
FIG. 19 illustrates a driver module provided in an electronics housing of the lighting fixture of FIG. 15 and a communications module in an associated housing coupled to the exterior of the electronics housing according to one embodiment of the disclosure.

With the embodiment of FIG. 18, adding or replacing the communications module 132 requires gaining access to the interior of the electronics housing 126. If this is undesirable, the driver module 130 may be provided alone in the electronics housing 126. The communications module 132 may be mounted outside of the electronics housing 126 in an exposed fashion or within a supplemental housing 134, which may be directly or indirectly coupled to the outside of the electronics housing 126, as shown in FIG. 19. The supplemental housing 134 may be bolted to the electronics housing 126. The supplemental housing 134 may alternatively be connected to the electronics housing using snap-fit or hook-and-snap mechanisms. The supplemental housing 134, alone or when coupled to the exterior surface of the electronics housing 126, may provide a plenum rated enclosure.

In embodiments where the electronics housing 126 and the supplemental housing 134 will be mounted within a plenum rated enclosure, the supplemental housing 134 may not need to be plenum rated. Further, the communications module 132 may be directly mounted to the exterior of the electronics housing 126 without any need for a supplemental housing 134, depending on the nature of the electronics provided in the communications module 132, how and where the lighting fixture 110 will be mounted, and the like. The latter embodiment wherein the communications module 132 is mounted outside of the electronics housing 126 may prove beneficial when the communications module 132 facilitates wireless communications with the other lighting fixtures 110, the remote control system, or other network or auxiliary device. In essence, the driver module 130 may be provided in the plenum rated electronics housing 126, which may not be conducive to wireless communications. The communications module 132 may be mounted outside of the electronics housing 126 by itself or within the supplemental housing 134 that is more conducive to wireless communications. A cable may be provided between the driver module 130 and the communications module 132 according to a defined communication interface.

The embodiments that employ mounting the communications module 132 outside of the electronics housing 126 may be somewhat less cost effective, but provide significant flexibility in allowing the communications module 132 or other auxiliary devices to be added to the lighting fixture 110, serviced, or replaced. The supplemental housing 134 for the communications module 132 may be made of a plenum rated plastic or metal, and may be configured to readily mount to the electronics housing 126 through snaps, screws, bolts, or the like, as well as receive the communications module 132. The communications module 132 may be mounted to the inside of the supplemental housing 134 through snap-fits, screws, twistlocks, and the like. The cabling and connectors used for connecting the communications module 132 to the driver module 130 may take any available form, such as with standard category 5 (cat 5) cable having RJ45 connectors, edge card connectors, blind mate connector pairs, terminal blocks and individual wires, and the like. Having an externally mounted communications module 132 relative to the electronics housing 126 that includes the driver module 130 allows for easy field installation of different types of communications modules 132 for a given driver module 130.

Figure 20:
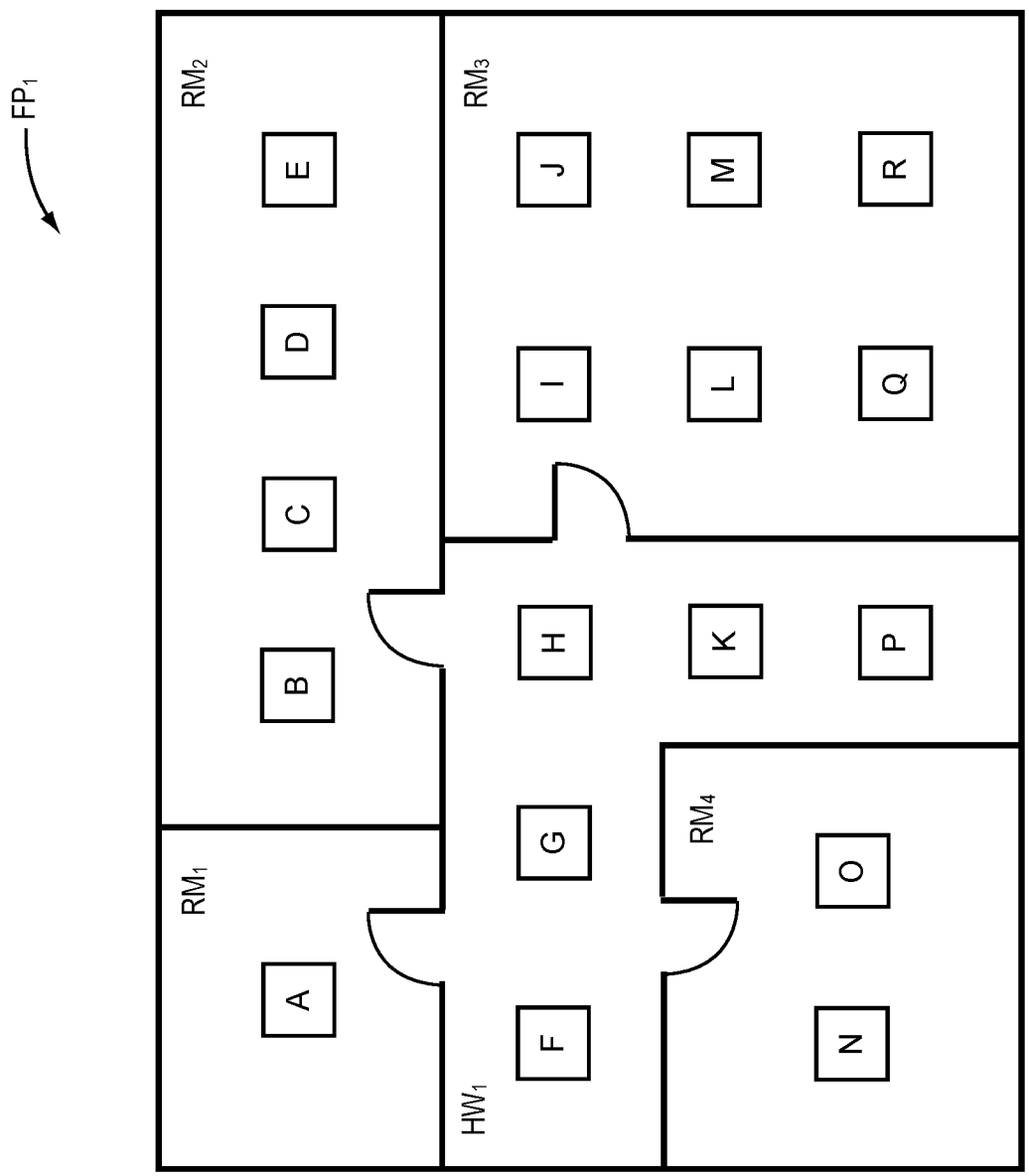
FIG. 20 illustrates a lighting system for an exemplary floor plan.

In one embodiment, the capabilities of the lighting fixtures 110 allow them to be readily grouped into different lighting zones. With reference to FIG. 20, assume that there are 118 ceiling mounted lighting fixtures 110, which are uniquely referenced as lighting fixtures A through R and placed in different rooms $RM_1$ through $RM_4$ and hallway $HW_1$ of floor plan $FP_1$.

In particular, lighting fixture A resides in room $RM_1$; lighting fixtures B-E reside in room $RM_2$; lighting fixtures I, J, L, M, Q, and R reside in room $RM_3$; lighting fixtures N and O reside in room $RM_4$, and lighting fixtures F, G, H, K, and P reside in hallway $HW_1$. Assuming that the doors from the hallway $HW_1$ into each of the respective rooms $RM_1$-$RM_4$ are closed, lighting fixtures A-R may be grouped into five unique lighting zones using a lightcast procedure. During a lightcast procedure, one light fixture A-R will adjust or modulate its light output while the other lighting fixtures A-R attempt to monitor or detect the adjusted or modulated light output of the first lighting fixture A-R.

Assume that the modulated or adjusted lightcast signal is a visible or near visible, such as infrared, light signal, which can be detected by the ambient light sensors that are provided in or associated with the various lighting fixtures A-R. Initially, assume lighting fixture A emits the visible or near visible lightcast signal, while the rest of the lighting fixtures B-R monitor their ambient light sensors to detect the relative strength of the lightcast signal being received by the integrated or associated ambient light sensors. Again assuming that the door between room $RM_1$ and the hallway $HW_1$ is closed, none of the other lighting fixtures A-R will detect the lightcast signal provided by lighting fixture A, and thus lighting fixture A will be grouped alone. Next, lighting fixture B will provide a lightcast signal, and lighting fixtures A and C-R will begin monitoring for the lightcast signal being provided by lighting fixture B. In this instance, lighting fixture C will detect the lightcast signal relatively strongly, lighting fixture D will detect the lightcast signal more weakly, and lighting fixture E will detect a faint lightcast signal, if the lightcast signal is detected at all.

A relative magnitude may be assigned to the lightcast signal monitored by each of the lighting fixtures C-E. These magnitudes may be used to populate a table, such as that illustrated in FIG. 21, or a portion thereof that is pertinent to a specific lighting fixture A-R. In this example, the lightcast signal emitted by lighting fixture B is assigned a relative strength of 0.7 for a range of 0 to 1.0 by lighting fixture C, 0.3 by lighting fixture D, and 0.1 by lighting fixture E. Since the door between room $RM_2$ and the hallway $HW_1$ is closed, none of the other lighting fixtures A or F-R will be able to detect the lightcast signal from lighting fixture B.

Next, lighting fixture C will begin providing the lightcast signal and the other lighting fixtures A, B, and D-R will begin monitoring for the lightcast signal provided by lighting fixture C. Lighting fixtures B, D, and E in room $RM_2$ will detect the lightcast signal and assign a relative magnitude for the lightcast signal. The magnitudes are provided in FIG. 21. Again, lighting fixtures A and F-R will not detect the lightcast signal due to their relative locations. This process is systematically repeated for each of the remaining lighting fixtures D-R such that the table of FIG. 21 is fully populated. By analyzing the signal strength magnitudes of the various lighting fixtures A-R one can readily divide the various groups of lighting fixtures A-R into associated lighting zones. Visually, one can readily determine that lighting fixture A should be in a zone by itself, lighting fixtures B-E should be in a second zone, lighting fixture I, J, L, M, Q, and R should be in a third zone, lighting fixtures N and O should be in a fourth zone, and lighting fixtures F, G, H, K, and P should be in a fifth zone. Each of these zones directly corresponds to the placement of the various lighting fixtures A-R in rooms $RM_1$-$RM_4$ and the hallway $HW_1$. In additional to simply grouping the lighting fixtures A-R of the different rooms into corresponding zones, one can readily determine the relative proximity and placement of the various lighting fixtures A-R with respect to each other based on the relative magnitudes of the lightcast signals.

As described further below, the various lighting fixtures A-R may also monitor RF signal strengths from one another. The RF signal strength between the various lighting fixtures A-R can be used to determine the distance between and relative location of lighting fixtures A-R. Further, the relative distance between and location of groups with respect to one another may be determined. As such, a relative distance and location can be determined for every fixture in the RF network and any groups thereof using the lightcast signal, RF signal strength, or a combination thereof. The results can be used to generate a scaled map of the lighting fixtures A-R and other elements in the lighting network. The map may include the commissioning tool 136 as well. In addition to using RF signal strength, microphones and speakers could be used in association with or instead of lightcasting techniques for grouping, communications, and the like. Each lighting fixture A-R could have or be associated with a microphone, or like acoustic (sonic or ultrasonic) sensor, and an audio amplifier and speaker (sonic or ultrasonic).

The microphones would allow the lighting fixture to pick up voice commands, like "brighter," "dimmer," "on," or "off," (or other acoustic data, perhaps footsteps for occupancy) and process the acoustic information. The information may cause the lighting fixture to control the light source in a desired fashion, issue commands to other lighting fixtures A-R (or other nodes), or share the acoustic information with other lighting fixtures A-R (or other nodes). A network of distributed microphones provided by the lighting fixtures A-R or in association therewith could determine not only things like where sounds are coming from (is the user in the same room?), but which direction and how fast the source of the sounds is moving (if the user is hurrying toward the exit, or even yelling "fire," maybe there's an emergency and the space should be more well-lit for safety reasons).

There is also the capability to provide a network of noise suppressing or noise canceling lighting fixtures all working together to keep office spaces quiet. The speakers may be driven with white or pink noise, which is configured to reduce the impact of ambient noise. For true noise canceling, the ambient noise monitored by the microphones at one or a group of the lighting fixtures A-R could be inverted (or played out of phase with respect to the ambient noise) and played back with the corresponding speakers at a volume that will provide a noise canceling effect for nearby occupants.

Notably, each lighting fixture A-R may generate its own table, as shown in FIG. 21, or a portion thereof. For example, each lighting fixture A-R may simply maintain an array that stores the relative magnitudes of the lightcast signals from the other lighting fixtures A-R. In this instance, each of the lighting fixtures A-R will respond to commands and share data with only those lighting fixtures A-R from which a lightcast signal was detected at all or detected above a certain magnitude. In these instances, each lighting fixture A-R can effectively associate itself with a zone. Alternatively, all of the lightcast signal data may be delivered to a master lighting fixture 110, which is capable of collecting all of the data for the table of FIG. 21, analyzing the data, assigning each of the lighting fixtures A-R to various zones, and communicating the zoning information to the lighting fixtures A-R. Further, the processing provided by the master lighting fixture 110 could also be outsourced to a remote control entity, such as the commissioning tool 136, or a central control system.

In the prior example, all of the doors in the hallway $HW_1$ were closed. As such, grouping the various lighting fixtures A-R into the five different zones was relatively clear cut, wherein all of the lighting fixtures in a room $RM_1$-$RM_4$ or the hallway $HW_1$ were grouped into different zones. As such, none of the lighting fixtures A-R were assigned to more than one zone.

Figure 22A:
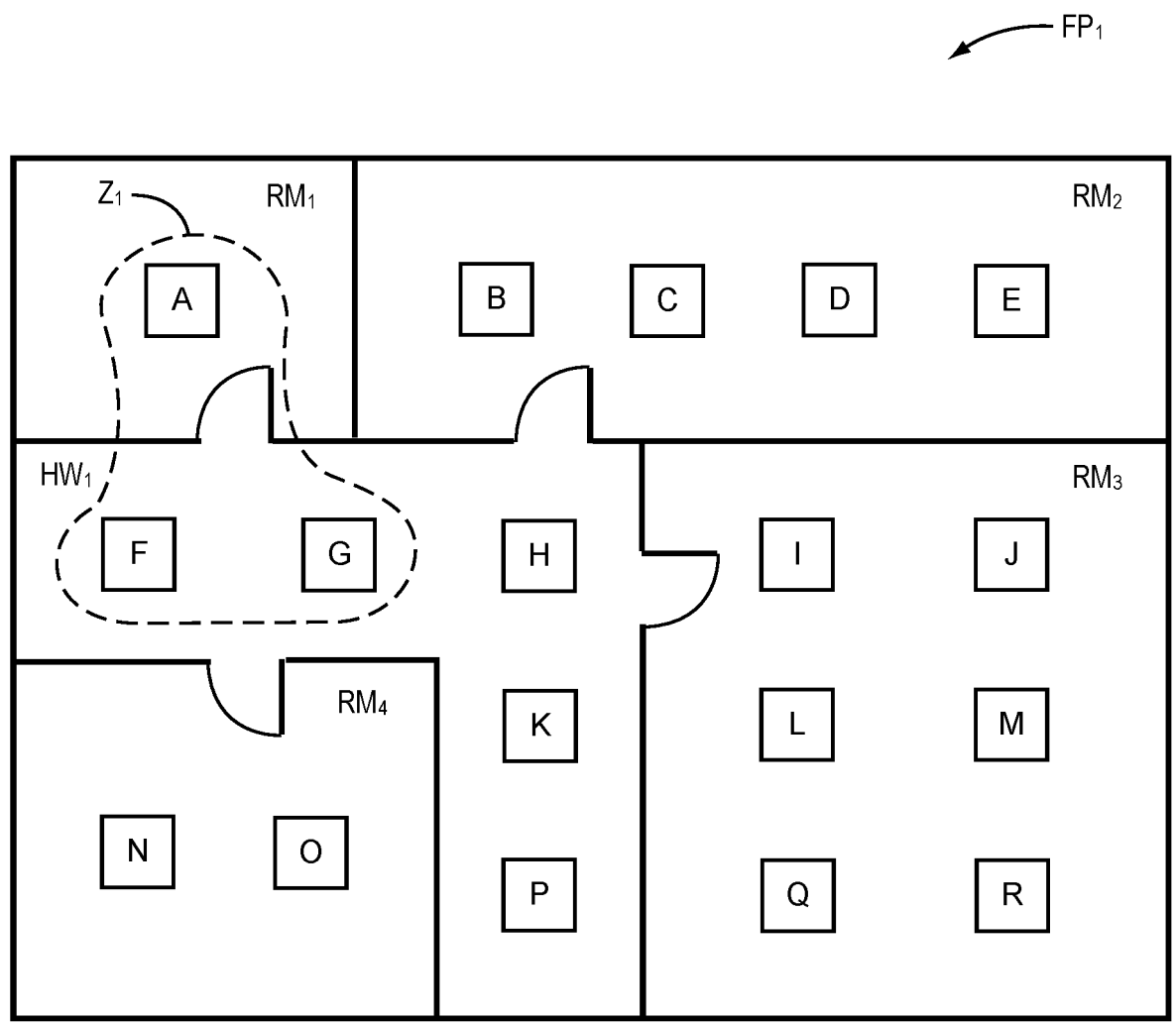
FIGS. 22A-22E illustrate exemplary zones for the floor plan illustrated in FIG. 20, when the lightcast process is provided with the doors from each room into the hallway open.
Figure 22B:
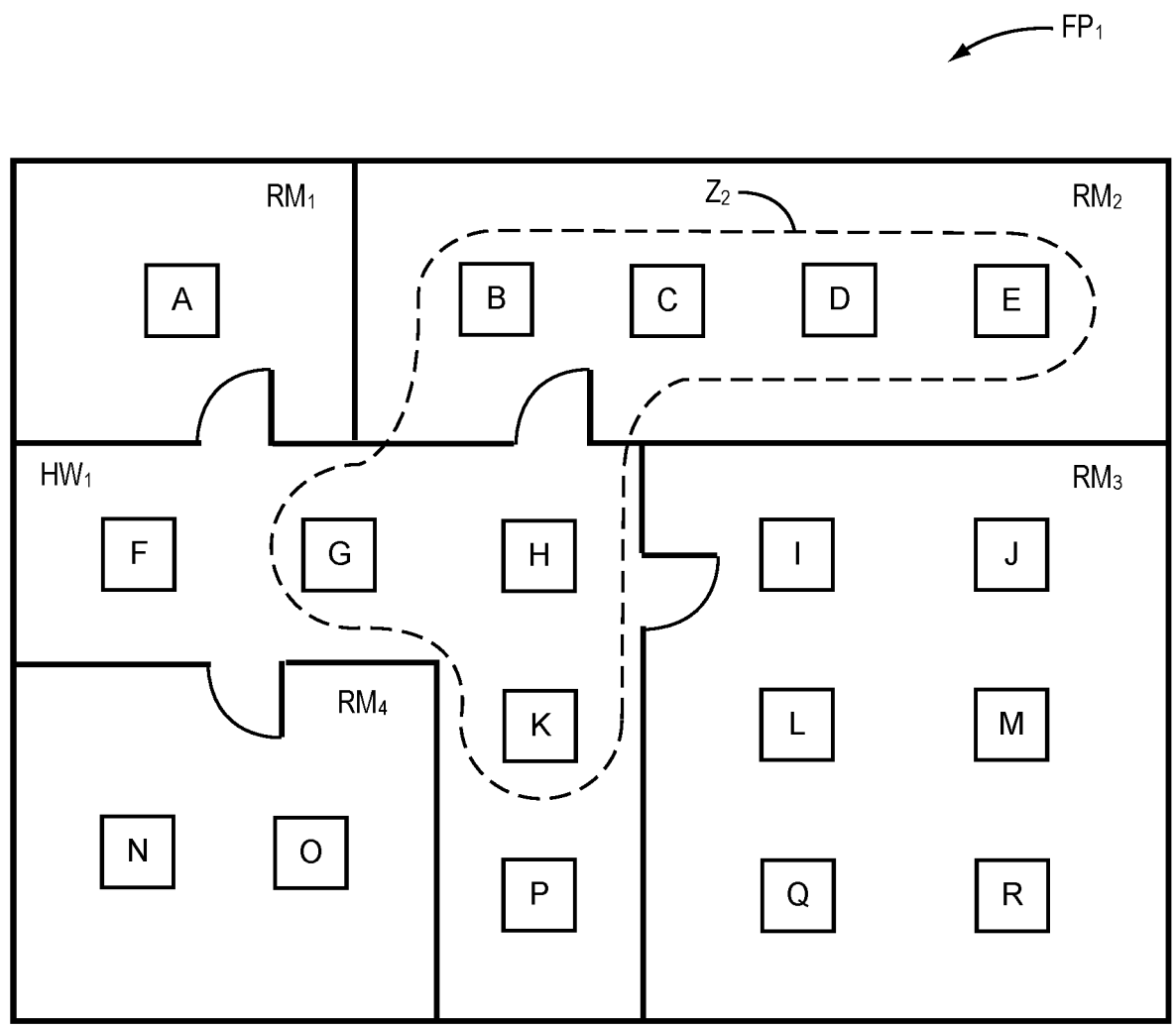
Figure 22C:
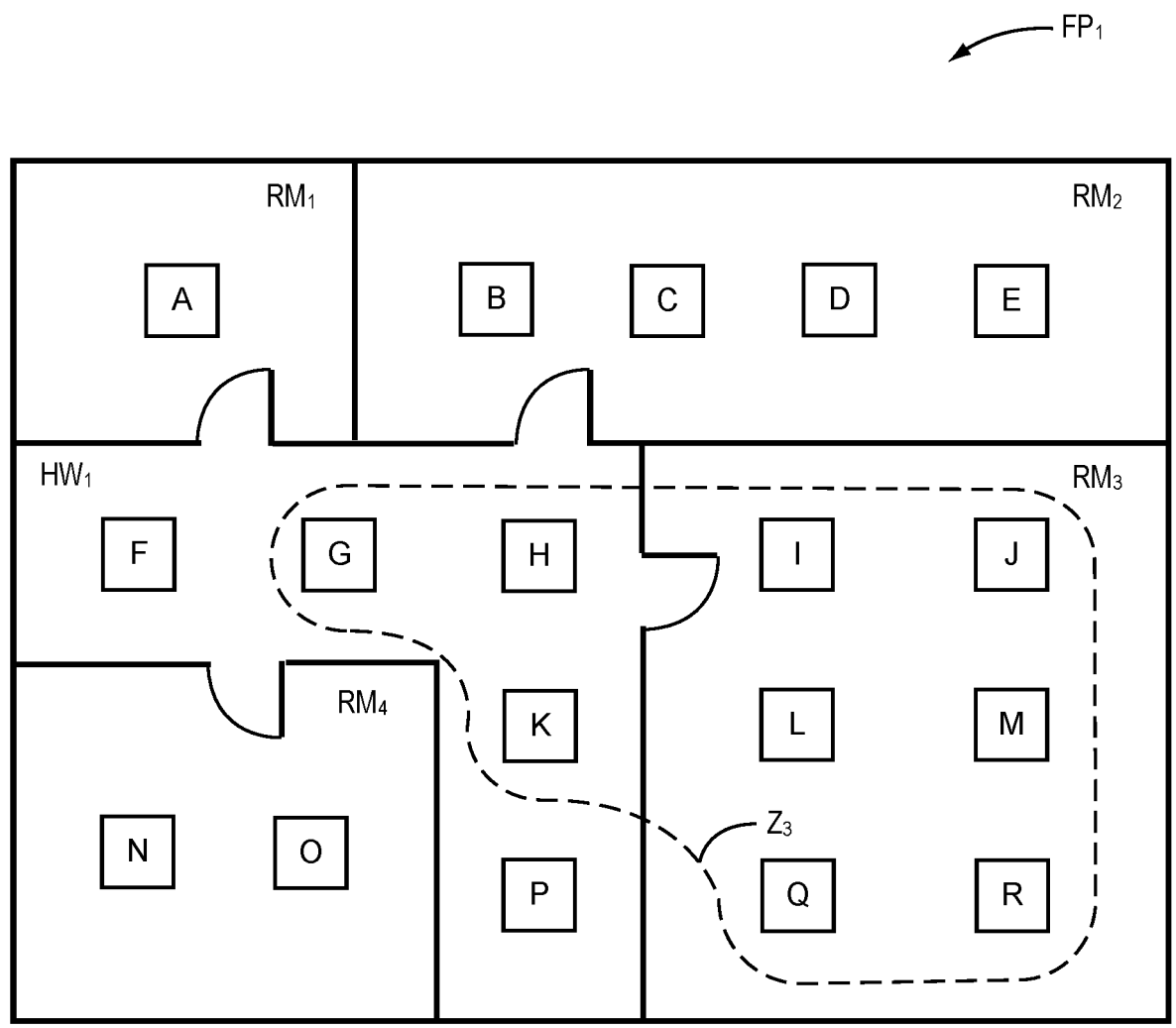
Figure 22D:
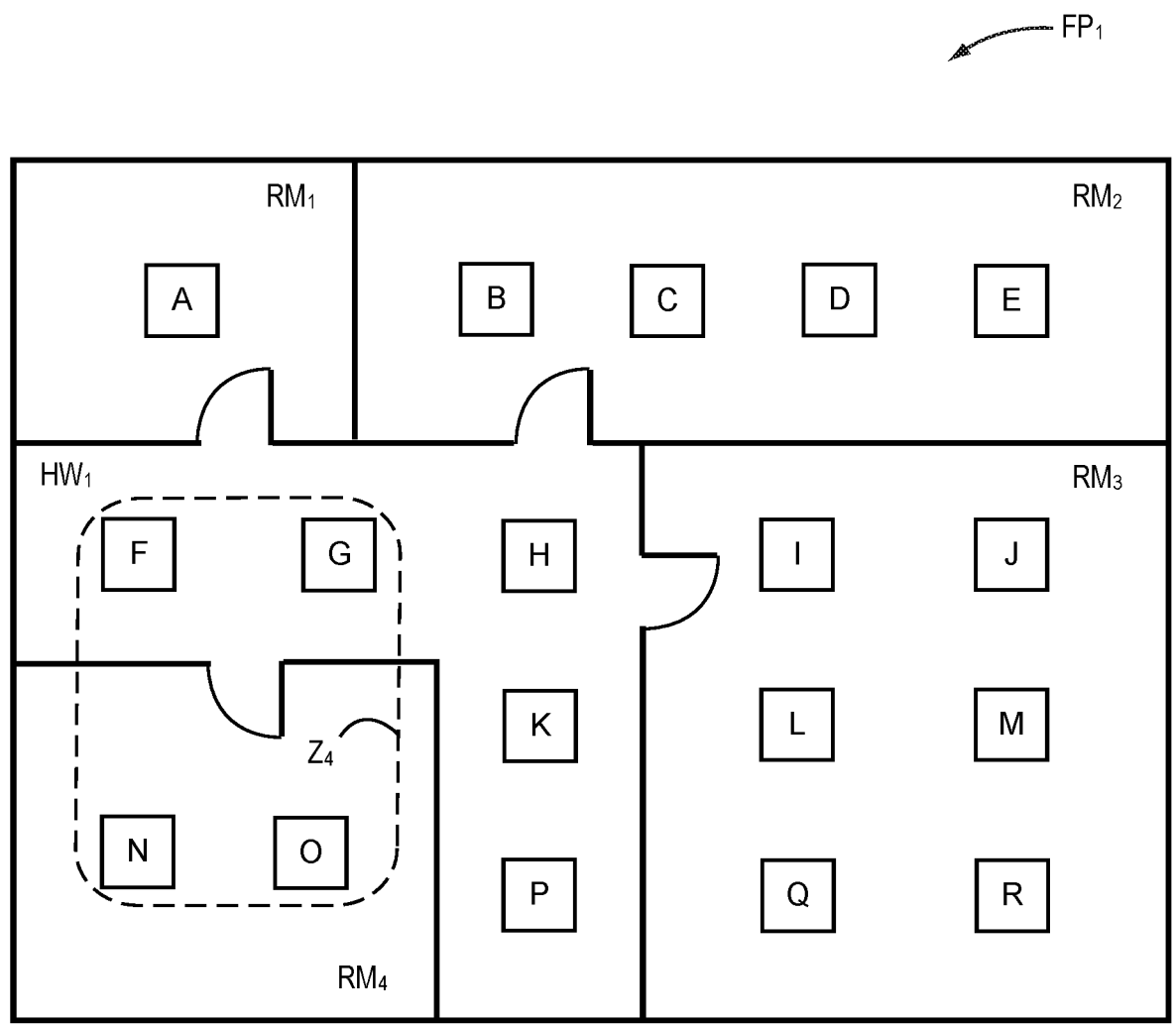

However, it may be desirable to have certain lighting fixtures A-R assigned to more than one zone. As an example, if the door into room $RM_1$ is normally open, it may be desirable to have lighting fixtures F and G, which are in the hallway $HW_1$, associated in some fashion with the zone for room $RM_1$, which includes lighting fixture A. Continuing with this concept, when lighting fixture A is providing the lightcast signal, lighting fixtures F and G of the hallway $HW_1$ may detect the lightcast signal. Similarly, when lighting fixtures F and G are providing a lightcast signal, they may pick up each other's lightcast signal, and lighting fixture A may also pick up the lightcast signals of lighting fixtures F and G. As such, respective lighting fixtures A, F, and G, or another control entity, will analyze the lightcast signal information and associate lighting fixtures A, F, and G with zone $Z_1$ as illustrated in FIG. 22A. If all of the doors in the hallway $HW_1$ remain open, the lightcast process may continue such that lighting fixtures B, C, D, and E of room $RM_2$ are grouped with lighting fixtures G, H, and K of hallway $HW_1$ in zone $Z_2$ as illustrated in FIG. 22B. Similarly, the lighting fixtures I, J, L, M, Q, and R of room $RM_3$ may also be associated with lighting fixtures G, H, and K of hallway $HW_1$ in zone $Z_3$, as shown in FIG. 22C. Lighting fixtures N and O of room $RM_4$ may be associated with lighting fixtures F and G of hallway $HW_1$ for zone $Z_4$, as illustrated in FIG. 22D.

Figure 22E:
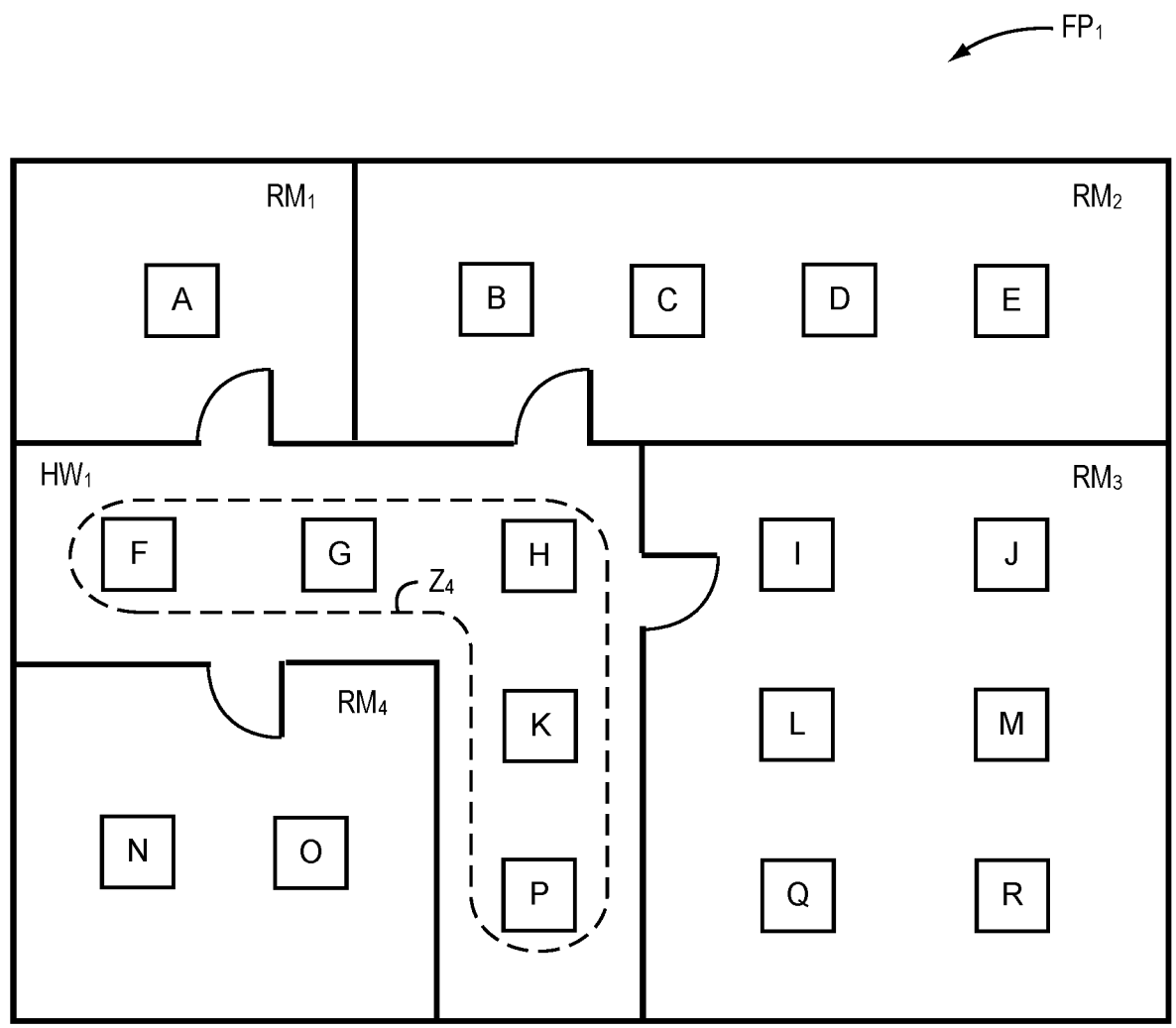

With reference to the hallway $HW_1$, when the doors are all open, the lighting fixtures H, G, K, and P may be associated with various lighting fixtures A, B, C, I, L, N, and O of the various rooms $RM_1$-$RM_4$. If this is not desired, a user may modify the grouping of the various lighting fixtures A-R such that just the lighting fixtures F, G, H, K, and P are associated with zone $Z_4$, which represents the lighting for just the hallway $HW_1$, as illustrated in FIG. 22E. Accordingly, the automatic grouping of the lighting fixtures 110 can be readily modified through direct interaction with each of the lighting fixtures 110 or from a remote control entity, such as the commissioning tool 136. Further details with respect to how the lighting fixtures 110 communicate with each other, share data, and operate in a concerted fashion are provided further below.

Figure 23:
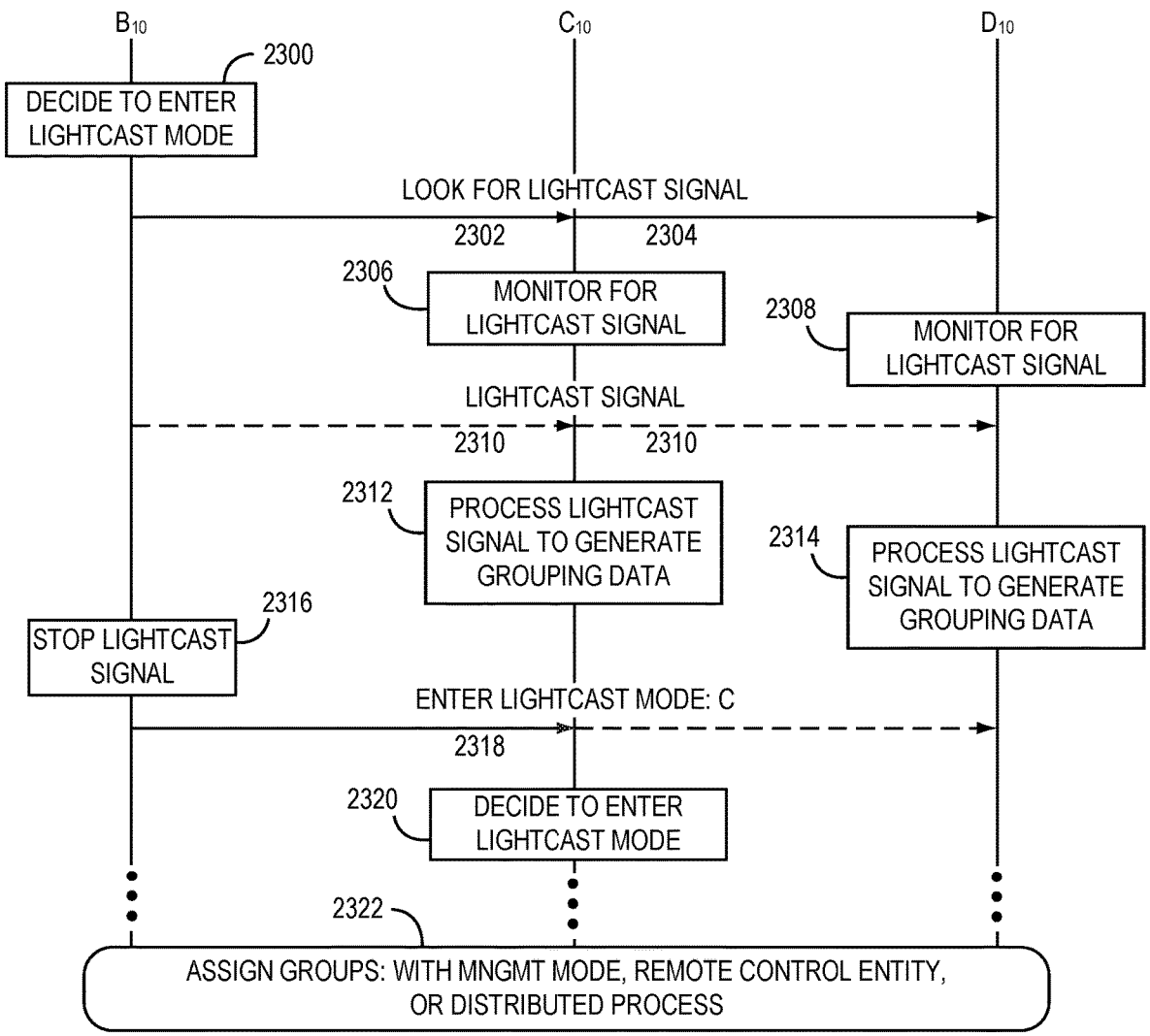
FIG. 23 is a communication flow diagram illustrating a grouping process according to one embodiment of the present disclosure.

With reference to FIG. 23, a partial communication flow is provided to illustrate an exemplary lightcast process and the functionality of each lighting fixture 110 involved in the process. The operation of lighting fixtures B-D, which are assumed to be in the same room, is highlighted. Initially, lighting fixture B decides to enter the lightcast mode based on an instruction from lighting fixture A or some other control entity (step 2300). Deciding to enter the lightcast mode may be triggered internally, from an external input over a wired or wireless network, or optically in response to receiving a lightcast signal with a certain signature. For example, lighting fixture B may enter a lightcast mode based on the time of day, periodically, based on sensor readings, or in response to a manual (user) request. Alternatively, the lightcast signal may always be monitored for, and may take the form of a specific off/on signature or modulation of the light, which gets automatically detected and measured by the monitoring light fixture 110.

Upon entering the lightcast mode, lighting fixture B will send an instruction out to the other lighting fixtures 110 directly or via a broadcast signal to look for a lightcast signal from lighting fixture B. Notably, these instructions may be sent directly from one lighting fixture 110 to another or may be relayed from one lighting fixture 110 to another throughout the lighting fixture network. As illustrated, the instructions to look for the lightcast signal provided by lighting fixture B is received by lighting fixture C (step 2302) and relayed to lighting fixture D (step 2304). However, instructions may be sent directly to lighting fixture D from lighting fixture B without being relayed.

At this point, both lighting fixtures C and D will begin monitoring for the lightcast signal to be provided by lighting fixture B (steps 2306 and 2308). Accordingly, lighting fixture B will begin adjusting or modulating its light source in some fashion to provide the lightcast signal (step 2310). Notably, the lightcast signal is an optical signal that will not be relayed from one lighting fixture 110 to another. Instead, lighting fixtures C and D will detect and process the lightcast signal to generate the grouping data (steps 2312 and 2314). The grouping data may range from simply determining whether or not the lightcast signal is detected or detected above a given threshold to assigning a relative magnitude to the lightcast signal, as discussed in association with the table of FIG. 21. After a certain amount of time, lighting fixture B will stop providing the lightcast signal (step 2316) and provide instructions for lighting fixture C to enter the lightcast mode (step 2318). Alternatively, a remote controlling entity, such as the commissioning tool 136, may provide instructions to lighting fixture C to enter the lightcast mode. At this point, lighting fixture C will decide to enter lightcast mode (step 2320) and the process will repeat for lighting fixture C. This sequence of events will continue for each of the lighting fixtures 110 in the lighting network.

With regard to processing the lightcast signals, the lightcast signal measurements, which are monitored by the receiving lighting fixtures 110, may be associated with an ID of the sending lighting fixture 110, the receiving lighting fixture 110, or both. The sending lighting fixture 110 may be identified based on an ID provided in the message to look for a lightcast signal (in step 2310) or a unique modulation signal that either includes the ID of the sending lighting fixture 110 or that is associated with the lighting fixture 110. The associations may be done by internal or remote control systems. Further, associations could be made based on time stamping or synchronizing the sending of lightcast signals by the different lighting fixtures 110 so that the sending lighting fixture 110 can be associated with the lightcast signal measurements from the various receiving fixtures 110.

The receiving lighting fixtures 110 may report the lightcast signal measurements along with the associated IDs of the receiving lighting fixtures 110 and the synchronizing or identifying information that can be used to associate the lightcast signal with a particular sending lighting fixture 110. Timestamping or other sensor information may be included in such a measurement report. These types of lightcast measurement reports can be used to develop tables of information, such as that shown in FIG. 21, for different times and include other sensor parameters. As such, greater granularity is provided into the control of the lighting fixtures 110 or light groupings, wherein the type of control can change at different times and/or based on different inputs from the sensors. For instance, control may change once an hour or when certain sensor readings are monitored.

Throughout this process or at the end of the process, each of the lighting fixtures 110 will either exchange the grouping data or provide the grouping data to a master lighting fixture 110 or a remote control entity to process the grouping data and assign the various lighting fixtures 110 to corresponding zones (step 2322). In a primarily distributed control process, the internal logic provided in each of the lighting fixtures 110 will allow the lighting fixtures 110 to effectively assign themselves to an appropriate zone based on the grouping data. Once a lighting fixture 110 has been assigned to a zone or has identified itself as being associated with a group of lighting fixtures 110, various information may be exchanged between the lighting fixtures 110 within a given zone. This information may range from sensor data to instructions for controlling operation.

Lightcast techniques may also be used to detect occupancy or lack thereof. The lighting fixtures 110 (and any other lightcast capable devices) may be configured to periodically or relatively continuously providing lightcasting, perhaps in a manner not visible or perceptible to the human eye, to compare lightcast readings relative to an empty room. Changes in the reference lightcast readings may indicate the presence of occupants, the amount of change may be indicative of the number of occupants, and the locations of the changes may be indicative of the location of the occupants. A return to the reference lightcast reading may indicate the area has been vacated, thus potentially eliminating the need to check for vacancy using traditional body heat or motion sensors.

Notably, acknowledgments may be provided in response to each communication signal or message as well as upon detecting a lightcast signal. These acknowledgements may be provided over the wired or wireless networks that support inter-lighting fixture communications, or may be provided optically using a type of lightcast signal having a certain modulation signature that is indicative of an acknowledgement. The acknowledgement signals or other response signals may be used to exchange status, signal strength information, requests for additional information, and the like. Within a given lighting system, different communication techniques (wired, wireless, lightcast modulation) may be used for different types of communications, data/information exchange, control, and the like. Communications may also be provided over AC power lines using conventional techniques.

Figure 24:
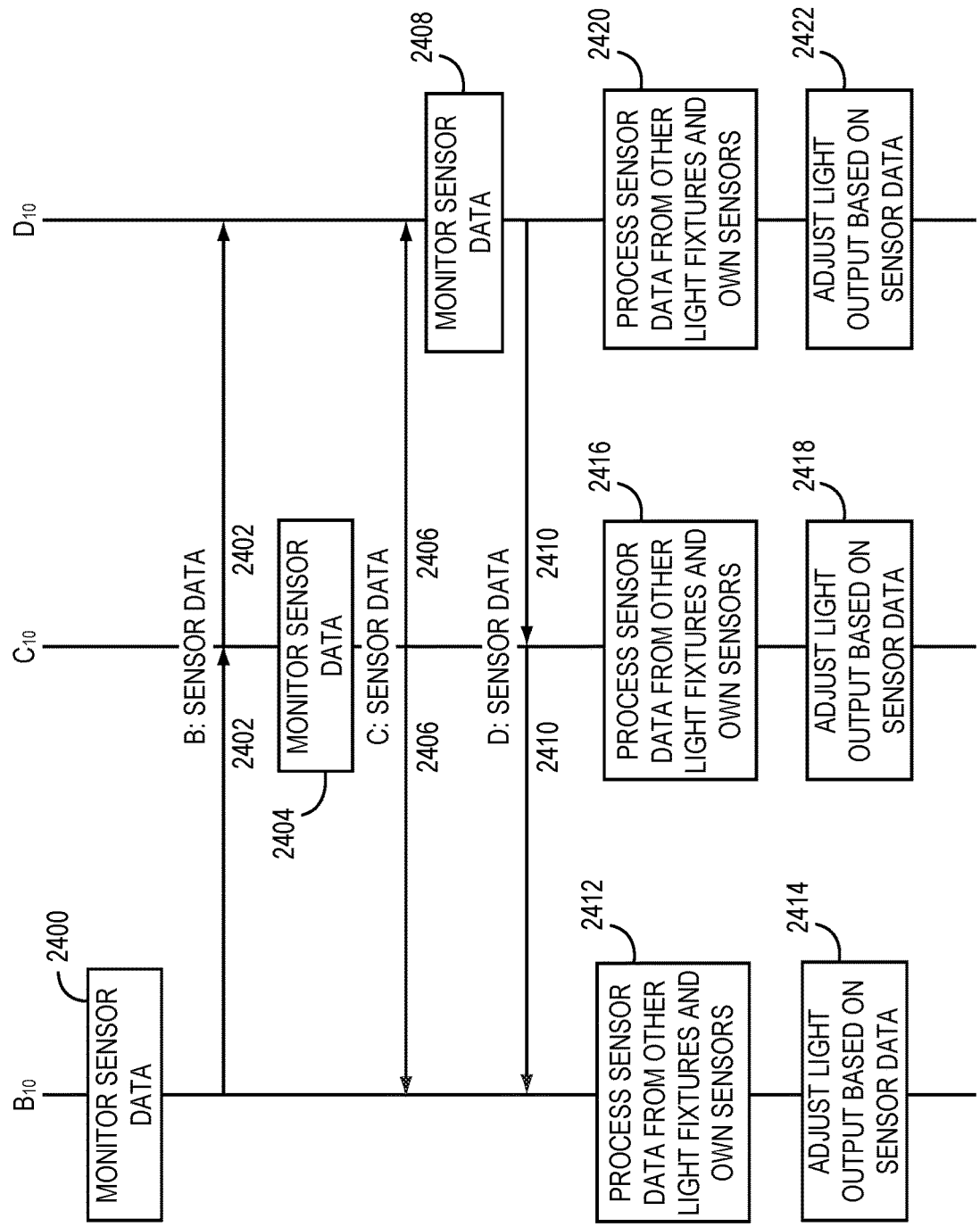
FIG. 24 is a communication flow diagram illustrating the sharing of sensor data among the lighting fixtures of the lighting system.

With reference to FIG. 24, a partial communication flow is provided to illustrate how sensor data may be exchanged among the various lighting fixtures 110 within a zone or a lighting network in general. Assume that lighting fixtures B, C, and D have been assigned to a particular zone. During operation, lighting fixtures B, C, and D will monitor and exchange sensor data and collectively use the sensor data to determine how to adjust their respective light outputs. Initially, lighting fixture B will monitor its sensor data, which is data from an associated ambient light, occupancy, or other sensor (step 2400). Lighting fixture B will send its sensor data to the other lighting fixtures C and D in the zone (step 2402). Meanwhile, lighting fixture C is monitoring its sensor data (step 2404) and providing the sensor data to lighting fixtures B and D (step 2406). Similarly, lighting fixture D is monitoring its sensor data and (step 2408) and providing the sensor data to lighting fixtures C and B (step 2410). Thus, each of the lighting fixtures B, C, and D has access to its own sensor data and the sensor data of the other lighting fixtures in its zone. While this example is zone-oriented, all of the lighting fixtures 110 in the entire lighting network may be providing all sensor data to one another or certain sensor data or all or certain ones of the lighting fixtures 110 in the lighting network. Within a given zone, a group of fixtures may separate themselves into one or more separate (or sub) zones if their ambient light sensors detect more light than the rest of the lighting fixtures in the zone. This could correspond to a group of lights that are closest to the window.

In a relatively continuous fashion, lighting fixture B will process the sensor data from its own sensor and the sensor data from the other lighting fixtures C and D (step 2412) and determine how to adjust its light output based on the sensor data (step 2414). Accordingly, lighting fixture B is independently controlling its light output; however, the internal logic of lighting fixture B may take into consideration not only its own sensor data but the sensor data of the other lighting fixtures C and D when determining precisely how to adjust its light output. In an independent yet concerted fashion, lighting fixtures C and D will also process their sensor data and the sensor data from the other lighting fixtures, and adjust their light output based on the sensor data (steps 2416-2422).

Interestingly, the internal logic of the different lighting fixtures B, C, and D may be configured to function identically to one another or differently from one another. For example, lighting fixtures B, C, and D may apply the same weighting to the sensor data as the other lighting fixtures B, C, and D in the zone. Thus, given the same sensor data from its own sensor and from the other lighting fixtures B, C, and D, each lighting fixture B, C, and D will adjust its light output in exactly the same fashion. If the internal logic varies among the lighting fixtures B, C, and D, the light output of the respective lighting fixtures B, C, and D may vary given the same sensor data. Notably, the sensor data may include data from different types of sensors. For example, sensor data from both ambient light and occupancy sensors may be exchanged and processed as dictated by the internal logic of each lighting fixture B, C, and D to determine how to adjust their respective light outputs.

Figure 25:
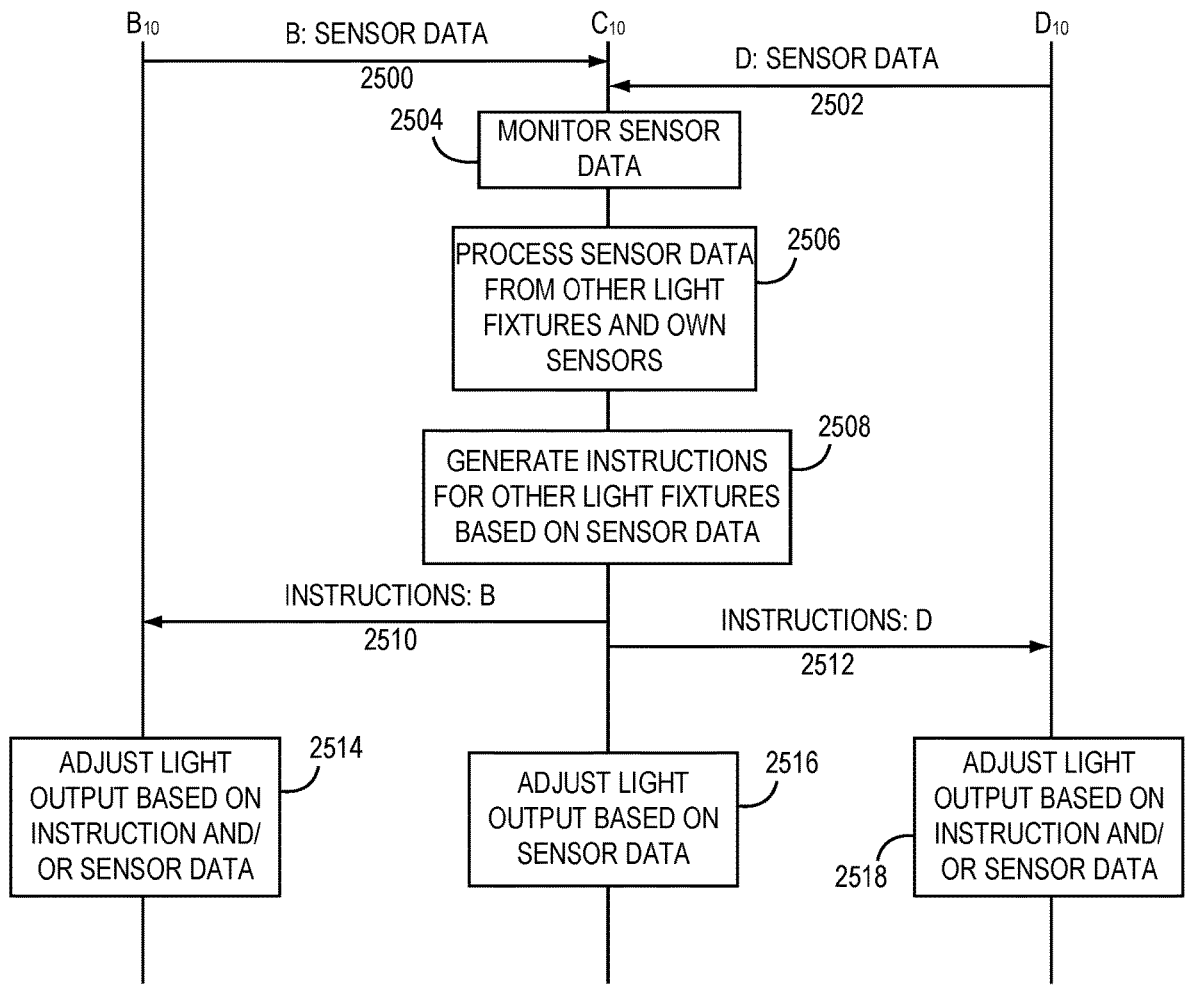
FIG. 25 is a communication flow diagram illustrating the sharing of sensor data and the creation of instructions within the lighting system.

In addition to exchanging sensor data and controlling operation in view thereof, the lighting fixtures B, C, and D may also use their own sensor data as well as the sensor data received from other lighting fixtures B, C, and D to control operation of other lighting fixtures B, C, and D. With reference to FIG. 25, a partial communication flow is shown to illustrate this concept. Initially, assume that lighting fixture B and lighting fixture D are gathering sensor data from their respective sensors and providing that sensor data to lighting fixture C (steps 2500 and 2502). While not illustrated, lighting fixture C may be providing its sensor data to the other lighting fixtures B and D. Lighting fixture C may also be monitoring its own sensor data (step 2504), and processing the sensor data from its own sensor as well as the sensor data from the other lighting fixtures B and D (step 2506) to generate instructions for lighting fixtures B and C (step 2508). Once the instructions are generated, they may be provided to the respective lighting fixtures B and D (steps 2510 and 2512). Accordingly, lighting fixture B may adjust its light output based on the instructions provided from lighting fixture C, the sensor data of lighting fixture D, or a combination thereof, depending on the internal logic of lighting fixture B (step 2514). Lighting fixture C may adjust its light output based on its own sensor data or a combination of its own sensor data and the sensor data received from lighting fixtures B and D (step 2516). Like lighting fixture B, lighting fixture D may adjust its light output based on instructions received from lighting fixture C, sensor data from lighting fixture D, or a combination thereof (step 2518).

As a practical example, lighting fixtures B, C, and D may share ambient light information, which may dictate the intensity of the light output, the color temperature of the light output, the color of the light output, or any combination thereof. However, lighting fixture C may also be associated with an occupancy sensor. As such, the instructions provided by lighting fixture C to lighting fixtures B and D may instruct lighting fixtures B and D to turn on and provide light output at a certain level, color temperature, or color. Lighting fixtures B and D may respond directly to these instructions or may process these instructions in light of their respective internal logic to determine whether to turn on and how to control the respective light outputs. As such, the instructions provided from one lighting fixture 110 to another may be taken as an absolute command and responded to accordingly, or may be taken as a mere "suggestion" depending on the programming of the lighting fixture 110 that receives the instructions. For example, in the scenario above wherein lighting fixture C is instructing lighting fixture B to turn on, there may be sufficient sunlight measured at lighting fixture B that negates the need for lighting fixture B to turn on. Or, if lighting fixture B does decide to turn on, the color, intensity, or color temperature of the light may be adjusted by the amount and color of the sunlight being measured at lighting fixture B. Again, the distributed control described in the present disclosure allows these lighting fixtures 110 to operate independently, yet in concert if the internal logic so dictates.

Figure 26:
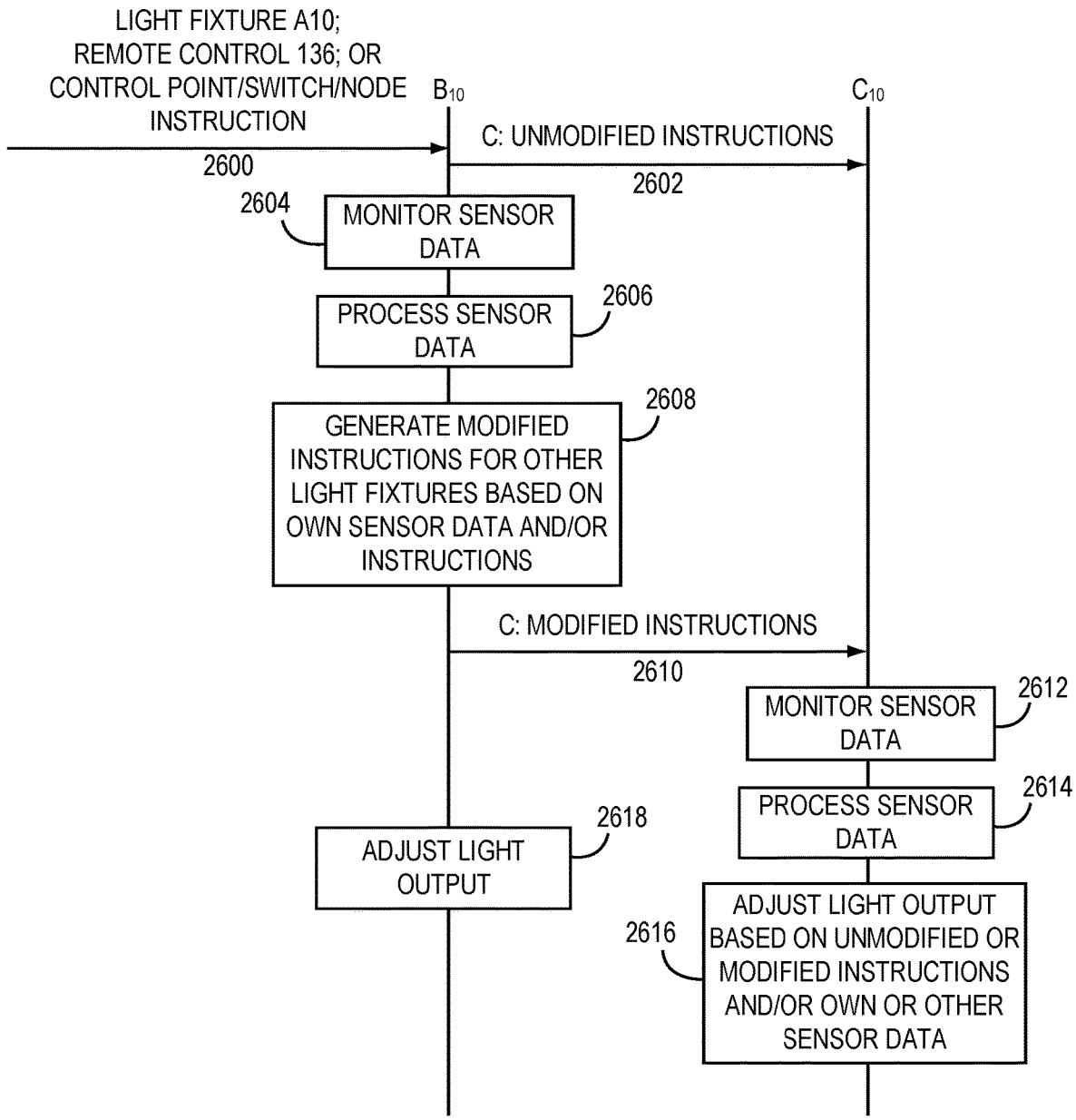
FIG. 26 is a communication flow diagram illustrating both the relay of instructions and the ability to modify instructions within the lighting system.

As shown in the partial communication flow of FIG. 26, the instructions provided from one lighting fixture 110 to another may be relayed through an intermediate lighting fixture 110. Further, the instructions may be modified as they are passed from one lighting fixture 110 to another, based on internal logic, sensor data, or the like. Initially, assume that lighting fixture A, a commissioning tool 136, or some other control point, switch, or node provides instructions to lighting fixture B (step 2600). Lighting fixture B may receive these instructions and pass the unmodified instructions on to one or more other lighting fixtures 110 such as lighting fixture C (step 2602). Lighting fixture B may then monitor its own sensor data (step 2604), process the sensor data (step 2606), and generate modified instructions for the other lighting fixtures 110, including lighting fixture C, based on its own sensor data, the sensor data of others, the instructions provided, or a combination thereof (step 2608). The modified instructions may be sent to the other lighting fixtures 110, such as lighting fixture C (step 2610). Lighting fixture B can then adjust its light output based on its own sensor data, the sensor data of others, and the instructions received (step 2618). Lighting fixture C may monitor its own sensor data (step 2612), process its sensor data (step 2614), and then adjust its light output based on the various sensor data, the modified instructions, the unmodified instructions, or a combination thereof (step 2616). Through this ability to share sensor data, communicate with each other, and operate independently according to internal logic, the various lighting fixtures 110 provide tremendous flexibility to lighting configurators.

Figure 27A:
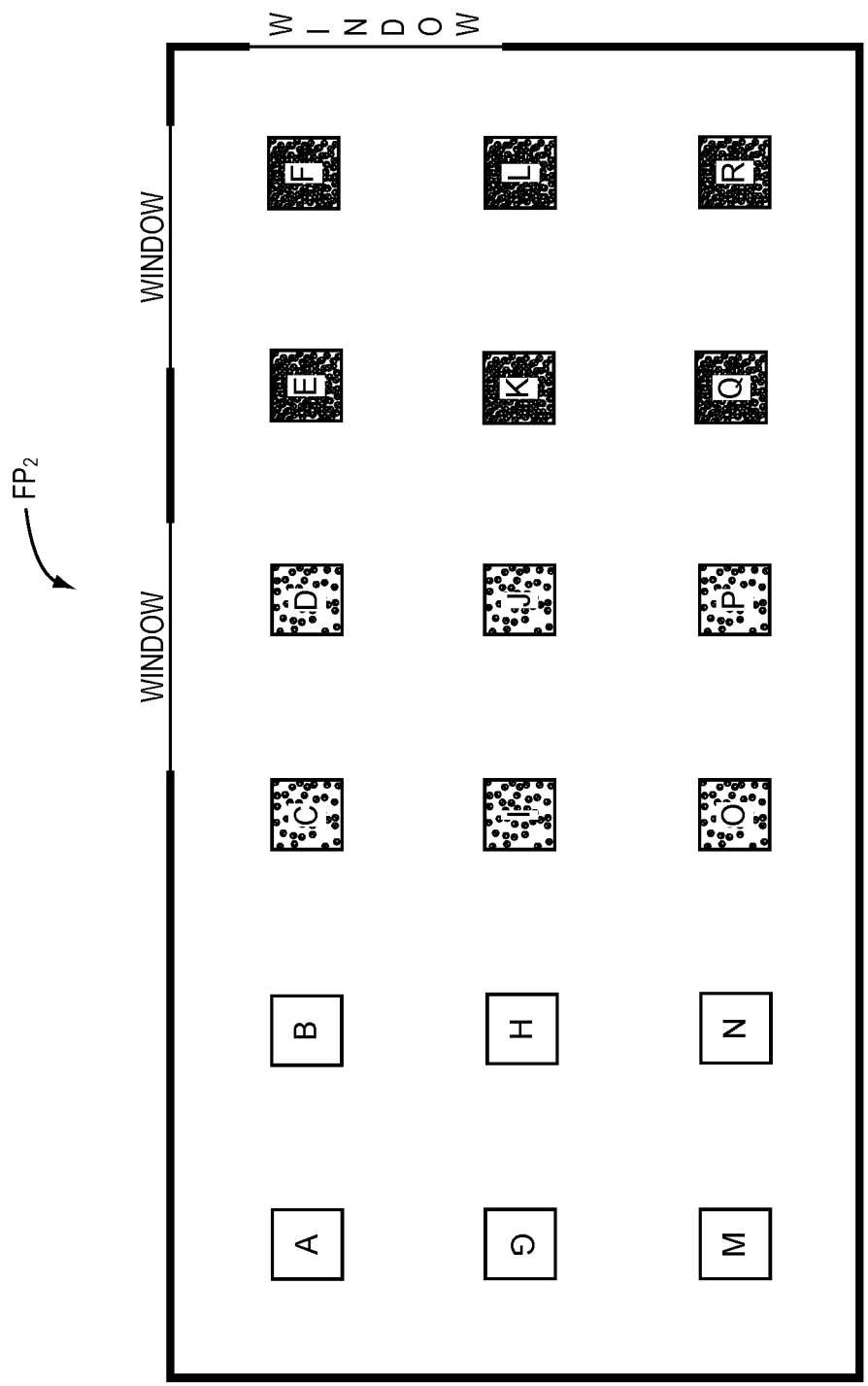
FIG. 27A illustrates a lighting system with three distinct zones, wherein each zone may have a different output level based on the presence of ambient light.
Figure 27B:
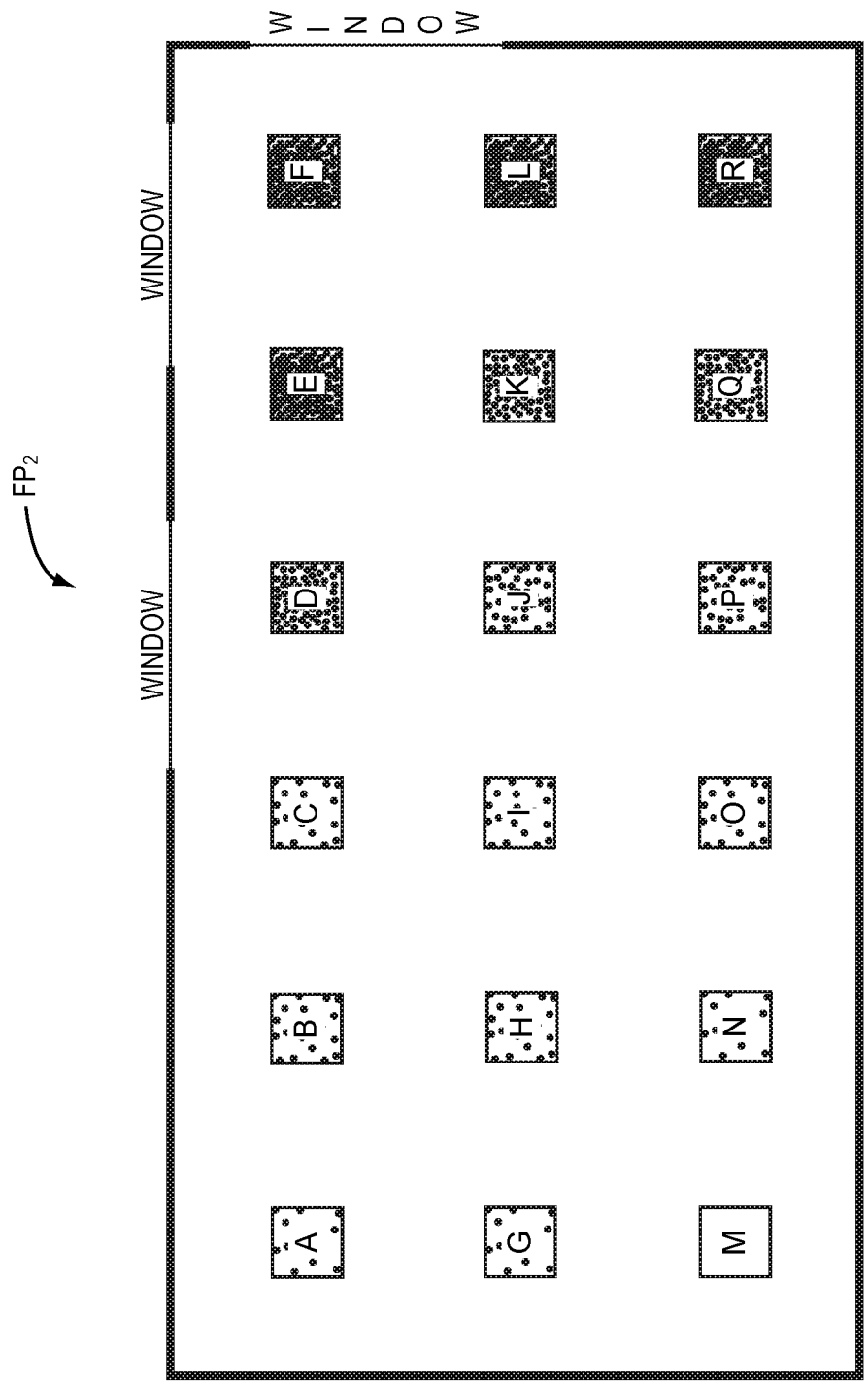
FIG. 27B illustrates a lighting system wherein there is a gradient in the light output based on the presence of ambient light.

With reference to FIGS. 27A and 27B, a floor plan $FP_2$ with lighting fixtures A-R is illustrated. In FIG. 27A, the lighting fixtures A-R may be grouped such that the six lighting fixtures A, B, G, H, M, and N that are farthest from the windowed end of the room are at their full light outputs when on, the six lighting fixtures C, D, I, J, O, and P in the middle of the room are producing an intermediate light output when on, and the six lighting fixtures E, F, K, L, Q, and R that are closest to the windows are producing the least amount of light output when on and sunlight is detected by one of more of the lighting fixtures A-R. In this instance, the portion of the room with the most ambient sunlight will employ the least amount of artificial light. Each of the lighting fixtures A-R is associated with an overall zone for the room and different sub-zones for each of the three sets of six lighting fixtures A-R. While the lighting fixtures A-R are broken into three groups providing three distinct light output levels when ambient sunlight is detected, the lighting fixtures A-R may be configured such that every one of the lighting fixtures A-R provides light output at a different intensity (or color and color temperature) when ambient sunlight is detected.

For example and with reference to FIG. 27B, each of the lighting fixtures A-R may be treated as being in the same zone, yet the light output is subject to a gradient that occurs across the entire zone. The gradient may be linear or non-linear. For example, lighting fixture M, which is farthest away from any of the windows, will provide the most light output, while lighting fixture F, which is likely to be in an area receiving the most ambient sunlight, will provide the least light output.

Each of the lighting fixtures between lighting fixtures M and F may provide a continuously decreasing amount of light output according to a defined linear or non-linear gradient that is shared amongst the lighting fixtures A-R. Notably, the gradient may be known by all of the lighting fixtures A-R wherein the gradient is continuously adjusted based on the amount of ambient sunlight available. Thus, the effective slope of the gradient is greatest when lighting fixture F detects the greatest amount of ambient sunlight, wherein the light output differential between the lighting fixtures M and F is the greatest. At night, when there is no ambient sunlight and very little light, if any, being received through the windows, all of the lighting fixtures A-R may determine to provide the same amount of light output, based on those lighting fixtures A-R that are closest to the windows sharing ambient light sensor data with the other lighting fixtures A-R in the zone. Again, the lighting fixtures A-R are capable of acting independently based on their own or shared sensor data. The internal logic used to control the light output based on the various sensor data may be fixed, manually adjusted, or dynamically adjusted based on interaction among the lighting fixtures A-R.

With continued reference to FIGS. 27A and 27B, assume that a doorway (not shown) is located near lighting fixture A and that at least lighting fixture A has or is associated with an occupancy sensor $S_O$. Further assume that all, or at least numerous ones, of the lighting fixtures A-R have or are associated with ambient light sensors SA and are currently in an off state. When someone walks into the room through the doorway into the room, the occupancy sensor $S_O$ will provide an occupied signal, which will alert lighting fixture A that the room is now occupied. In response, lighting fixture A may be programmed to instruct all of the other lighting fixtures B-R to turn on. Alternatively, lighting fixture A may share its occupancy sensor (or other sensor) information with the other lighting fixtures B-R, which will independently use their own internal logic to process the occupancy sensor information and turn themselves on.

Alternatively, lighting fixture A may instruct only a subgroup that is associated with a zone to turn. In the latter case, lighting fixture A may be programmed to only instruct lighting fixtures A, B, G, H, M, and N to turn on. The other zones [C, D, I, J, O, P] and [E, F, K, L, Q, R] in the room may turn on only when occupancy sensors $S_O$ associated with those zones detect an occupant. In either case, all of the lighting fixtures A-R may monitor the amount of ambient light being received through the windows, and perhaps the doorway, and individually control the level, color, and color temperature of the light to output once turned on. The level, color, and color temperature may dynamically change as ambient light levels change.

Instead of being instructed to turn on by another lighting fixture, each of the lighting fixtures A-R may have or be associated with an occupancy sensor $S_O$ and react independently to detecting an occupant. The occupancy sensor $S_O$ may employ any available type of motion, heat, or like sensor technology that is capable of detecting movement or the presence of people. The lighting fixtures A-R could also be programmed to turn on when light from another lighting fixture A-R is detected. Thus, when lighting fixture A turns on in response to detecting an occupant, the other lighting fixtures B-R will detect the presence of light from lighting fixture A and turn on in response to detecting the light from lighting fixture A turning on.

In certain embodiments, only one of the lighting fixtures A-R needs to be wired or wirelessly coupled to an on/off switch or dimmer. If lighting fixture A is coupled to the switch or dimmer, lighting fixture A can instruct the other lighting fixtures to turn on (as well as dim to a certain level). Alternatively, lighting fixture A could simply turn on to a certain output level. The other lighting fixtures B-R would detect the light as a result of lighting fixture A turning on, and perhaps the relative level of dimming through an associated ambient light sensor SA, and turn on to a certain output level. If not sensed, the relative dimming level could be shared with lighting fixtures B-R by lighting fixture A.

The intelligence of the network is virtually limitless and affords the potential for highly intelligent lighting systems. For example, the lighting fixtures A-R may be able to determine (or be programmed with) their relative location to one another. Using the occupancy sensors $S_O$, the collective group of lighting fixtures A-R may be configured to develop predictive algorithms based on historical occupancy data and use these predictive algorithms to determine how long to keep lights on, what lights should turn on as a person walks into a room or down a hallway, and the like. For instance, the lighting fixtures 110 along a hallway may turn on sequentially and well in advance of a person walking down the hallway. The lights may turn off sequentially and behind the person as well. The sequential turning on of the lights may be triggered by a first lighting fixture 110 detecting the person, but the remaining lighting fixtures 110 in the hallway may sequentially turn on based on the historical walking speeds, paths, and the like that are embodied in the predictive algorithms. Each of the lighting fixtures 110 may share sensor data, instructions, and the like and then operate independently in light of this shared information.

The above concept of "light tracking" is illustrated below with two examples. For the first example, reference is made to FIG. 22A, which provides a light tracking example for a person walking along the hallway $HW_1$. Assume that the person enters the hallway near lighting fixture F, and exits the hallway near lighting fixture P. Also assume that each of the lighting fixtures F, G, H, K, and P include occupancy sensors $S_O$. As the person enters the hallway near lighting fixture F, lighting fixture F will sense the presence of the person via its occupancy sensor $S_O$ and turn itself on. Lighting fixture F may be programmed to alert lighting fixture G that lighting fixture F has detected a user. Lighting fixture G may know that lighting fixture H is currently off, and since lighting fixture F is detecting the presence of a person, lighting fixture G may turn itself on in a predictive fashion. If lighting fixture G subsequently detects the presence of a person, it may alert lighting fixture H and lighting fixture F. Once lighting fixture H receives an indication that the occupancy sensor of lighting fixture G has detected a person, it may turn on. If lighting fixture H detects the presence of a person through its occupancy sensor $S_O$, it may alert lighting fixture K, lighting fixture G, and lighting fixture F. Lighting fixture F may take this information as an indication that the person is travelling along the hallway $HW_1$ toward lighting fixture P, and thus turn off, as it may no longer be needed. Lighting fixture G may remain on for the time being, while lighting fixture K will turn on in a predictive fashion. This process may continue such that one, two, or more lights are on in the hallway $HW_1$ near the current location of the person. The time between adjacent occupancy sensor detections can also be used to approximate the speed at which the person is traveling. This can be used to predict where the person or object is going. For example, if someone is slowing down to enter a room, then the lights in the room may react accordingly.

Further, the ability of the lights to communicate with each other and to share their occupancy sensor information allows the group of lighting fixtures in the hallway $HW_1$ to light the current location of the person and predictively turn on lighting fixtures in advance of the person reaching a particular lighting fixture. Of course, all of the lighting fixtures in the hallway $HW_1$ could be turned on when lighting fixture F detects the presence of a person, and turn off when none of the lighting fixtures F, G, H, K, and P detect the presence of a person after a certain amount of time. As yet another tracking example, each of the lighting fixtures F, G, H, K, and P may merely turn on when they detect the presence of a person and turn off after a certain amount of time of no longer detecting the presence of a person or when none of the lighting fixtures in the group detects the presence of a person.

The tracking concepts are equally applicable to larger areas, such as rooms or outdoor areas. Reference is made to FIG. 27A or 27B for the following example. In a simplistic example, each of the lighting fixtures A-R may include an occupancy sensor $S_O$ and be programmed as follows. If the occupancy sensor $S_O$ for a particular lighting fixture A-R detects the presence of a person, that lighting fixture will turn on and instruct immediately adjacent lighting fixtures to turn on if they are not already on. As such, different ones of the lighting fixtures A-R or groups thereof may turn on and track the people in the room. The lighting fixture that detected the presence of a person (as well as those fixtures that were instructed to turn on by that lighting fixture) may stay on for a set period of time after the presence of the person is no longer detected. While the prior example is a simplistic tracking of room occupants and selectively turning lighting fixtures on or off based thereon, predictive algorithms may also be employed. For example, assume a person enters the room near lighting fixture M and walks diagonally across the room to the opposing corner near lighting fixture F. When lighting fixture M detects the presence of the person, it may turn on and instruct lighting fixtures G, H, and N to turn on. The remaining lighting fixtures will remain off. If lighting fixture N subsequently detects the presence of the person, it will remain on and will instruct lighting fixtures I and O to turn on, because it knows that lighting fixture M first detected the person and now lighting fixture N is detecting the person. When lighting fixture I detects the person, it may alert lighting fixtures B, C, D, H, J, N, 0, and P to turn on as well, and may alert lighting fixture M as well. Lighting fixture M may no longer detect the presence of a person and may turn off, based on the knowledge that it is no longer detecting the presence of a person, and that lighting fixtures N and I have subsequently detected the presence of the person. This process may continue across the room, as lighting fixtures J, K, E, L, and F progressively turn on as lighting fixtures M, H, N, and the like turn off after the person has left the corresponding area of the room. Thus, basic tracking and predictive control may be used in virtually any environment to selectively turn on and turn off or otherwise control lighting fixtures in a room, group, or the like.

Figure 28:
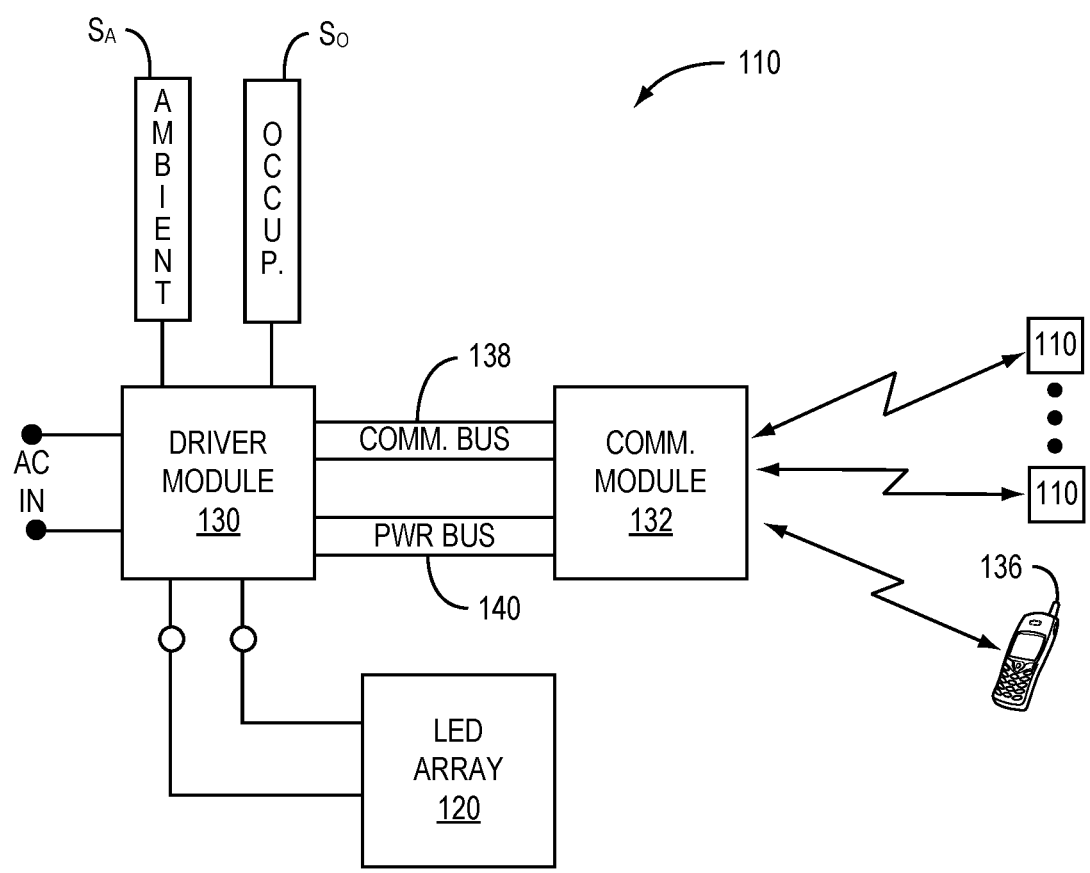
FIG. 28 is a block diagram of a lighting system according to one embodiment of the disclosure.

Turning now to FIG. 28, a block diagram of a lighting fixture 110 is provided according to one embodiment. Assume for purposes of discussion that the driver module 130, communications module 132, and LED array 120 are ultimately connected to form the core of the lighting fixture 110, and that the communications module 132 is configured to bidirectionally communicate with other lighting fixtures 110, the commissioning tool 136, or other control entity through wired or wireless techniques. In this embodiment, a standard communication interface and a first, or standard, protocol are used between the driver module 130 and the communications module 132. This standard protocol allows different driver modules 130 to communicate with and be controlled by different communications modules 132, assuming that both the driver module 130 and the communications module 132 are operating according to the standard protocol used by the standard communication interface. The term "standard protocol" is defined to mean any type of known or future developed, proprietary or industry-standardized protocol.

In the illustrated embodiment, the driver module 130 and the communications module 132 are coupled via a communication (COMM) bus 138 and a power (PWR) bus 140. The communication bus 138 allows the communications module 132 to receive information from the driver module 130 as well as control the driver module 130. An exemplary communication bus 138 is the well-known inter-integrated circuitry ($I^2C$) bus, which is a serial bus and is typically implemented with a two-wire interface employing data and clock lines. Other available buses include: serial peripheral interface (SPI) bus, Dallas Semiconductor Corporation's 1-Wire serial bus, universal serial bus (USB), RS-232, Microchip Technology Incorporated's UNI/O®, and the like.

In this embodiment, the driver module 130 is configured to collect data from the ambient light sensor SA and the occupancy sensor $S_O$ and drive the LEDs of the LED array 120. The data collected from the ambient light sensor SA and the occupancy sensor $S_O$ as well as any other operational parameters of the driver module 130 may be shared with the communications module 132. As such, the communications module 132 may collect data about the configuration or operation of the driver module 130 and any information made available to the driver module 130 by the LED array 120, the ambient light sensor SA, and the occupancy sensor $S_O$. The collected data may be used by the communications module 132 to control how the driver module 130 operates, may be shared with other lighting fixtures 110 or control entities, or may be processed to generate instructions that are sent to other lighting fixtures 110.

The communications module 132 may also be controlled in whole or in part by a remote control entity, such as the commissioning tool 136 or another lighting fixture 110. In general, the communications module 132 will process sensor data and instructions provided by the other lighting fixtures 110 or remote control entities and then provide instructions over the communication bus 138 to the driver module 130. An alternative way of looking at it is that the communications module 132 facilitates the sharing of the system's information, including occupancy sensing, ambient light sensing, dimmer switch settings, etc., and provides this information to the driver module 130, which then uses its own internal logic to determine what action(s) to take. The driver module 130 will respond by controlling the drive current or voltages provided to the LED array 120 as appropriate. An exemplary command set for a hypothetical protocol is provided below.

Exemplary Command Set

| Command | Source | Receiver | Description |
|---|---|---|---|
| On/Off | Communications Module | Driver Module | On/Off |
| Color Temperature | Communications Module | Driver Module | Color temperature of solid state light |
| Dimming Level | Communications Module | Driver Module | Set light level |
| Fixture ID | Driver Module | Communications Module | Solid State light id |
| Health | Driver Module | Communications Module | Health of solid state light |
| Power Usage | Driver Module | Communications Module | Power used by solid state light |
| Usage | Driver Module | Communications Module | Hours of use |
| Lifetime | Driver Module | Communications Module | Useful life (factors hours, ambient temp and power level) |
| Zone ID | Driver Module | Communications Module | Identifies the zone the fixture is in |
| Temperature | Driver Module | Communications Module | Solid State temperature level (protection) |
| Emergency Enabled | Driver Module | Communications Module | Identifies the fixture as an emergency enabled fixture. |
| Emergency Health | Driver Module | Communications Module | Battery State |
| Emergency Test | Communications Module | Driver Module | Remote method to allow testing of emergency solid state fixture |
| Emergency Pass | Driver Module | Communications Module | Pass indication for emergency test |
| Emergency time remaining | Driver Module | Communications Module | Battery time left |
| Occupancy Statistics | Driver Module | Communications Module | Number of occupancy events |
| Daylighting statistics | Driver Module | Communications Module | Average dim level to maintain ambient light level |
| Sensor Data Update | Any Device with Sensor(s) | Any Device | Ambient light level, occupancy detection status, etc. |
| User Dimmer/Switch Setting Update | Dimmer/Switch | Fixtures & Wireless Relay Modules | Value of dimmer switch setting |

The above table has four columns: command, source, receiver, and description. The command represents the actual instruction passed either from the communications module 132 to the driver module 130 or from the driver module 130 to the communications module 132. The source identifies the sender of the command. The receiver identifies the intended recipient of the command. The communication column provides a description of the command. For example, the "on/off" command is sent by the communications module 132 to the driver module 130 and effectively allows the communications module 132 to instruct the driver module 130 to either turn on or turn off the LED array 120. The "color temperature" command allows the communications module 132 to instruct the driver module 130 to drive the LED array 120 in a manner to generate a desired color temperature. The "color temperature" command may actually include the desired color temperature or a reference to available color temperature.

The "dimming level" command is sent from the communications module 132 to the driver module 130 to set an overall light level based on a desired level of dimming. The "fixture ID" command allows the driver module 130 to identify itself to the communications module 132. The "health" command allows the driver module 130 to send the communications module 132 information relative to its operational capability or, in other words, health. The "power usage" command allows the driver module 130 to tell the communications module 132 how much power is being used by the driver module 130 on average or at any given time, depending on the capabilities of the driver module 130. The "usage" command allows the driver module 130 to identify the total hours of use, hours of consistent use, or the like to the communications module 132. The "lifetime" command allows the driver module 130 to provide an estimate of the useful remaining life of the driver module 130, the LED array 120, or a combination thereof to the communications module 132. Based on the capabilities of the driver module 130, the amount of remaining life may factor in past usage, ambient temperatures, power levels, or the like.

The "zone ID" command allows the driver module 130 to tell the communications module 132 in which zone the driver module 130 resides. This command is useful when the other lighting fixtures 110 or the remote control entity is controlling multiple lighting fixtures and is collecting information about the zones in which the lighting fixtures 110 reside. The "temperature" command allows the driver module 130 to provide ambient temperature information for the driver module 130 or the LED array 120 to the communications module 132.

The "emergency enabled" command allows the driver module 130 to tell the communications module 132 that the lighting fixture 110 is an emergency enabled fixture, which can be used for emergency lighting. The "emergency health" command allows the driver module 130 to provide information bearing on the ability of the driver module 130 or the lighting fixture 110 to function as an emergency lighting fixture. In a simple embodiment, the command may provide the state of an emergency backup battery that has been made available to drive the lighting fixture 110 in case of an emergency. The "emergency test" command allows the communications module 132 to send an instruction to the driver module 130 to run an emergency lighting test to ensure that the lighting fixture 110 can operate in an emergency lighting mode, if so required. The "emergency pass" command allows the driver module 130 to inform the communications module 132 that the emergency test was passed (or failed). The above commands primarily describe the direction of information flow. However, the protocol may allow the communications module 132 or the driver module 130 to selectively or periodically request any of this or other information specifically or in batches.

The use of a standard communication interface and a standard protocol for communications between the driver module 130 and the communications module 132 supports a modular approach for the driver module 130 and the communications module 132. For example, different manufacturers may make different communications modules 132 that interface with a particular driver module 130. The different communications modules 132 may be configured to drive the driver module 130 differently based on different lighting applications, available features, price points, and the like. As such, the communications module 132 may be configured to communicate with different types of driver modules 130. Once a communications module 132 is coupled to a driver module 130, the communications module 132 identifies the type of driver module 130 and will interface with the driver module 130 accordingly. Further, a driver module 130 may be able to operate over various ranges for different lighting parameters. Different communications modules 132 may be configured to control these parameters to varying degrees. The first communications module 132 may only be given access to a limited parameter set, wherein another communications module 132 may be given access to a much greater parameter set. The table below provides an exemplary parameter set for a given driver module 130.

| Parameters | |
|---|---|
| PWM dimming Frequency | 200 Hz through 1000 Hz |
| Maximum Light Level | 50% to 100% |
| Color Temperature | 2700 K to 6000 K |
| Maximum allowable hours | 50,000 to 100,000 |
| Minimum dimming level | 0 to 50% |
| Response time | 100 ms to 1 sec |
| Color temperature settable | 0 or 1 |
| Dimming curve | Linear, exponential. Dim to warmer or cooler color temperature |
| Alarm Indication | 0 or 1 |

The parameters in the above table may represent the available control points for a given driver module 130. A given parameter set may be assigned to the driver module 130 during manufacture or may be set by the communications module 132 during installation of the lighting fixture 110 or upon associating the communications module 132 with the driver module 130. The parameter set includes various parameters, such as the pulse width modulation (PWM) dimming frequency, maximum light level, and color temperature. The parameter set represents the allowable ranges for each of these parameters. Each parameter may be set within the identified range in the parameter set during operation or the like by the communications module 132 or the remote control system, depending on the desires of the designer or the particular application.

As an example, the maximum light level for the exemplary parameter set indicates it can be set from anywhere from 50% to 100% of the capabilities of the driver module 130 and the associated LED array 120. If the end user or owner of the lighting system that employs the lighting fixture 110 initiates the appropriate instructions, the maximum light level may be set to 80% in an appropriate parameter field. As such, the driver module 130 would not drive the LED array 120 to exceed 80%, even if the communications module 132 provided a command to the driver module 130 to increase the lighting level above 80% of its maximum capability. These parameters may be stored in the driver module 130 or in the communications module 132 in non-volatile memory.

In certain embodiments, the driver module 130 includes sufficient electronics to process an alternating current (AC) input signal (AC IN) and provide an appropriate rectified or direct current (DC) signal sufficient to power the communications module 132, and perhaps the LED array 120. As such, the communications module 132 does not require separate AC-to-DC conversion circuitry to power the electronics residing therein, and can simply receive DC power from the driver module 130 over the power bus 140, which may be separate from the communication bus 138 or may be integrated with the communication bus 138, as will be described below.

In one embodiment, one aspect of the standard communication interface is the definition of a standard power delivery system. For example, the power bus 140 may be set to a low voltage level, such as 5 volts, 12 volts, 24 volts, or the like. The driver module 130 is configured to process the AC input signal to provide the defined low voltage level and provide that voltage over the power bus 140, thus the communications module 132 or auxiliary devices may be designed in anticipation of the desired low voltage level being provided over the power bus 140 by the driver module 130 without concern for connecting to or processing an AC signal to a DC power signal for powering the electronics of the communications module 132.

Figure 29:
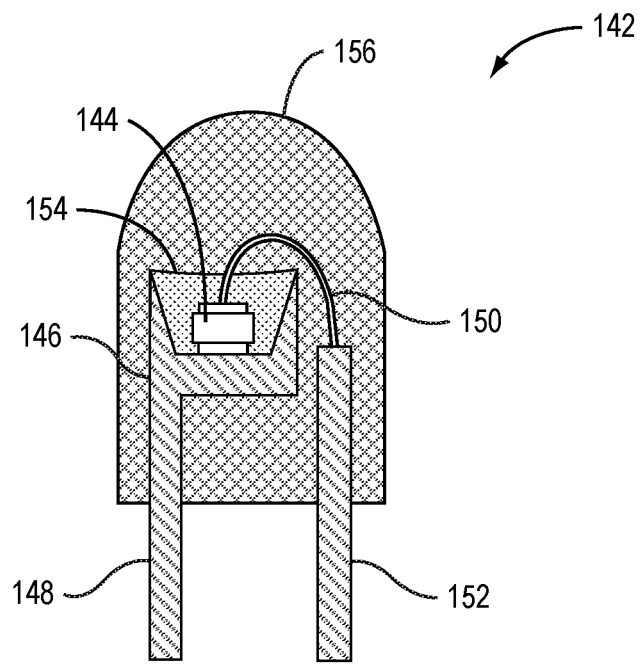
FIG. 29 is a cross section of an exemplary LED according to a first embodiment of the disclosure.

A description of an exemplary embodiment of the LED array 120, driver module 130, and the communications module 132 follows. As noted, the LED array 120 includes a plurality of LEDs, such as the LEDs 142 illustrated in FIGS. 29 and 30. With reference to FIG. 29, a single LED chip 144 is mounted on a reflective cup 146 using solder or a conductive epoxy, such that ohmic contacts for the cathode (or anode) of the LED chip 144 are electrically coupled to the bottom of the reflective cup 146. The reflective cup 146 is either coupled to or integrally formed with a first lead 148 of the LED 142. One or more bond wires 150 connect ohmic contacts for the anode (or cathode) of the LED chip 144 to a second lead 152.

The reflective cup 146 may be filled with an encapsulant material 154 that encapsulates the LED chip 144. The encapsulant material 154 may be clear or contain a wavelength conversion material, such as a phosphor, which is described in greater detail below. The entire assembly is encapsulated in a clear protective resin 156, which may be molded in the shape of a lens to control the light emitted from the LED chip 144.

Figure 30:
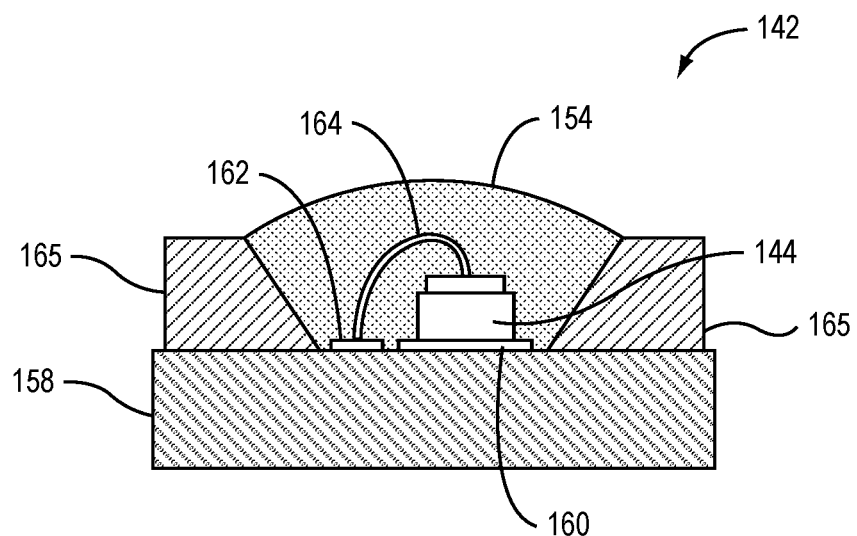
FIG. 30 is a cross section of an exemplary LED according to a second embodiment of the disclosure.

An alternative package for an LED 142 is illustrated in FIG. 30 wherein the LED chip 144 is mounted on a substrate 158. In particular, the ohmic contacts for the anode (or cathode) of the LED chip 144 are directly mounted to first contact pads 160 on the surface of the substrate 158. The ohmic contacts for the cathode (or anode) of the LED chip 144 are connected to second contact pads 162, which are also on the surface of the substrate 158, using bond wires 164. The LED chip 144 resides in a cavity of a reflector structure 165, which is formed from a reflective material and functions to reflect light emitted from the LED chip 144 through the opening formed by the reflector structure 165. The cavity formed by the reflector structure 165 may be filled with an encapsulant material 154 that encapsulates the LED chip 144. The encapsulant material 154 may be clear or contain a wavelength conversion material, such as a phosphor.

In either of the embodiments of FIGS. 29 and 30, if the encapsulant material 154 is clear, the light emitted by the LED chip 144 passes through the encapsulant material 154 and the protective resin 156 without any substantial shift in color. As such, the light emitted from the LED chip 144 is effectively the light emitted from the LED 142. If the encapsulant material 154 contains a wavelength conversion material, substantially all or a portion of the light emitted by the LED chip 144 in a first wavelength range may be absorbed by the wavelength conversion material, which will responsively emit light in a second wavelength range. The concentration and type of wavelength conversion material will dictate how much of the light emitted by the LED chip 144 is absorbed by the wavelength conversion material as well as the extent of the wavelength conversion. In embodiments where some of the light emitted by the LED chip 144 passes through the wavelength conversion material without being absorbed, the light passing through the wavelength conversion material will mix with the light emitted by the wavelength conversion material. Thus, when a wavelength conversion material is used, the light emitted from the LED 142 is shifted in color from the actual light emitted from the LED chip 144.

For example, the LED array 120 may include a group of BSY or BSG LEDs 142 as well as a group of red LEDs 142. BSY LEDs 142 include an LED chip 144 that emits bluish light, and the wavelength conversion material is a yellow phosphor that absorbs the blue light and emits yellowish light. Even if some of the bluish light passes through the phosphor, the resultant mix of light emitted from the overall BSY LED 142 is yellowish light. The yellowish light emitted from a BSY LED 142 has a color point that falls above the Black Body Locus (BBL) on the 1931 CIE chromaticity diagram wherein the BBL corresponds to the various color temperatures of white light.

Similarly, BSG LEDs 142 include an LED chip 144 that emits bluish light; however, the wavelength conversion material is a greenish phosphor that absorbs the blue light and emits greenish light. Even if some of the bluish light passes through the phosphor, the resultant mix of light emitted from the overall BSG LED 142 is greenish light. The greenish light emitted from a BSG LED 142 has a color point that falls above the BBL on the 1931 CIE chromaticity diagram wherein the BBL corresponds to the various color temperatures of white light.

The red LEDs 142 generally emit reddish light at a color point on the opposite side of the BBL as the yellowish or greenish light of the BSY or BSG LEDs 142. As such, the reddish light from the red LEDs 142 mixes with the yellowish or greenish light emitted from the BSY or BSG LEDs 142 to generate white light that has a desired color temperature and falls within a desired proximity of the BBL. In effect, the reddish light from the red LEDs 142 pulls the yellowish or greenish light from the BSY or BSG LEDs 142 to a desired color point on or near the BBL. Notably, the red LEDs 142 may have LED chips 144 that natively emit reddish light wherein no wavelength conversion material is employed. Alternatively, the LED chips 144 may be associated with a wavelength conversion material, wherein the resultant light emitted from the wavelength conversion material and any light that is emitted from the LED chips 144 without being absorbed by the wavelength conversion material mixes to form the desired reddish light.

The blue LED chip 144 used to form either the BSY or BSG LEDs 142 may be formed from a gallium nitride (GaN), indium gallium nitride (InGaN), silicon carbide (SiC), zinc selenide (ZnSe), or like material system. The red LED chip 144 may be formed from an aluminum indium gallium nitride (AlInGaP), gallium phosphide (GaP), aluminum gallium arsenide (AlGaAs), or like material system. Exemplary yellow phosphors include cerium-doped yttrium aluminum garnet (YAG:Ce), yellow BOSE (Ba, O, Sr, Si, Eu) phosphors, and the like. Exemplary green phosphors include green BOSE phosphors, Lutetium aluminum garnet (LuAg), cerium doped LuAg (LuAg:Ce), Maui M535 from Lightscape Materials, Inc. of 201 Washington Road, Princeton, N.J. 08540, and the like. The above LED architectures, phosphors, and material systems are merely exemplary and are not intended to provide an exhaustive listing of architectures, phosphors, and materials systems that are applicable to the concepts disclosed herein.

Figure 31:
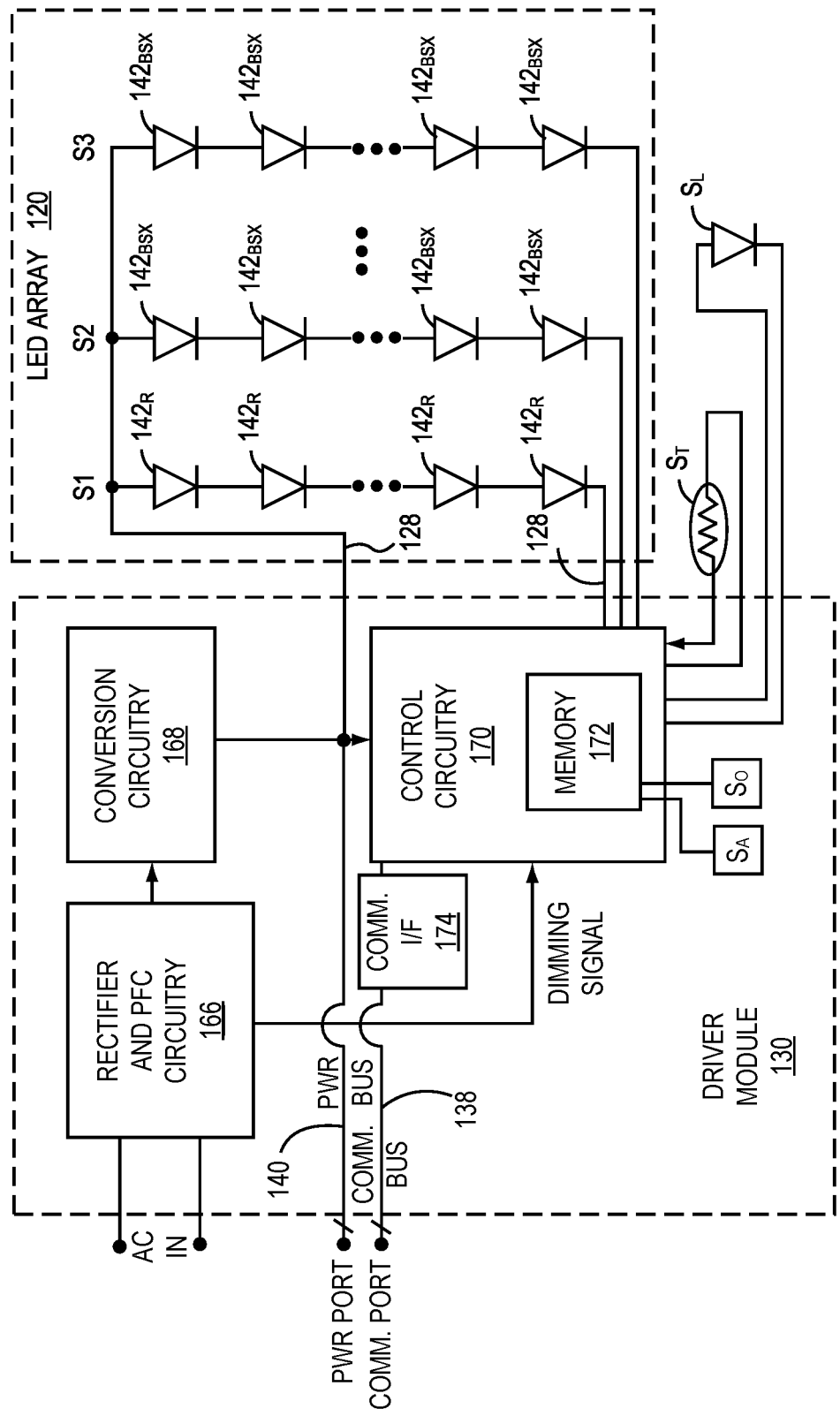
FIG. 31 is a schematic of a driver module and an LED array according to one embodiment of the disclosure.

As noted, the LED array 120 may include a mixture of red LEDs 142 and either BSY or BSG LEDs 142. The driver module 130 for driving the LED array 120 is illustrated in FIG. 31 according to one embodiment of the disclosure. The LED array 120 may be electrically divided into two or more strings of series connected LEDs 142. As depicted, there are three LED strings S1, S2, and S3. For clarity, the reference number "142" will include a subscript indicative of the color of the LED 142 in the following text where 'IR' corresponds to red, 'BSY' corresponds to blue shifted yellow, 'BSG' corresponds to blue shifted green, and 'BSX' corresponds to either BSG or BSY LEDs. LED string S1 includes a number of red LEDs $142_R$, LED string S2 includes a number of either BSY or BSG LEDs $142_{BSX}$, and LED string S3 includes a number of either BSY or BSG LEDs $142_{BSX}$. The driver module 130 controls the current delivered to the respective LED strings S1, S2, and S3. The current used to drive the LEDs 142 is generally pulse width modulated (PWM), wherein the duty cycle of the pulsed current controls the intensity of the light emitted from the LEDs 142.

The BSY or BSG LEDs $142_{BSX}$ in the second LED string S2 may be selected to have a slightly more bluish hue (less yellowish or greenish hue) than the BSY or BSG LEDs $142_{BSX}$ in the third LED string S3. As such, the current flowing through the second and third strings S2 and S3 may be tuned to control the yellowish or greenish light that is effectively emitted by the BSY or BSG LEDs $142_{BSX}$ of the second and third LED strings S2, S3. By controlling the relative intensities of the yellowish or greenish light emitted from the differently hued BSY or BSG LEDs $142_{BSX}$ of the second and third LED strings S2, S3, the hue of the combined yellowish or greenish light from the second and third LED strings S2, S3 may be controlled in a desired fashion.

The ratio of current provided through the red LEDs $142_R$ of the first LED string S1 relative to the currents provided through the BSY or BSG LEDs $142_{BSX}$ of the second and third LED strings S2 and S3 may be adjusted to effectively control the relative intensities of the reddish light emitted from the red LEDs $142_R$ and the combined yellowish or greenish light emitted from the various BSY or BSG LEDs $142_{BSX}$. As such, the intensity and the color point of the yellowish or greenish light from BSY or BSG LEDs $142_{BSX}$ can be set relative to the intensity of the reddish light emitted from the red LEDs $142_R$. The resultant yellowish or greenish light mixes with the reddish light to generate white light that has a desired color temperature and falls within a desired proximity of the BBL.

Notably, the number of LED strings Sx may vary from one to many and different combinations of LED colors may be used in the different strings. Each LED string Sx may have LEDs 142 of the same color, variations of the same color, or substantially different colors, such as red, green, and blue. In one embodiment, a single LED string may be used, wherein the LEDs in the string are all substantially identical in color, vary in substantially the same color, or include different colors. In another embodiment, three LED strings Sx with red, green, and blue LEDs may be used, wherein each LED string Sx is dedicated to a single color. In yet another embodiment, at least two LED strings Sx may be used, wherein different colored BSY LEDs are used in one of the LED strings Sx and red LEDs are used in the other of the LED strings Sx.

The driver module 130 depicted in FIG. 31 generally includes rectifier and power factor correction (PFC) circuitry 166, conversion circuitry 168, and control circuitry 170. The rectifier and power factor correction circuitry 166 is adapted to receive an AC power signal (AC IN), rectify the AC power signal, and correct the power factor of the AC power signal. The resultant signal is provided to the conversion circuitry 168, which converts the rectified AC power signal to a DC power signal. The DC power signal may be boosted or bucked to one or more desired DC voltages by DC-DC converter circuitry, which is provided by the conversion circuitry 168. Internally, The DC power signal may be used to power the control circuitry 170 and any other circuitry provided in the driver module 130.

The DC power signal is also provided to the power bus 140, which is coupled to one or more power ports, which may be part of the standard communication interface. The DC power signal provided to the power bus 140 may be used to provide power to one or more external devices that are coupled to the power bus and separate from the driver module 130. These external devices may include the communications module 132 and any number of auxiliary devices, which are discussed further below. Accordingly, these external devices may rely on the driver module 130 for power and can be efficiently and cost effectively designed accordingly. The rectifier and PFC circuitry 166 and the conversion circuitry 168 of the driver module 130 are robustly designed in anticipation of being required to supply power to not only its internal circuitry and the LED array 120, but also to supply power to these external devices as well. Such a design greatly simplifies the power supply design, if not eliminating the need for a power supply, and reduces the cost for these external devices.

As illustrated, the DC power signal may be provided to another port, which will be connected by the cabling 128 to the LED array 120. In this embodiment, the supply line of the DC power signal is ultimately coupled to the first end of each of the LED strings S1, S2, and S3 in the LED array 120. The control circuitry 170 is coupled to the second end of each of the LED strings S1, S2, and S3 by the cabling 128. Based on any number of fixed or dynamic parameters, the control circuitry 170 may individually control the pulse width modulated current that flows through the respective LED strings S1, S2, and S3 such that the resultant white light emitted from the LED strings S1, S2, and S3 has a desired color temperature and falls within a desired proximity of the BBL. Certain of the many variables that may impact the current provided to each of the LED strings S1, S2, and S3 include: the magnitude of the AC power signal, the resultant white light, ambient temperature of the driver module 130 or LED array 120. Notably, the architecture used to drive the LED array 120 in this embodiment is merely exemplary, as those skilled in the art will recognize other architectures for controlling the drive voltages and currents presented to the LED strings S1, S2, and S3.

In certain instances, a dimming device controls the AC power signal. The rectifier and PFC circuitry 166 may be configured to detect the relative amount of dimming associated with the AC power signal and provide a corresponding dimming signal to the control circuitry 170. Based on the dimming signal, the control circuitry 170 will adjust the current provided to each of the LED strings S1, S2, and S3 to effectively reduce the intensity of the resultant white light emitted from the LED strings S1, S2, and S3 while maintaining the desired color temperature. Dimming instructions may alternatively be delivered from the communications module 132 to the control circuitry 170 in the form of a command via the communication bus 138.

The intensity or color of the light emitted from the LEDs 142 may be affected by ambient temperature. If associated with a thermistor ST or other temperature-sensing device, the control circuitry 170 can control the current provided to each of the LED strings S1, S2, and S3 based on ambient temperature in an effort to compensate for adverse temperature effects. The intensity or color of the light emitted from the LEDs 142 may also change over time. If associated with an LED light sensor SL, the control circuitry 170 can measure the color of the resultant white light being generated by the LED strings S1, S2, and S3 and adjust the current provided to each of the LED strings S1, S2, and S3 to ensure that the resultant white light maintains a desired color temperature or other desired metric. The control circuitry 170 may also monitor the output of the occupancy and ambient light sensors $S_O$ and SA for occupancy and ambient light information.

The control circuitry 170 may include a central processing unit (CPU) and sufficient memory 172 to enable the control circuitry 170 to bidirectionally communicate with the communications module 132 or other devices over the communication bus 138 through an appropriate communication interface (I/F) 174 using a defined protocol, such as the standard protocol described above. The control circuitry 170 may receive instructions from the communications module 132 or other device and take appropriate action to implement the received instructions. The instructions may range from controlling how the LEDs 142 of the LED array 120 are driven to returning operational data, such as temperature, occupancy, light output, or ambient light information, that was collected by the control circuitry 170 to the communications module 132 or other device via the communication bus 138. As described further below in association with FIG.

35, the functionality of the communications module 132 may be integrated into the driver module 130, and vice versa.

Figure 32:
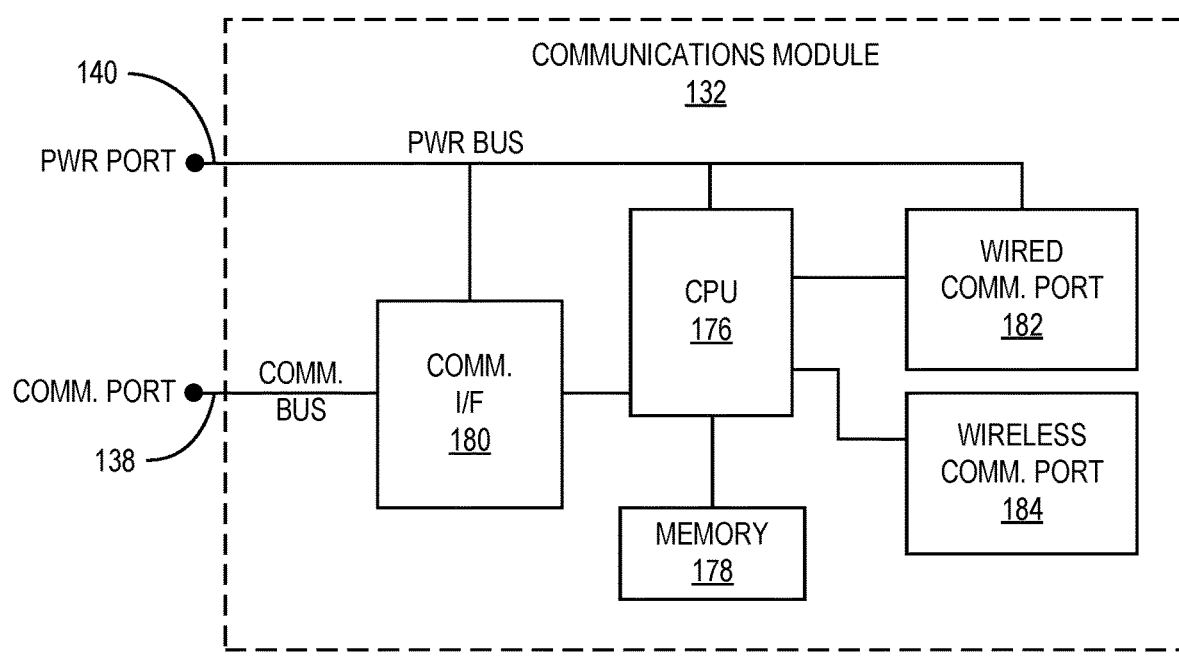
FIG. 32 is a block diagram of a communications module according to one embodiment of the disclosure.

With reference to FIG. 32, a block diagram of one embodiment of the communications module 132 is illustrated. The communications module 132 includes a CPU 176 and associated memory 178 that contains the requisite software instructions and data to facilitate operation as described herein. The CPU 176 may be associated with a communication interface 180, which is to be coupled to the driver module 130, directly or indirectly via the communication bus 138. The CPU 176 may also be associated with a wired communication port 182, a wireless communication port 184, or both, to facilitate wired or wireless communications with other lighting fixtures 110 and remote control entities.

The capabilities of the communications module 132 may vary greatly from one embodiment to another. For example, the communications module 132 may act as a simple bridge between the driver module 130 and the other lighting fixtures 110 or remote control entities. In such an embodiment, the CPU 176 will primarily pass data and instructions received from the other lighting fixtures 110 or remote control entities to the driver module 130, and vice versa. The CPU 176 may translate the instructions as necessary based on the protocols being used to facilitate communications between the driver module 130 and the communications module 132 as well as between the communications module 132 and the remote control entities. In other embodiments, the CPU 176 plays an important role in coordinating intelligence and sharing data among the lighting fixtures 110 as well as providing significant, if not complete, control of the driver module 130. While the communications module 132 may be able to control the driver module 130 by itself, the CPU 176 may also be configured to receive data and instructions from the other lighting fixtures 110 or remote control entities and use this information to control the driver module 130. The communication module 132 may also provide instructions to other lighting fixtures 110 and remote control entities based on the sensor data from the associated driver module 130 as well as the sensor data and instructions received from the other lighting fixtures 110 and remote control entities.

Power for the CPU 176, memory 178, the communication interface 180, and the wired and/or wireless communication ports 182 and 184 may be provided over the power bus 140 via the power port. As noted above, the power bus 140 may receive its power from the driver module 130, which generates the DC power signal. As such, the communications module 132 may not need to be connected to AC power or include rectifier and conversion circuitry. The power port and the communication port may be separate or may be integrated with the standard communication interface. The power port and communication port are shown separately for clarity. The communication bus 138 may take many forms. In one embodiment, the communication bus 138 is a 2-wire serial bus, wherein the connector or cabling configuration may be configured such that the communication bus 138 and the power bus 140 are provided using four wires: data, clock, power, and ground.

Figure 33:
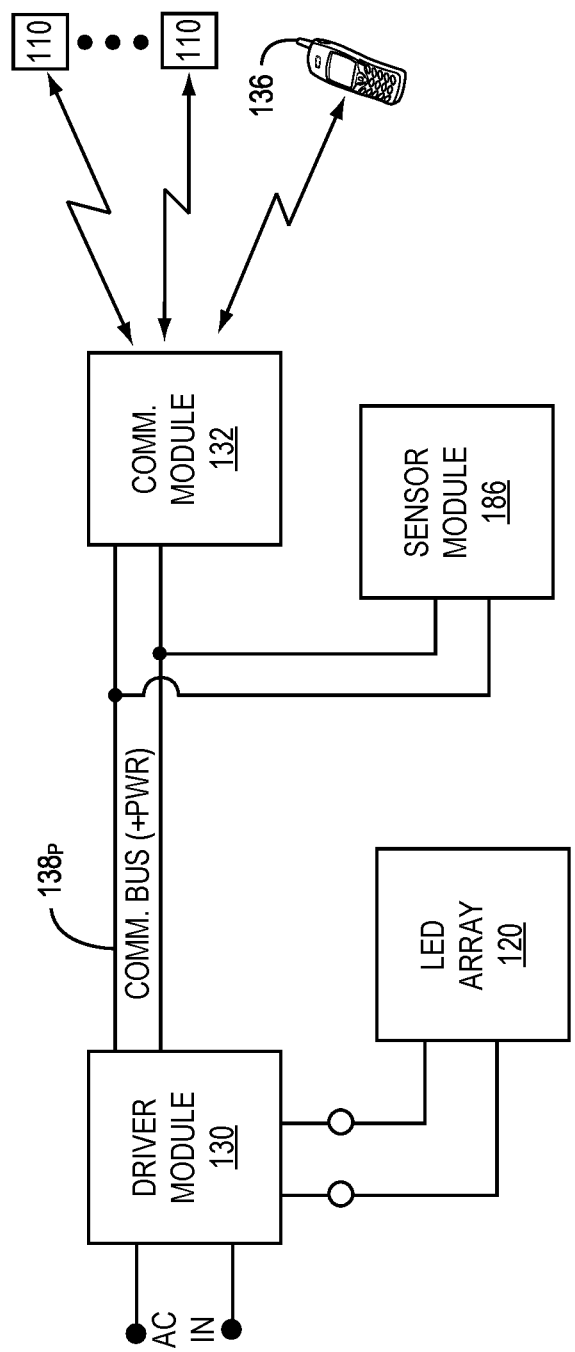
FIG. 33 is a block diagram of a lighting fixture according to a first embodiment of the disclosure.

In other embodiments, the communication bus 138 and the power bus 140 may be effectively combined to provide a communication bus $138_P$ that not only supports bidirectional communications, but also provides DC power, as shown in FIG. 33. In a 4-wire system, two wires may be used for data and clock signals, and another two wires may be used for power and ground. The availability of the communication bus $138_P$ (or communication bus 138) allows auxiliary modules to be coupled to the communication bus $138_P$. As shown in FIG. 33, the driver module 130, a communications module 132, and an auxiliary sensor module 186 are all coupled to the communication bus $138_P$ and configured to use a standard protocol to facilitate communications therebetween. The auxiliary sensor module 186 may be specially configured to sense occupancy, ambient light, light output, temperature, or the like and provide corresponding sensor data to the communications module 132 or the driver module 130. The auxiliary sensor module 186 may be used to provide different types of supplemental control for the driver module 130 as well as the communications module based on different lighting applications or requirements.

Figure 34:
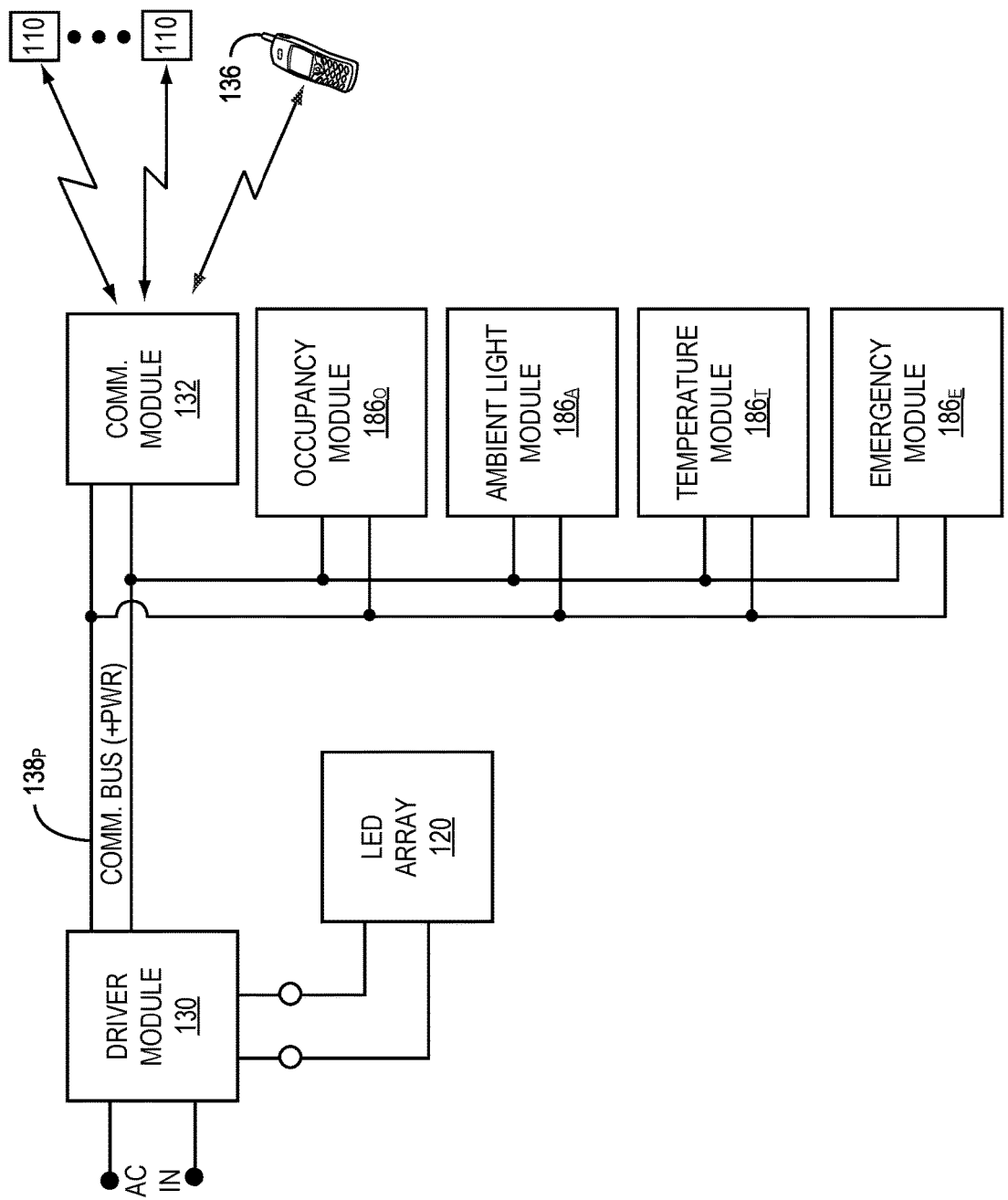
FIG. 34 is a block diagram of a lighting fixture according to a second embodiment of the disclosure.

While any number of functions or control techniques may be employed by an auxiliary sensor module 186, several examples are shown in FIG. 34. The illustrated auxiliary sensor modules include: an occupancy module $186_O$, an ambient light module 186A, a temperature module 186T, and an emergency module 186E. The occupancy module $186_O$ may be configured with an occupancy sensor and function to provide information bearing on whether the room in which the lighting fixture 110 is mounted is occupied. When the room is initially occupied, the communications module 132 may instruct the driver module 130 to drive the LED array 120 such that the lighting fixture 110 is effectively turned on and provide instructions for other lighting fixtures 110 in the same zone to do the same.

The ambient light module 186A may include an ambient light sensor that is capable of measuring ambient light, determining the characteristics of the ambient light, and then providing such information to the communications module 132 or the driver module 130. As a result, either the communications module 132 will instruct the driver module 130 or the driver module 130 will independently function to drive the LED array 120 in a manner based on the amount or characteristics of the ambient light. For example, if there is a lot of ambient light, the driver module 130 may only drive the LED array 120 to a level corresponding to 20% of its maximum light output. If there is little or no ambient light, the driver module 130 may drive the LED array 120 at or near maximum capacity. In more sophisticated embodiments, the ambient light module 186A, the driver module 130, or the communications module 132 may analyze the quality of the ambient light and cause the driver module 130 to drive the LED array 120 in a manner based on the quality of the ambient light. For example, if there is a relatively large amount of reddish light in the ambient light, the ambient light module 186A may instruct the driver module 130 to drive the LED array 120 such that the less efficient, red LEDs $142_R$ are driven at a lower level than normal to improve the overall efficiency of the lighting fixture 110. The communications module 132 may share the ambient light data with the other lighting fixtures 110 or remote control entities as well as process the ambient light data from one or more lighting fixtures 110 and provide instructions to other lighting fixtures 110 based thereon.

The temperature module $186_T$ may include a sensor capable of determining the ambient temperature of the room, the LED array 120, or electronics associated with any of the modules. The ambient temperature data may be used to cause the driver module 130 to drive the LED array 120 in an appropriate fashion. The last illustrated auxiliary sensor module is an emergency module 186E. The emergency module 186E illustrates an application type module, wherein the overall lighting fixture 110 may be converted to operate as an emergency lighting fixture when associated with the emergency module 186E. The emergency module 186E may be able to communicate with the driver module 130 and determine the state of the AC input signal (AC IN), the operational state of the driver module 130, or the like, and then control the driver module 130 in an appropriate fashion or provide information bearing on the operational state to the communications module 132. For example, if there is a power failure in the AC input signal (AC IN), the emergency module 186E may instruct the driver module 130 to switch over to a battery backup supply (not shown) and drive the LED array 120 at an appropriate level for an emergency lighting condition. The emergency module 186E may also retrieve various metrics for the AC input signal (AC IN), the driver module 130, or the LED array 120, and pass this information to the communications module 132. The communications module 132 may then pass the information or generate instructions for the other lighting fixtures 110 or a remote control entity.

For the various modules that are coupled to the communication bus $138_P$, one embodiment assigns a unique ID to each of the modules, such that one or more of the other modules can uniquely identify them. The identifiers may also correspond to the functionality or type of module. As such, the driver module 130 may be able to identify the various auxiliary sensor modules 186 and communications module 132 that reside on the communication bus $138_P$ and recognize the functionality provided by those modules. As such, the driver module 130 or communications module 132 can prioritize commands received by the various modules and manage conflicts therebetween.

Figure 35:
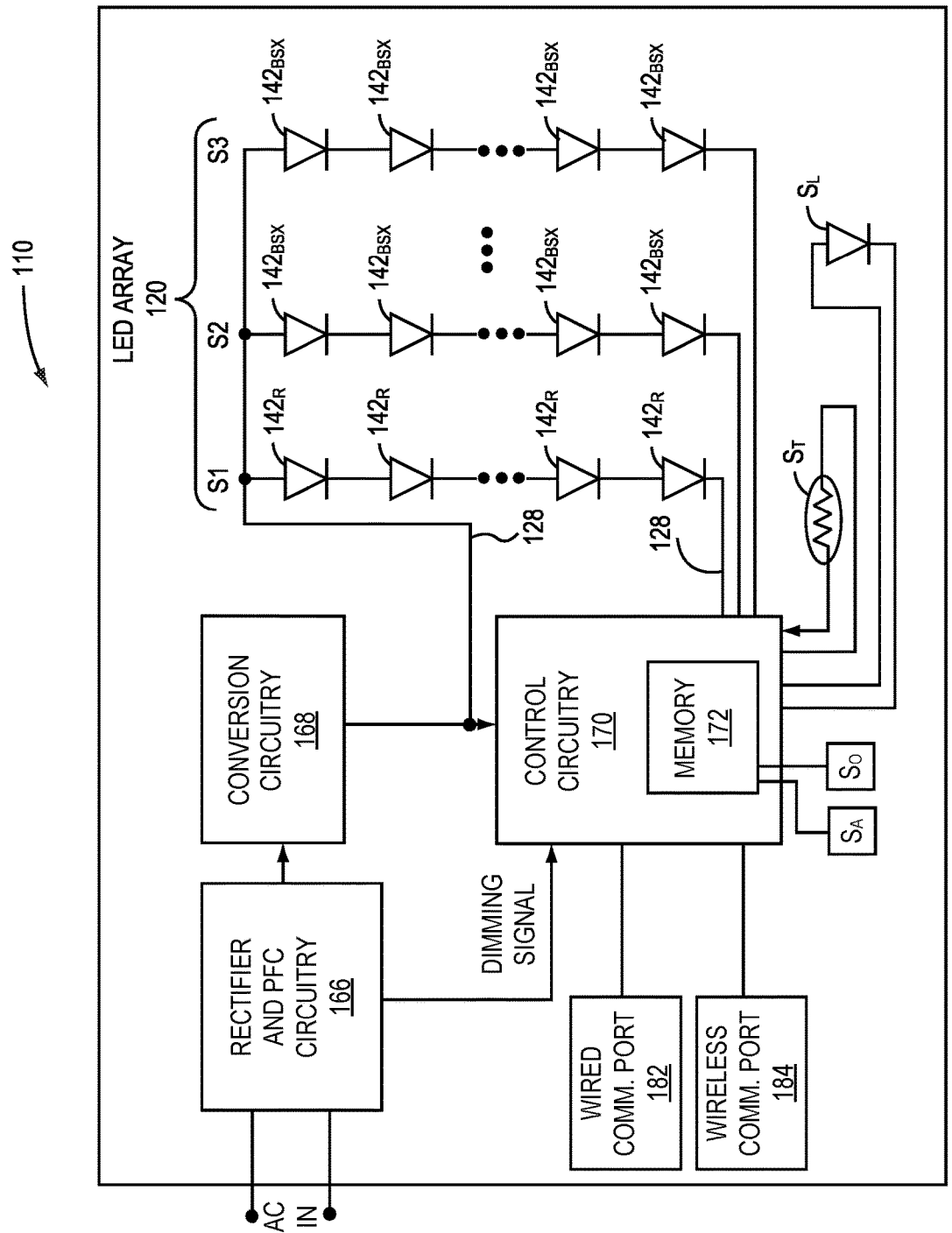
FIG. 35 is a block diagram of a lighting system wherein the functionality of the driver module and the communications module is integrated.

With reference to FIG. 35, an embodiment is provided wherein the functionality of the above-described driver module 130 and communications module 132 are integrated. In essence, the control circuitry 170 is expanded to include the functionality of the communications module 132. As such, the control circuitry 170 may be associated with various wired or wireless communication ports 182' and 184' to facilitate communications with the other lighting fixtures 110 and remote control entities, as described above. Such an embodiment is generally less expensive to manufacture, but may not provide as much flexibility as the above embodiments that employ distinct communications modules and driver modules 130.

Figure 36:
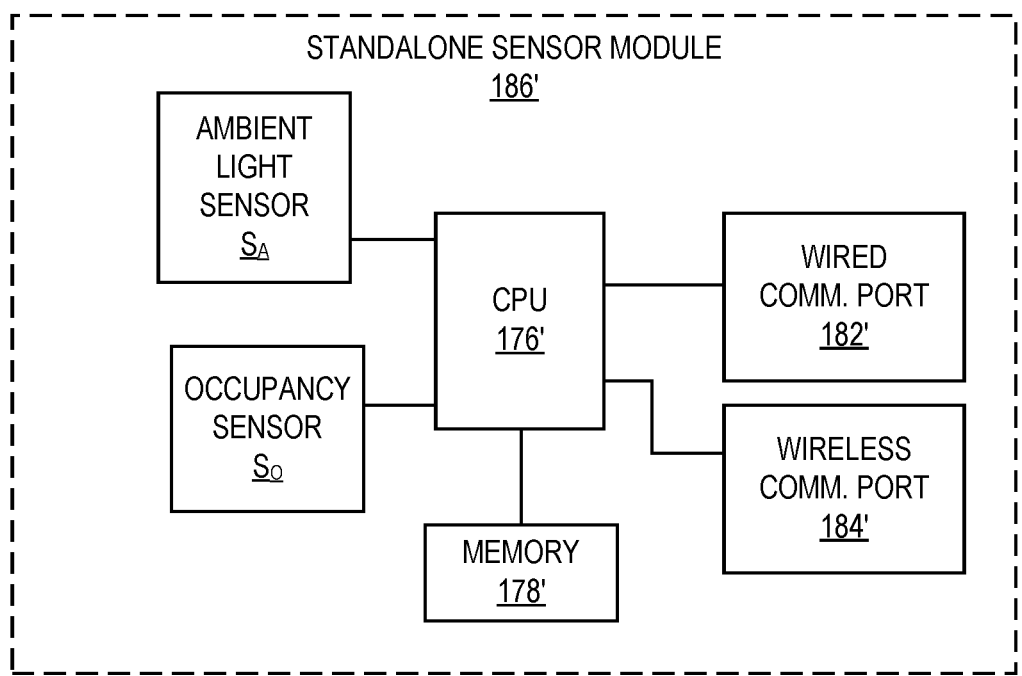
FIG. 36 is a block diagram of a standalone sensor module according to one embodiment of the disclosure.

As shown in FIG. 36, a standalone sensor module 186' may be provided in the lighting system. The standalone sensor module 186' may include one or more sensors, such as an ambient light sensor SA and an occupancy sensor $S_O$ as shown, and be proximately located with lighting fixtures 110 that do not have these sensors. As such, the communications modules 132 of the lighting fixtures 110 that do not have these sensors may communicate with the standalone sensor modules 186' to obtain ambient light, occupancy, or other available sensor data and then function as described above. As such, some or all of the lighting fixtures 110 in a zone or area of the lighting system need not have sensors or certain types of sensors. For example, some or all of the lighting fixtures 110 in a room may have ambient lighting sensors SA; however, none of the lighting fixtures 110 may need an occupancy sensor $S_O$, if one or more standalone sensor modules 186' are available with at least an occupancy sensor $S_O$ in the room.

The electronics of the standalone sensor module 186' may appear similar to a communications module 132. For example, the communications module 132 includes a CPU 176' and associated memory 178' that contains the requisite software instructions and data to facilitate operation as described herein. The CPU 176' may also be associated with a wired communication port 182, a wireless communication port 184, or both, to facilitate wired or wireless communications with the other lighting fixtures 110 or remote control entities. The standalone sensor modules 186' may also be configured to provide control instructions, in addition to just sensor data, to the other lighting fixtures 110 of a lighting system. Various types of control may be provided based on its own sensor data as well as sensor data collected from other lighting fixtures 110 and standalone sensor modules 186'.

Figure 37:
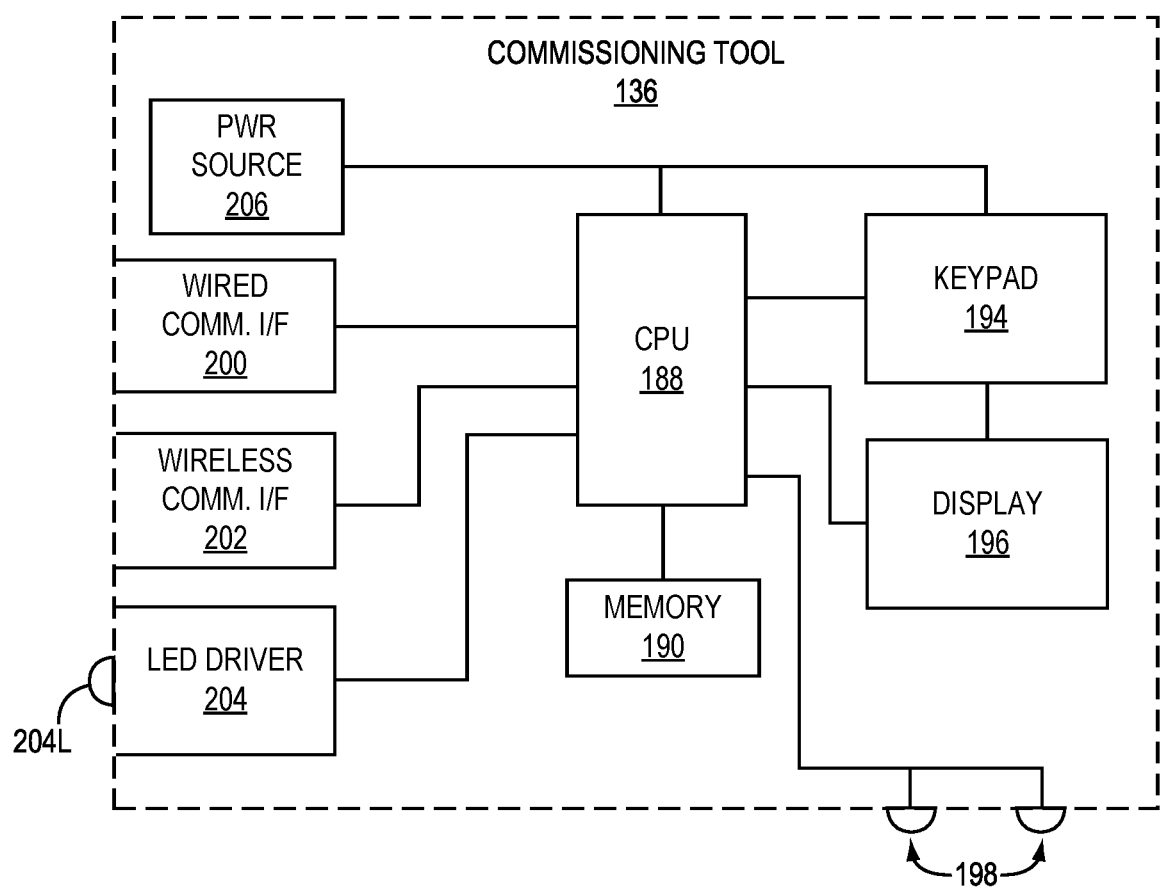
FIG. 37 is a block diagram of a commissioning tool according to one embodiment of the disclosure.

With reference to FIG. 37, an exemplary commissioning tool 136 is illustrated. The commissioning tool 136 may include a CPU 188, and sufficient memory 190 to facilitate the functionality described above. The CPU 188 may be associated with a keypad 194 and display 196, which act in combination to provide a user interface. The keypad may be a traditional alpha-numeric keypad and/or a series of buttons that have specifically assigned functions. The display 196 may be a touchscreen display, wherein a separate hardware-based keypad 194 is not needed. Status indicators 198 may be used to provide the user feedback regarding the status of a function, a certain activity, and the like. The CPU 188 is associated with one or more communication interfaces, such as a wired communication interface 200 and a wireless communication interface 202, which facilitates wired or wireless communications with any of the lighting fixtures 110, other control entities, standalone sensor modules 186', and the like. The LED driver 204 may also function as a communication interface to allow the commissioning tool 136 to communicate with the lighting fixtures 110, sensors, and switches that are equipped with an ambient light sensor SA or other light receiver. The ambient light used for communications may reside in the visible and/or non-visible light spectrum. For instance, the communications may be infrared.

All of the electronics in the commissioning tool 136 may be powered from an appropriate power source 206, such as a battery. The commissioning tool 136 may be used to program the lighting fixtures 110, sensors, and switches, as well as adjust any settings, load settings, receive sensor data, provide instructions, and the like. In essence, the commissioning tool 136 may act as a portable user interface for each of the lighting fixtures 110 and standalone sensors and switches as well as act as a remote control entity via which various data processing and control may be provided. Typically, the commissioning tool 136 will be used to initiate the setup of a lighting network, make adjustments to the network, and receive information from the lighting network. The commissioning tool 136 is particularly useful when the lighting network has no other interface to facilitate connection to another remote control entity.

Once the lighting fixtures 110 and any standalone sensors and switches are installed, the commissioning tool 136 may initially be used to assign addresses or IDs to the lighting fixtures 110 and standalone sensors and switches, if addresses or IDs are not pre-programmed into the devices. The commissioning tool 136 may also be used to assign the various lighting fixtures 110 and standalone sensors and switches into various groups, which will represent the lighting entities for a particular zone. The commissioning tool 136 may also be used to change group assignments as well as remove a lighting fixture 110 or a standalone sensor or switch from a group or lighting system in general. The commissioning tool 136 may also be able to instruct a particular lighting fixture 110 or standalone sensor or switch to provide this functionality for a particular zone or for the overall lighting system. Exemplary commissioning processes that employ the commissioning tool 136 are illustrated further below.

For access control, the commissioning tool 136 will be able to establish communications with a particular entity and authenticate itself. Once the commissioning tool 136 has authenticated itself with a lighting fixture 110 or a standalone sensor or switch in a particular group or in the overall lighting system, the commissioning tool 136 may be authenticated automatically with the other members of the group or lighting system. Further, various lighting fixtures 110 or standalone sensor or switch may be able to facilitate communications between other lighting fixtures 110 and standalone sensor or switch and the commissioning tool 136. Alternatively, the commissioning tool 136 may be configured only to communicate with a lighting fixture 110 or standalone sensor or switch when in close proximity. This may be accomplished through a physical plug-in connection or through a low-power infrared or radio frequency communication link. Employing direct or short-range communication techniques allows the commissioning tool 136 to be placed in close proximity to a particular lighting fixture 110 or standalone sensor or switch and only communicate with the entity or entities within the limited communication range.

The internal logic or programming of the standalone sensors or switches may be downloaded from, modified by, or replaced by the commissioning tool 136, or by any other remote control entity. As such, lighting designers and maintenance technicians are equipped to configure the overall lighting network to function in a way that best achieves their intended lighting goals. Accordingly, all or various groups of lighting fixtures 110 and standalone sensors or switches may be configured to act in synch with one another for certain applications and independently from one another in other applications. The commissioning tool 136 may take various forms, such as a handheld device with a form factor similar to a smartphone or tablet. Various ports on the communication interface 200 may be used to install external sensors, displays, keypads, and the like, as well as facilitate an interface to a personal computer or computer network. The commissioning tool 136 may also be a device with an architecture as described above and connected with a portable computing device such as a notebook PC, tablet, or smart phone. The combination could perform the commissioning tool functionality.

As indicated above, the various lighting fixtures 110, as well as the standalone sensors or switches, share sensor data, instructions, and other information. In many instances, such information may need to be routed through one or more intermediate lighting fixtures 110 or standalone sensor modules 186' before reaching an intended destination. As such, these lighting fixtures 110 and standalone sensors or switches may function as routing nodes within the overall lighting system. The following describes unique and efficient techniques for assigning addresses, configuring routing tables, and accessing these routing tables to facilitate the exchange of information among the various entities of the lighting system. These techniques make lighting systems such as the one described above more reliable and predictable in terms of their requirements.

Figure 38:
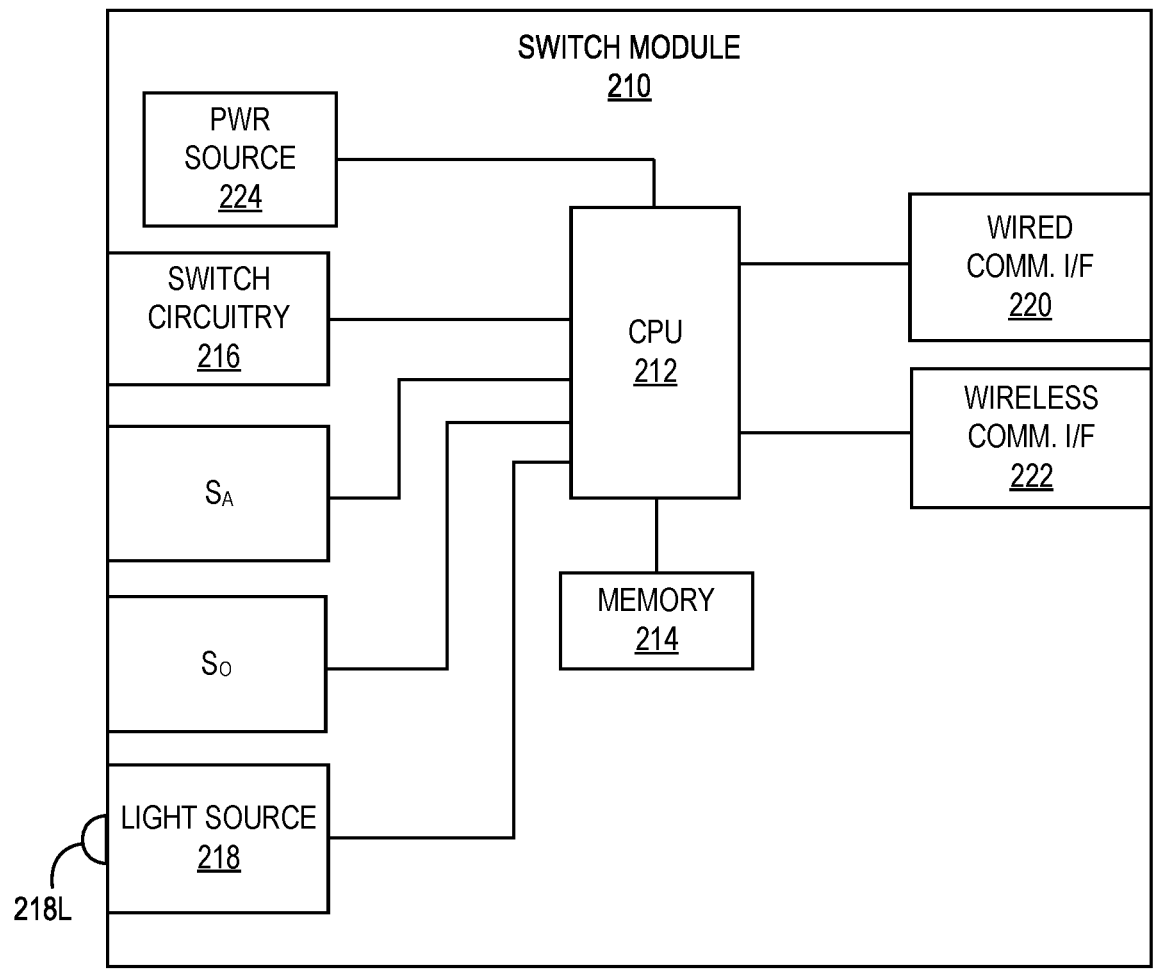
FIG. 38 is a block diagram of a switch module according to one embodiment of the disclosure.

With reference to FIG. 38, an exemplary standalone switch module 210 is provided. The switch module 210 may include a CPU 212 and sufficient memory 214 to facilitate operation of the switch. Switch circuitry 216 is capable of determining whether the switch should be on or off, as well as a dimming position. Based on the on/off/dimming position, the switch circuitry 216 will provide corresponding information to the CPU 212, which is capable of processing the information and determining whether or not to send a command or corresponding status information to one or more nodes in the lighting network. The switch module 210 may communicate with other nodes in the lighting network through a wired communication interface 220 or a wireless communication interface 222. For the wired communication interface 220, the type of connectivity may range from running signals over existing AC lines, a separate interface cabling, which would perhaps support serial bus communications, or a proprietary interface. The wireless communication interface 222 may facilitate communications wirelessly with the network and effectively be another node in the mesh network provided by the lighting network. The switch module 210 may also include an ambient light sensor SA and an occupancy sensor $S_O$, which can provide ambient light conditions and/or occupancy information to the CPU 212, which may process ambient light conditions and/or occupancy information in order to control how to instruct the other nodes in the lighting network to function, or merely pass the ambient light and/or occupancy information to a controlling node in the lighting network. The switch module 210 may also include a light source 218, such as an LED, to provide status indication or facilitate near field visible or non-visible light-based communications with the commissioning tool 136 or other device. The ambient light sensor SA may also receive visible or non-visible light-based communications from the commissioning tool 136 or other device. Notably, the switch module 210 may include additional or less functionality relative to that illustrated in FIG. 38.

III. Network Devices in Exemplary Lighting System

The following is a description of a particular system that employs exemplary wireless communication techniques of the present disclosure. The devices in the system may include switches, sensors, and lighting fixtures 110 of varying configurations. The system's communications topology may be an RF mesh network based on the IEEE 802.15.4 standard. As such, the various nodes on the network may communicate on one or more channels in the 2.4 GHz band. The data rate in this configuration is nominally 200 kbps but actual throughput depends heavily on messaging overhead and traffic volume.

Once the network is formed, most communications occur within groups, where groups include devices, such as the switches, sensors, and lighting fixtures, operating in tandem. With this particular system's emphasis on grouping, RF traffic should be relatively minimal once the system is up and running. Consequently for most applications, the RF mesh network will provide a perceptually instantaneous response, such that delays are not noticeable to the user. In practice, this means that lighting fixtures 110 may typically respond within 200 msec to switch, sensor, or other control operations within their group.

The following describes the particular components and configurations of the switches, sensors, and lighting fixtures 110 of the illustrated system. As illustrated in FIG. 39, a smart fixture 230 is a component that includes a driver module 130, which is integrally associated with an LED array 120, ambient light sensor SA, and occupancy sensor $S_O$. Communications with other modular components, as described below, are facilitated via an I²C serial bus or the like, as noted above. In this configuration, the driver module 130 is capable of providing DC power to modules or components connected thereto.

As illustrated in FIGS. 40 and 41, an indoor RF communication module iRFM 132' and outdoor RF communication module 132" oRFM are variants of the communication module 132. The iRFM 132' and the oRFM 132" may connect to and provide wireless connectivity to the mesh network for various lighting components, such as the smart fixture 230. The iRFM 132' and the oRFM 132" may receive power from and communicate with a coupled smart fixture 230 or other component via a standard connector. The iRFM 132' and oRFM 132" support wireless connectivity to other devices that have wireless communication capabilities. FIG. 42 illustrates an iRFM 132' directly coupled to a smart fixture 230 to create a variant of a lighting fixture 110. DC power is provided to the iRFM 132' by the smart fixture 230. The iRFM 132' and the smart fixture 230 communicate with each other via the I²C serial bus.

As illustrated in FIG. 43, a fixture sensor module (FSM) 232 may be connected to the iRFM 132' and smart fixture 230 of FIG. 42 to add additional sensing capabilities to the lighting fixture 110. The FSM 232 is a type of auxiliary module 186 (FIG. 34) and is configured to obtain power from the smart fixture 230 and provide pass-through connectors for plugging in the iRFM 132' and the smart fixture 230. When the ambient light sensor SA, occupancy sensor $S_O$, or other sensor type generates an output change, the FSM 232 communicates the changes via the local I²C bus to both the attached smart fixture 230, and if present, the iRFM 132'. If an iRFM 132' is connected, it wirelessly communicates the FSM sensor updates to an associated group of lighting devices in the system.

As illustrated in FIG. 44, an indoor or outdoor wireless sensor module 234, which is either AC or battery-powered, may also be provided. The wireless sensor 234 has a wireless communications interface and is configured to monitor ambient light conditions, room occupancy, or the like using one or more ambient light or occupancy sensors $S_A$, $S_O$. To maximize battery life, the wireless sensor's communication and processing circuitry may remain turned off over 99% of the time. When outputs from the sensors change, the communication and processing circuitry turns on and sends a sensor update to lighting devices in an associated group. The wireless sensor 234 is intended to be located physically apart from other lighting fixtures 110, smart fixtures 230, and the like. Wireless sensors 234 may be placed in locations where sensors, but not necessarily lighting elements, are needed or desired.

Figure 45:
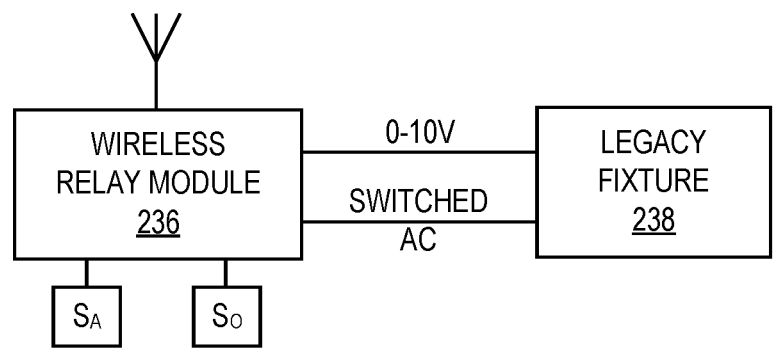
FIG. 45 is a block diagram of a wireless relay module that is capable of driving a legacy fixture according to one embodiment of the disclosure.

As illustrated in FIG. 45, a wireless relay module 236 may be used to allow wireless control of legacy (light) fixtures 238 to provide on/off control and dimming thereof. When wireless communication circuitry receives a wireless control signal, a relay may control AC power supplied to the legacy fixture 238 and/or a control signal (0-10V) may be provided to control a dimming level. The wireless relay module 236 may also include ambient light and occupancy sensors $S_A$, $S_O$, and report output changes wirelessly to other devices in the associated group.

Figure 46:
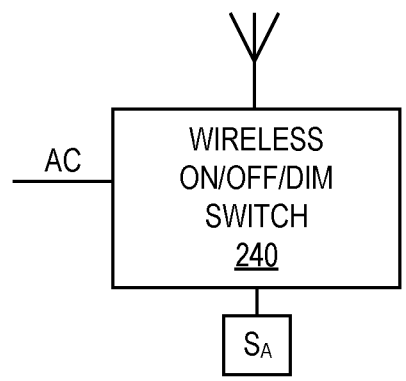
FIG. 46 is a block diagram of a wireless switch according to one embodiment of the disclosure.

As illustrated in FIG. 46, a version of the switch module 210 configured as a wireless on/off/dimming switch (WS) 240 is provided. The WS 240 resides on the wireless communications network, and as described above, may include an ambient light sensor $S_A$, on/off control, and dimming circuitry. When ambient light sensor $S_A$ activates, the WS 240 sends an update to the devices in its group. The RF design supports low power operation for battery power, but may be hardwired to an AC power source.

IV. Exemplary Network Commissioning Procedure

Commissioning generally includes the steps of 1) forming the network, 2) collecting data for grouping network devices into groups, 3) running the grouping process, 4) assigning groups for each device, and 5) revising group assignments.

In this example, the handheld commissioning tool 136 is used to initiate and control the commissioning process. For an uninitialized system, a user asserts a 'Start Commissioning' process from the commissioning tool 136 to begin network formation. This may simply entail moving the commissioning tool 136 near a routing node, such as a lighting fixture 110, and then initiating a one-button command on the commissioning tool 136, which sends a 'start network formation' message. A routing node may be any device on the network, such as a lighting fixture 110, that is capable of acting as the coordinator and is able to route information from one node to another.

For a routing node to become the coordinator, it may monitor a received signal strength indicator (RSSI) associated with a message or the like, and determine that the RSSI is above a defined threshold. Other routing nodes may receive the message, but the RSSI will be below the defined threshold. Sleeper nodes, such as battery-powered wireless sensors 234, wireless switches 240, and the like, will either be asleep or ignore the start network formation message.

In this embodiment, assume the proximate routing node accepts the start network formation message and asserts itself as the coordinator. The coordinator broadcasts a Join My Network (JMN) message to the other non-coordinator routing nodes and subsequently allows the non-coordinator nodes in the system to join the network. The coordinator permits joining and may assign "short" network addresses, which may be 24, 16, 8 or so bits, to those non-coordinator routing nodes that joined the network. The short addresses are "short" in that they are shorter than the corresponding MAC addresses for the devices, and will be used instead of the MAC addresses to facilitate communications throughout the network once they are assigned. In this first stage of network formation, the coordinator effectively establishes a network that includes all of the routing nodes.

In particular, the coordinator is tasked with sending a JMN message on multiple, if not all, available communication channels. In that JMN message, the coordinator may indicate a selected channel on which the non-coordinator routing nodes should respond. During the joining process, the coordinator will provide short addresses to those non-coordinator routing nodes that are joining the network. The coordinator will also have a default short address, or will assign itself a short address. As noted, these short addresses will be used for communications during normal network operation. The coordinator will also build its own routing tables to use when routing information from one routing node to another.

In a cooperative fashion, the non-coordinator routing nodes will initially listen for the JMN message. When the broadcasted JMN message is received, the non-coordinator routing nodes will respond on the selected channel identified by the coordinator. The routing nodes will also receive the short addresses assigned by the coordinator, store the short addresses, and build their own routing tables. The unique MAC addresses for the various routing nodes may also be exchanged during this process. The coordinator will keep track of the nodes that have responded and may inform each node of the other nodes that make up the network and the respective short addresses to effectively form the routing core of the network.

After allowing sufficient time for all routing nodes to join, the coordinator will initiate and control the above described lightcasting process to help group the various routing nodes into different groups. As such, the coordinator will enter itself and then sequentially request each routing node to enter a lightcast mode. An exemplary lightcast would entail providing a light output at 50% duty cycle at a pre-defined PWM frequency. As an alternative to the PWM frequency for the lightcast signal, an on-off sequencing could be used.

While lightcasting, a routing node is considered a 'lightcaster' and will transmit to routing nodes a stream of RF messages identifying itself and indicating it is the current lightcaster. The other routing nodes act as lightcast receivers (or lightcatchers) by monitoring the lightcast signal from the given lightcaster, calculating the magnitude of the lightcast signal, and storing the magnitudes of the lightcast signal for the given lightcaster. Sleeper nodes, such as battery-powered wireless sensors 234, wireless switches 240, and the like, may receive the lightcast signal and turn on their radio receivers to hear the RF message indicating the identity of the lightcaster. During the lightcasting process, sleeper nodes may be triggered to wake up and request to join the network. The coordinator node will assign them short addresses while approving their join requests. After lightcasting wraps up for all devices, the coordinator will send a message to the commissioning tool 136 that network formation is complete.

Accordingly, the coordinator will sequentially send lightcast request messages to the routing nodes, accept join requests from sleeper nodes, and assign short addresses to those joining sleeper nodes. The coordinator will also save lightcast reception data, which is gathered when the other lightcasters are lightcasting. The coordinator will also retain the lightcast reception data until requested by the commissioning tool 136 or other device. The non-coordinator lighting nodes will perform lightcasting when requested as well as gather and save lightcast reception data during lightcasting from other lightcasters. Again, the lightcast reception data is stored until requested by the commissioning tool 136 or other device. For the sleeper nodes, which are normally asleep, they will fully power on and submit Join Network' (JN) request messages upon sensing the presence of a lightcast signal. The sleeper nodes will receive short addresses from the commissioning tool 136 as well as gather and save lightcast reception data. The lightcast reception data is saved until requested by the commissioning tool 136 or another device. In other embodiments, the lightcast reception data may be sent to a designated node, such as the coordinator, or to the commissioning tool 136, as it is gathered.

Assuming that the lightcast reception data is stored until requested, the following process may be employed. To collect the lightcast reception data, the commissioning tool 136 queries each node for its lightcast reception data. Since a wireless mesh network is already formed, the commissioning tool 136 may communicate with any routing node to establish the entry point to the network. Each node responds with its lightcast data.

In particular, the commissioning tool 136 may send out a request for the lightcast reception data. Both the coordinator and the non-coordinator routing nodes will respond with the lightcast reception data. In certain embodiments, the sleeper nodes may share their lightcast reception data with a non-sleeper node, such as the non-coordinator routing nodes and the coordinator. If this is the case, the lightcast reception data for the sleeper nodes may be provided to the commissioning tool 136. If the sleeper nodes did not share their lightcast reception data with a non-sleeper node, the sleeper nodes may respond with their own lightcast reception data, if they are awake or when they are ultimately awakened automatically or through a lightcast or light signal.

After collecting the lightcast reception data, the commissioning tool 136 proceeds with a grouping process. The commissioning tool 136 itself, or possibly an attached notebook computer, executes a grouping algorithm for determining optimal node grouping based on the lightcast reception data. Once the commissioning tool 136 (or attached PC) runs the grouping algorithm, it communicates the group assignments and a group address to each routing node in the network, wherein the group assignment data (inducing the group address) is sent to each routing node and includes all nodes within that routing node's group.

All sleeping nodes are grouped with at least one routing node. Sleeping nodes may receive their group assignment by either of two methods. First, each sleeping node wakes up periodically to send out its sensor data and to request system status updates from the network. In response to the sleeper node's message, the associated routing node may respond and provide the sleeper node with its group assignment via the group assignment data. The second method for assigning the group address to the sleeper nodes requires that a routing node with sleeper nodes in its group perform lightcasting to awaken the sleeper nodes. An awakened sleeper node subsequently sends out its sensor data and requests system status updates from the network. In response to the sleeper node's message, the associated routing node responds and provides the sleeper node its group assignment data.

Inevitably some group assignments will need to be modified. The commissioning tool 136 provides a way for checking and changing group assignments. The commissioning tool 136 may include an LED (or other visible or non-visible light) output that the user may point at an ambient light sensor $S_A$, which is embedded in a lighting fixture 110, wireless sensor 234, wireless relay module 236, wireless switch 240, or the like that needs to be assigned to a different group. The commissioning tool 136 may use the LED to provide a lightcast signal as well as send and receive RF messages to effect a group assignment change.

An exemplary process for reassigning a node, such as a smart fixture 230, from one group to another follows. Initially, a user will point the commissioning tool 136 at the smart fixture 230 to be reassigned and provide a user input that is associated with reassigning a node from one group to another. The commissioning tool 136 will initiate a corresponding lightcast signal via its LED output, as well as send an RF message to request the short address of the smart fixture 230. The smart fixture 230 will receive the lightcast signal and listen for the RF message. The smart fixture 230 will provide an RF acknowledgement message, which includes the short address and the group address for the smart fixture 230.

Next, the user will point the commissioning tool 136 at a node in the new group to which the smart fixture 230 is being moved. The user will press a button or provide an input instructing the commissioning tool 136 to move the smart fixture 230 to the new group. In response, the commissioning tool 136 will initiate a lightcast signal as well as send a corresponding RF message indicating that a node is being moved to the new group. The RF message will include the short address of the smart fixture 230. The node in the new group that is receiving the lightcast signal will also receive the RF message from the commissioning tool 136.

Upon receipt, the node in the new group will send an acknowledgement to the commissioning tool 136 as well as send a message to the smart fixture 230 using the appropriate short address to provide the address for the new group. The smart fixture 230 will update its group address and send a message to the commissioning tool 136 indicating that the move has been completed. Information associated with the other nodes in the new group may also be provided to the smart fixture 230 via the mesh network. After receiving the new group address from the node in the new group, the smart fixture 230 may also send an acknowledgement back to the commissioning tool 136 as well as send a message to one or more nodes in the old group indicating that it is changing groups. At this point, the smart fixture 230 may monitor any sensor levels and provide any available sensor data to the nodes in the new group via the mesh network. While the example reassigned a smart fixture 230 from one group to another, this technique applies to any type of node in the network.

If the network requires re-initialization, the user may employ the commissioning tool 136 to instruct the network nodes to revert to their pre-commissioned settings. Presumably, starting this process will require a multi-step sequence to prevent inadvertent undo commands. Once commissioning is completed, and grouping corrections are made, the system is ready to operate. In general, switches and sensors provide inputs to the system. Lighting fixtures 110 interpret these inputs within the framework of their energy-saving settings and function accordingly.

Operation of the different types of devices in the network is described below. A wireless relay module 236 (FIG. 45) monitors input data from its group. This includes data from other switches, remote sensors, and its own internal sensors. Data from switches and remote sensors arrives via wireless network communications. Data from internal sensors is gathered and stored internally. The wireless relay module 236 independently executes internal logic that interprets the various inputs and settings, and correspondingly outputs the 0-10V dimming control and relay on/off control. The wireless relay module 236 relies on its wireless communication circuitry to perform message routing within the mesh network. Routing occurs as a background activity and has no impact on the light-control operation.

The wireless relay module 236 may hold a message for a sleeping sleeper node in its group. When the node next awakens and requests an update, the wireless relay module 236 sends the held message to the awakened sleeper node. Notably, the wireless relay module 236 processes its internal ambient light sensor data looking for a lightcast signal. With the network in normal operating mode, the only expected lightcast signal will be from the commissioning tool 136. When the wireless relay module 236 receives a commissioning tool's lightcast signal, it will perform the requested wireless command.

In most respects, a smart fixture 230 operates similarly to the wireless relay module 236. One major difference is that smart fixtures 230 are generally coupled with a communication module 132 to form a lighting fixture. The two modules may communicate with each other via the I²C bus. Either of the modules may be used to process and store the sensor data; however, communications are provided by the communications module 132.

Wireless sensors 234 provide ambient light and occupancy sensor data to their groups. The wireless switches 240 provide on/off and dimming information via RF messages. The wireless sensors 234 periodically wake up, monitor the sensors, and send sensor update messages to their group. The wireless switches 240 provide RF messages to indicate on, off, and dimming state changes. This allows group members to monitor the wireless sensors 234 and wireless switches 240 within the group, process the information provided in the messages, and react accordingly. If routing nodes within the group have messages for the wireless sensors 234, they communicate these messages during the waking interval.

V. Automatic Coordinator Selection and Grouping Initiation

The preceding example relied on the commissioning tool 136 to initiate network formation by selecting a routing node, such as a lighting fixture 110, to act as the coordinator. The coordinator will then assign short addresses to the various network elements and assist the commissioning tool 136 in making group assignments through the lightcasting process. For the next embodiment, a variant is described wherein routing nodes automatically discover each other and work together to identify a coordinator, without external aid from the commissioning tool 136 or other entity. The coordinator will automatically assign short addresses for use with normal communications within the network as well as automatically initiate and control the grouping process using the previously described lightcasting.

Identification of the coordinator in this embodiment is an iterative process wherein the various routing nodes will essentially exchange their typically 64-bit MAC addresses and decide that the routing node with the lower (or higher) MAC address should be the coordinator, at least for the time being. The routing node with the lower MAC address (coordinator) will assign the routing node with the higher MAC address a unique short address. The coordinator and the other routing nodes will periodically send out requests, such as the JMN requests, to join their networks. If a first routing node that has been assigned as coordinator exchanges MAC addresses with a second routing node that has a lower MAC address, the first routing node will relinquish its coordinator role to the second routing node having the lower MAC address. The second routing node will promptly assign a short address to the first routing node. After a few iterations, the routing node with the lowest (or highest) MAC address in the network will be set as the coordinator and will have assigned short addresses for to each routing node in the network. Again, the coordinator assignment process could just as easily find the routing node with the highest MAC address as opposed to the one with the lowest MAC address. Also, other unique identifying criteria may be exchanged to identify the coordinator in an analogous process. Further, short addresses are optional, and are used merely to speed up the routing process during normal operation. Alternative embodiments may forego the use of short addresses and rely on the MAC or other addresses for routing, as done in traditional mesh networks.

Sleeper or other non-routing nodes will wake up periodically and obtain their short addresses from the coordinator directly or from the coordinator via an associated routing node. All other functions, such as overall control, exchanging switch and sensor information, setting up routing tables, routing messages through the network, lightcasting control, grouping, and the like can be handled as described above. Further, a commissioning tool 136 may still be used to tweak settings, regroup elements, and the like as described above.

A few exemplary communication flows are described below to illustrate various scenarios for selecting a coordinator for a network. In these flows, four different routing nodes A through D are described. In the various flows, 64-bit MAC addresses are provided for these nodes. For simplicity's sake, the MAC addresses used are: EEEE EEEE EEEE EEEE (the highest MAC address in the examples); AAAA AAAA AAAA AAAA; 8888 8888 8888 8888; and 1111 1111 1111 1111 (the lowest MAC address in the examples). For conciseness and readability, these MAC addresses are referenced below and in the associated communication flows as [E-E], [A-A], [8-8], and [1-1], respectively.

Figure 47:
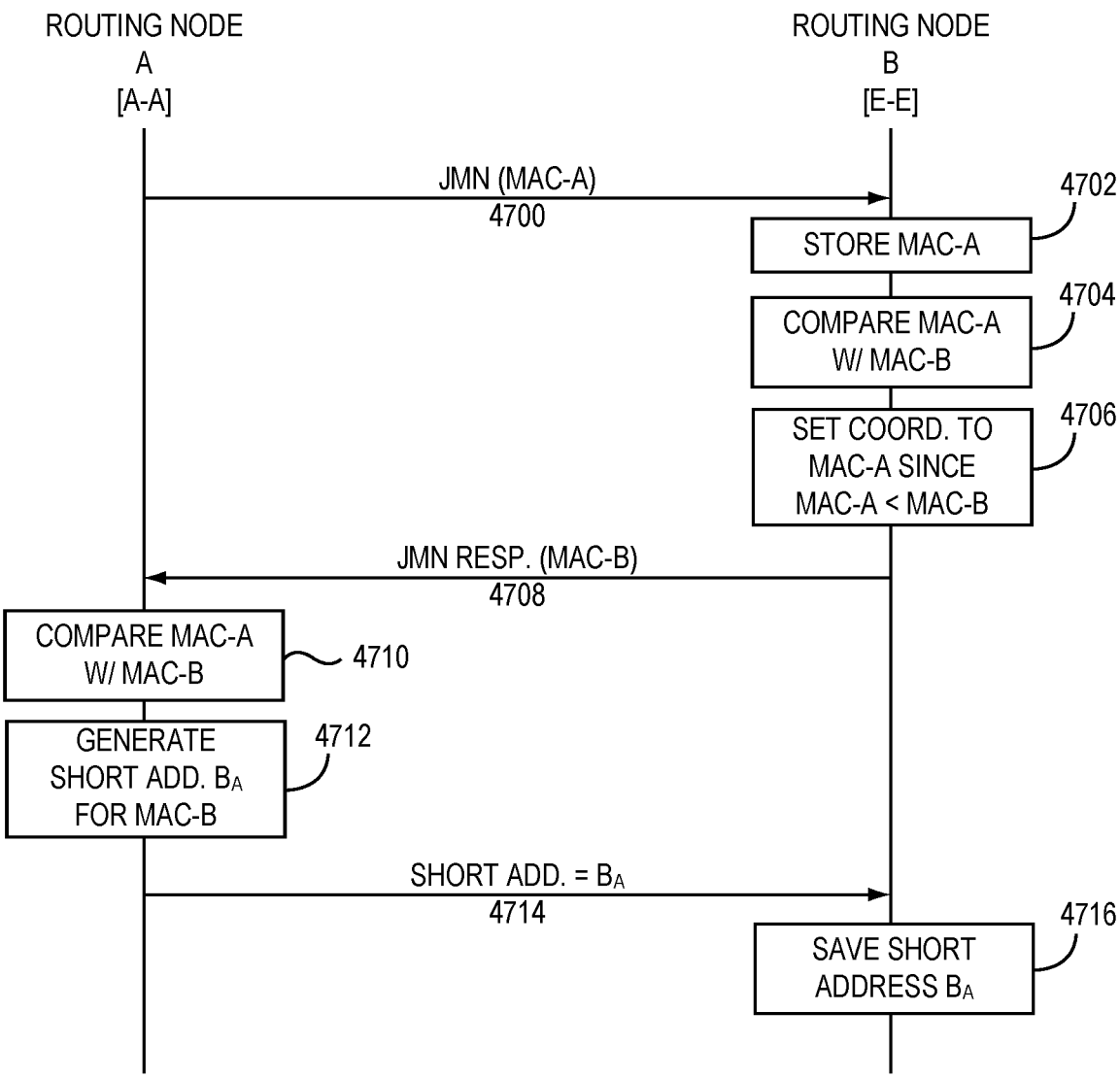
FIG. 47 is a communication flow diagram illustrating an iterative process for selecting a coordinator according to one embodiment of the disclosure.

With reference to the communication flow of FIG. 47, assume routing node A has a MAC address of [A-A], and routing node B has a MAC address of [E-E]. As such, routing node B has a higher MAC address than routing node A. In this example and in the examples following this one, assume that the coordinator role should be assigned to the routing node with the lowest MAC address. Initially, routing node A is set to its default settings and is programmed to periodically broadcast a JMN (Join My Network) message to request other routing nodes to join routing node A's network, which at this point is a one-element network. As such, routing node A's initial network will only include routing node A. In essence, routing node A may default to thinking that it is a coordinator.

With continued reference to FIG. 47, assume that routing node A broadcasts a JMN message, including its MAC address (MAC-A) (step 4700). Routing node B will be listening for JMN messages, and will respond to routing node A's JMN message by storing the MAC address (MAC-A) for routing node A (step 4702) and then comparing routing node A's MAC address (MAC-A) with its own MAC address (MAC-B) (step 4704). Routing node B will recognize that routing node A's MAC address [A-A] is less than routing node B's MAC address [E-E] and will set the coordinator for its associated network to routing node A's MAC address (step 4706). At this point, routing node B assumes that routing node A, which is associated with the MAC address [A-A], is the coordinator of the network to which it belongs.

In response to the JMN message, routing node B will also send a JMN response with its MAC address (MAC-B) back to routing node A (step 4708). Routing node A will compare its MAC address (MAC-A) with that of routing node B (MAC-B) (step 4710) and will recognize that it has the lower MAC address, and thus should remain the coordinator of the network. Accordingly, routing node A will generate a short address (BA) for routing node B's MAC address (MAC-B) (step 4712) and will send the short address to routing node B (step 4714). Routing node B will then save the short address (BA), which was assigned by routing node A (step 4716), and if not subsequently changed by another routing node that becomes the coordinator, will use the short address for communications and routing within the network.

Figure 48:
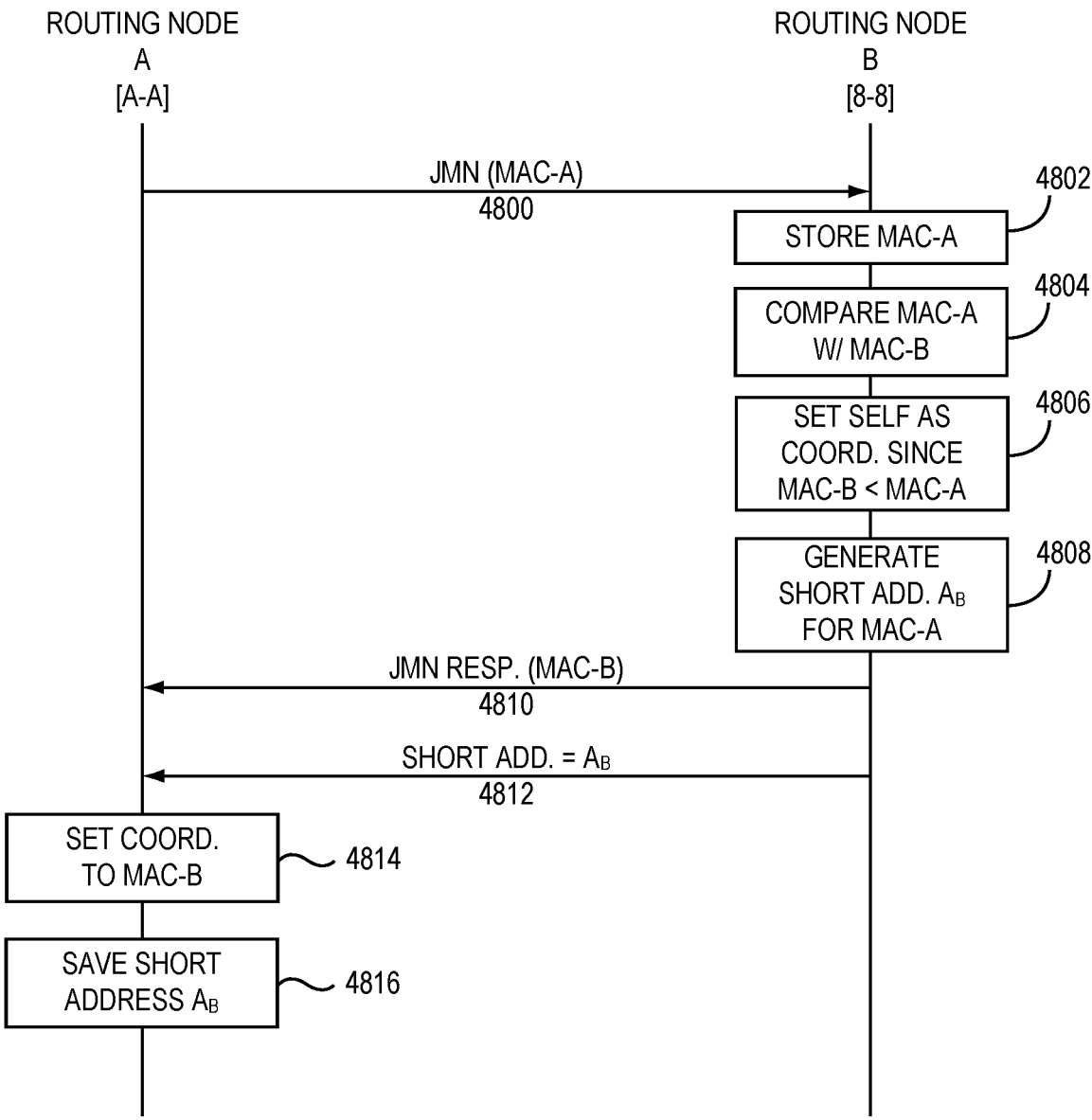
FIG. 48 is a communication flow diagram illustrating an iterative process for selecting a coordinator according to another embodiment of the disclosure.

In the above example, the routing node (A) with the lower MAC address originated the JMN message, and the routing node (B) with the higher MAC address joined the JMN message originator's network. In the next example, illustrated in FIG. 48, the routing node (B) receiving the JMN message becomes the coordinator because it has a lower MAC address. In this example and with reference to FIG. 48, routing node A is associated with a higher MAC address [A-A] than routing node B, which has a lower MAC address [8-8]. At some point, assume that routing node A broadcasts a JMN message, which includes routing node A's MAC address (MAC-A) (step 4800). The broadcast message is received by routing node B, which proceeds to store the MAC address (MAC-A) for routing node A (step 4802) and then compares routing node A's MAC address (MAC-A) with routing node B's MAC address (MAC-B) (step 4804). In contrast with the example illustrated in FIG. 47, routing node B will recognize that it should set itself as the coordinator, since its MAC address (MAC-B) is less than routing node A's MAC address (MAC-A) (step 4806). Since routing node B is the coordinator, it will generate a short address (AB) associated with routing node A's MAC address (MAC-A) (step 4808). Next, routing node B will send a JMN response message, which includes routing nodes B's MAC address (MAC-B) to routing node A (step 4810) and immediately follow with a message providing the short address (AB) to routing node A (step 4812). Routing node A will then recognize that it is no longer the coordinator, and will set the coordinator to routing node B's MAC address (MAC-B) (step 4814), which effectively recognizes routing node B as the coordinator for the network to which routing node A belongs. Routing node A will also save the short address (AB) as the short address that routing node A will use for communications over the network (step 4816).

Figure 49B:
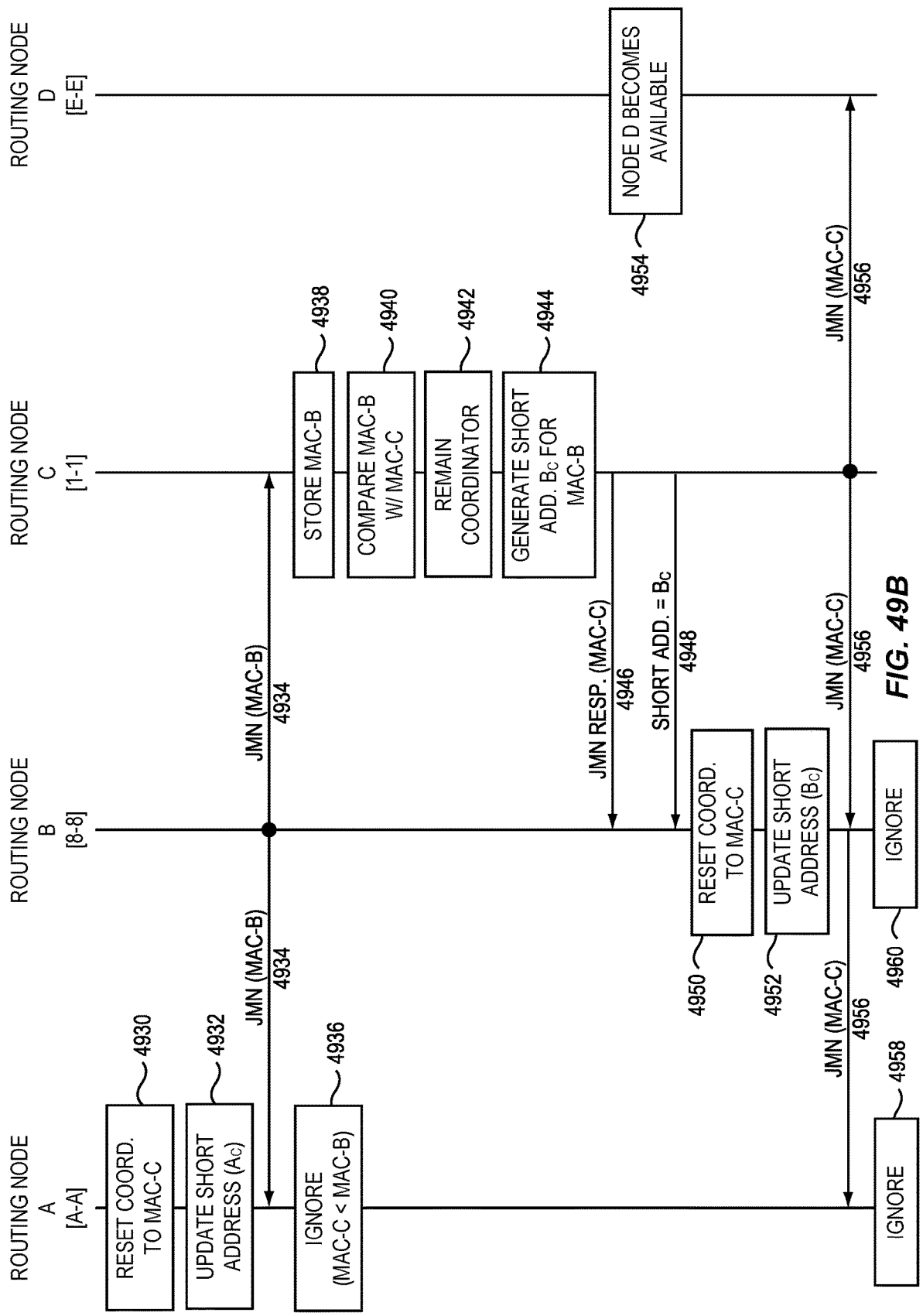

Turning now to the communication flow illustrated in FIGS. 49A-49C, a more complex scenario is illustrated wherein multiple routing nodes (B and C) receive an initial JMN message from routing node A. The example also shows a fourth routing node (D) that does not initially receive the JMN message of routing node A, but ultimately joins the network, recognizes the network's coordinator, and receives a short address from the coordinator. This example shows the coordinator being transitioned from routing node A to routing node B and then to routing node C. Assume that the MAC addresses for routing nodes A, B, C, and D are as follows:

| | |
|---|---|
| MAC-A | [A-A]; |
| MAC-B | [8-8]; |
| MAC-C | [1-1]; and |
| MAC-D | [E-E]. |

Thus, routing node C has the lowest MAC address and routing node D has the highest MAC address.

Initially, assume that routing node A broadcasts a JMN message with its MAC address (MAC-A) (step 4900). Assume that routing node B and routing node C receive the JMN message, and that routing node D does not receive the JMN message. Further assume that routing node B is the faster routing node to respond to the JMN message. As such, routing node B will process the JMN message by storing routing node A's MAC address (MAC-A) (step 4902) and comparing routing node A's MAC address (MAC-A) with its own MAC address (MAC-B) (step 4904). As with the previous example, routing node B will set itself as the coordinator since routing node B's MAC address (MAC-B) is less than routing node A's MAC address (MAC-A) (step 4906). Routing node B will generate a short address (AB) for routing node A's MAC address (MAC-A) (step 4908) and send an appropriate JMN response including routing node B's MAC address (MAC-B) to routing node A (step 4910). Routing node B will also send the short address for routing node A (AB) to routing node A in a separate message (step 4912). Although separate messages are used for the JMN response and providing the short address, those skilled in the art will recognize that this information may be provided in a single message. Again, routing node A, having the higher MAC address, will set the coordinator to routing node B's MAC address (MAC-B), indicating that routing node B will become the coordinator, at least for the time being (step 4914). Routing node A will also store the short address ($A_B$) assigned by routing node B (step 4916).

Substantially concurrently, routing node C will also process the JMN message that was provided by routing node A (in step 4900). In response, routing node C will store routing node A's MAC address (MAC-A) (step 4918) and compare routing node A's MAC address (MAC-A) with routing node C's MAC address (MAC-C) (step 4920). Routing node C will also recognize that its MAC address (MAC-C) is lower than routing node A's MAC address (MAC-A) and set itself as the coordinator (step 4922). As the coordinator, routing node C will generate a short address ($A_C$) for routing node A's MAC address (step 4924). Routing node C will then send a JMN response message including its MAC address (MAC-C) (step 4926) and another message providing the short address ($A_C$) for routing node A (step 4928) to routing node A. Routing node A will recognize that routing node C thinks it should be the coordinator, and will reset the identified coordinator to routing node C's MAC address (MAC-C), since routing node C's MAC address is less than routing node B's MAC address (step 4930). Routing node A will also update its short address with the short address ($A_C$), assigned by routing node C (step 4932). As such, routing node B has been uprooted as the coordinator from the perspective of routing node A. In certain examples, if routing node B would have had the lower MAC address, routing node A would have maintained that routing node B was the coordinator and would have ignored the messages from routing node C. This portion of the example highlights the fact that multiple routing nodes may think they are the coordinator during this iterative coordinator identification process.

At this time, routing node B may continue to think that it is the coordinator, and will periodically broadcast JMN messages to other routing nodes. In this instance, routing node B broadcasts a JMN message including routing node B's MAC address (MAC-B) that is received by both routing node A and routing node C (step 4934). Routing node A will effectively ignore the JMN message sent by routing node B, because it recognizes that the currently assigned coordinator, routing node C, has a MAC address less than that of routing node B (step 4936). However, routing node C will respond differently, because routing node C has a lower MAC address (MAC-C) than routing node B. As such, routing node C will store routing node B's MAC address (MAC-B) (step 4938) and compare routing node B's MAC address (MAC-B) with routing node C's MAC address (MAC-C) (step 4940). Routing node C will then recognize that it should remain the coordinator, because it has a lower MAC address (step 4942) and then generate a short address ($B_C$) for routing node B's MAC address (MAC-B) (step 4944). Routing node C will then send a JMN response including its MAC address (MAC-C) (step 4946) and a short address message including the short address ($B_C$) for routing node C (step 4948) to routing node B. In response, routing node B will reset the coordinator to routing node C using routing node C's MAC address (MAC-C) (step 4950) and store $B_C$ as its short address (step 4952).

During this time, assume that routing node D becomes available (step 4954), and as coordinator, routing node C begins periodically broadcasting JMN messages. As such, routing node C will send a JMN message including its MAC address (MAC-C), which is received by routing node A, routing node B, and routing node D (step 4956). Routing nodes A and B will effectively ignore the JMN messages, because they recognize that these messages are sent by the recognized coordinator, routing node C (steps 4958 and 4960). Since routing node D is a new party within communication range of the network, routing node D will process the JMN message. Accordingly, routing node D will store routing node C's MAC address (MAC-C) (step 4962) and compare routing node C's MAC address (MAC-C) with routing node D's MAC address (MAC-D) (step 4964). Since routing node D will recognize that it has a higher MAC address than routing node C, routing node D will recognize that routing node C should be the coordinator and will set the coordinator to routing node C's MAC address (MAC-C) (step 4966). As such, routing node D will not assign a short address for routing node C, since routing node C is the coordinator. Routing node D will simply respond to the JMN message by providing a JMN response message, which includes routing node D's MAC address (MAC-D) to routing node C (step 4968). Routing node C will compare its MAC address (MAC-C) with routing node D's MAC address (MAC-D) (step 4970). Since routing node C has the lower MAC address and should remain the coordinator, routing node C will generate a short address ($D_C$) for routing node D's MAC address (MAC-D) (step 4972) and will send a message including the short address ($D_C$) for routing node D to routing node D (step 4974). Routing node D will store the short address ($D_C$) for use with subsequent communications (step 4976).

At some point during the process, if routing node C does not have a default short address that is known to the other routing nodes, it will assign itself a short address (step 4978). Routing node C may assign itself a short address and provide the short address to the other routing nodes in any desired fashion. The benefit of having a default short address for the coordinator is that all other routing nodes, whether they have been assigned a short address or not, may use a short address to route messages through the network to the coordinator using traditional mesh network routing techniques.

At this point, the coordinating routing node C can join non-routing (sleeper) nodes to the network and assign them short addresses (step 4980) as well as initiate the aforementioned grouping process (step 4982) and carry out various control, routing, and the like using the assigned short addresses (step 4984). Nodes that are subsequently added to the network may have lower MAC addresses than that of routing node C, and in those situations, the newly added routing node with the lower MAC address may take over as coordinator and reassign short addresses to all the routing and non-routing nodes in the network. Further, the commissioning tool 136 may interact with the automatically identified coordinator to modify grouping assignments and the like. The coordinator may also be changed or reassigned by the commissioning tool 136 as desired by the network administrator.

VI. Multiple Master Lighting Fixture Configuration

Figure 50:
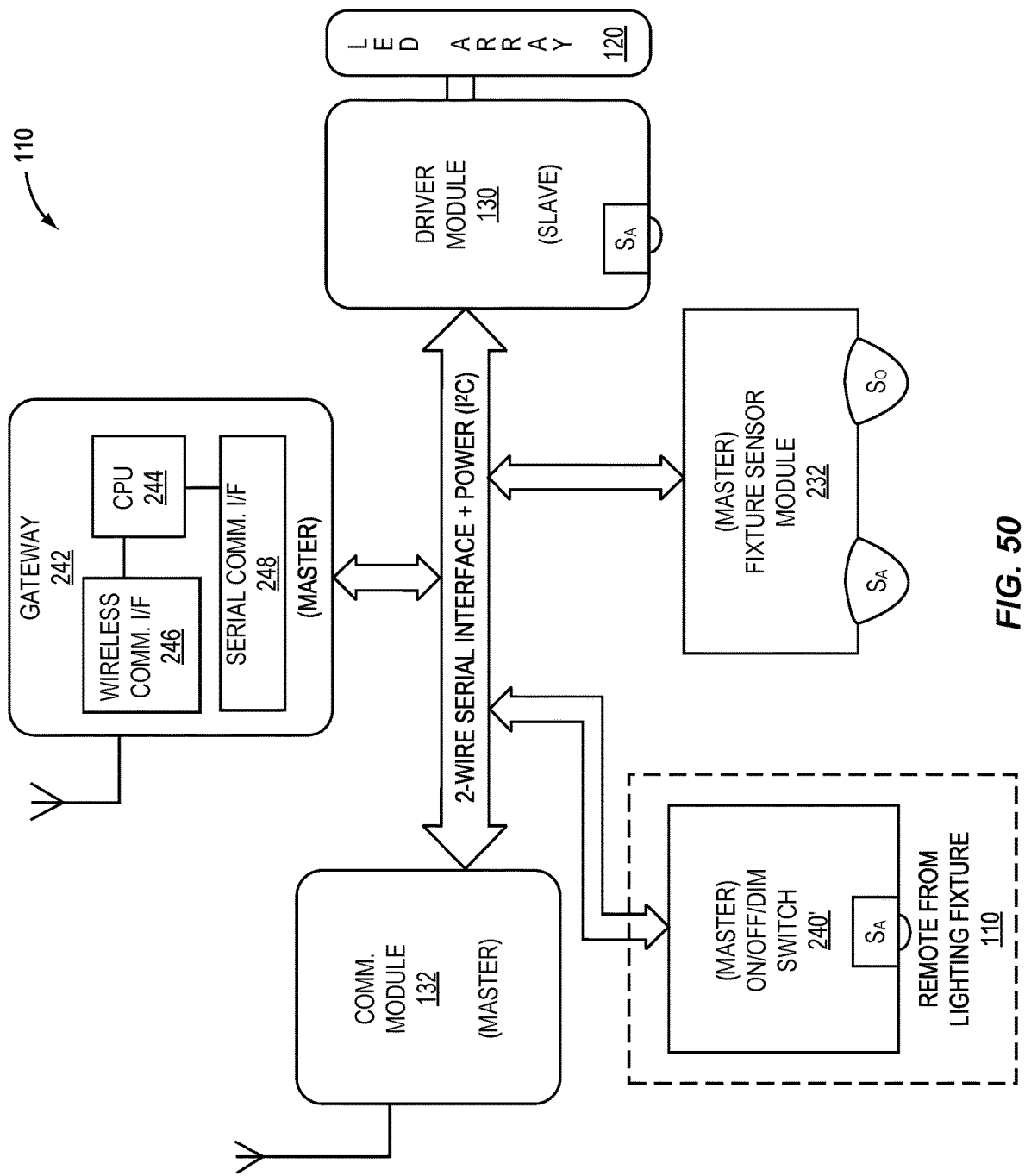
FIG. 50 is a block diagram of an exemplary lighting fixture according to one embodiment of the disclosure.

With reference to FIG. 50, an exemplary lighting fixture 110 is illustrated as having a driver module 130 with an associated LED array 120, a communication module 132, a fixture sensor module 232, and a gateway 242. The driver module 130, communication module 132, fixture sensor module 232, and the gateway 242 may be configured to communicate with each other over a 2 or more wire serial interface, such as the I²C bus, to allow each of the devices to exchange information, such as data and control information, as desired. As described above, the communication module 132 may facilitate wireless communications with other nodes in the wireless network, and essentially act as a communication interface for the lighting fixture 110 in general, and in particular for the gateway 242, the driver module 130, and the fixture sensor module 232. The gateway 242 may facilitate wireless communications with entities outside of the network, such as a remote controller or to a remote network, perhaps using a different wireless communication interface. For example, the communication module 132 may facilitate wireless communications with other nodes in the lighting network using the IEEE 802.15.4 standard on one or more channels in the 2.4 GHz band, whereas the gateway 242 may facilitate communications in a different band, using a different communication standard, such as cellular or other IEEE standard, or the like. Accordingly, one of the lighting fixtures 110 may be provided with the gateway 242, which will act as an access point or node for the entire lighting network. The gateway 242 is shown with a CPU 244, a wireless communication interface 246, and a serial communication interface 248. The wireless communication interface 246 supports wireless communications with external networks or devices, whereas the serial communication interface 248 facilitates communications over the 2-wire serial interface.

Also shown is an exemplary (on/off/dim) switch 240', which has an ambient light sensor $S_A$, and in this embodiment, a cable that is capable of interfacing with the 2-wire serial interface of the lighting fixture 110. As such, the switch 240' may be located remotely from the lighting fixture 110, and yet be integrated via the 2-wire serial interface. On, off, and dimming control may be provided to the communication module 132 or the driver module 130 via the 2-wire serial interface, where either of the communication module 132 or the driver module 130 will process these commands internally as well as provide the commands to other nodes, such as other lighting fixtures, that reside within the same group as the lighting fixture 110. The fixture sensor module 232 may have both ambient light and occupancy sensors $S_A$ and $S_O$, wherein ambient light and occupancy measurements may be shared with either the communication module 132 or the driver module 130, either of which may process the commands and react accordingly internally as well as share the information with other members of the group. Again, the driver module 130 may also include various sensors, such as the ambient light sensor $S_A$ that is illustrated.

Overall control for the lighting fixture 110 may be provided by the communication module 132, wherein all internal and directly attached control information is sent to the communication module 132, which will process the information according to its internal logic and control the associated driver module 130 accordingly, as well as send control information to other nodes in its group or to the network in its entirety. Conversely, the driver module 130 may provide this functionality, wherein sensor and switch information is provided to the driver module 130 and processed by its internal logic to control the LED array 120. The driver module 130 may also share this control information or the data and sensor information with other members of the network via the communication module 132. A further modification of this scenario would be wherein the on/off/dim switch 240' is capable of wirelessly communicating with the communication module 132 to share its sensor input, as well as send information to other devices on the network.

As noted, various serial interface technologies may be employed. In the following example, an I²C interface is employed in an uncharacteristic fashion. In this embodiment, primary control of the lighting fixture 110 is provided in the driver module 130. If an I²C interface is used, the driver module 130 is configured as a slave device, whereas the other entities that are communicating over the I²C interface, including the communication module 132, fixture sensor module 232, gateway 242, and the on/off/dim switch 240', are all configured as master devices. This configuration is counterintuitive to previous implementations of an I²C based bus structure. With the driver module 130 acting as a slave device, the other master devices can initiate transfers, and thus send or request data to or from the driver module 130, at any time without having to wait or alert the driver module 130 in advance of initiating the transfer. As such, the driver module 130 does not have to periodically or constantly poll the other devices that are attached to the I²C interface in search of switch, sensor, or communication changes. Instead, the master devices are configured to automatically initiate switch, sensor, or communication changes to the driver module 130, wherein the driver module 130 is configured to readily receive this information and process it accordingly. The master devices may also request information from the driver module 130, which may have the information on hand and provide it back to the requesting master device, or may retrieve the information from another network node via the communication module 132, or another device within or associated with the lighting fixture 110.

As an example, if the ambient light sensor $S_A$ or the occupancy sensor $S_O$ of the fixture sensor module 232 detects a change, the fixture sensor module 232 is configured to initiate a transfer of information representative of the sensor change or changes to the driver module 130. The driver module 130 will process the information and determine whether or not the LED array 120 needs to be turned on or off or varied in light output based on its own internal logic. The driver module 130 may also generate a control command or message that includes the sensor information that is sent to other nodes in its associated group or the network in general via the communication module 132. For a control command, the receiving device may respond as directed. For the sensor information, the receiving device may process the sensor information and determine how to control itself based thereon. Similar operation is provided by the on/off/dim switch 240', wherein an on/off or dimming adjustment is detected, and the on/off/dim switch 240' will initiate a transfer of the switch status or status change to the driver module 130, which will again process the information to control the LED array 120 as needed and provide any necessary instructions to other nodes on the network via the communication module 132.

Commands or shared data, such as sensor information, may also arrive at the lighting fixture 110 via the communication module 132. As such, the communication module 132 will receive a command or the shared data from another node in the associated group or the network in general, and initiate a transfer to the driver module 130, which will process the command or interpret the shared data based on its own internal logic and control the LED array 120 in an appropriate fashion. In addition to simply providing status information, data, and commands to the driver module 130, any of these devices may request information that the driver module 130 maintains. For example, in a lightcasting process, the communication module 132 may receive a request for the lightcast data from the commissioning tool 136. The communication module 132 will initiate a request for the information to the driver module 130, which will provide the information back to the communication module 132. The communication module 132 will then route the information back to the commissioning tool 136, directly or indirectly through other routing nodes in the network.

While the illustrated master-slave configuration is very beneficial, it is not necessary to practice the concepts disclosed herein. A benefit of this type of configuration is that the other devices within the lighting fixture 110 need not be aware of the others' existence, if their data and status information is collected and maintained on the driver module 130. Other nodes need only make requests of the communication module 132 or the gateway 242, which will obtain the information from the driver module 130 and respond accordingly. Notably, the driver module 130 may maintain or collect all types of status or performance information for the lighting fixture 110 and make it available to any device within the lighting fixture 110, on the network via the communication module 132, or to a remote entity via the gateway 242. Further, the master and slave devices for a given lighting fixture 110 need not be maintained within the housing of the lighting fixture 110.

In certain embodiments, the functionality of the communication module 132 may be integrated into the driver module 130, or vice versa. For instance, the integrated module would have a microcontroller with a built in or closely associated radio frequency transceiver, wherein the microcontroller would provide all of the requisite processing of the driver module 130 and the communication module 132. The transceiver would facilitate RF communications with other elements (fixtures, sensors, switches, etc.) of the lighting network as well as the commissioning tool 136 and other remote entities. As such, the integrated module could also provide the functionality of the gateway 242. The integrated module could also include various sensors, such as the ambient light sensor $S_A$, the occupancy sensor $S_O$, and the like. Any AC-DC conversion could be provided on the same PCB as the microcontroller and transceiver or may be provided by a remote module or PCB.

Figure 51:
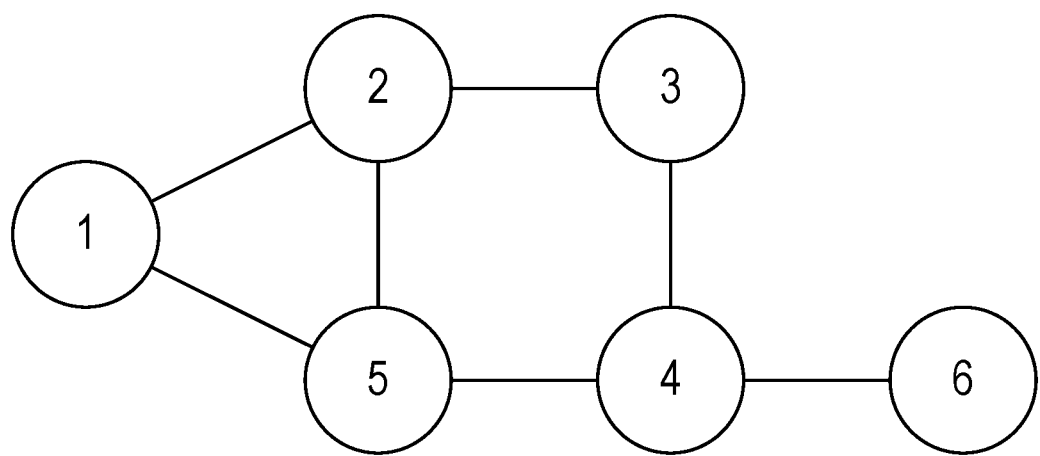
FIG. 51 illustrates a routing diagram for a first lighting system configuration.

Extensive research has been performed in the last few decades on improving wireless networks in general. However, much of this research has focused on reducing power requirements or increasing throughput. For a lighting system, these priorities should be shifted to increasing response time and reducing cost. In a first embodiment, the lighting nodes, such as lighting fixtures 110 and standalone sensors and switches, may be assigned unique addresses starting from the number one. Further, the maximum number of lighting nodes in a given lighting system is bounded at a defined number, such as 256. For the following example, assume that there are six lighting nodes in the lighting network, and each node is sequentially addressed 1-6. A representation of such a lighting network is provided in FIG. 51.

Routing tables are used to identify the next hop along a routing path, and perhaps a number of hops necessary to reach a destination from the current location. An exemplary routing table for lighting node 1, constructed according to related art techniques, is provided immediately below (Table A). For this example, assume that a packet of data needs to be routed from lighting node 1 to lighting node 6. In the below routing table, three columns of information are required: the destination address, the next hop address, and the number of hops to the destination from the current location. In operation, the lighting node will identify a destination address for the packet of data being routed, and search the destination address field in the routing table to find a match. If the destination address for the packet to be routed is number 6, lighting node 1 will search the entries in the destination address field to find one for lighting node 6. The corresponding next hop address (5) for destination address 6 is identified, and the packet of data is routed to the next hop address (5), wherein the process repeats at each lighting node until the packet of data reaches its intended destination.

TABLE A

| Destination Address | Next Hop Address | Number of Hops |
|---|---|---|
| 5 | 5 | 1 |
| 3 | 2 | 2 |
| 2 | 2 | 1 |
| 6 | 5 | 3 |
| 4 | 5 | 2 |

For the present disclosure, the size of the routing table can be reduced by approximately one third, and thus save on the amount of required system memory as well as the processing necessary to identify the next hop address. As shown in the table below (Table B), the column for destination address is removed. Instead, the routing table is reorganized such that the rows correspond to the destination address. In other words, the first entry in the routing table corresponds to destination address 1, the second row of the routing table corresponds to destination address 2, the third row in the routing table corresponds to destination address 3, and so on and so forth. Accordingly, and again assuming that the routing table below corresponds to lighting node 1, a routing decision is determined as follows. The destination for the packet of data is determined. Since the destination address directly corresponds to the location in the routing table, lighting node 1 need only access the sixth entry in the routing table to identify the next hop address for routing a packet of data to destination address 6, which corresponds to lighting node 6. Notably, the routing tables are preferably ordered corresponding to destination address. However, the destination address does not need to match the position in the routing table. Offsets and the like may be used to compensate for lighting networks or zones that employ lighting nodes that are not associated with addresses starting with one. With this embodiment, the size of the routing table is reduced and the amount of processing required to compare a destination address with various entries in a routing table is reduced. In essence, there is no need to scan through the table to find a matching destination address, because the position in the table corresponds to the destination address.

TABLE B

| Next Hop Address | Number of Hops |
|---|---|
| 1 | 0 |
| 2 | 1 |
| 2 | 2 |
| 5 | 2 |
| 5 | 1 |
| 5 | 3 |

Figure 52:
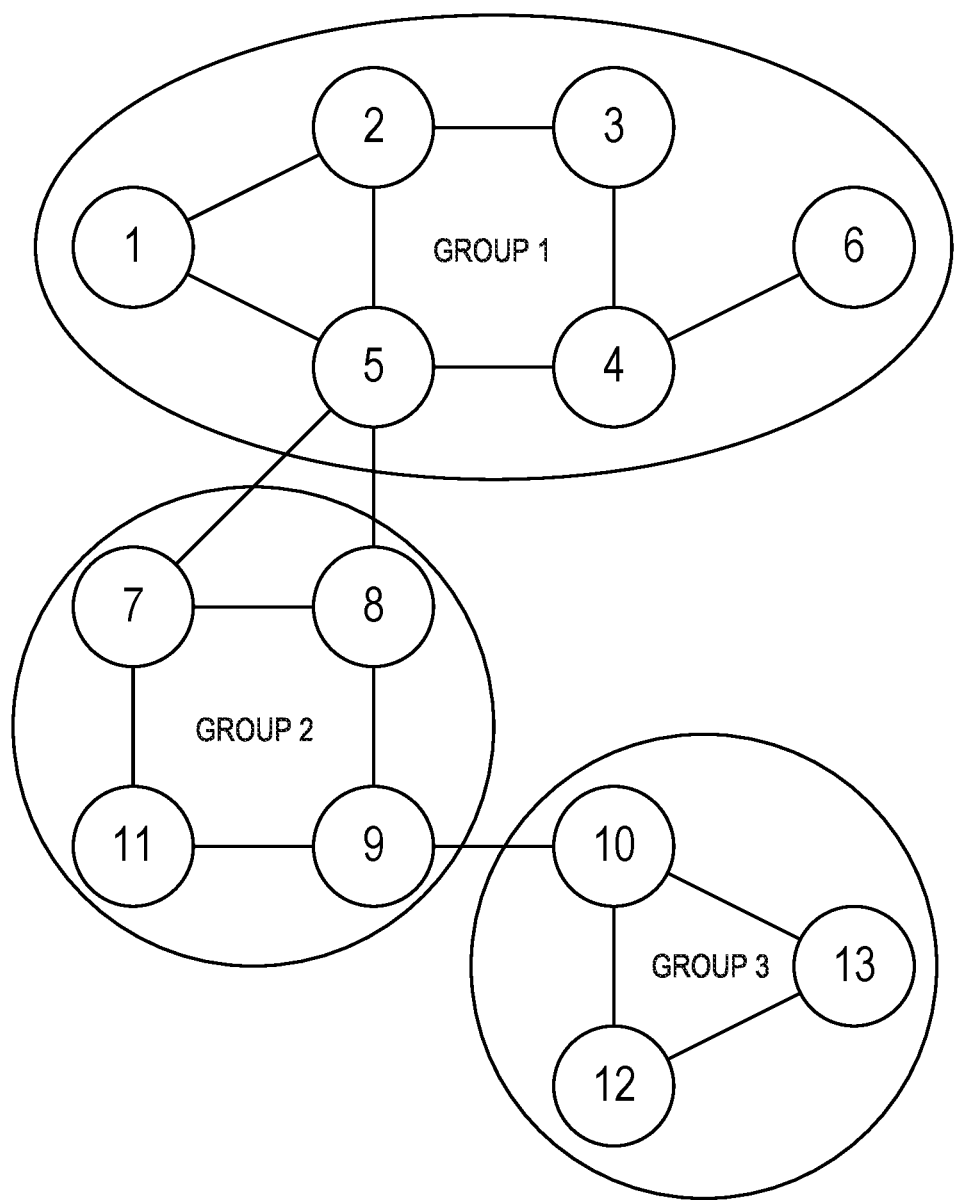
FIG. 52 illustrates a routing diagram for a second lighting system configuration.

With reference to FIG. 52, the addresses for the lighting nodes may be assigned based on the lighting zone in which the lighting nodes reside. For example, there are three lighting zones: group 1, group 2, and group 3. Lighting nodes 1-6 are in group 1, lighting nodes 7-9 and 11 are in group 2, and lighting nodes 10, 12, and 13 are in group 3. Table C corresponds to a routing table for lighting node 9 wherein a traditional routing table architecture is employed. From analyzing the configuration for FIG. 52, a large number of the lighting nodes, including all the nodes within group 1, will route through lighting node 8 when routing data from one group to another. Applicants have discovered that it is more efficient for lighting node 9 to have two separate sections, which correspond to Table D and Table E below.

TABLE C

| Destination Address | Next Hop Address | Number of Hops |
|---|---|---|
| 6 | 8 | 4 |
| 2 | 8 | 3 |
| 12 | 10 | 2 |
| 8 | 8 | 1 |
| 7 | 8 | 2 |
| 5 | 8 | 2 |
| 10 | 10 | 1 |
| 3 | 8 | 4 |
| 1 | 8 | 3 |
| 11 | 11 | 1 |
| 13 | 10 | 2 |
| 4 | 8 | 3 |

TABLE D

| Destination Group | Next Hop Address | Number of Hops |
|---|---|---|
| 3 | 10 | 1 |
| 1 | 8 | 2 |
| 2 | See Next Section | |

The first section of the routing table for lighting node 9 includes three fields (or columns): destination group, next hop address, and number of hops. This is referred to as the group section. When determining the next hop address, lighting node 9 will identify the group in which the destination address resides and use the table to determine the next hop address for that group destination. Thus, if the destination address corresponds to 10, 12, or 13 of group 3, the routing table will identify the next hop address as 10. If the destination address is 1-6, which correspond to group 1, the next hop address for group 1, which is destination address 8, is selected and used for routing the packet of data. Notably, if the destination address resides in the same group, the second section of the routing table is searched. The second section may take the configuration of a traditional routing table, wherein the destination address is used, such as that shown in Table E below.

TABLE E

| Destination Address | Next Hop Address | Number of Hops |
|---|---|---|
| 7 | 8 | 2 |
| 11 | 11 | 1 |
| 8 | 8 | 1 |

Alternatively, the entire destination address field may be dropped from the second section of the routing table. Using the techniques described in association with FIG. 51, the next hop addresses in the second section of the routing table may be positioned in the routing table in a position corresponding to the destination address. Thus, when the second section of the routing table is used, the positioning of the next hop address in the routing table will correspond to the actual destination address.

Figure 53:
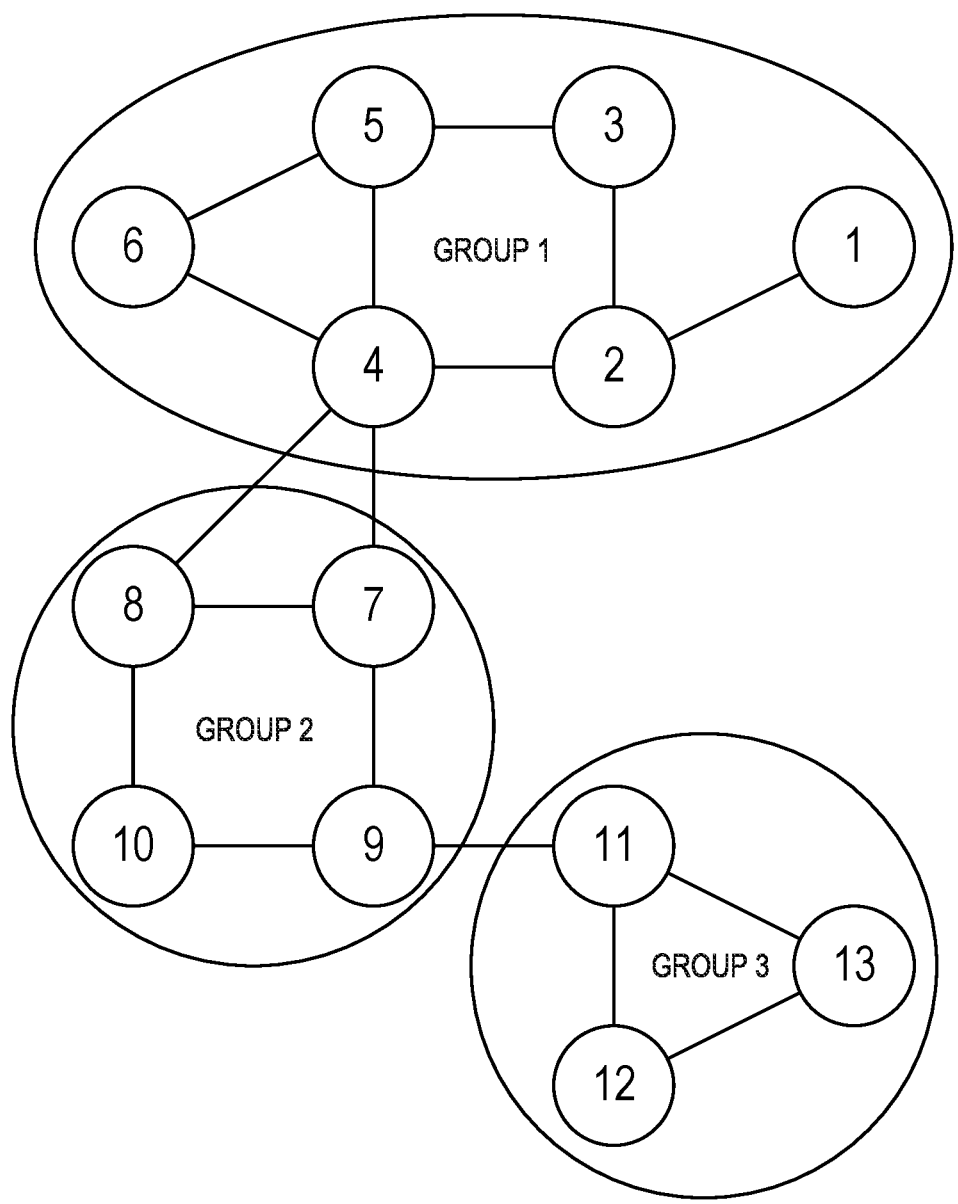
FIG. 53 illustrates a routing diagram for a third lighting system configuration.

With reference to FIG. 53, yet another routing table configuration is illustrated. The basic configuration of the lighting network shown in FIG. 53 is the same as that of FIG. 52. The only difference is that the addresses for the respective lighting nodes have been reassigned to facilitate the creation of very condensed routing tables. An exemplary routing table for lighting node 9 is shown below (Table F).

TABLE F

| Criterion | Next Hop Address |
|---|---|
| Destination <9 | 7 |
| Destination =10 | 10 |
| Destination >10 | 11 |

As illustrated, the routing table only has two fields, and instead of determining the next hop address based on an actual destination address or a group in which the actual destination address resides, routing criteria is defined for selecting the next hop address. The routing criteria are based on a range in which the destination addresses fall, and in certain instances, the actual destination address. For example, and again using lighting node 9, the next hop address for any destination address less than 9 is destination address 7. The next hop address for any destination address greater than 10 is destination address 11. Finally, if the destination address is 10, the next hop is destination address 10. This embodiment illustrates the concept of assigning addresses to the various lighting nodes within the individual zones (or groups) and the overall system as a whole, with an eye toward the routing tables. With routing tables in mind, addresses may be assigned to the various lighting nodes in a manner that greatly reduces the number of entries in the routing tables, and wherein at least certain next hop address selections are based on a range in which the destination address falls. These improvements in routing may be used in virtually any networking scheme, and are not limited solely to lighting applications.

Figure 54:
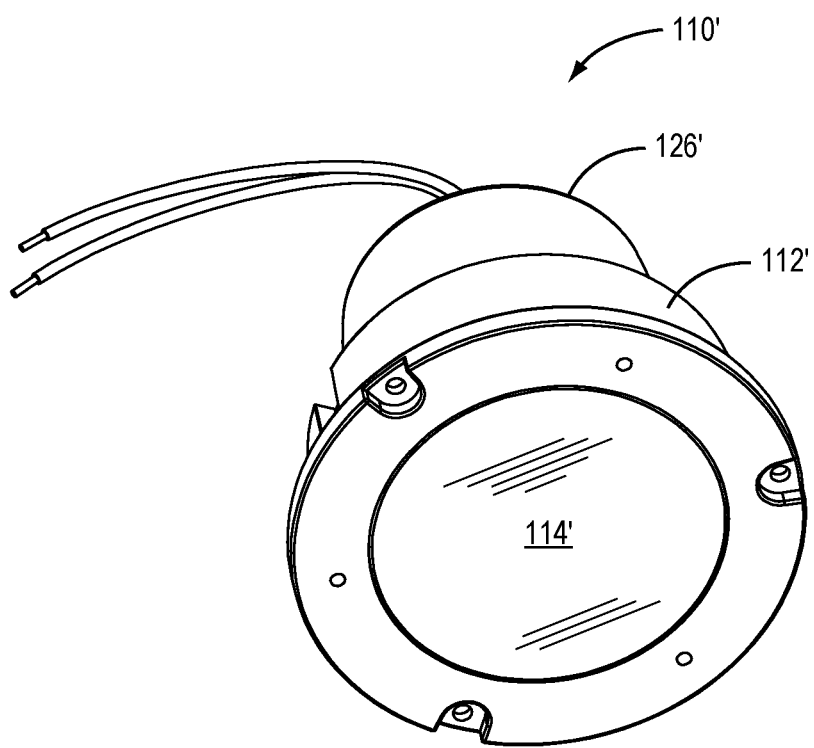
FIG. 54 is an alternative lighting fixture configuration according to a second embodiment of the disclosure.

While the embodiments described above were focused on a troffer-type lighting fixture 110, the concepts disclosed herein apply to any type of lighting fixture. For example, a recessed-type lighting fixture 110' as illustrated in FIG. 54 may also incorporate all of the concepts described above. As illustrated, the lighting fixture 110' includes a main housing 112', a lens 114', and an electronics housing 126'. The various modules described above may be housed within the electronics housing 126' or attached thereto, outside of or within supplemental plenum rated enclosures. These configurations will vary based on the particular application. However, the concepts of a modular system that allows any of the modules to be readily replaced and new modules added are considered to be within the scope of the present disclosure and the claims that follow.

The present disclosure relates to a lighting network where control of the lighting fixtures in the network may be distributed among the lighting fixtures. The lighting fixtures may be broken into groups that are associated with different lighting zones. At least some of the lighting fixtures will have or be associated with one or more sensors, such as occupancy sensors, ambient light sensors, and the like. Within the overall lighting network or the various lighting zones, the lighting fixtures may share sensor data from the sensors. Each lighting fixture may process sensor data provided by its own sensor, a remote standalone sensor, or lighting fixture, and process the sensor data according to the lighting fixture's own internal logic to control operation of the lighting fixture. The lighting fixtures may also receive control input from other lighting fixtures, control nodes, light switches, and commissioning tools. The control input may be processed along with the sensor data according to the internal logic to further enhance control of the lighting fixture.

Accordingly, control of the lighting network of the present disclosure is decentralized so that each lighting fixture essentially operates independently of the lighting network; however, the internal logic in each of the lighting fixtures is configured so that the lighting fixtures may act in concert as a group. While acting in concert, each lighting fixture may operate in a different manner depending on the goals for the particular lighting application. The lighting fixtures may also respond to any user inputs that are presented.

In one embodiment, a lighting fixture having a light sensor, a solid-state light source, and associated circuitry is provided. The circuitry is adapted to determine that a given lighting fixture of a plurality lighting fixtures is entering a lightcast mode. Via the light sensor, the circuitry will monitor for a first lightcast signal provided by the given lighting fixture and effect generation of grouping data for the given lighting fixture based on receipt of the first lightcast signal. The grouping data may be used, at least in part, for grouping the lighting fixture with one or more of the plurality of lighting fixtures. For grouping the lighting fixture with one or more of the plurality of lighting fixtures, the circuitry may send the grouping data to a remote entity, which will determine how to group the plurality of lighting fixtures, and receive information identifying a group to which the lighting fixture belongs. Alternatively, the circuitry may send the grouping data to one of the plurality of lighting fixtures that will determine how to group the plurality of lighting fixtures.

For grouping the lighting fixture with one or more of the plurality of lighting fixtures, the circuitry may process the grouping data along with other grouping data received from one or more of the plurality lighting fixtures to determine a group of the plurality of lighting fixtures in which the lighting fixture belongs. If the first lightcast signal is detected, the grouping data may be indicative of a relative signal strength of the lightcast signal.

In another embodiment, the circuitry may be adapted to enter the lightcast mode and then drive the solid-state light source to provide a second lightcast signal to be monitored by the plurality of lighting fixtures. In advance of providing the lightcast signal, the circuitry may send, to the plurality of lighting fixtures, an instruction to begin monitoring for the second lightcast signal.

The circuitry may be further adapted to receive remote sensor data from at least one of the plurality of lighting fixtures and drive the solid-state light source based on the remote sensor data. As such, the circuitry may determine local sensor data from the light sensor or another local sensor of the lighting fixture and drive the solid-state light source based on both the remote sensor data and the local sensor data. The circuitry may also send the local sensor data to at least one of the plurality of lighting fixtures.

The circuitry may also identify a group of the plurality of lighting fixtures to which the lighting fixture has been assigned and drive the solid-state light source in response to an instruction intended for the group. Each lighting fixture may be assigned to just one group or may be assigned to multiple groups in the case of overlapping groups, which share at least one lighting fixture.

The circuitry may be split into a driver module that is adapted to drive the solid-state light source and a communications module that is adapted to communicate with the plurality of lighting fixtures and control the driver module. The driver module and the communications module communicate with one another over a communications bus.

In yet another embodiment, a lighting network is provided with a plurality of lighting fixtures having associated light sensors. During a monitor mode, each of the plurality of lighting fixtures is adapted to determine that a given lighting fixture of the plurality lighting fixtures is entering a lightcast mode; via the light sensor, monitor for a lightcast signal provided by the given lighting fixture; and effect generation of grouping data for the given lighting fixture based on receipt of the first lightcast signal. During a receive mode, each lighting fixture will drive an associated solid-state light source to provide the lightcast signal for monitoring by others of the plurality of lighting fixtures. Each of the plurality of lighting fixtures may be automatically assigned to at least one of a plurality of groups based on the grouping data.

The grouping data associated with any two of the plurality of lighting fixtures may indicate a relative magnitude of the lightcast signal, which was provided by a first of the two, and received by a second of the two. Further, each of the plurality of lighting fixtures may be adapted to exchange the grouping data that is gathered for others of the plurality of lighting fixtures and automatically assign itself to one of a plurality of groups based on the grouping data, such that each of the plurality of groups comprises those lighting fixtures that were able to detect the lightcast signal from other lighting fixtures in the particular group. Alternatively, each of the plurality of lighting fixtures may be adapted to exchange the grouping data that is gathered for others of the plurality of lighting fixtures and automatically assign itself to one of a plurality of groups based on the grouping data, such that each of the plurality of groups comprises those lighting fixtures that were able to detect, at a magnitude above a set threshold, the lightcast signal from other lighting fixtures in the particular group.

The grouping data gathered by each of the plurality of lighting fixtures may be sent to a remote entity, which assigns the plurality of lighting fixtures to groups based on the grouping data. The grouping data gathered by each of the plurality of lighting fixtures may also be sent to one of the plurality of lighting fixtures, which assigns the plurality of lighting fixtures to groups based on the grouping data.

Also, each lighting fixture may be adapted to share sensor data from its light sensor or another associated sensor with others of the plurality of lighting fixtures, and control light output based on the sensor data in light of its own internal logic. The internal logic may be configured such that each of the plurality of lighting fixtures operates independently from one another while providing light in a concerted fashion.

In yet another embodiment, a lighting network is provided with a group of lighting fixtures, which have sensors and solid-state light sources. Each lighting fixture of the group of lighting fixtures may be adapted to coordinate with at least one of the of the group of lighting fixtures to determine a light output level, and drive the solid-state light sources to provide the light output. At least certain of the group of lighting fixtures will concurrently provide a different light output level. Different subgroups of the group of lighting fixtures may provide different light output levels or output levels that are graduated among the group of lighting fixtures. The light output level for each lighting fixture may be determined, at least in part, on ambient light. The amount of ambient light may be detected via the light sensor of the lighting fixture. Notably, the light output level for each lighting fixture may be determined, at least in part, on an amount of ambient light detected via a light sensor of another lighting fixture of the group of lighting fixtures.

Each of the plurality of lighting fixtures, including the group of lighting fixtures, may be adapted to determine that a given lighting fixture of the plurality of lighting fixtures is entering a lightcast mode; via the light sensor, monitor for a lightcast signal provided by the given lighting fixture; and effect generation of grouping data for the given lighting fixture based on receipt of the first lightcast signal. Each of the plurality of lighting fixtures may drive an associated solid-state light source to provide the lightcast signal for monitoring by others of the plurality of lighting fixtures. Each of the plurality of lighting fixtures may be automatically assigned to at least one of a plurality of groups based on the grouping data.

The present disclosure relates to a lighting network where control of the lighting fixtures in the network may be distributed among the lighting fixtures. The lighting fixtures may be broken into groups that are associated with different lighting zones. At least some of the lighting fixtures will have or be associated with one or more sensors, such as occupancy sensors, ambient light sensors, and the like. Within the overall lighting network or the various lighting zones, the lighting fixtures may share sensor data from their sensors. Each lighting fixture may process sensor data provided by its own sensor, a remote standalone sensor, or lighting fixture, and process the sensor data according to the lighting fixture's own internal logic to control operation of the lighting fixture. The lighting fixtures may also receive control input from other lighting fixtures, control nodes, light switches, commissioning tools, gateways, and remote devices via the Internet or other like network. The control input may be processed along with the sensor data according to the internal logic to further enhance control of the lighting fixture.

Accordingly, control of the lighting network of the present disclosure may be decentralized so that each lighting fixture essentially operates independently of the lighting network; however, the internal logic in each of the lighting fixtures is configured so that the lighting fixtures may act in concert as a group. While acting in concert, each lighting fixture may operate in a different manner, such as providing different light output levels, depending on the goals for the particular lighting application. The lighting fixtures may also respond to any user inputs that are presented.

In one embodiment, each lighting fixture includes a solid-state light source and circuitry to control operation. In particular, the circuitry is adapted to receive remote sensor data from at least one other lighting fixture and drive the solid-state light source based on the remote sensor data. The lighting fixture may include a local sensor, such as an ambient lighting sensor, occupancy sensor, or the like. With the local sensor, the circuitry is further adapted to determine local sensor data from the local sensor and drive the solid-state light source based on both the remote sensor data and the local sensor data. The local sensor data may also be sent to other lighting fixtures, which may use the local sensor data to help control those lighting fixtures. In addition to controlling the lighting fixtures, sensor activity can show use patterns in fine detail. Some examples would be occupancy sensor patterns within a room showing what areas are used in a room over an extended time period, or the ambient light sensors showing how efficiently daylight is being captured and distributed from the windows to the room.

As such, these lighting fixtures may share their sensor data with other lighting fixtures in a lighting network and control their light output based on the local and remote sensor data in view of their own internal logic. The internal logic is configured such that each of the lighting fixtures operates independently from one another while providing light or functionality in a concerted fashion.

For example, a switch may be used to turn on all of the lighting fixtures in a particular zone. However, the amount of light provided by the various lighting fixtures may vary from one lighting fixture to the next based on the amount of ambient light present in the different areas of the lighting zone. The lighting fixtures closer to windows may provide less light or light of a different color or color temperature than those lighting fixtures that are near an interior wall.

The present disclosure relates to a lighting network where control of the lighting fixtures in the network may be distributed among the lighting fixtures. The lighting fixtures may be broken into groups that are associated with different lighting zones. At least some of the lighting fixtures will have or be associated with one or more sensors, such as occupancy sensors, ambient light sensors, and the like. Within the overall lighting network or the various lighting zones, the lighting fixtures may share sensor data from their sensors. Each lighting fixture may process sensor data provided by its own sensor, a remote standalone sensor, or lighting fixture, and process the sensor data according to the lighting fixture's own internal logic to control operation of the lighting fixture. The lighting fixtures may also receive control input from other lighting fixtures, control nodes, light switches, and commissioning tools. The control input may be processed along with the sensor data according to the internal logic to further enhance control of the lighting fixture.

Accordingly, control of the lighting network of the present disclosure may be decentralized so that each lighting fixture essentially operates independently of the lighting network; however, the internal logic in each of the lighting fixtures is configured so that the lighting fixtures may act in concert as a group. While acting in concert, each lighting fixture may operate in a different manner, such as providing different light output levels, depending on the goals for the particular lighting application. The lighting fixtures may also respond to any user inputs that are presented.

In such a lighting system, the lighting fixtures need to communicate information between them, and in many instances, route information in the form of data packets from one lighting fixture to another. As such, the lighting fixtures may generate data packets and route them to another lighting fixture, which may process the information in the data packet or route the data packet toward another lighting fixture.

In a first embodiment, each lighting fixture includes a light source and circuitry to control operation. For providing light output, the circuitry is adapted to drive the lighting source to provide light output. For routing data packets, the circuitry employs a routing table having a next hop address for each of a plurality of destination addresses. Each next hop address is positioned in the routing table based on a corresponding one of the plurality of destination addresses. As such, the plurality of destination addresses need not be used to access the routing table.

The circuitry may first determine a position in the routing table based on a destination address of the data packet. Next, the next hop address for the destination address is accessed based on the position in the routing table; and then the data packet is routed toward the next hop address. In essence, the next hop address for each of the plurality of destination addresses may be positioned in the routing table in an order corresponding to a numerical ordering of the plurality of destination addresses. To access the next hop address for the destination address, the circuitry may use the destination address as an index to identify the next hop address for the destination address from the routing table. The routing table may include a number of hops for each next hop address. The number of the plurality of nodes may correspond to a number of positions in the routing table. In one scenario, a value of each destination address directly corresponds to a position that contains a corresponding next hop address in the routing table.

In a second embodiment, the routing table is broken into at least a first section and a second section. The first section includes a next hop address for each of a plurality of groups of lighting fixtures to which the lighting fixture does not belong. The second section comprises a next hop address corresponding to each of a plurality of destination addresses associated with a group of lighting fixtures to which the lighting fixture belongs.

In one implementation, the second section comprises each of the plurality of destination addresses in association with the corresponding next hop address. The next hop address is accessed based directly on the corresponding destination address. In another implementation, each next hop address is positioned in the routing table based on a corresponding one of the plurality of destination addresses such that the plurality of destination addresses are not used to access the routing table.

If the data packet is intended for one of the plurality of groups of lighting fixtures to which the lighting fixture does not belong, the circuitry will access the first section and determine the next hop address based on the one of the plurality of groups of lighting fixtures to which the lighting fixture does not belong. If the data packet is intended for the group of lighting fixtures to which the lighting fixture belongs, the circuitry will access the second section to determine the next hop address for the data packet. Once the next hop address is identified, the circuitry will route the data packet toward the next hop address.

In a third embodiment, a lighting fixture comprising routing criteria is provided that has a next hop address for each of at least two ranges of destination addresses. When routing a data packet toward one of the at least two ranges of destination addresses, the circuitry will first determine a destination address for the data packet. Next, the circuitry will select a next hop address from the routing criteria based on one of the at least two ranges of destination addresses in which the destination address falls; and then route the data packet toward the next hop address. The routing criteria may also include a next hop address for at least one destination address. If the next hop address is directly associated with a destination address instead of a range of addresses, the circuitry will determine a destination address for the data packet, select a next hop address from the routing criteria based on the at least one destination, and route the data packet toward the next hop address.

The present disclosure relates to a lighting network where control of the lighting fixtures in the network may be distributed among the lighting fixtures. The lighting fixtures may be broken into groups that are associated with different lighting zones. At least some of the lighting fixtures will have or be associated with one or more sensors, such as occupancy sensors, ambient light sensors, and the like. Within the overall lighting network or the various lighting zones, the lighting fixtures may share sensor data from their sensors. Each lighting fixture may process sensor data provided by its own sensor, a remote standalone sensor, or lighting fixture, and process the sensor data according to the lighting fixture's own internal logic to control operation of the lighting fixture. The lighting fixtures may also receive control input from other lighting fixtures, control nodes, light switches, and commissioning tools. The control input may be processed along with the sensor data according to the internal logic to further enhance control of the lighting fixture.

Accordingly, control of the lighting network of the present disclosure may be decentralized so that each lighting fixture essentially operates independently of the lighting network; however, the internal logic in each of the lighting fixtures is configured so that the lighting fixtures may act in concert as a group. While acting in concert, each lighting fixture may operate in a different manner, such as providing different light output levels, depending on the goals for the particular lighting application. The lighting fixtures may also respond to any user inputs that are presented.

In one embodiment, a handheld device may be used to setup, configure, and control the various lighting fixtures through wired or wireless communications means once the lighting fixtures are installed in a lighting network. The handheld device may be used to configure the internal logic of the various lighting fixtures to operate in a desired, coordinated fashion; assign the lighting fixtures to groups associated with defined lighting zones; reassign the lighting fixtures to other groups, and the like. For grouping, the handheld device may be configured to receive grouping data from the various lighting fixtures and group the lighting fixtures based on the grouping data. Once the groups have been determined, the handheld device may inform each lighting fixture of the group or groups to which the lighting fixture has been assigned.

The present disclosure relates to a lighting fixture that includes a driver module and at least one other module that provides a lighting fixture function, such as a sensor function, lighting network communication function, gateway function, and the like. The driver module communicates with the other modules in a master/slave scheme over a communication bus. The driver module is configured as a slave communication device, and the other modules are configured as master communication devices. As such, the other modules may initiate communications with the driver to send information to or retrieve information from the driver module.

In one embodiment, a lighting fixture is provided that includes a driver module and a communications module. The driver module is adapted to drive an associated light source and to facilitate communications over a communication bus as a slave communication device. The communications module is adapted to facilitate wireless communications with other elements in a lighting network and communicate as a master communication device with the driver module over the communication bus. The lighting fixture may also include an auxiliary module adapted to provide a lighting fixture function for the lighting fixture as well as facilitate communications as a master communication device with the driver module over the communication bus. Being master communication devices, both the auxiliary device and the communications module may initiate communications with the driver module. The driver module may be adapted to receive AC power and provide DC power to the communications module and the auxiliary module. The communication bus may be a serial communication bus, such as an I²C bus.

Communications with the driver module may include requesting information from the driver module and transferring information to the driver module. The auxiliary module may be configured to have 1) an occupancy sensor wherein the lighting fixture function is detecting occupancy, 2) an ambient light sensor wherein the lighting fixture function is detecting ambient light, and 3) a communication gateway wherein the lighting fixture function is providing a wireless communication gateway to at least one of a remote device and a network outside of the lighting network.

In one scenario, the communications module is adapted to wirelessly receive first information from one of the other elements of the lighting network and, as the master communication device, initiate transfer of the first information to the driver module, which will control the light source based on the first information. Further, the auxiliary module may include a sensor and be adapted to determine second information bearing on an output of the sensor. As the master communication device, the auxiliary module may initiate transfer of the second information to the driver module, which will control the light source based on the second information.

The communications module may be adapted to wirelessly receive information from one of the other elements of the lighting network and, as the master communication device, initiate transfer of the information to the driver module, which will control the light source based on this information.

The driver module may be further adapted to communicate with a remote switch via the communication bus, wherein the remote switch is also configured as a master communication device, which is adapted to initiate transfer of switch information to the driver module, which will control the light source based on the switch information.

The present disclosure relates to lighting fixtures for use in a lighting network where the lighting fixtures and other elements are able to communicate with each other via wired or wireless communication techniques. When the lighting network is being formed or modified, the lighting fixtures may be able to communicate with each other and automatically determine a single lighting fixture to act as a coordinator during a commissioning process. In essence, the lighting fixtures can exchange their communication addresses, such as MAC addresses, wherein the lighting fixture with the lowest (or highest) normal communication address becomes the coordinator. The coordinator may also be configured to assign short addresses to use for communications once the lighting network is formed instead of the longer MAC, or like, addresses. The short addresses can reduce routing overhead, and thus make the routing of messages including control information, sensor data, and the like, more efficient.

In one exemplary embodiment, a lighting fixture is provided that has a first address and is intended to be employed in a lighting network with any number of elements. The lighting fixture generally includes a light source, a communication interface, and circuitry for controlling the lighting fixture. In addition to controlling the light source, the circuitry is adapted to receive from a first remote lighting fixture a first 'join my network' message, which includes a second address for the first remote lighting fixture. The circuitry will compare the first address with the second address. If the first address does not have a predefined relationship with the second address, the circuitry may recognize the first remote lighting fixture as the coordinator for the lighting network. If the first address has the predefined relationship with the second address, the circuitry may set its own lighting fixture as the coordinator for the lighting network. The predefined relationship may simply be whether the first address is higher or lower than the second address; however, the concepts disclosed herein are not limited to these two relationships.

If short addresses are to be used, the circuitry may generate a short address for the first remote lighting fixture and send the short address to the first remote lighting fixture, if the first address has the predefined relationship with the second address. In this case, the lighting fixture will, at least temporarily, consider itself the coordinator for the first remote lighting fixture. Again, the first short address is shorter than the first address. For example the first address may be a 64-bit MAC address, and the short address may be an 8, 16, or 24-bit address or the like. The circuitry will send the first short address to the first remote lighting fixture. If the first address does not have the predefined relationship with the second address, the circuitry may wait to receive a first short address for the lighting fixture to use for communications within the lighting network, wherein the first short address is shorter than the first address.

The lighting fixture may receive 'join my network' messages from different lighting fixtures during the commissioning process. The lighting fixture may initially think it is the coordinator relative to one remote lighting fixture during a first exchange and the then give up its coordinator role during a second exchange with another remote lighting fixture. For example, the circuitry may be adapted to receive from a second remote lighting fixture a second 'join my network' message including a third address for the second remote lighting fixture, and compare the first address with the third address. If the first address does not have the predefined relationship with the third address, the circuitry may recognize the first remote lighting fixture as the coordinator for the lighting network. If the first address has the predefined relationship with the third address, the circuitry may set its own lighting fixture as the coordinator, at least temporarily, for the lighting network.

When the lighting fixtures are mostly routing nodes for a mesh network, the circuitry for the lighting fixture that ultimately becomes the coordinator may assign short addresses to each of the non-routing elements, which may include sensor modules, switch modules, certain lighting fixtures, and the like in the lighting network.

The circuitry for the coordinator may effect delivery of instructions to the various elements, both routing and non-routing, to initiate a grouping process, wherein the elements coordinate with each other to form a plurality of groups of elements. The grouping process may employ lightcasting processing wherein as one element emits a lightcast signal, other ones of the elements monitor the lightcast signal to determine lightcast data that is used determine the plurality of groups of elements. One or more elements, such as a coordinator, may collect the lightcast data from the other ones of the elements as well as send to the other ones of the elements information that identifies a group to which each of the ones of the elements are assigned. The coordinator may actually determine the groups or use a remote entity, such as a commissioning tool or other control system, to determine the groups. Alternatively, certain of the elements may exchange all of the data and independently identify themselves with a group.

The present disclosure relates to lighting fixtures for use in a lighting network where the lighting fixtures and other elements are able to communicate with each other via wired or wireless communication techniques. When the lighting network is being formed or modified, a lighting fixture is selected to act as a coordinator for forming the lighting network. For example, a user may employ a commissioning tool to select a particular lighting fixture as the coordinator. The coordinator will send out one or more 'join my network' messages toward the other elements of the lighting network. The elements that receive the 'join my network' message may respond in order to make the coordinator aware of their presence and join them to a lighting network.

In certain embodiments, the coordinator will assign short addresses to itself and to the other elements in the lighting network. While the elements already have MAC or like addresses, once the short addresses are assigned, the elements of the routing network will use the short addresses for normal communications. The short addresses can reduce routing overhead, and thus make the routing of messages including control information, sensor data, and the like, more efficient.

The lighting network may be a mesh network formed from the various elements wherein some elements act as routing nodes and other elements act as non-routing nodes. For example, some or all of the lighting fixtures may be routing nodes while switches, stand-alone sensors, and the like may be non-routing nodes in select embodiments. However, there is no limitation as to whether a particular type of element can be configured as a routing or non-routing element.

The coordinator may effect delivery of instructions to the various elements, both routing and non-routing, to initiate a grouping process, wherein the elements coordinate with each other to form a plurality of groups of elements. The grouping process may employ lightcasting processing wherein as one element emits a lightcast signal, other ones of the elements monitor the lightcast signal to determine the plurality of groups of elements. One or more elements, such as a coordinator, may collect the lightcast data from the other ones of the elements as well as send information to the other ones of the elements that identifies a group to which each of the ones of the elements are assigned. The coordinator may actually determine the groups or it may use a remote entity, such as a commissioning tool or other control system, to determine the groups. Alternatively, certain of the elements may exchange all of the data and independently identify themselves with a group.

The concepts of the present disclosure may also be applied in a power over Ethernet (PoE) environment. PoE allows a single cable to carry both power and data communications. The IEEE 802.3af and 802.3at standards, which are incorporated herein by reference in their entireties, set forth PoE standards that have found wide acceptance. CISCO has set forth criteria for an alternative PoE standard, which was developed prior to the IEEE 802.3af/at standards being developed. With either standard, two devices may communicate with each other over a single cable wherein one device provides power to the other device over the cable. The device providing power is referred to as power sourcing equipment (PSE), while the device receiving power is referred to as the powered device (PD). As such, the PSE operates to supply the PD power over a single cable, and the PD consumes power that it receives from the PSE over that cable.

Figure 55:
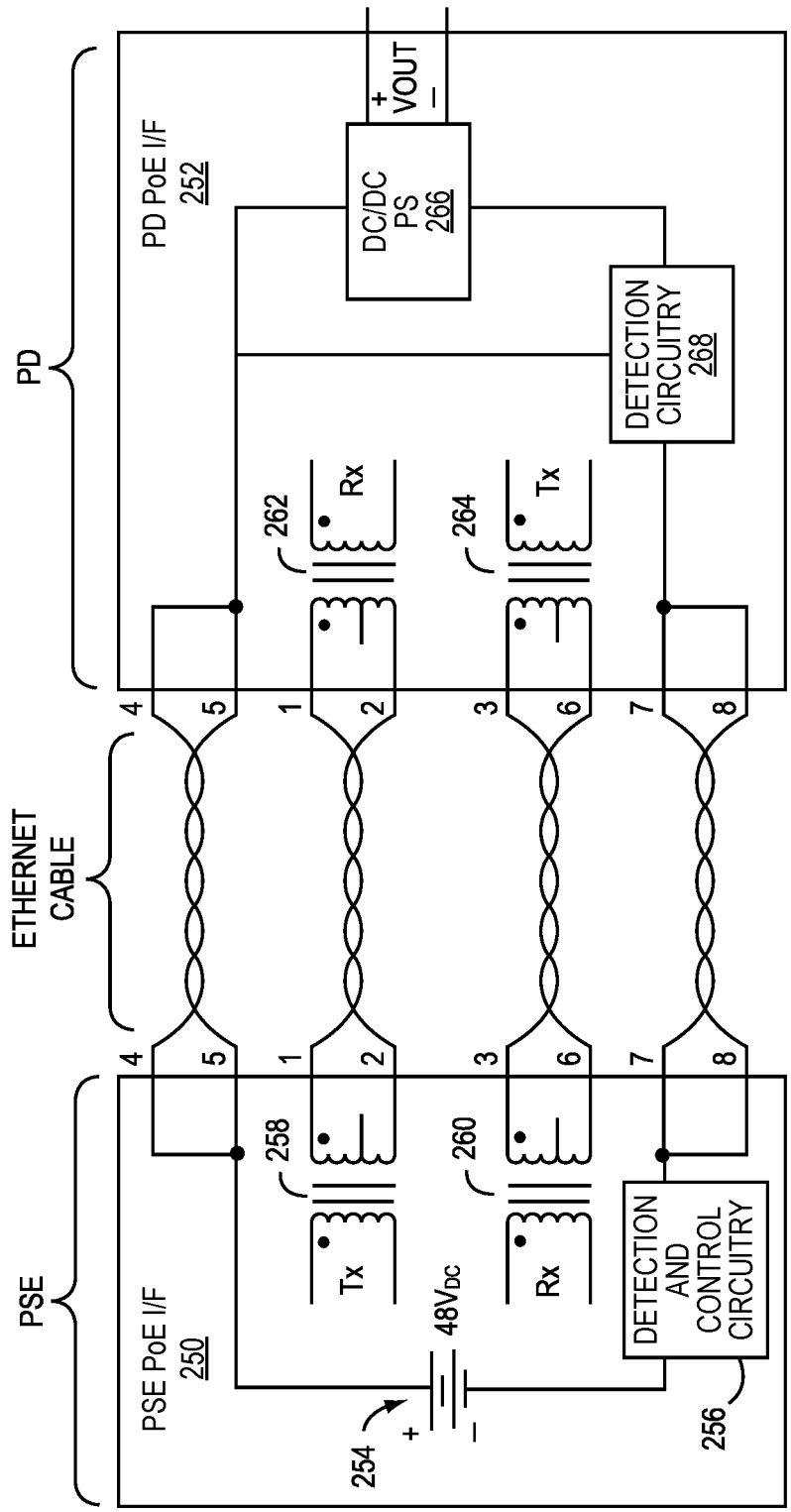
FIG. 55 illustrates a POE interface architecture in a spare-pair power feed embodiment.

FIG. 55 illustrates the respective interfaces for a PSE and PD for a "spare-pair" power feed configuration. An alternative "phantom" power feed configuration is described further below. The PSE PoE interface 250 will form part of the PSE and function as both the communication and power delivery interface, which is connected to the PD by an appropriate cable, such as a CAT-5 or CAT-6 Ethernet cable. An Ethernet cable generally has eight wires, which are configured as four twisted pairs of wire. Similarly, the PD has a PD PoE interface 252.

The PSE PoE interface 250 is shown with a power supply 254, which has a positive supply output coupled to pins 4 and 5 of an Ethernet jack and a negative supply output coupled to pins 7 and 8 via detection and control circuitry 256. As such, the voltages developed by the power supply 254 may be provided across pins 4/5 and pins 7/8 and delivered to the corresponding pins of the Ethernet jack provided by the PD over the Ethernet cable.

The PSE PoE interface 250 has a transmit (TX) transformer 258 and a receive (RX) transformer 260. Data to be transmitted by the PSE over the Ethernet cable is presented to the left primary side of the transmit transformer 258 by the requisite control and communication circuitry (not shown) of the PSE, coupled to the right secondary side of the transmit transformer 258, and delivered to the Ethernet cable in a differential fashion via pins 1 and 2 of the Ethernet jack of the PSE. Data received from the PD is received in a differential fashion via pins 3 and 6 of the Ethernet jack, presented to the right primary side of the receive transformer 260, coupled to the left secondary side of the receive transformer 260, and delivered to the requisite communication circuitry (not shown).

On the PD side, data transmitted by the PSE and received via pins 1 and 2 of the PD's Ethernet jack is received in a differential fashion by the left primary side of the receive transformer 262, coupled to the right secondary side of a receive transformer 262, and delivered to the requisite communication circuitry (not shown) of the PD. Data to be transmitted by the PD over the Ethernet cable is presented to the right primary side of a transmit transformer 264 by the requisite communication circuitry (not shown) of the PD, coupled to the left secondary side of the transmit transformer 264, and delivered to the Ethernet cable in a differential fashion via pins 3 and 6 of the PD's Ethernet jack.

The voltages presented between pins 4/5 and pins 7/8 are effectively presented to a DC-DC power supply (PS) 266, which is controlled by detection circuitry 268 and capable of providing a DC output voltage, VOUT, based on the direction of the detection circuitry 268. Notably, the detection circuitry 268 not only controls the level of the DC output voltage VOUT, but also controls whether the DC output voltage VOUT is presented at all.

The detection and control circuitry 256 of the PSE and the detection circuitry 268 of the PD effectively communicate with one another such that the PSE can detect that the PD is a PoE device and classify the PD as falling into one of the defined IEEE 802.3af PoE power classes. During detection, the detection and control circuitry 256 of the PSE measures the current being provided to the PD via pins 4/5 and 7/8 at two different voltage levels. These two voltage levels are relatively low reach levels, such as 2.8 V and 5.6 V, respectively. When presented with these different voltage levels, the detection circuitry 268 of the PD will provide a standard-defined input resistance. Based on these currents, a differential input resistance for the PD is determined by the detection and control circuitry 256 of the PSE. If the differential input resistance falls within an appropriate range, the detection and control circuitry 256 will determine that the PD is an appropriate PoE device. Otherwise, the detection and control circuitry 256 will determine that PD is not a PoE device.

For classification, the detection and control circuitry 256 of the PSE will provide an intermediate voltage and measure the resulting current. The PD will be expecting this intermediate voltage and will modify its input impedance to a level that indicates its particular power classification. In other embodiments, information may be exchanged over the data lines to assist with classification. Once the PD is classified, the detection and control circuitry 256 of the PSE will present the standard 48V PoE supply voltage across pins 4/5 and 7/8. The PD will receive this voltage via pins 4/5 and 7/8. The voltage is provided to the DC-DC power supply 266 and regulated to a desired output voltage VOUT to power electronics of the PD. The detection circuitry 268 may be configured to control the particular voltage level for the output voltage VOUT.

In the above embodiment, data is transmitted from the PSE to the PD over a twisted-pair, which couples pins 1 and 2 of both devices. Data is transmitted from the PD to the PSE over a twisted-pair coupling pins 3 and 6 of both devices. In this configuration, power is not supplied on the wires used for communicating data. The positive supply voltage is provided over the spare twisted-pair coupling pins 4/5, and the negative supply voltage is provided over the spare twisted-pair coupling pins 7/8. As such, this embodiment is referred to as a spare-pair power feed. In the following embodiment, power is supplied over the wires used for communicating data in a phantom power feed configuration.

Figure 56:
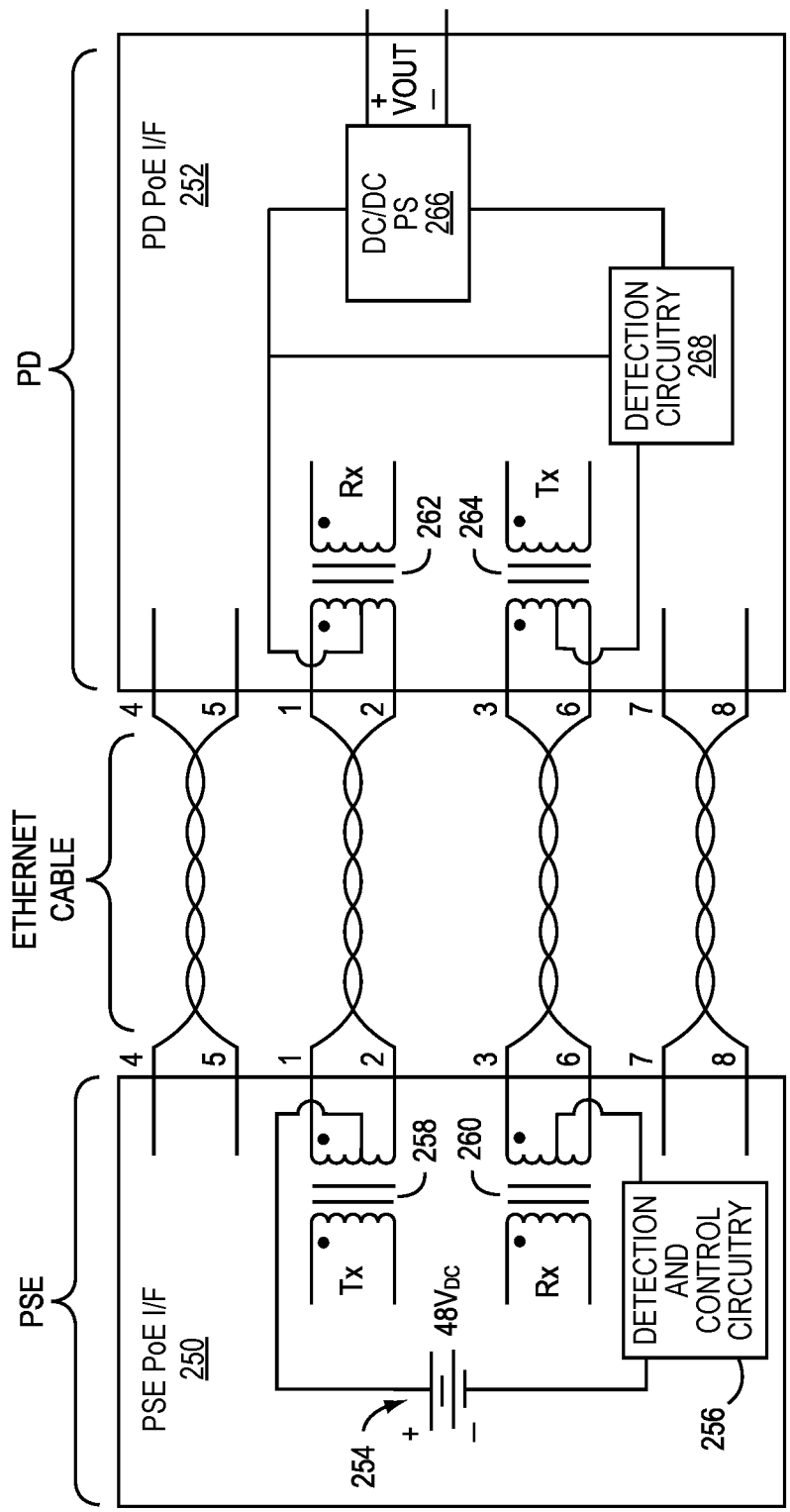
FIG. 56 illustrates a POE interface architecture in a phantom power feed embodiment.

With reference to FIG. 56, the PSE and PD in FIG. 55 are slightly modified. In particular, the positive supply voltage from the power supply 254 is coupled to a center tap of the right secondary of the transmit transformer 258. The negative supply voltage is coupled to the center tap of the right primary of the receive transformer 260. As such, the positive supply voltage is provided over the twisted-pair coupling pins 1/2 along with data transmitted to the PD, and the negative supply voltage is provided over the twisted-pair coupling pins 3/6 along with data received from the PD.

In the PD PoE interface 252, the DC-DC power supply 266 is coupled to the center tap of the left primary of the receive transformer 262, and the detection circuitry 268 is coupled to the center tap of the left secondary of the transmit transformer 264. As such, the positive supply voltage is received over the twisted-pair coupling pins 1/2 along with data received from the PSE, and the negative supply voltage is received over the twisted-pair coupling pins 3/6 along with data transmitted from the PD. The twisted pairs that run between pins 4/5 and 7/8, respectively, are unused. The handshaking used to detect and classify the PD is similar to that described above.

Figure 57:
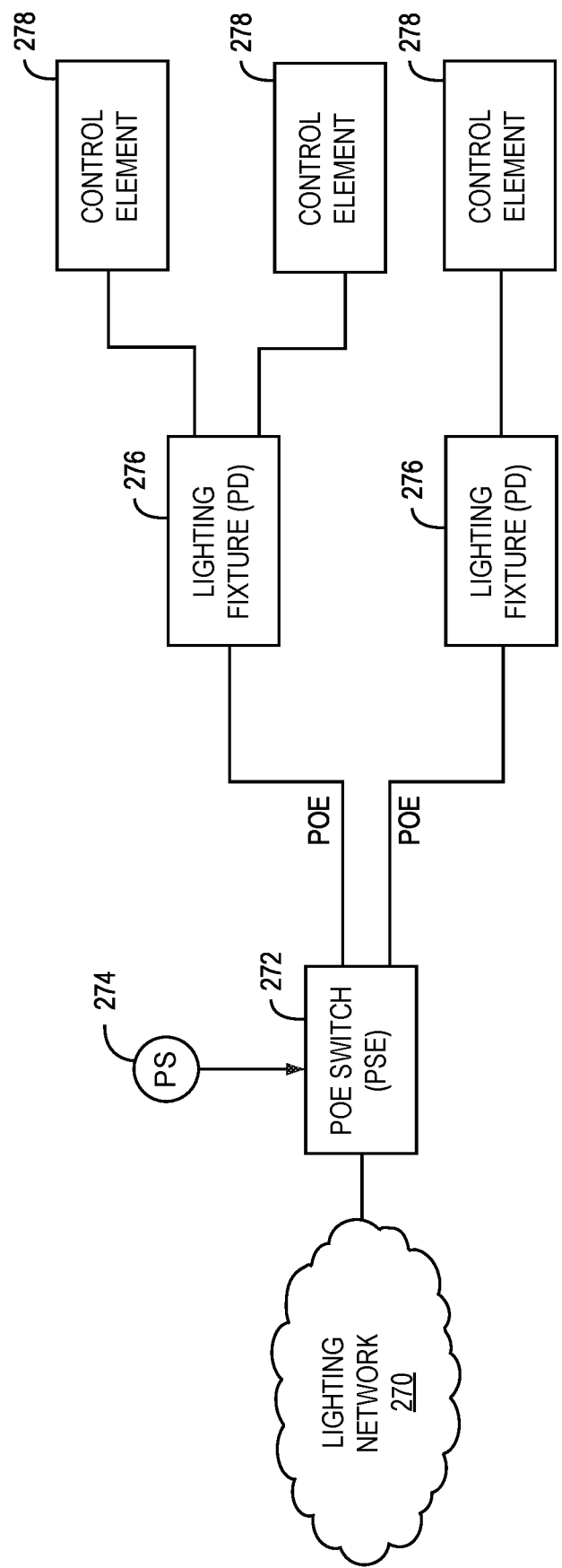
FIG. 57 is a lighting network environment wherein the lighting fixture acts as a POE PD device.

Turning now to FIG. 57, a network lighting environment that employs PoE is illustrated according to a first embodiment. In this embodiment, a lighting network 270 is coupled to a PoE switch 272, which receives power from a power supply (PS) 274. The PoE switch 272 is configured as a PSE and is coupled to multiple lighting fixtures 276, which are configured as PDs. As such, the PoE switch 272 facilitates Ethernet-based communications between the lighting network 270 and the lighting fixtures 276. While the PoE switch 272 receives power from the power supply 274, the lighting fixtures 276 receive power from the PoE switch 272 over Ethernet or like cables. Data is exchanged between the PoE switch 272 and the lighting fixtures 276 over the same cabling through which power is provided from the PoE switch 272 to the lighting fixtures 276, as described above.

Further, various control elements 278 may be coupled to the lighting fixtures 276. These control elements 278 may represent integrated or separate occupancy sensors, ambient light sensors, temperature sensors, wireless access points, emergency lighting fixtures, cameras, thermostats, speakers, security sensors, smoke alarms, telephones, and the like. Notably, the lighting fixtures 276, which are receiving power from the PoE switch 272, may be able to provide power to some or all of the control elements 278. In certain embodiments, the control elements 278 may have their own power sources, and as such, not receive power from the corresponding lighting fixture 276. As described further below, the lighting fixtures 276 and the control elements 278 are able to communicate with one another such that the lighting fixtures 276 may respond to information provided from the control elements 278 as well as provide information to control the control elements 278. The lighting fixtures 276 may exchange information, including control messages or data, with each other as well as with other entities, including other lighting fixtures 276 that form part of the lighting network 270.

Figure 58:
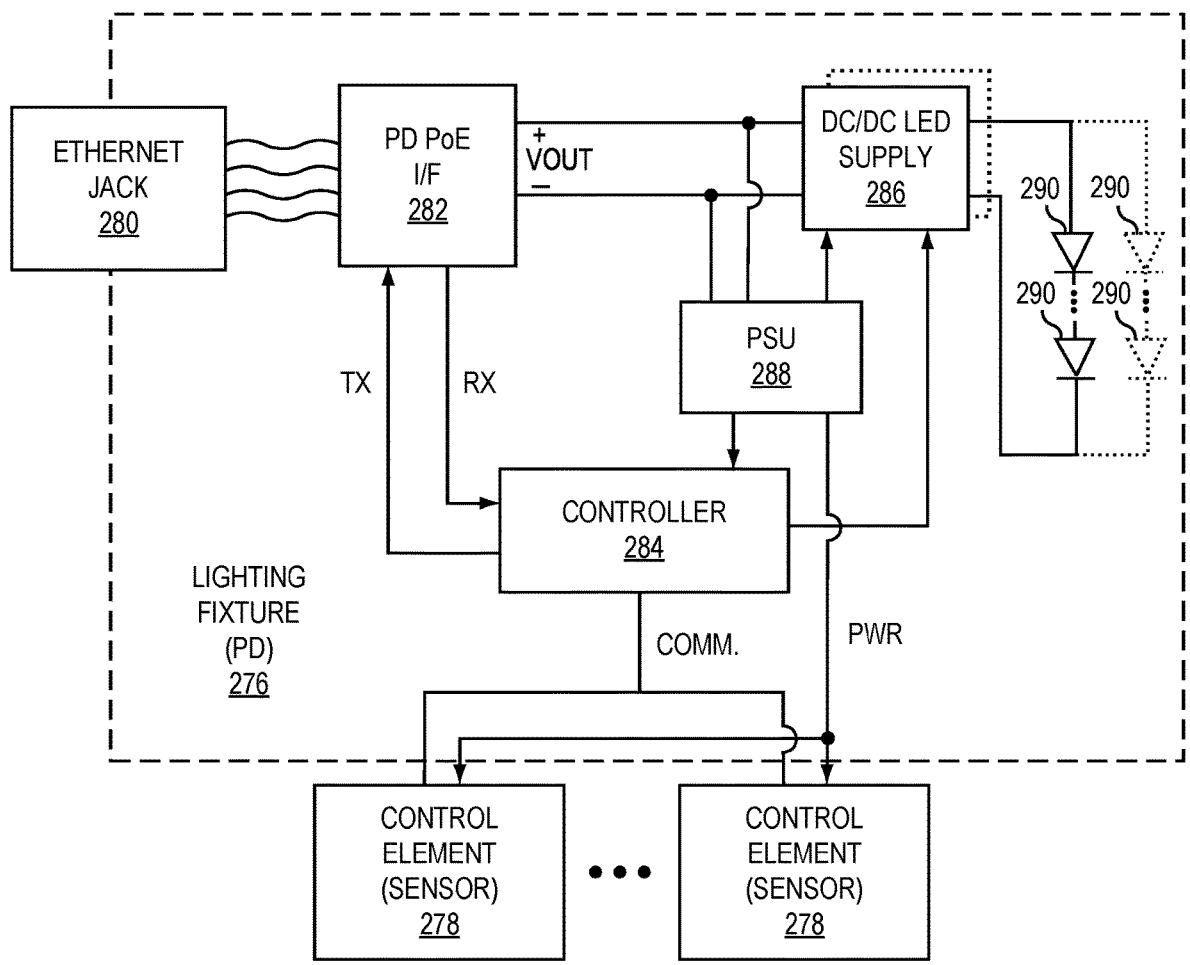
FIG. 58 illustrates a lighting fixture configured as a POE PD device.

FIG. 58 illustrates an exemplary lighting fixture 276, which is configured as a PD. The lighting fixture 276 includes an Ethernet jack 280, which is coupled to a PD PoE interface 282 that is configured similar to what is shown in FIG. 55. The PD PoE interface 282 provides data (RX) at the Ethernet jack 280 from a PoE device, such as the PoE switch 272, to a controller 284. The PD PoE interface 282 passes data (TX) to be transmitted from controller 284 to the Ethernet jack 280 for delivery to the PoE device.

The PD PoE interface 282 also provides the output voltage VOUT to one or more DC-DC LED supplies 286 as well as a power supply unit (PSU) 288. Each DC-DC LED supply 286 may be configured to drive one or more strings of LEDs 290, wherein each string may have LEDs of the same or different color, as previously described. The DC-DC LED supply 286 may receive a control signal from the controller 284. The control signal may be analog or digital and is used to set the drive voltage placed across each string of LEDs 290 by the DC-DC LED supply 286. Controlling the current through each string of LEDs 290 will effectively set the brightness level for each of the respective LEDs 290.

The PSU 288 acts as a low voltage power supply, voltage reference, or the like for various components of the lighting fixture 276. In this example, the PSU 288 provides a supply voltage for the controller 284 and a voltage reference or bias voltage for the DC-DC LED supply 286. The PSU 288 may also provide a supply voltage to power (PWR) some or all of the control elements 278, which are integrated within or coupled to the lighting fixture 276. Alternatively, power may be supplied to the control elements 278 from the PD PoE interface 282.

Communications between the controller 284 and the various control elements 278 may take place over a proprietary or industry-standard communication bus (COMM), such as the I²C serial bus. The interface between the controller 284 and the control elements 278 could also be Ethernet based. Again, the control elements 278 may take various forms as noted above. For example, the control elements 278 may be an occupancy sensor and an ambient light sensor. Information from the sensors may be processed by the controller 284 and used to control how the various strings of LEDs 290 are driven. The controller 284 may share the information from the sensors with other lighting fixtures 276 or control entities via the PD PoE interface 282 as well as generate control information, which is sent to these lighting fixtures 276 or control entities, based on this information as previously described.

Figure 59:
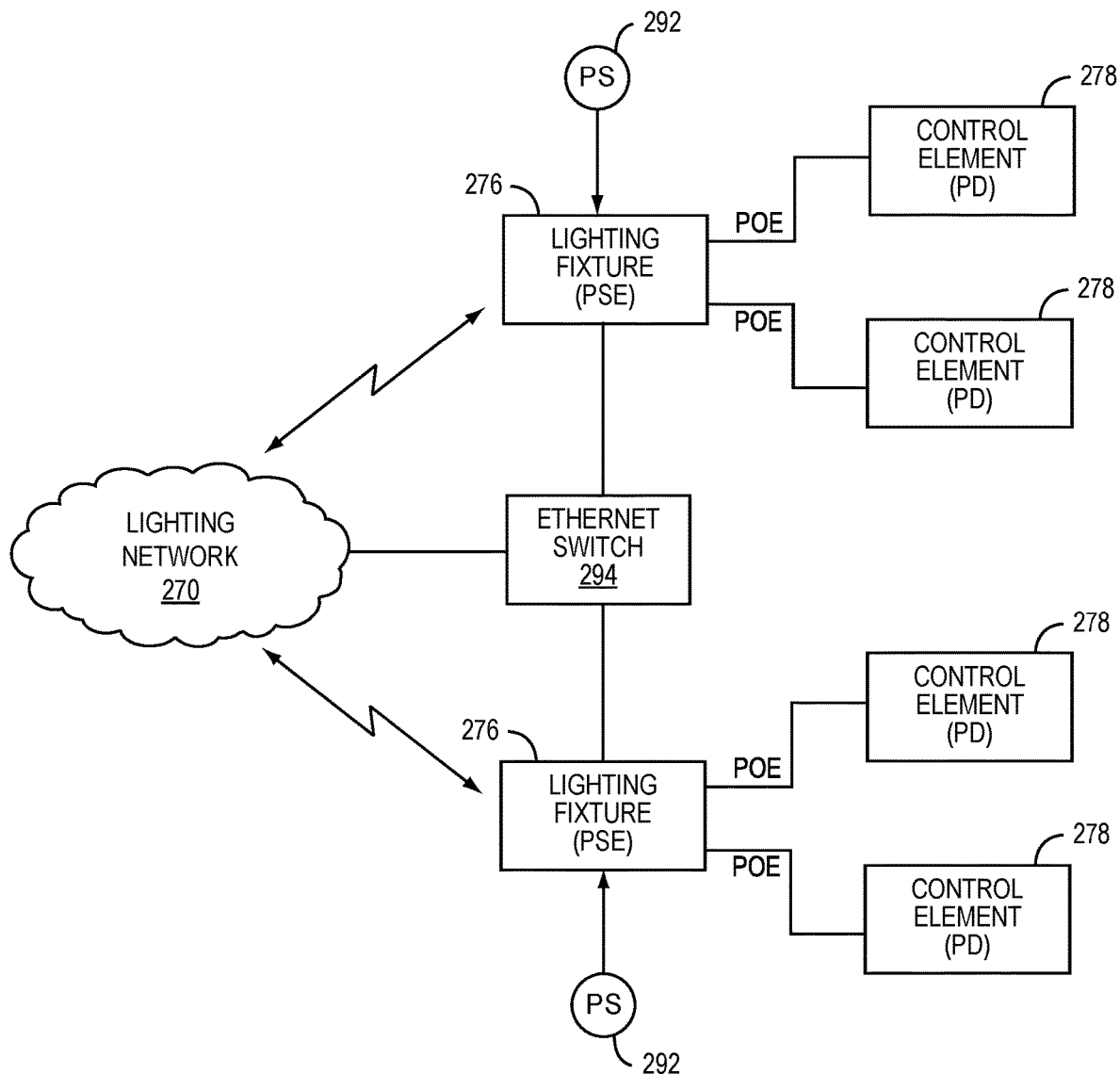
FIG. 59 is a lighting network environment wherein the lighting fixture acts as a POE PSE device.

FIG. 59 illustrates a lighting environment wherein the lighting fixtures 276 are configured as PSEs instead of PDs. Further, the control elements 278 are now configured as PDs. As such, each lighting fixture 276 will receive power from a separate AC or DC power supply (PS) 292 and provide power, via a PoE interface, to one or more control elements 278. The lighting fixtures 276 may communicate with the lighting network 270 using wired or wireless techniques. For a wired connection, the lighting fixture 276 may have an Ethernet interface, which is coupled to an Ethernet switch 294 that is connected to the lighting network 270. For a wireless connection, a lighting fixture 276 may have a wireless communication interface that is capable of communicating with a wireless access point (not shown) of the lighting network 270, another lighting fixture 276 having a wireless communication interface, or other device as described above.

Figure 60:
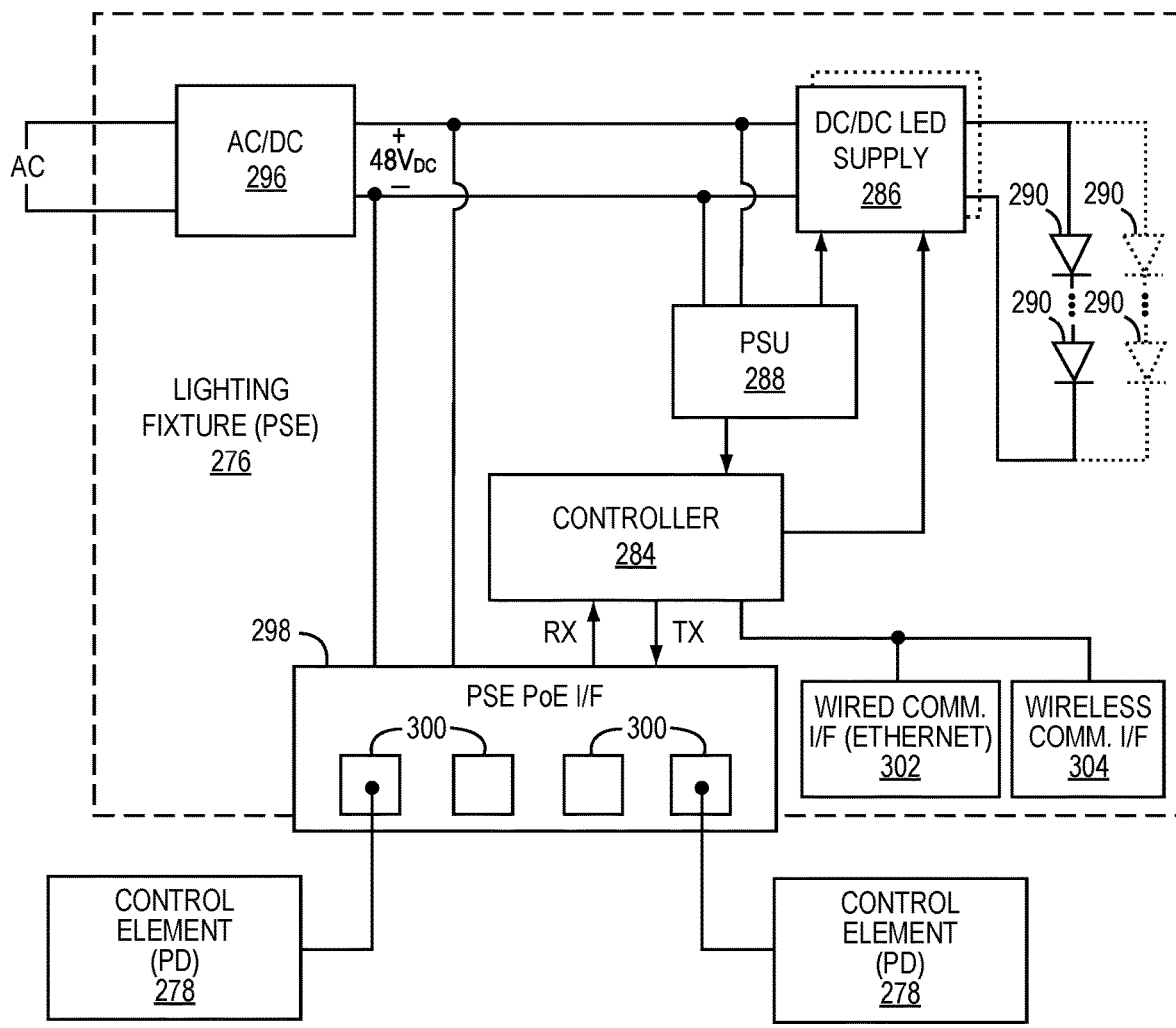
FIG. 60 illustrates a lighting fixture configured as a POE PSE device.

With reference to FIG. 60, an exemplary architecture for a lighting fixture 276, which is configured as a PSE, is described. In this configuration, the lighting fixture 276 is powered from an AC source, and can be supplied with an external DC source or power supply. In similar fashion to the lighting fixture 276 of FIG. 58, a DC-DC LED supply 286 is used to control the current through one or more strings of LEDs 290. In certain embodiments, multiple DC-DC LED supplies 286 may be provided wherein each is capable of independently controlling the current provided through a corresponding string of LEDs 290. The current provided to each string of LEDs 290 is controlled by the controller 284, which receives its power from the PSU 288. An AC/DC converter 296 is capable of converting an AC signal to a desired DC signal. In this instance, the output of the AC/DC converter 296 is approximately 48V DC, which corresponds to standard supply voltage for PoE applications. This output voltage is provided to the DC-DC LED supply 286, the PSU 288, as well as a PSE PoE interface 298.

The PSE PoE interface 298 is similar to that illustrated in and described in association with FIG. 56. The lighting fixture 276 is also associated with one or more other communication interfaces, such as a wired communication interface 302 and a wireless communication interface 304. The PSE PoE interface 298 has multiple PoE ports 300 to which various control elements 278 may be connected via an appropriate cable, such as an Ethernet cable. One or more the control elements 278 may be PoE devices that are configured as PDs. The control element 278 may take any of the forms described above, such as occupancy sensors, ambient light sensors, light switches, and the like. As such, the PSE PoE interface 298 may facilitate the appropriate PoE handshaking with, provide power to, and facilitate Ethernet communications with the control elements 278 according to a desired PoE standard.

The controller 284 not only controls the operation of lighting fixture 276, but also coordinates communications between any of the devices that are coupled to the PoE ports 300 of the PSE PoE interface 298, the wired communication interface 302, and the wireless communication interface 304. In one embodiment, the wired communication interface 302 is a non-PoE Ethernet interface. As such, the PoE ports 300, the wired communication interface 302, and the wireless communication interface 304 may be associated to provide an Ethernet hub, Ethernet switch, router, or a combination thereof. As such, the controller 284 may facilitate the exchange of information between any two control elements 278 (or other devices) that are coupled to the PoE ports 300 as well as facilitate the exchange of information between any control element 278 that is coupled to a PoE port 300 and any control device, lighting fixture 276, or network that is coupled to the wired or wireless communication interfaces 302, 304 on a frame or packet level. In short, the controller 284 may act as a hub, switch, router, or like control entity, and the lighting fixture 276 will effectively have an integrated hub, switch, router, or like control entity integrated therein.

In addition to relaying or routing information between networks or network devices, the controller 284 may also process information, make lighting decisions for itself, and make lighting decisions for other lighting fixtures 276 that are associated with its lighting network 270. These decisions may be based partially or solely on information obtained from the attached control elements 278, other lighting fixtures 276, remote control entities, and the like, as described above. The terms hub, switch, and router are intended to carry their customary meanings.

For example, if the two control elements 278 are configured as an occupancy sensor and an ambient light sensor, respectively, sensor data may be provided to controller 284 and may be: used to control the string of LEDs 290; passed on to other lighting fixtures or control entities via the wired or wireless communication interfaces 302, 304; used to generate commands that are sent to other lighting fixtures 276 or control entities via the wired or wireless communication interfaces 302, 304; or any combination thereof. Further, the controller 284 may also receive sensor information or other data from other lighting fixtures 276 or remote control entities and use this information or data to help determine how to control the string of LEDs 290 or generate commands to send to other lighting fixtures 276 or remote entities. All of these functions may be provided on top of basic hub, switch, and router functions for the various interfaces of the lighting fixture 276.

When the control elements 278 are configured as PoE PD devices, they may be associated with an Internet protocol (IP) address. As such, a control element 278 configured as a sensor or the like will have an IP address and receive power from the PoE port 300 of the PSE PoE interface 298 of the lighting fixture 276.

The following discussion provides specific examples of how to use the commissioning tool 136 to interact with and set parameters with and the various devices of the lighting network. In this example, the lighting network may include any number of lighting fixtures 110, switch modules 210, and the like. In general, the commissioning tool 136 may instruct the various devices of the lighting network to enter into a configuration mode. While in the configuration mode, the devices of the lighting network will stop their normal operation, which includes the sharing of sensor, state, and control information and controlling operation based thereon. Instead, the devices of the lighting network will primarily interact with the commissioning tool 136 to achieve various commissioning goals, several of which are discussed further below. Once the commissioning is complete, the devices of the lighting network will return to normal operation, and resume sharing sensor, state, and control information and controlling operation based on this information, as desired.

Any discussion of the commissioning tool 136 taking an action will generally do so in direct or indirect response to an input from a user. The commissioning tool 136 may provide a graphical user interface that steps the user through the following processes and queries the user for any necessary user input. Further, certain of the following processes involve the user operating the commissioning tool 136 to select a lighting fixture 110. This process generally involves the user aiming the commissioning tool 136 toward the lighting fixture 110 to be selected, such that the LED 204L of the commissioning tool 136 emits light that can be received by the ambient light sensor $S_A$, or the like, of the lighting fixture 110. General communications are provided between the devices of the lighting network using wired or wireless communications.

Figure 61:
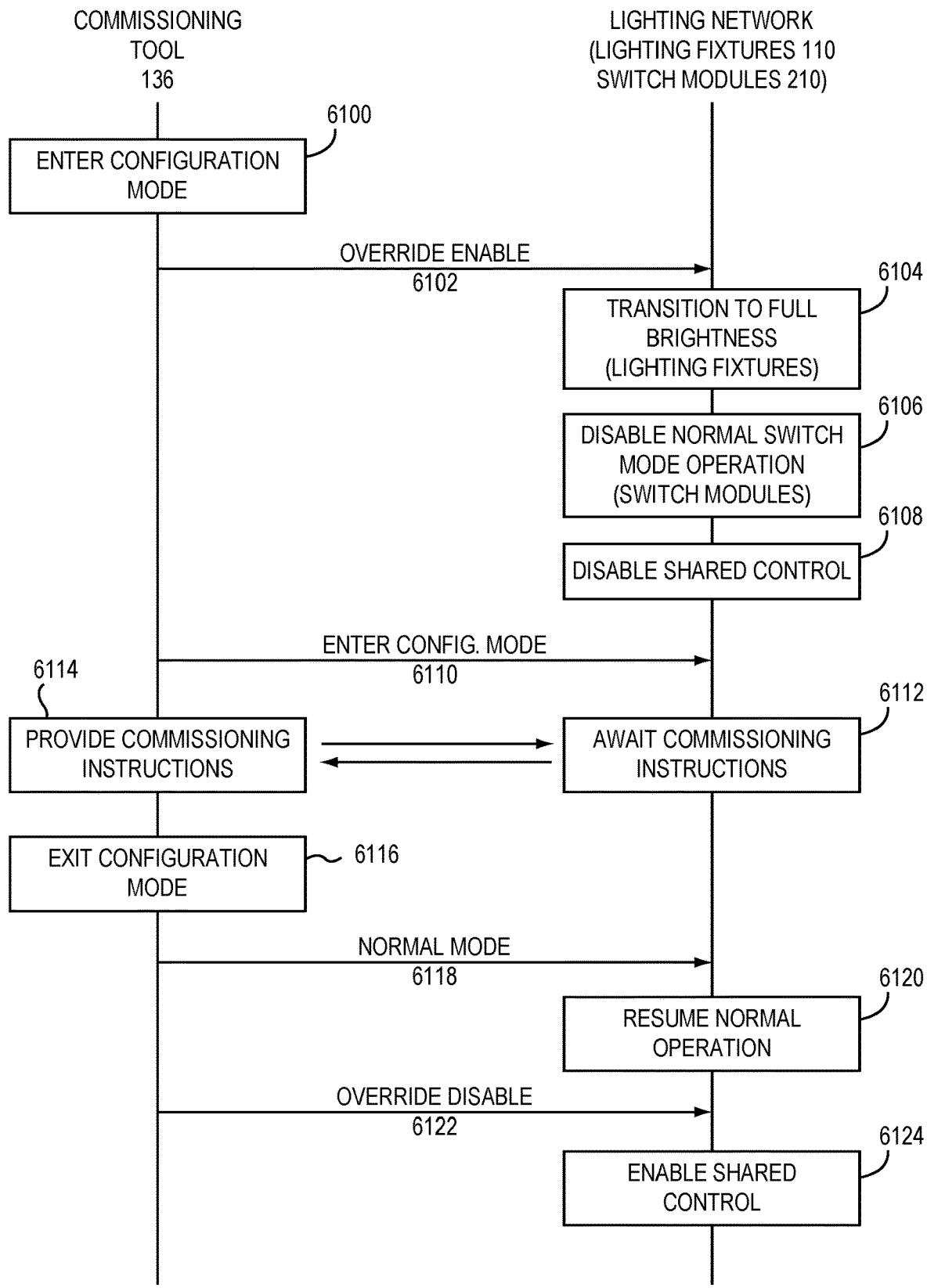
FIG. 61 is a flow diagram illustrating a process for placing devices into a configuration mode according to one embodiment.

An exemplary process for entering and exiting a configuration mode is illustrated in FIG. 61. Initially, the commissioning tool 136 will enter the configuration mode based on input from the user (step 6100). In response to entering the configuration mode, the commissioning tool 136 will send an override enable message to the various devices of the lighting network (step 6102). In response to receiving the override enable message, the lighting fixtures 110 may halt all normal network traffic in order reduce network traffic for better reception of subsequent messages. The lighting devices may also disable shared control (step 6104), which means that the various devices will stop sharing or responding to sensor, status, or control information as required during normal operation.

Next, the commissioning tool 136 will instruct the devices of the lighting network to enter the configuration mode (step 6106). In response to receiving the enter configuration mode message, the lighting fixtures 110 may transition to full brightness (step 6108) and the switch modules 210 may disable their normal switch module operation (step 6110). As an alternative to transitioning to full brightness, the lighting fixtures 110 may provide any other type of visual feedback to the user. Transitioning to full brightness is just one example of how the lighting fixtures 110 may provide feedback to the user. For the switch modules 210, disabling normal operation may simply mean not responding to user input that would normally cause one or more of the lighting fixtures 110 to turn off, turn on, or dim to a desired level. At this point, the devices of the lighting network will await commissioning instructions from the commissioning tool 136 (step 6112). To facilitate the desired commissioning, the commissioning tool 136 will provide commissioning instructions (step 6114). Steps 6112 and 6114 represent a generic commissioning process, several of which are described further below. Once the commissioning process is complete, the commissioning tool 136 will exit the configuration mode in response to user input (step 6116). The commissioning tool 136 will send an instruction to enter normal mode to the various devices of the lighting network (step 6118). In response, the various devices of the lighting network will resume normal operation (step 6120). At this point, the various devices of the lighting network may operate independently, as they normally would do, without sharing or responding to sensor, status, or control information. The commissioning tool 136 will subsequently send an override disable message (step 6122), which will cause the various devices of the lighting network to enable shared control (step 6124). At this point, the various devices of the lighting network will be able to share and respond to sensor, status, and control information.

Figure 62:
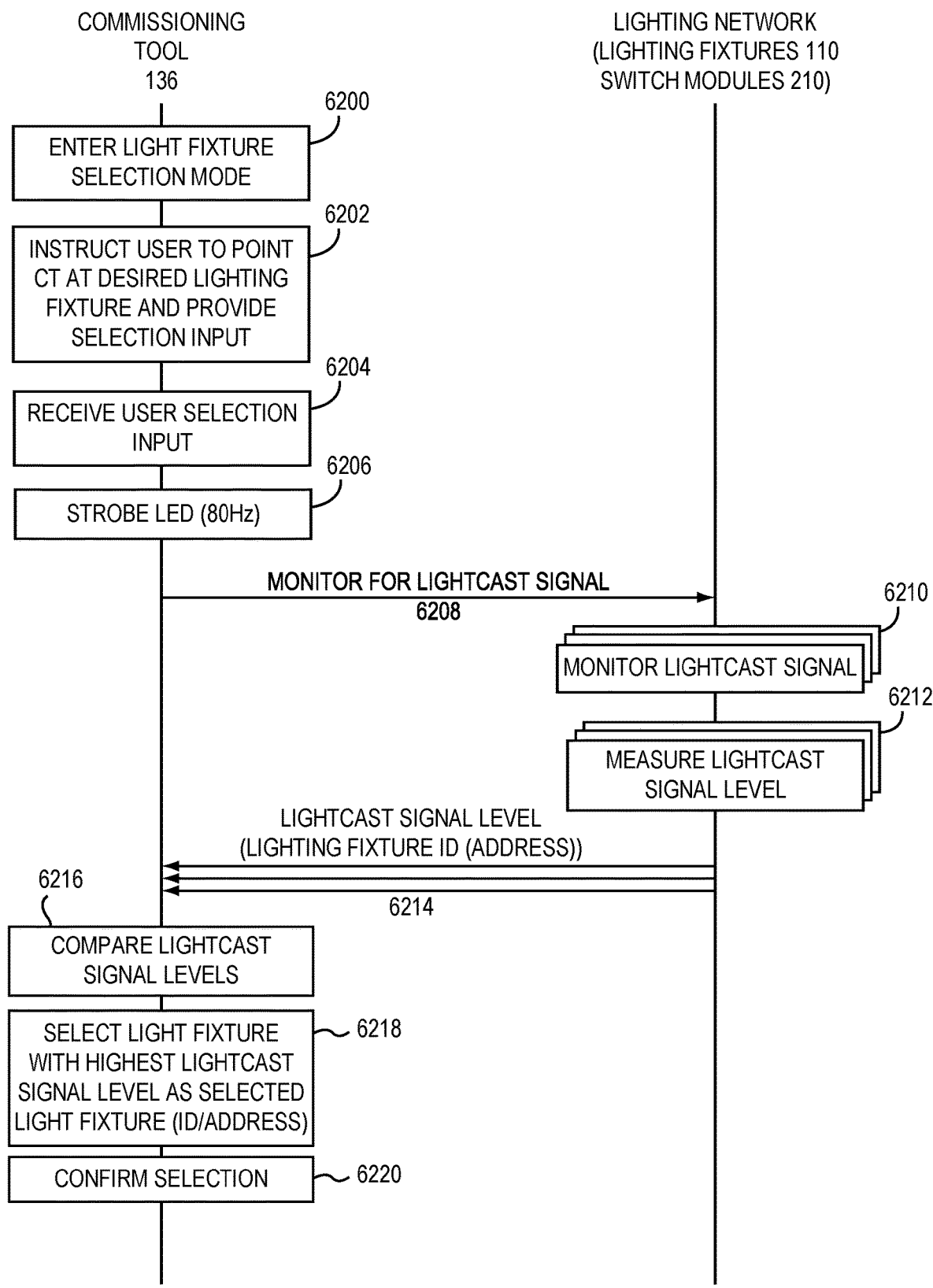
FIG. 62 is a flow diagram illustrating a process for selecting a lighting fixture according to one embodiment.

Prior to describing some exemplary commissioning procedures, common functions required in the various commissioning procedures are described, including selecting a particular lighting fixture 110 or switch module 210. FIG. 62 illustrates an exemplary process for selecting a particular lighting fixture 110. As noted above, this process takes place after the commissioning tool 136 has instructed the various devices of the lighting network to enter the configuration mode. Initially, the commissioning tool 136 will enter a light fixture selection mode, based on user input (step 6200). The commissioning tool 136 will instruct the user to point the light beam emitted from the LED 204L of commissioning tool 136 (FIG. 37) toward the desired lighting fixture 110 and provide a selection input once the commissioning tool 136 is pointing at the desired lighting fixture 110 (step 6202). Upon receiving the user selection input (step 6204), the commissioning tool 136 will strobe the LED 204L, preferably at a frequency that is not humanly perceptible (step 6206). For example, the LED 204L may be strobed at 80 Hz.

At this point, the commissioning tool 136 will send a message to the various devices of the lighting network to monitor for a lightcast signal (step 6208). In response, the lighting fixtures 110 and the lighting network will begin monitoring for the lightcast signal that is being emitted from the commissioning tool 136 (step 6210). Each of the lighting fixtures 110 will measure the level of the lightcast signal (step 6212) and send a message back to the commissioning tool 136 that includes the light cast signal level that it received (step 6214). The commissioning tool 136 will compare the various lightcast signal levels (step 6216), and select the lighting fixture 110 with the highest lightcast signal level as the selected lighting fixture (step 6218). Notably, the lighting fixtures 110 will include their identification information or address when they send their lightcast signal levels to the commissioning tool 136. As such, the commissioning tool 136 can use this identification information or address to identify the lighting fixture 110 from which the various lightcast signal levels were received.

Prior to this process, the commissioning tool 136 will have retrieved from the various devices of the lighting network the identities or addresses of each device in the lighting network. Therefore, the commissioning tool 136 will already have a map or listing of the various devices of the lighting network, and based upon the selection will know which one of the lighting fixtures 110 was selected. Once the lighting fixture 110 that had the highest lightcast signal level is selected, the commissioning tool 136 may provide a visual confirmation of the selection to the user (step 6220). The lighting fixture 110 that was selected need not know that it was selected. This information is maintained in the commissioning tool 136 and may be used by the commissioning tool 136 as needed.

Figure 63:
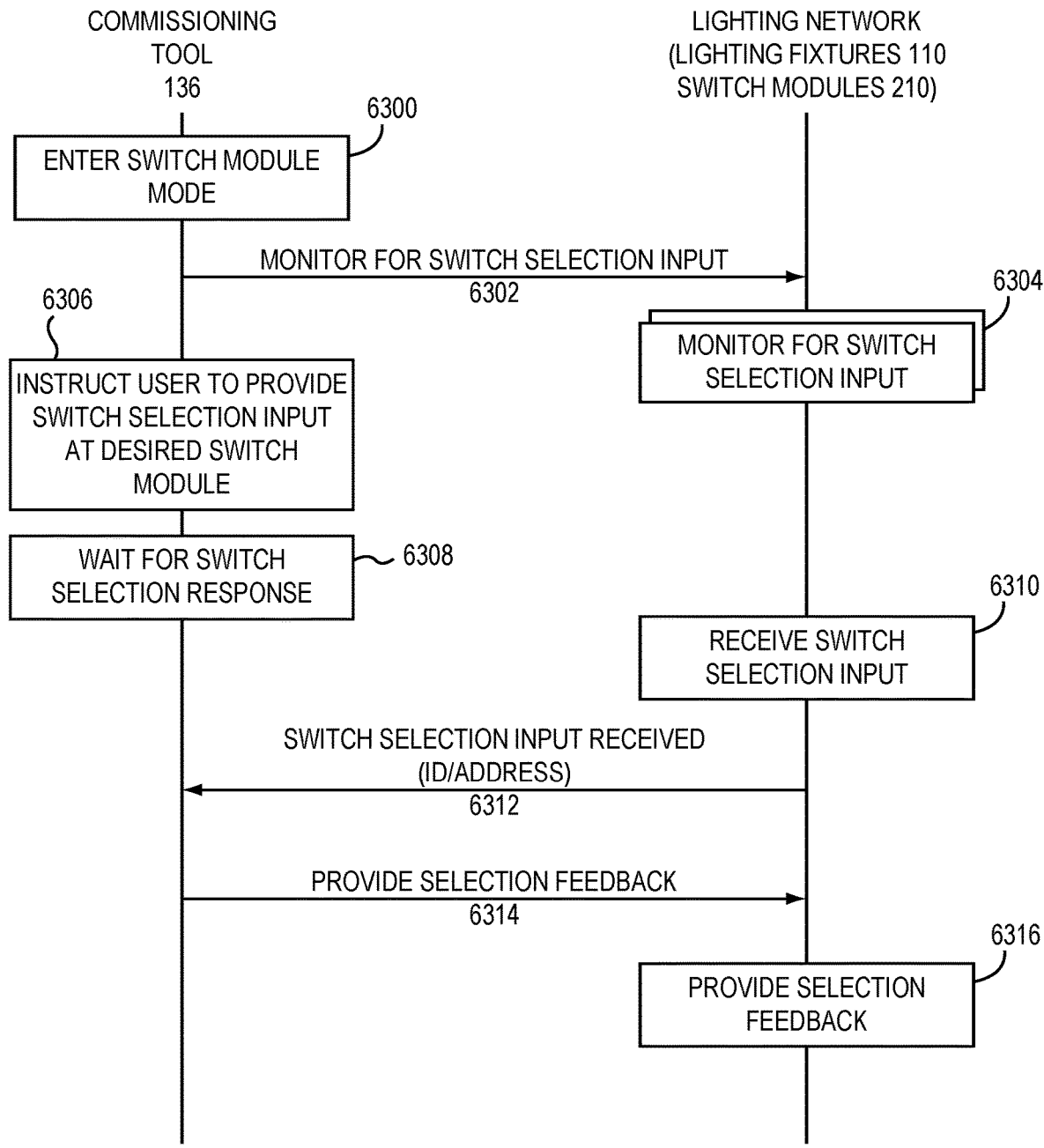
FIG. 63 is a flow diagram illustrating a process for selecting a switch module according to one embodiment.

An exemplary process for selecting a switch module 210, which may be used to turn on, turn off, or dim one or more lighting fixtures 110, is described in association with FIG. 63. Again, during this process, the lighting fixtures 110 and the one or more associated switch modules 210 in a particular group are in configuration mode during this process. In this example, assume that there are at least two switch modules 210 associated with a particular group of lighting fixtures 110.

Initially, the commissioning tool 136 will enter a switch module selection mode (step 6300) and send out a message for the switch modules 210 to monitor for a switch selection input, which will be provided by the user (step 6302). Each of the switch modules 210 will begin monitoring for the switch selection input (step 6304). The commissioning tool 136 will instruct the user to provide the switch selection input at the desired switch module 210 (step 6306) and begin waiting for a switch selection response (step 6308), which will ultimately be received from the selected switch module 210.

As instructed, the user will go to the switch module 210 to be selected and provide a desired input at the switch module 210. The desired input may include depressing the switch, a desired keypad, or the like of the switch circuitry 216 in a desired way or for a certain amount time. For example, a logo may be placed on a specific key of the keypad, and the user will be instructed to press the key with the logo for five seconds. The selected switch module 210 will receive the switch selection input (step 6310) and send a message back to the commissioning tool 136 to indicate that the switch selection input was received (step 6312). The message sent from the switch module 210 to the commissioning tool 136 will include the identity or address of the particular switch module 210 that was selected. As such, the commissioning tool 136 will know which switch module 210 was selected.

The commissioning tool 136 will send to the selected switch module 210 an instruction to provide feedback to the user (step 6314). In response, the selected switch module 210 will provide selection feedback to the user (step 6316). The selection feedback may include having the switch module 210 illuminate or flash the LED 218L of the light source 218 (FIG. 38) to provide a visual indication that selection of the desired switch module 210 was successful.

In the following discussion, the terms configuration mode, vacancy mode, occupancy mode, control group, and occupancy group are used. These terms have specific meanings that will be described prior to discussing exemplary commissioning examples. The term configuration mode was introduced above. Configuration mode refers to a state that the lighting fixtures 110 and switch modules 210 can be placed in to receive special commands that could not be sent during normal network operation. Examples of commands that will be accepted in configuration mode are: selection commands, group assignments, dim/full commands, and occupancy setting assignments.

In one embodiment, all of the devices in the lighting network are associated with a control group and an occupancy group. A control group is a collection of devices that may be controlled by any switch modules 210 in that control group. For example, a hallway with six lighting fixtures 110 and two switch modules 210, which are located on opposite ends of the hallway, would likely be in the same control group so that both switch modules 210 can turn off, turn on, or dim all six of the lighting fixtures 110. When a control group contains at least one switch module 210, it generally runs in vacancy mode. Vacancy mode is where the lighting fixtures 110 initially turn on after being off for an extended period in response to a command from a switch module 210 and turn off in response to two conditions: a command from the switch module 210 or inactivity based on an occupancy timeout. An occupancy timeout occurs when the lighting fixtures 110 collectively fail to detect movement through their associated occupancy sensors $S_O$ after a certain period of time.

In certain embodiments, a grace period is set after the lighting fixtures 110 are turned off in response to an occupancy timeout. If occupancy is detected during the grace period, the lighting fixtures 110 will turn on again. If occupancy is not detected during the grace period, the lighting fixtures 110 will remain off until an appropriate turn-on command is received from an associated switch module 210, even if occupancy is detected.

A control group does not need to be associated with a switch module 210. For example, a bathroom with three lighting fixtures 110 and no switch modules 210 may be configured to have the three lighting fixtures 110 turn on in response to occupancy being detected and turn off after a period of time when occupancy is no longer detected. Such an operating mode is referred to as an occupancy mode, as opposed to the vacancy mode described above.

In essence, a control group determines how a lighting fixture 110 will be controlled. An occupancy group, on the other hand, is a collection of devices that share occupancy events. When an occupancy sensor $S_O$ on a lighting fixture 110 detects occupancy, the lighting fixture 110 will send an occupancy status update to the other lighting fixtures 110 in its occupancy group. The lighting fixture 110 that detected the occupancy event as well as the other lighting fixtures 110 that received the occupancy status update will respond according to whether it is in vacancy mode or occupancy mode. Control groups include a wall control, while occupancy groups generally do not. Further, occupancy and control groups may overlap, as described in further detail below. Fixtures operating in vacancy mode have both an occupancy group assignment and a control group assignment. The control group would necessarily include a wall control. Fixtures operating in occupancy mode (without a wall control) require an occupancy group assignment; however, their control group assignment is unused/ignored, and may be unchanged from the original commissioning assignment. Occupancy mode fixtures are not typically configured to respond to wall controls, although they may be configured that way if desired. In such a case, the occupancy mode fixtures would be in the same control group as the associated wall control.

Figure 64A:
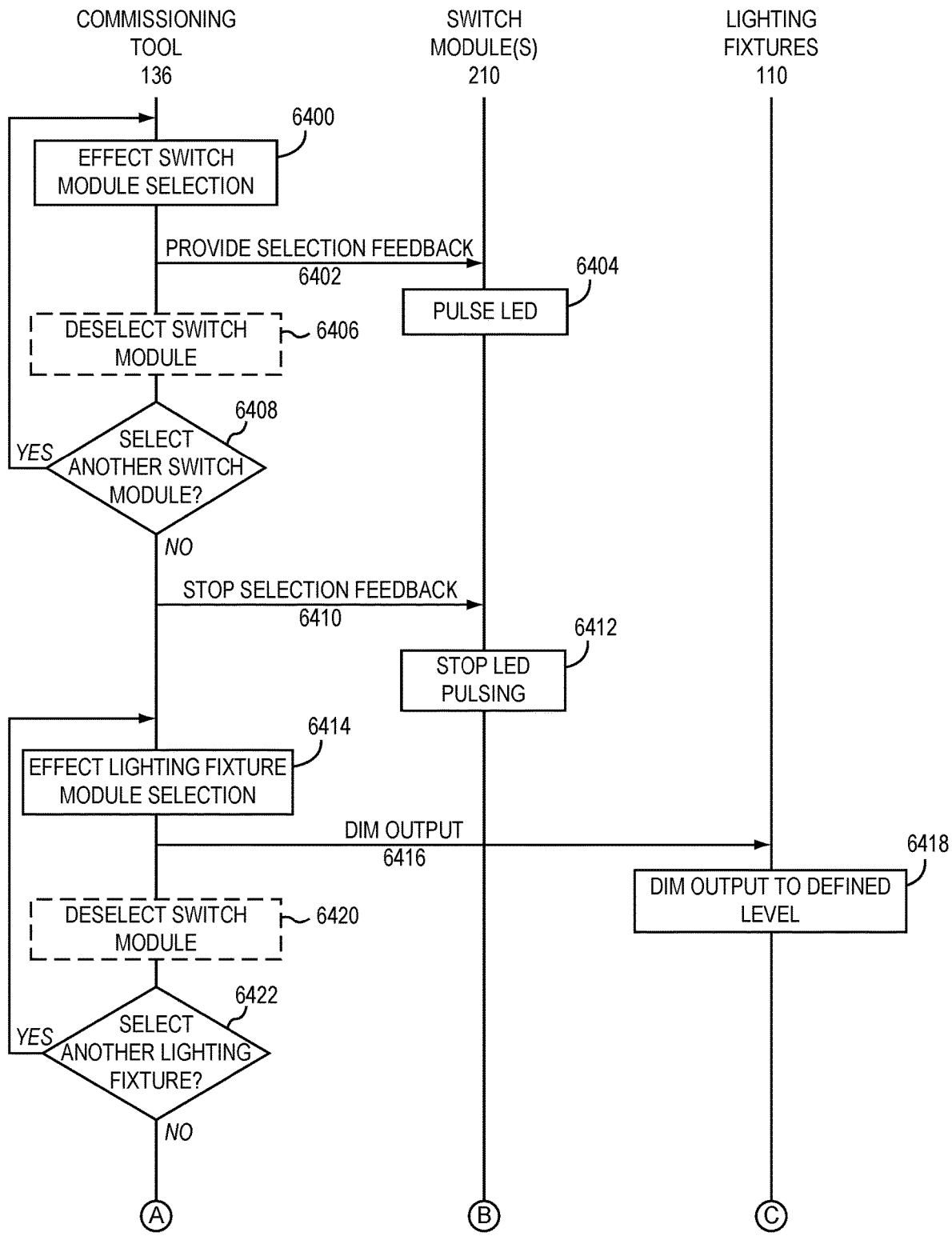
FIGS. 64A and 64B are a flow diagram illustrating a process for creating a new control group according to one embodiment.
Figure 64B:
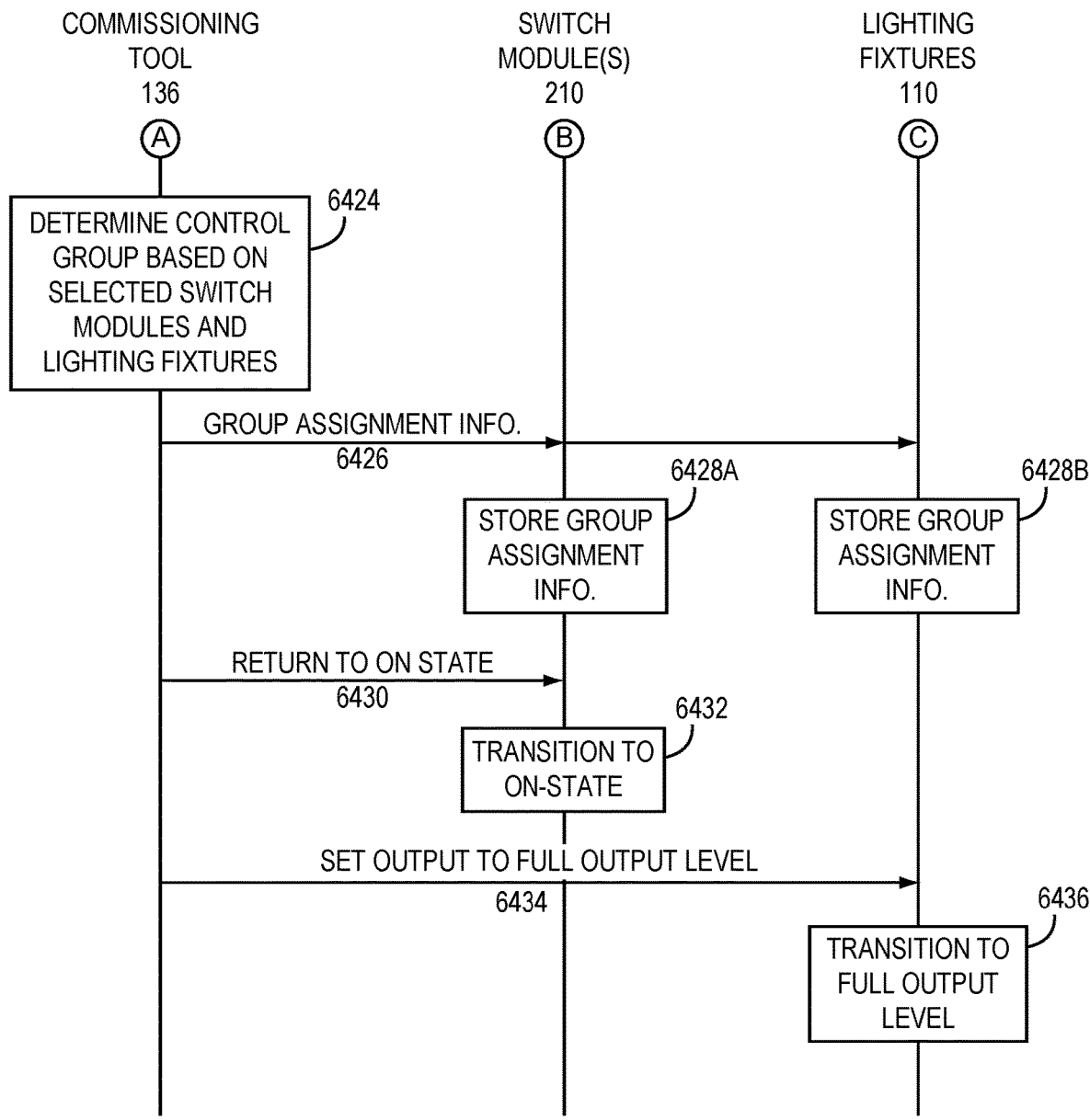

With reference to FIGS. 64A and 64B, an exemplary process is illustrated for creating a control group that includes one or more switch modules 210 and one or more lighting fixtures 110. Initially, the commissioning tool 136 will effect switch module selection for each of the switch modules 210 in the control group. The switch module selection was previously described in detail in association with FIG. 63. In essence, a first switch module 210 is selected via the commissioning tool 136 using the switch module selection process (step 6400). Once the first switch module 210 is selected, the commissioning tool 136 will send a message to the selected switch module 210 to provide selection feedback (step 6402). The selected switch module 210 may respond by pulsing the LED 218L in a humanly perceptible fashion, such that the user will have visible feedback that the first switch module 210 has been selected (step 6404).

Once the first switch module 210 is selected, the commissioning tool 136 may provide the user with an option to deselect the first switch module 210 (step 6406). If deselected, the commissioning tool 136 will instruct the first switch module 210 to stop pulsing the LED 218L to provide visible feedback to the user that the first switch module 210 has been deselected (step not shown). For the current example, assume that the first switch module 210 is not deselected.

Once the first switch module 210 is selected, the commissioning tool 136 presents another switch module 210 (step 6408). To select additional switch modules 210 to add to the control group, the above process is repeated for each additional switch module 210. Once selected, the switch modules 210 will continue to pulse their LEDs 218L until the user indicates that there are no further switch modules 210 to add to the switch group (step 6408). In one embodiment, the switch modules 210 will continue their LED sequence throughout the rest of the group creation process. Alternatively, once there are no further switch modules 210 to add to the switch group, the commissioning tool 136 sends a message to the selected switch modules 210 to stop providing their selection feedback (step 6410). In this example, the switch modules 210 will respond by stopping their LEDs 218L from pulsing (step 6412).

Next, the commissioning tool 136 will effect lighting fixture selection. Under the control of the user, the commissioning tool 136 will effect selection of a first lighting fixture 110 (step 6414), and send an instruction to the selected lighting fixture 110 to dim its output to a defined level (step 6416). The selected lighting fixture 110 will dim its output to the defined level to provide visual feedback indicative of being selected (step 6418). In this embodiment, or any of the others provided herein, the visual feedback provided for individual or group selections may include transitioning to a defined light output level, color, or color temperature, as well as flashing a certain number of times or at a certain rate, or any combination thereof.

The commissioning tool 136 will also provide the option to deselect the selected lighting fixture 110 (step 6420). If the selected lighting fixture 110 is deselected, the commissioning tool 136 will instruct the lighting fixture 110 to return to its full output level. Assume for this example that the selected lighting fixture 110 is not deselected.

The commissioning tool 136 will determine whether the user wants to select another lighting fixture 110 to add to the control group (step 6422). As such, the process is repeated for each lighting fixture 110 that will be added to the control group. Once all of the lighting fixtures 110 have been selected for the control group (step 6422), the commissioning tool 136 will determine a control group based on the currently selected switch modules 210 and lighting fixtures 110 (step 6424). Each control group will have unique group assignment information, which is assigned by the commissioning tool 136. The group assignment information is sent to the selected switch modules 210 and lighting fixtures 110 (step 6426), which will store the group assignment information (steps 6428A and 6428B).

At this point, the commissioning tool 136 will send an instruction for the selected switch modules 210 to return to their on-state (step 6432), and the switch modules 210 will transition to an on-state (step 6430). Similarly, the commissioning tool 136 will send an instruction for the selected lighting fixtures 110 to set their output to the full output level (step 6434). The lighting fixtures 110 will respond by transitioning from the dimmed level associated with being selected to their full output level (step 6436).

Figure 65:
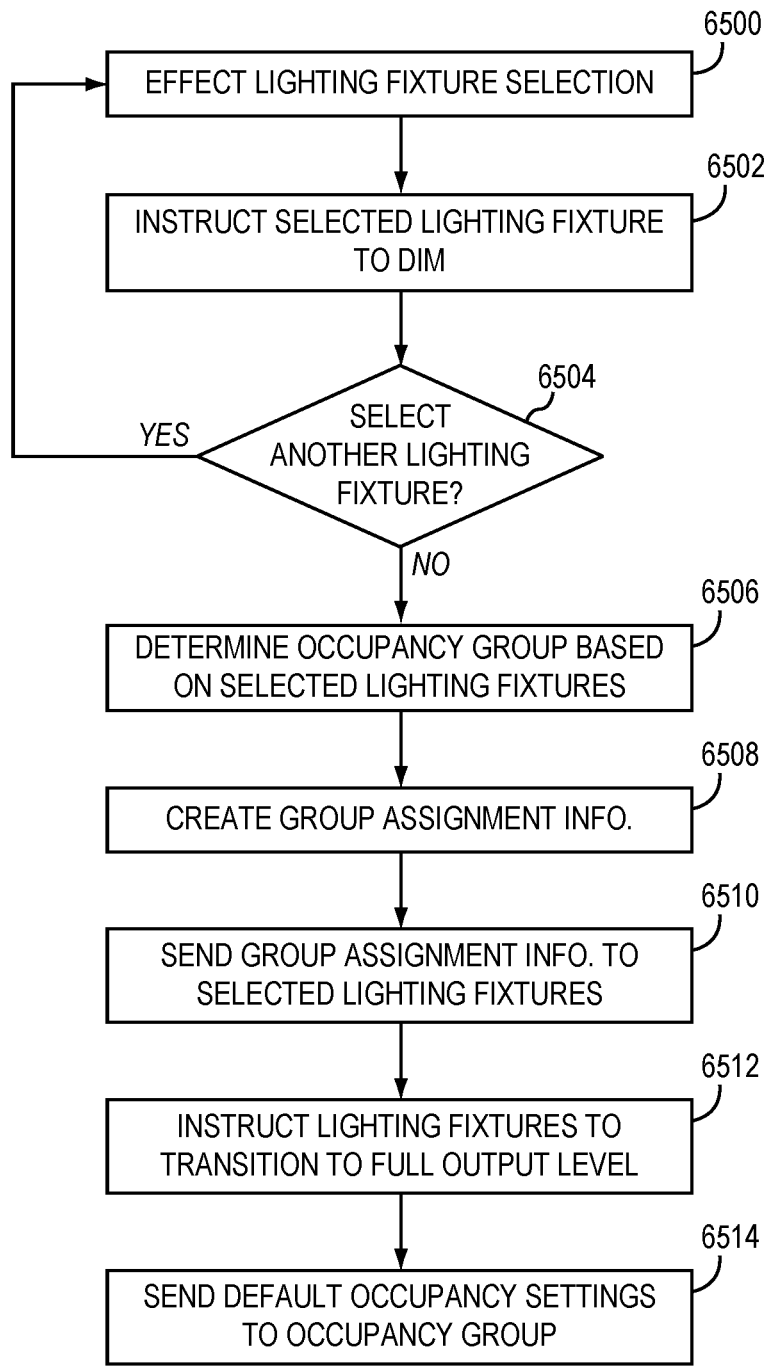
FIG. 65 is a flow diagram illustrating a process for creating a new occupancy group according to one embodiment.

Creating a new occupancy group is analogous to creating a control group, with the exception that the occupancy group may not have the associated switch modules 210. In the following embodiment the occupancy group will only include lighting fixtures 110, even though these lighting fixtures 110 may be in a control group with one or more switch modules 210. An exemplary process for forming a new occupancy group, from the perspective of the commissioning tool 136, is shown in FIG. 65.

Initially, the commissioning tool 136 will effect lighting fixture selection for a first lighting fixture 110 (step 6500), as previously described. The commissioning tool 136 will instruct the selected lighting fixture 110 to dim to a defined dimming level (step 6502). The commissioning tool 136 will then ask the user if another lighting fixture 110 should be selected (step 6504). If another lighting fixture 110 should be selected, the process is repeated for each desired lighting fixture 110. Once all of the desired lighting fixtures 110 are selected (step 6504), the commissioning tool 136 will determine an occupancy group based on the selected lighting fixtures 110 (step 6506) and create group assignment information for the new occupancy group (step 6508). The commissioning tool 136 will send the group assignment information to the selected lighting fixtures 110 (step 6510) and instruct the lighting fixtures 110 to transition to their full output levels (step 6512). Finally, the commissioning tool 136 will provide the lighting fixtures 110 in the new occupancy group with default occupancy settings (step 6514). The default occupancy settings may relate to sensitivity levels, timeout periods, and the like for the various lighting fixtures 110, which are associated with an occupancy sensor $S_O$. At this point, the lighting fixtures 110 that were selected will have the group assignment information and start operating according to the default occupancy settings that were provided by the commissioning tool 136. As such, the lighting fixtures 110 may respond to occupancy updates that are received from other lighting fixtures 110 in the same occupancy group.

Figure 66:
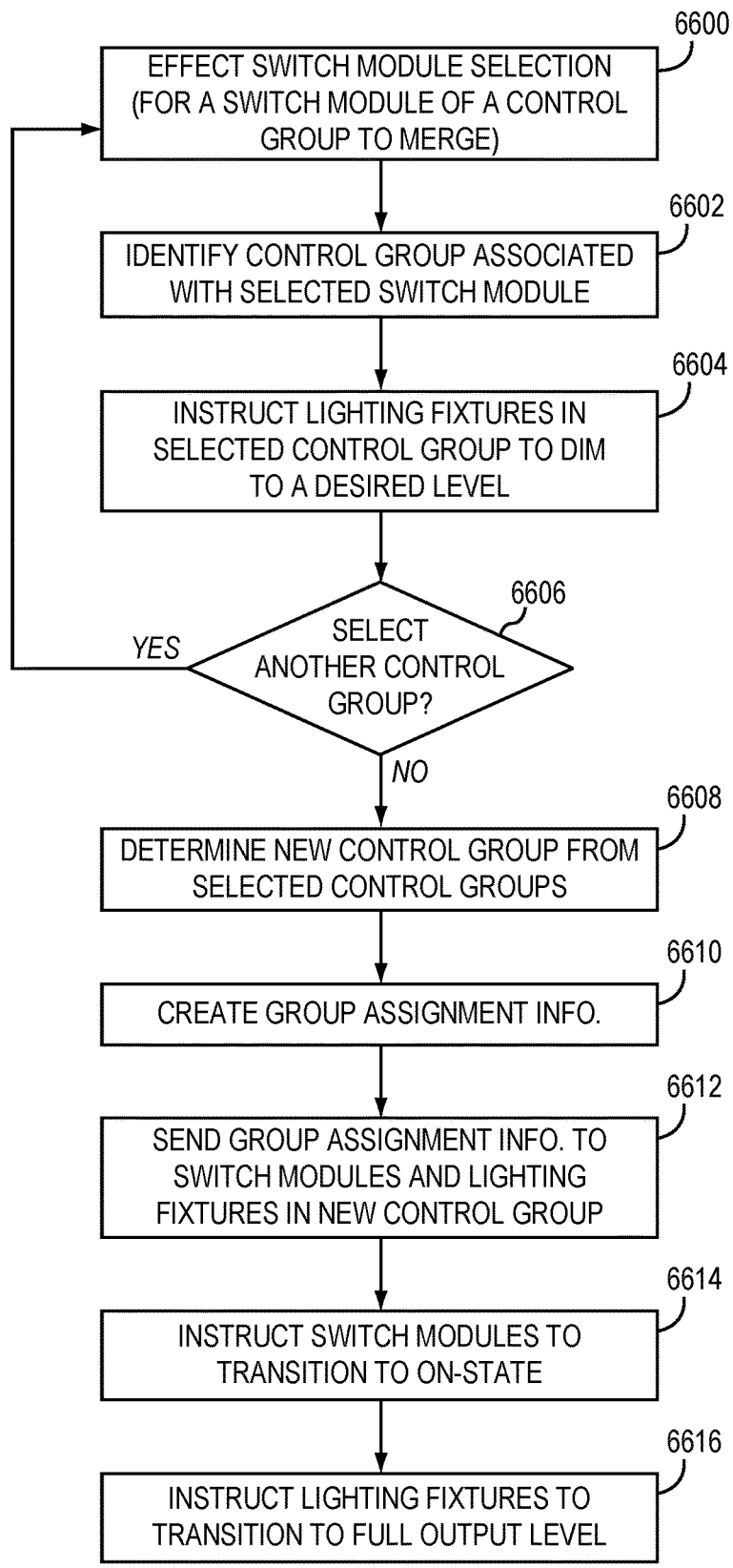
FIG. 66 is a flow diagram illustrating a process for merging control groups according to one embodiment.

With reference to the flow diagram of FIG. 66, a process to merge two or more control groups into a single control group is described according to one embodiment of the disclosure. Merging of the control groups will allow all of the lighting fixtures 110 from the original control groups to be controlled from any of the switching modules 210 from the original control groups.

Initially, the commissioning tool 136 will effect switch module selection for a switch module 210 of a first control group, which the user wants to merge with one or more other control groups (step 6600). The switch module selection process is the same as that described in association with FIG. 62. The commissioning tool 136 will then identify the control group that includes the selected switch module 210 (step 6602) and instruct the lighting fixtures 110, which are in the selected control group, to dim to a desired level (step 6604). Having the lighting fixtures 110 of the selected control group dim provides the user with visual feedback that the control group has been selected and clearly identifies the lighting fixtures 110 that are in the selected control group.

Once the first control group has been selected, the commissioning tool 136 presents the user with the opportunity to select another control group to merge with the first control group (step 6606). This process may be repeated for any number of control groups. Once all of the control groups that need to be merged have been selected, the commissioning tool 136 will determine a new control group from all of the devices in the selected control groups (step 6608), and create group assignment information for the new control group (step 6610). The commissioning tool will then send the group assignment information for the new control group to the affected switch modules 210 and lighting fixtures 110 (step 6612). Next, the commissioning tool 136 will instruct the affected switch modules 210 to transition to their on-state (step 6614) and instruct the affected lighting fixtures 110 to transition to their full output levels (step 6616) to provide visual feedback that the selected control groups have been merged into a single, new control group.

Figure 67:
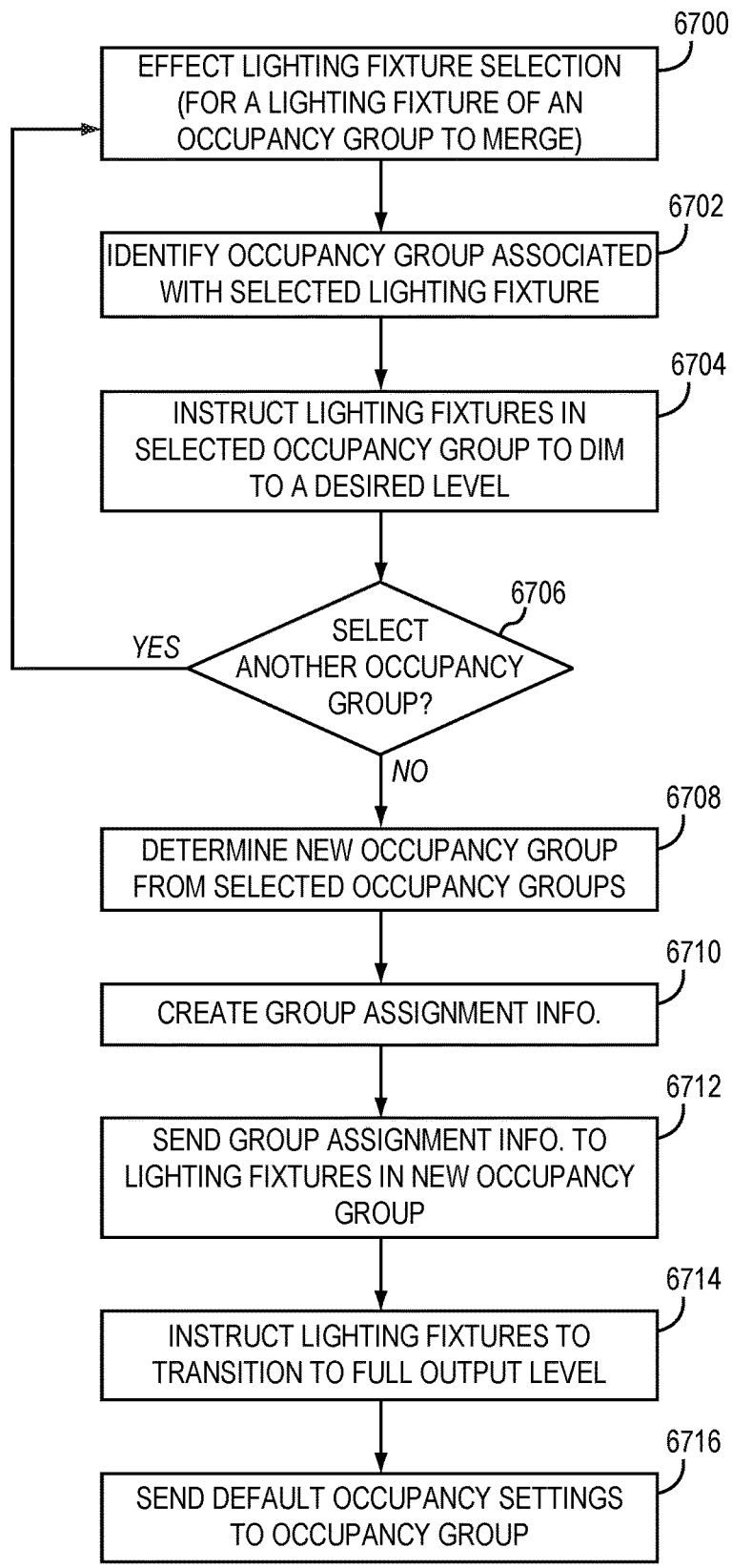
FIG. 67 is a flow diagram illustrating a process for merging occupancy groups according to one embodiment.

With reference to the flow diagram of FIG. 67, a process to merge two or more occupancy groups into a single occupancy group is described according to one embodiment. Merging of the occupancy groups will allow all of the lighting fixtures 110 from the original occupancy groups to share and respond to occupancy events.

Initially, the commissioning tool 136 will effect lighting module selection for a lighting fixture 110 of a first occupancy group, which the user wants to merge with one or more other occupancy groups (step 6700). The lighting fixture selection process is the same as that described in association with FIG. 63. The commissioning tool 136 will then identify the occupancy group that includes the selected lighting fixture 110 (step 6702) and instruct the lighting fixtures 110 in the selected control group to dim to a desired level (step 6704). Having the lighting fixtures 110 of the selected control group dim provides the user visual feedback that the selected occupancy group has been selected and clearly identifies the lighting fixtures 110 that are in the selected control group.

Once the first occupancy group has been selected, the commissioning tool 136 presents the user with the opportunity to select another occupancy group to merge with the first occupancy group (step 6706). This process may be repeated for any number of occupancy groups. Once all of the occupancy groups that need to be merged have been selected, the commissioning tool 136 will determine a new occupancy group from all of the lighting fixtures 110 in the selected occupancy groups (step 6708) and create group assignment information for the new occupancy group (step 6710). The commissioning tool will then send the group assignment information for the new occupancy group to the affected lighting fixtures 110 (step 6712). Next, the commissioning tool 136 will instruct the affected lighting fixtures 110 to transition to their full output levels (step 6714) to provide visual feedback that the selected occupancy groups have been merged into a single, new occupancy group. Finally, the commissioning tool 136 will send default occupancy settings to each lighting fixture 110 in the occupancy group (step 6716).

Figure 68A:
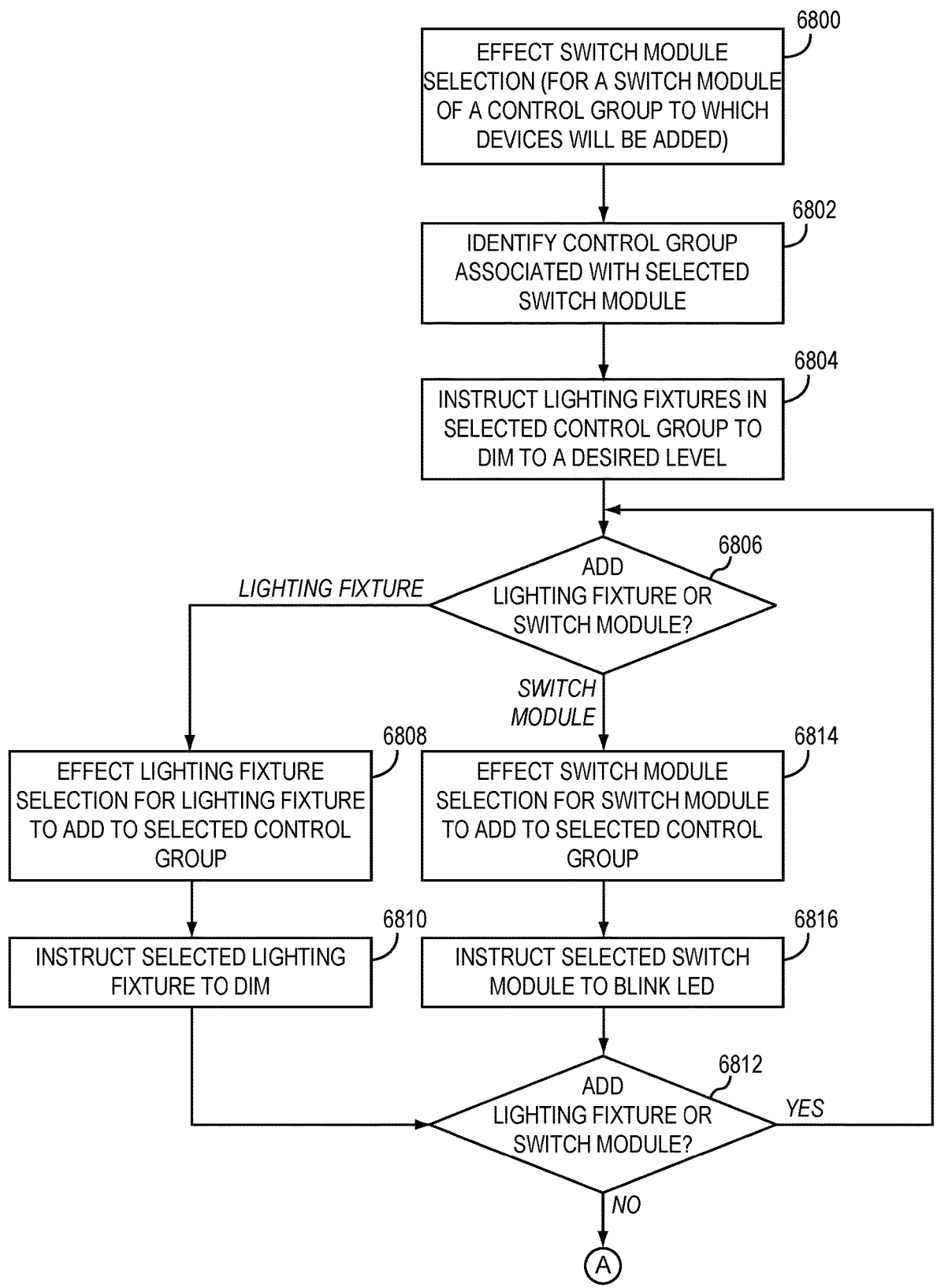
FIGS. 68A and 68B are a flow diagram illustrating a process for adding devices to a control group according to one embodiment.
Figure 68B:
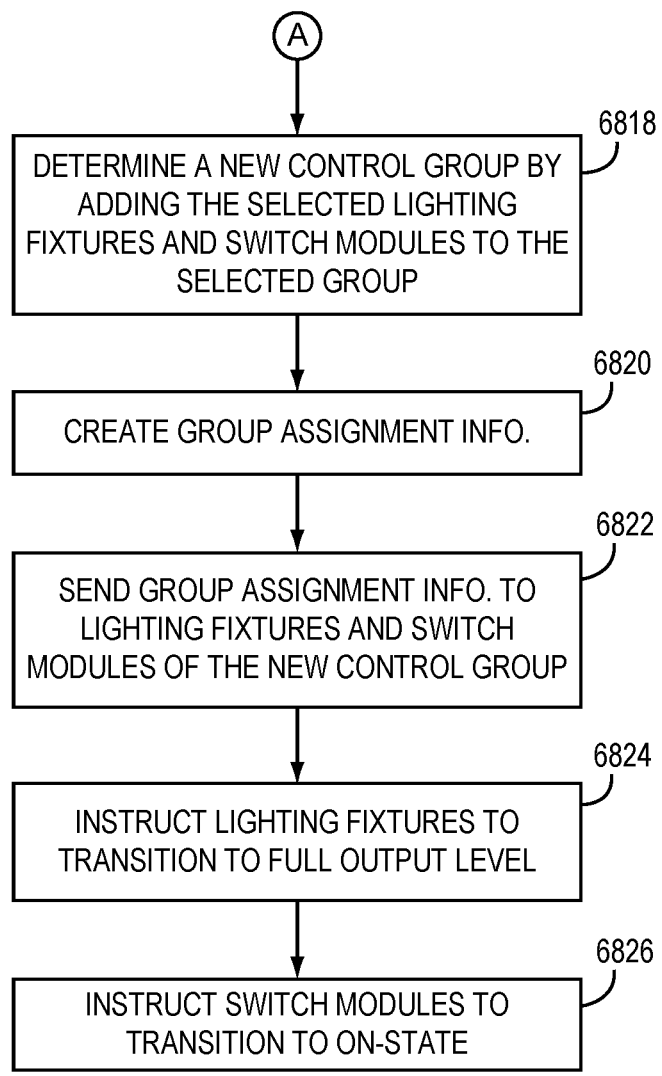

Turning now to FIGS. 68A and 68B, a process for adding a lighting fixture 110 or a switch module 210 to an existing control group is described, according to one embodiment. Initially, the user will select the appropriate mode on the commissioning tool 136 to accomplish this feature and use the commissioning tool 136 to effect switch module selection, as described above (step 6800). In particular, the user will choose a switch module 210 that is part of the control group to which other devices, such as a lighting fixture 110, switch module 210, or other network device, will be added. Once selected, the commissioning tool 136 may instruct the selected switch module 210 to visibly blink its LED 218L.

The commissioning tool 136 will identify the control group associated with the selected switch module 210 (step 6802) and instruct the lighting fixtures 110 in the selected control group to dim to a desired level (step 6804). Based on user input, the commissioning tool 136 will determine whether the user desires to add a lighting fixture 110 or a switch module 210 to the selected control group (step 6806). If a lighting fixture 110 is selected for adding to the selected control group, the commissioning tool 136 will effect lighting fixture selection for the lighting fixture 110 to be added to the selected control group (step 6808). Once selected, the commissioning tool 136 may instruct the selected lighting fixture 110 to dim to a desired level (step 6810). Next, the commissioning tool 136 will query the user to determine if there is a need to add another device to the selected control group (step 6812). If there is a desire to add another device to the selected control group, the process returns to step 6806.

If the user desires to add a switch module 210 (step 6806), the commissioning tool 136 will effect switch module selection for the particular switch module 210 to be added to the selected control group (step 6814). Once selected, the commissioning tool 136 may instruct the newly selected switch module 210 to visibly blink its LED 218L (step 6816). Again, the commissioning tool 136 will present the user with the opportunity to add yet another device (step 6812). This process is repeated until all devices that need to be added to the selected control group are selected.

Once all of the devices to be added to the selected control group are selected, the commissioning tool 136 will determine a new control group by adding the selected lighting fixtures 110 and switch modules 210 to the selected group (step 6818). The commissioning tool 136 will create group assignment information for the new control group (step 6820) and send the group assignment information to the lighting fixtures 110 and the switch modules 210 of the new control group (step 6822). Notably, the group assignment information is sent to all of the lighting fixtures 110 and switch modules 210 that were in the originally selected control group as well as the lighting fixtures 110 and switch modules 210 that were selected to be added to the selected control group. The commissioning tool 136 may then instruct the lighting fixtures 110 to transition to their full output level (step 6824) and instruct the switch modules 210 to transition to their on-state (step 6826).

Figure 69A:
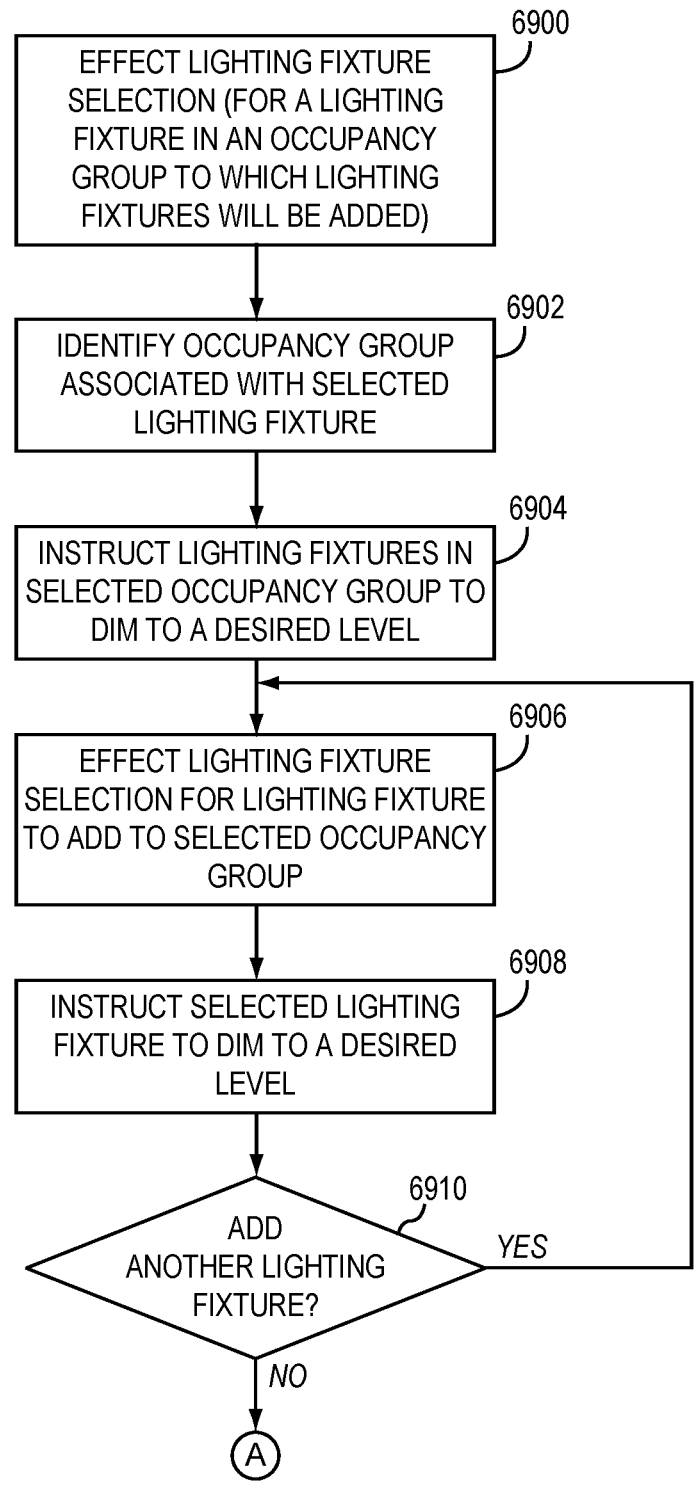
FIGS. 69A and 69B are a flow diagram illustrating a process for adding devices to an occupancy group according to one embodiment.
Figure 69B:
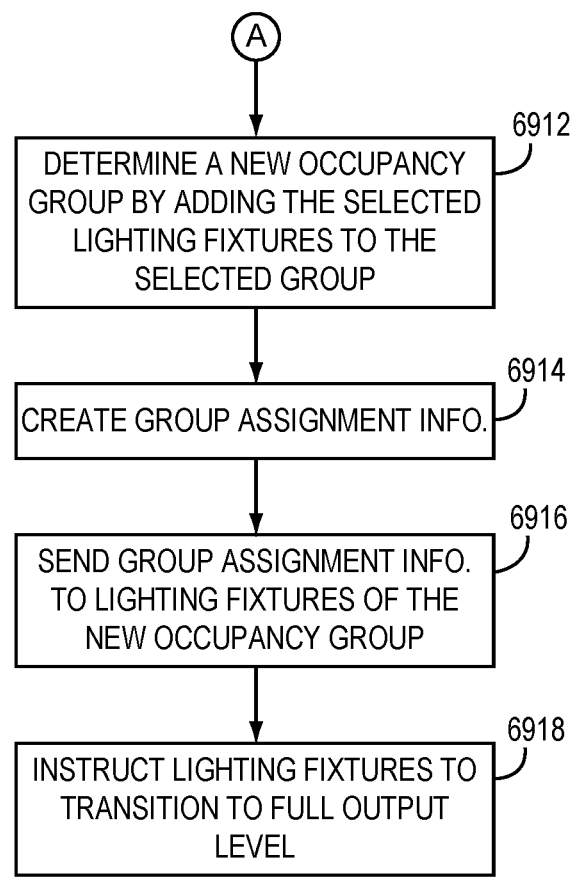

Turning now to FIGS. 69A and 69B, a process for adding a lighting fixture 110 to an existing occupancy group is described, according to one embodiment. Initially, the user will select the appropriate mode on the commissioning tool 136 to accomplish this feature and use the commissioning tool 136 to effect lighting fixture selection, as described above (step 6900). In particular, the user will choose a lighting fixture 110 that is part of the occupancy group to which other lighting fixtures 110 will be added.

The commissioning tool 136 will identify the occupancy group associated with the selected lighting fixture 110 (step 6902) and instruct the lighting fixtures 110 in the selected occupancy group to dim to a desired level (step 6904). Next, the commissioning tool 136 will effect lighting fixture selection for the lighting fixture 110 to be added to the selected occupancy group (step 6906). Once selected, the commissioning tool 136 may instruct the selected lighting fixture 110 to dim to a desired level (step 6908). Next, the commissioning tool 136 will query the user to determine if there is a need to add another lighting fixture 110 to the selected occupancy group (step 6910). If there is a desire to add another device to the selected occupancy group, the process returns to step 6906. This process is repeated until all lighting fixtures 110 that need to be added to the selected occupancy group are selected.

Once all of the lighting fixtures 110 to be added to the selected occupancy group are selected, the commissioning tool 136 will determine a new occupancy group by adding the selected lighting fixtures 110 to the selected occupancy group (step 6912). The commissioning tool 136 will create group assignment information for the new occupancy group (step 6914) and send the group assignment information to the lighting fixtures 110 of the new occupancy group (step 6916). Notably, the group assignment information is sent to all of the lighting fixtures 110 that were in the selected occupancy group as well as the lighting fixtures 110 that were selected to be added to the originally selected occupancy group. The commissioning tool 136 may then instruct the lighting fixtures 110 to transition to their full output level (step 6918).

Figure 70:
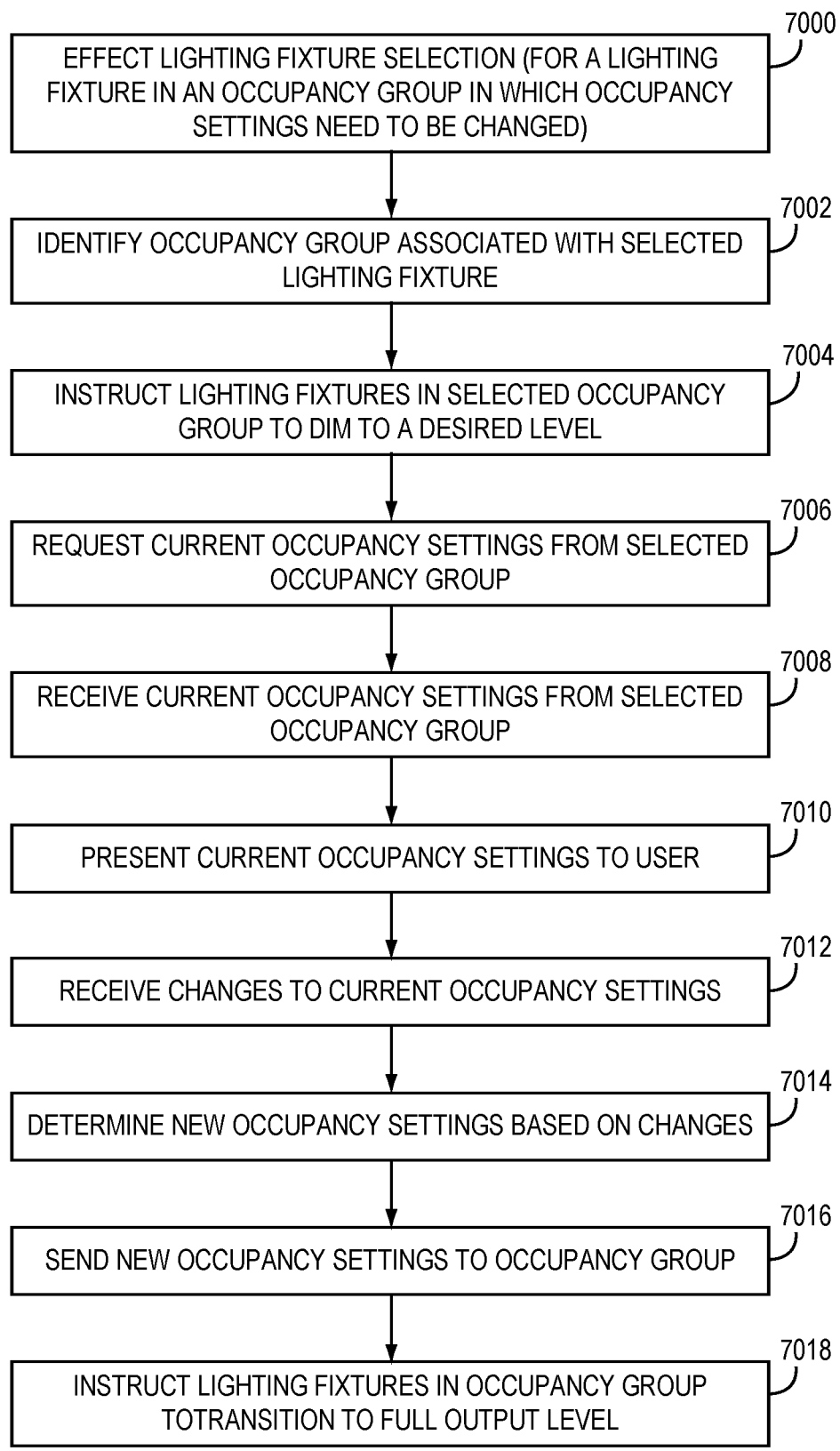
FIG. 70 is a flow diagram illustrating a process for changing settings in an occupancy group according to one embodiment.

With reference to FIG. 70, a process is illustrated for changing the occupancy settings in an occupancy group according to one embodiment of the disclosure. Initially, the commissioning tool 136 will effect lighting fixture selection for a lighting fixture 110 in an occupancy group in which occupancy settings need to be changed (step 7000). Once the lighting fixture 110 is selected, the commissioning tool 136 will identify the occupancy group associated with the selected lighting fixture 110 (step 7002), and instruct the lighting fixtures 110 in the selected occupancy group to dim to a desired level (step 7004).

The commissioning tool 136 will also request the current occupancy settings from the selected occupancy group (step 7006). This may be accomplished by obtaining the current occupancy settings from one, some, or all of the lighting fixtures 110 in the selected occupancy group. In response to the request, the commissioning tool 136 will receive the current occupancy settings from the selected occupancy group (step 7008).

Through a user interface provided by the commissioning tool 136, the current occupancy settings will be presented to the user (step 7010). The user will be able to review and change the current occupancy settings. The commissioning tool 136 will receive the changes to the current occupancy settings (step 7012) and determine new occupancy settings based on these changes (step 7014). The commissioning tool 136 will then send the new occupancy settings to the occupancy group (step 7016). Finally, the commissioning tool 136 will instruct the lighting fixtures 110 in the occupancy group to transition to their full output levels (step 7018).

As indicated above, the same or similar processes may be used to change any type of operational setting that is used for a defined group of lighting fixtures 110. In additional to occupancy settings, the commissioning tool 136 may be used to provide settings that dictate how the group of lighting fixtures handle and react to ambient light levels, input from associated switch modules 210, input from associated lighting fixtures 110, and the like. The commissioning tool 136 may be used to provide settings that dictate the intensity, dimming levels, color temperature, color, lighting schedules (i.e., defined periods for different lighting scenes or light levels), and the like for a given group during normal operation or in response to various input from associated lighting fixtures 110 or switch modules 210. The commissioning tool 136 may also act as a simple remote control to adjust any of these parameters in real time for an individual lighting fixture 110 or a group thereof. For example, the commissioning tool 136 may be used to directly change the color temperature, color, output level, on-off state, or the like for one or more selected lighting fixtures 110 or one or more groups thereof.

Figure 71:
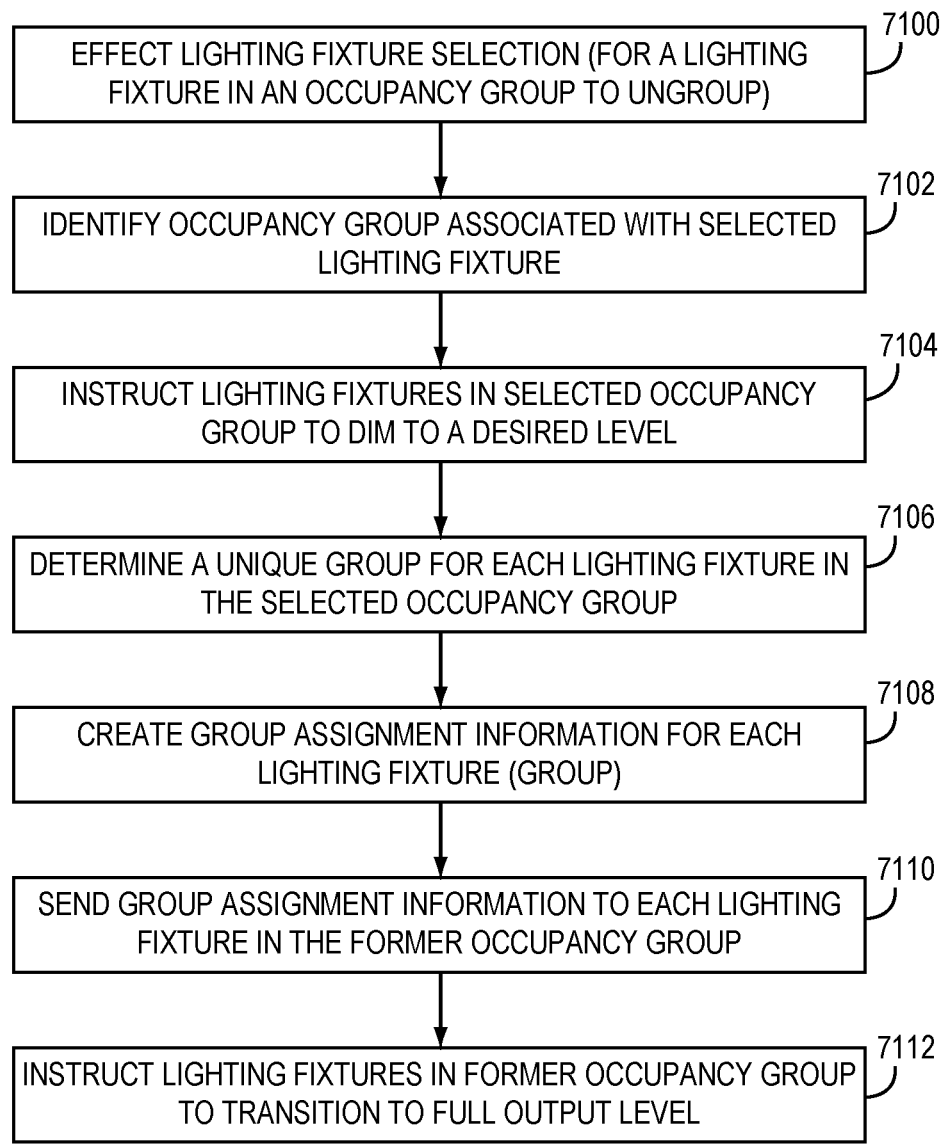
FIG. 71 is a flow diagram illustrating a process for ungrouping devices according to one embodiment.

With reference to FIG. 71, a process is illustrated for ungrouping an occupancy group according to one embodiment of the disclosure. Ungrouping an occupancy group will effectively have each of the lighting fixtures 110 in the occupancy group disassociate from another and operate independently, from an occupancy perspective. Ungrouping an occupancy group will not affect control grouping. Further, the process for ungrouping devices in a control group will take place in a similar fashion.

Initially, the commissioning tool 136 will effect lighting fixture selection for a lighting fixture 110 in an occupancy group to be ungrouped (step 7100). Once the lighting fixture 110 is selected, the commissioning tool 136 will identify the occupancy group associated with the selected lighting fixture 110 (step 7102), and instruct the lighting fixtures 110 in the selected occupancy group to dim to a desired level (step 7104).

At this point, the commissioning tool 136 essentially needs to provide a unique occupancy group to each lighting fixture 110 in the selected occupancy group. As such, the commissioning tool 136 will determine a unique group for each lighting fixture 110 in the selected occupancy group (step 7106) and create unique group assignment information for each lighting fixture 110, or group, in the selected occupancy group (step 7108). The commissioning tool 136 will then send the group assignment information to each lighting fixture in the former occupancy group (step 7110) and instruct the lighting fixtures in the former occupancy group to transition to their full output levels (step 7112).

In any of the above scenarios, the selection of a particular lighting fixture 110, switch module 210, control group, or occupancy group may be readily undone during the selection process. Once one of these devices or groups is selected, the commissioning tool 136 may provide the user an option to deselect the just selected device or group in case the user made an errant selection or changed her mind. If deselected, the deselected lighting fixture 110 or group of lighting fixtures 110 will be instructed to return to their full output level from the dimmed state, and the deselected switch module 210 or group of switch modules 210 will be instructed to return to their on-state by the commissioning tool 136.

VII. Replacing or Adding Devices

The following discussions relate to exemplary processes for replacing a device, such as a lighting fixture 110 or switch module 210, in the lighting network, or adding a device to an existing lighting network. The processes for replacing or adding a device in the lighting network are very similar. The first few steps are required for replacing a device in the lighting network. After these first few steps, the process is essentially the same.

Initially, the commissioning tool 136 will have a table that identifies all of the devices that are in the lighting network. To replace one of the devices and the lighting network, the commissioning tool 136 will send out a request for all of the devices in the lighting network to respond, if the devices hear the request. The commissioning tool 136 will identify all of the devices that do not respond by comparing the responding devices to the list of devices in the table. The commissioning tool 136 will send reset commands to these non-responding devices, and perhaps remove the non-responding devices from the table. At this point, the process for adding a device to the lighting network and replacing a device in the lighting network is the same. Next, the commissioning tool 136 will instruct all of the devices in the lighting network to enter configuration mode, as described above.

Since the devices in the lighting network may communicate over different RF communication channels, the commissioning tool 136 will search all channels for new devices and pull these new devices into the network. During this process, the various devices in the lighting network may provide messages over the network, and the commissioning tool 136 may detect these messages. During this process, short addresses may be assigned to the various devices by the commissioning tool 136, and the commissioning tool 136 may identify a desired RF communications channel for the new and existing devices of the lighting network to use for communications.

The commissioning tool 136 will update its table to include any newly discovered devices. If no new devices were discovered, the process ends. If only switch modules 210 were discovered, the next few steps are skipped, as they are primarily relevant to lighting fixtures 110.

If new lighting fixtures 110 were detected, the commissioning tool 136 will instruct all of the lighting fixtures 110, including both newly detected and previously existing lighting fixtures 110, to perform a calibration routine for the ambient light sensors $S_A$. As described in detail above, this process may include having all of the lighting fixtures 110 in the lighting network simultaneously turn off (or to a desired dimming level), take an ambient light measurement while the lighting fixtures and are off, turn on (or to another desired dimming level), and take another ambient light measurement while the lighting fixtures are all on. Each lighting fixture 110 will use the difference between these ambient light measurements and calibrate itself to provide a desired light output based on the light contributions from itself, its peers, and potentially any ambient light provided by sources other than the lighting fixtures 110.

Next, the commissioning tool 136 will initiate a lightcast process to facilitate grouping the new lighting fixtures 110 with one another or with groups of devices that were already part of the lighting network. For each new lighting fixture 110, the commissioning tool 136 will instruct the new lighting fixture 110 to initiate a lightcast as a lightcaster, wherein the lighting fixture 110 will modulate its light output. For the other lighting fixtures 110, the commissioning tool 136 will instruct them to listen for the lightcast signal, and thus act as lightcatchers. The lightcatchers will monitor the relative strength of the lightcast signal and report back to the commissioning tool 136. As such, each new lighting fixture 110 will take its turn providing a lightcast signal, which is monitored and reported by the rest of the lighting fixtures 110 in the lighting network back to the commissioning tool 136.

The commissioning tool 136 may process the lightcast information that is reported back from the lightcatchers as follows. Initially, the commissioning tool 136 takes a first newly joined lighting fixture 110 and looks at the link strengths with all of the other newly joined lighting fixtures 110. The commissioning tool 136 temporarily creates a group that includes the first newly joined lighting fixture 110 and any other newly joined lighting fixtures 110 that have a sufficiently strong link strength with the first newly joined lighting fixture. As an example, assume that the newly joined lighting fixtures 110 include lighting fixtures A, B, C, D, and E. If the first newly joined lighting fixture A has a high link strength with other newly joined lighting fixtures C and D, but not with lighting fixtures B or E, a temporary group that includes lighting fixtures A, C, and D is created and stored in the commissioning tool 136.

Next, the commissioning tool 136 will analyze the link strengths that the other newly joined lighting fixtures C and D, which are in the temporary group, have with those newly joined lighting fixtures B and E, which are not in the temporary group. Any of the newly joined lighting fixtures B and E that has sufficiently strong link strength with any other newly joined lighting fixture in the temporary group is added to the temporary group. For example, if lighting fixture E has a sufficiently high link strength with lighting fixture D, lighting fixture E will be added to the temporary group. This occurs even if lighting fixture E does not have a sufficiently high link strength with the other lighting fixtures A and C of the temporary group. Assuming that lighting fixture B does not have a sufficiently highly link strength with any of the lighting fixtures A, C, D, or E, the temporary group will include lighting fixtures A, C, D, and E. Lighting fixture B may be assigned to its own unique temporary group.

For each temporary group, the link strengths between each of the lighting fixtures 110 in the temporary group and each of the original lighting fixtures 110 that were already part of the lighting network are analyzed. The strongest link between any of the newly joined lighting fixtures 110 and the original lighting fixtures 110 is identified, and if the link is sufficiently strong, all of the lighting fixtures 110 in the temporary group are merged into the group to which the original lighting fixtures 110 associated with the strongest link to the temporary group, belonged.

For example, assume that there is strong link strength between lighting fixture A of the temporary group (A, C, D, and E) and original lighting fixture F, which belongs to a group with lighting fixtures G and H. The commissioning tool 136 will add the lighting fixtures (A, C, D, and E) of the temporary group to the same occupancy and control group as lighting fixture F to create a new group that includes lighting fixtures A, C, D, E, F, G, and H. If the commissioning tool 136 does not find a sufficiently strong link strength between any lighting fixture 110 of the temporary group and an original lighting fixture 110, the lighting fixtures 110 of the temporary group are assigned to a new permanent group.

For all of the devices in the network, the commissioning tool 136 will determine whether the device should operate in the vacancy or occupancy mode, since the addition of a device may affect the mode of an original device and the newly joined devices will need a mode assignment. The commissioning tool 136 will then send out the grouping (control or occupancy group) and mode (vacancy, occupancy, etc.) assignments to the newly joined and original devices in the lighting network.

The commissioning tool 136 will identify all groups to which new devices were added. For such a group, the commissioning tool 136 will request the occupancy settings of an original device of the group, and provide these occupancy settings to the newly added devices of the group, in a fashion similar to that done in the above-described process for adding devices to a group. For any groups that are made up entirely of newly added devices, the commissioning tool 136 will send these devices default occupancy settings, in a fashion similar to that done in the above-described process for creating a new group.

The commissioning tool 136 will also identify any switch modules 210 that are not grouped with at least one lighting fixture 110, such as those that are not grouped with any other device or only grouped with other switch modules 210. For such switch modules 210, the commissioning tool 136 will identify these switch modules 210 to the user and instruct the user to address the situation by manually creating a new group, merging existing groups, adding devices to a group, or the like. Once complete, the commissioning tool 136 will instruct the devices of the lighting network to return to normal mode.

VIII. State Diagram

Figure 72:
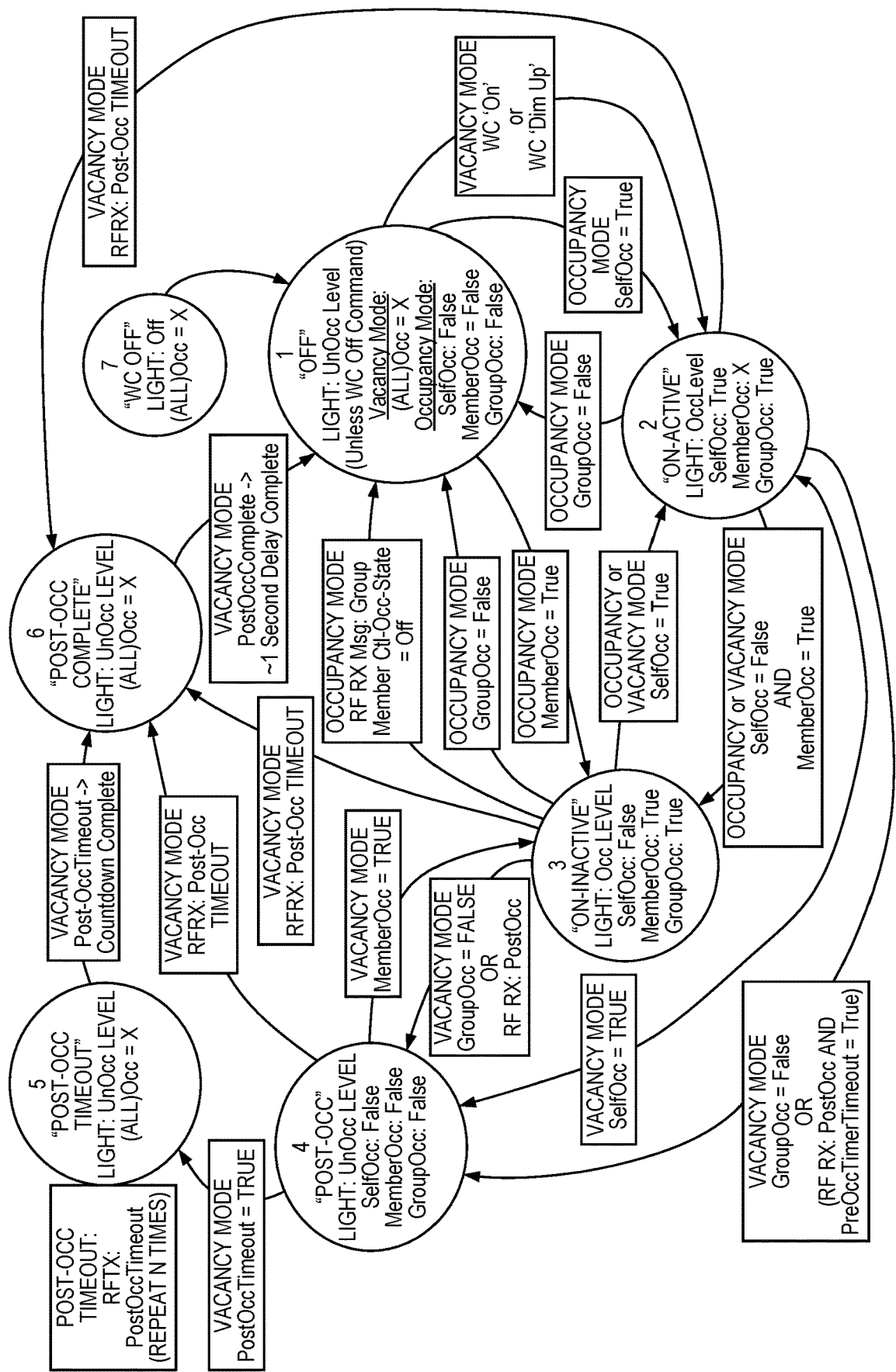
FIG. 72 is a state diagram illustrating operation of a lighting fixture in both occupancy and vacancy modes according to one embodiment.

The state diagram of FIG. 72 illustrates how an exemplary lighting fixture 110 will operate in both occupancy and vacancy modes. As illustrated, there are seven states, which are provided in circular boxes and numbered 1 through 7. These states include state 1—"Off" state 2—"On-Active" state 3—"On-Inactive" state 4—"Post-Occ" state 5—"Post-Occ Timeout" state 6—"Post-Occ Complete" and state 7—"WC Off." The acronym WC stands for 'wall controller' and may be any type of switch module 210, with or without dimmer controls. All states are used for vacancy mode. In certain embodiments, only the Off, On-Active, and On-Inactive states are used for occupancy mode.

In general, the Off state is state where the lighting fixture 110 has either been turned off or has transitioned to a predetermined light level after detecting a period where there is no (occupancy) activity. The On-Active state is a state in which the lighting fixture 110 is sensing activity with its own occupancy sensor $S_A$. The On-Inactive state is a state in which another member of the group is sensing activity. In vacancy mode, the PostOcc (post occupancy) state is a grace period that generally occurs after all of the group members stop sensing activity. The PostOcc Timeout state is a state that occurs after the grace period provided by the PostOcc state has expired. The Post Occ Timeout state is temporary and automatically transitions to the PostOcc Complete state, which is also temporary and leads back to the Off state. The WC Off state is a temporary state where the switch module 210 has turned off the lighting fixtures 110 of the group. The lighting fixture 110 will automatically transition from the WC Off state to the Off state. Further detail about these states and the transitions between the states is provided below.

In general, each lighting fixture 110 will monitor and update three occupancy fields: SelfOcc, MemberOcc, and GroupOcc. The lighting fixture 110 will update the SelfOcc field based on its own occupancy sensor readings. The lighting fixture 110 will update the MemberOcc field based on information received from other lighting fixtures 110 in the same control group when operating in vacancy mode or in the same occupancy group when operating in occupancy mode. The lighting fixture 110 will update the GroupOcc field by providing a logic OR of the SelfOcc and MemberOcc fields.

The lighting fixtures 110 send messages to each other to share occupancy related information. Certain messages are sent upon a state transition. Other messages are sent on a periodic basis as well as upon any state change, except when changing from WC Off to Off. The messages are generally broadcast and may include various fields including the sender's address, group ID, (occupancy) activity status of itself or the group, the current state, and the previous state. The group ID allows any lighting fixture 110 receiving the message to determine whether or not the message is intended for the group in which the lighting fixture 110 resides. The activity status indicates whether or not the light fixture 110 sending message is sensing activity or whether there is an indication that any other member of the group is sensing activity. The current state indicates the current state in the state diagram, and the previous state indicates the previous state in the state diagram since the last message or set of messages.

If there is a recent state change, the current state and the previous state fields will differ. If there has not been a recent state change, the current state and the previous state fields will be the same. As such, a lighting fixture 110 receiving the message can determine whether or not there has been a recent state change based on determining whether the current state and previous state fields are different for the incoming message.

Based on the activity status, the lighting fixture 110 that is receiving the message is able to determine whether one of its members is sensing activity or believes that another member is sensing activity. If a lighting fixture 110 determines that one of its members is sensing activity, the lighting fixture 110 will set the MemberOcc field as true, and vice versa. If a lighting fixture 110 is sensing activity with its own occupancy sensor, the lighting fixture 110 will set the SelfOcc field to true, and vice versa. The lighting fixture 110 will set the GroupOcc field based on providing a logic OR of the SelfOcc and MemberOcc fields.

In the state diagram of FIG. 72, the states will identify the values of the SelfOcc field, MemberOcc field, and GroupOcc field as well as a light field. The light field indicates the light level provided by the lighting fixture 110 at the various states. The light levels may take on one of three levels: an occupied level (OccLevel); an unoccupied level (UnOcc Level), and Off. The occupied level may be fully on or at any desired dimming level. The unoccupied level may be fully off or at any desired dimming level, which is less than the occupied level. The light level for the Off state is that of the unoccupied level. The light levels for the on-active state and the on-inactive state are at the occupied levels. The light levels for the Post-Occ, Post-Occ Timeout, and Post-Occ states are at the unoccupied levels. The light level for the WC Off state is off. While in On-Active or On-Inactive modes, devices in vacancy mode also respond to dim up/down commands, and will set their light level accordingly.

The following discussion will first describe the lighting fixture 110 as it operates in occupancy mode. A discussion of vacancy mode operation will follow the occupancy mode discussion. In occupancy mode, all of the lighting fixtures 110 that are in a particular group will turn on when any one member of the group senses activity. If none of the members are sensing activity, all of the lighting fixtures 110 that are in the group will turn off.

Assume that the lighting fixture 110 is operating in occupancy mode and is in the Off state. Notably, occupancy mode operation only employs the Off, On-Active, and On-Inactive states. In the Off state, the lighting fixture 110 is providing light at the unoccupied level and the SelfOcc, MemberOcc, and GroupOcc fields are all false. From the Off state, the lighting fixture 110 may transition to the On-Active and On-Inactive states. The rectangular boxes identify the information or activity required to trigger a state change.

The lighting fixture 110 will transition from the Off state to the On-Active state in response to determining that the SelfOcc field is true. The lighting level will be set to the occupied level. As noted, the SelfOcc field is set to true when the lighting fixture 110 senses activity with its own occupancy sensor $S_A$. Notably, the lighting fixture 110 will include an occupancy timer, which is reset any time the lighting fixture 110 senses activity via its occupancy sensor $S_A$. If the occupancy timer times out due to not sensing activity, the SelfOcc field is set to false.

Upon reaching the on-active state, the lighting fixture 110 will send out a message, which indicates a state change. In this example, the current state field is filled with the on-active state and the previous state field is filled with the Off state. Further, the lighting fixture 110 will change the GroupOcc field to true, because of the SelfOcc field is now true. While in the on-active state, the lighting fixture 110 can transition back to the Off state, if the GroupOcc field becomes false. The GroupOcc field will become false if the SelfOcc field becomes false when the MemberOcc field is also false. Transitioning back to the Off state will trigger the lighting fixture 110 to change the light level to the unoccupied level. Update messages will be broadcast to the members of the group.

The lighting fixture 110 will transition from the Off state to the On-Inactive state in response to determining that the MemberOcc field is true. The lighting level will be set to the occupied level. As noted, the MemberOcc field is set to true when the lighting fixture 110 receives a message that indicates one of its group members senses activity. Upon reaching the On-Inactive state, the lighting fixture 110 will send out a message indicating a state change. In this example, the current state field is filled with the On-Inactive state and the previous state field is filled with the Off state. Further, the lighting fixture 110 will change the GroupOcc field to true, because of the MemberOcc field is now true. While in the On-Inactive state, the lighting fixture 110 can transition back to the Off state if the GroupOcc field becomes false. The GroupOcc field will become false if the MemberOcc field becomes false when the SelfOcc is also false. Transitioning back to the Off state will trigger the lighting fixture 110 to change the light level to the unoccupied level. Update messages will be broadcast to the members of the group.

The lighting fixture 110 will transition from the On-Active state to the On-Inactive state if the SelfOcc field becomes false and the MemberOcc field becomes true. This means that the lighting fixture 110 is no longer sensing occupancy activity, but one of its group members is sensing occupancy activity. The lighting fixture 110 will transition from the On-Inactive state to the On-Active state if the SelfOcc field becomes true. Transitioning between these two states will not affect the light level, which will remain at the occupied level. Again, update messages will be broadcast to the members of the group in response to the state change.

For vacancy mode, the each lighting fixtures 110 in a control group will turn on in response to an 'on' or 'dim up' command from the switch module 210. Each lighting fixture 110 in the group will turn off after none of the members in the group have sensed activity for a while. After the lighting fixtures 110 in the group are turned off, a grace period is provided wherein any activity sensed by any of the lighting fixtures 110 in the group will trigger the lighting fixtures 110 to turn back on. If there is no activity sensed during the grace period by any of the lighting fixtures 110 in the group, all of the lighting fixtures 110 will turn off, wherein a command from the switch module 210 will be required to turn the lighting fixtures 110 in the group back on.

The exemplary state diagram is described for vacancy mode. Assume that the lighting fixture 110 is operating in vacancy mode and is in the Off state. Notably, vacancy mode operation employs all seven states. In the Off state, the lighting fixture 110 is providing light at the unoccupied level and does not care (X) about the state of the SelfOcc, MemberOcc, and GroupOcc fields. From the Off state, the lighting fixture 110 may transition to the On-Active and On-Inactive states.

The lighting fixture 110 will transition from the Off state to the On Active state in response to receiving a WC 'On' or WC Dim Up' command from a switch module 210 that is in the same group as the lighting fixture 110. Regardless of whether the lighting fixture 110 is actually sensing activity, the SelfOcc field is initially forced to be true and the occupancy timer is reset. The lighting level will be set to the occupied level. As noted, the SelfOcc field is set to true if the lighting fixture 110 senses activity with its own occupancy sensor $S_A$. The occupancy timer is reset any time the lighting fixture 110 senses activity via its occupancy sensor $S_A$. If the occupancy timer times out due to not sensing activity, the SelfOcc field is set to false.

In certain embodiments, the switch module 210 is configured to send the WC 'On' or WC Dim Up' commands in a rapid succession of messages that essentially flood the lighting network. Each message may be the exact same message. For example, the message may be sent out four to ten times, wherein each message is spaced apart by around 100 ms. Repeating the message in a sequential burst helps to ensure that each member of the group will receive the message. For further assurance, any lighting fixture 110 or device in the group that receives a message with the WC 'On' or Dim Up' command from a switch module 210 may retransmit the message once.

Upon reaching the On-Active state, the lighting fixture 110 will send out a message indicating a state change. In this example, the current state field is filled with the On-Active state and the previous state field is filled with the Off state. Further, the lighting fixture 110 will change the GroupOcc field to true, because of the SelfOcc field is now true.

While in the On-Active state, the lighting fixture 110 can transition to the Post-Occ state, if the GroupOcc field becomes false. The GroupOcc field will become false if the SelfOcc field becomes false when the MemberOcc field is also false. Transitioning to the Post-Occ state will cause the light level to transition to the unoccupied level. Update messages will be sent to the members of the group.

Upon reaching the Post-Occ state, a post occupancy timer is set for a relatively short grace period, such as 15-30 seconds. If the post occupancy timer times out (PostOccTimeout=True), the lighting fixture moves to the Post-Occ Timeout state and the light level will remain at the unoccupied level. At this point, the lighting fixture will immediately send a rapid succession of post occupancy timeout messages (PostOccTimeout). Each message may be the exact same message. As with the WC 'On' and WC 'Dim' messages, the message may be sent out four to ten times, wherein each message is spaced apart by around 100 ms. Providing the message in a sequential burst helps to ensure that each member of the group will quickly receive the message. Any lighting fixture 110 or device that receives the post occupancy timeout message from a member will retransmit the message as well as quickly transition from the On-Active, On-Inactive, and Post-Occ states to the Post-Occ Complete state.

Once the Post-Occ Timeout state is reached, the lighting fixture 110 automatically moves to the Post-Occ Complete state after a set countdown (PostOccTimeout→Countdown Complete) takes place. The lighting level remains at the unoccupied level. As with the Post-Occ Timeout state, the Post-Occ Complete state does not care about the status of the SelfOcc, MemberOcc, and GroupOcc fields. After a relatively short delay, such as around one second, the lighting fixture 110 will automatically move to the Off state, wherein the process may repeat.

Returning to the Post-Occ state (state 4), the grace period provided by the post occupancy timer is described. As noted above, if the post occupancy timer expires, there is an automatic progression of states that lead to the Off state. However, if the lighting fixture 110 or another member in the group detects activity before the occupancy timer times out, the lighting fixture 110 will return to either the On-Active state or the On-Inactive state, respectively.

In particular, the lighting fixture 110 will transition from the Post-Occ state to the On-Active state if the SelfOcc field is changed to true in response to the lighting fixture 110 detecting activity prior to the post occupancy timer timing out. Similarly, the lighting fixture 110 will transition from the Post-Occ state to the On-Inactive state, if the MemberOcc field is changed to true in response to the lighting fixture 110 receiving a message indicating that a member of the group has detected occupancy prior to the post occupancy timer timing out. In either case, the lighting fixture 110 will transition from providing light at the unoccupied level to providing light at the occupied level.

Any lighting fixture 110 that receives a post occupancy timeout message from another member of the group will quickly transition from the On-Active, On-Inactive, and Post-Occ states to the Post-Occ Complete state. Receiving a post occupancy timeout message indicates that another member of the group has reached the Post-Occ state and its post occupancy timer has timed out. Once this happens for any member, that member will automatically progress toward the Off state and all other members will follow upon receiving a message indicating the same. This ensures that all of the members of the group turn off at substantially the same time and in a concerted fashion.

In either vacancy or occupancy mode, an 'Off' command from a switch module 210 or other device forces a transition from any state to the WC Off state. The WC Off state is a momentary state in which the lighting fixture 110 is turned off, such that the light level is set to off. After brief period in the WC Off state, the lighting fixture 110 will transition to the Off state. Notably, the 'WC Off' state forces the light level to transition to Off, while the "Off" state may leave the light level at a reduced level if they are not already off. This may occur when entering the 'Off' State from On-Active state or the On-Inactive state wherein the lighting fixture 110 provides light at the unoccupied level, which may be off or at a lower dimming level.

A few other miscellaneous transitions are now discussed. A transition from the On-Active state to the Post-Occ state may take place when the lighting fixture 110 receives a message from a member that indicates that the member's occupancy timer has timed out and the member has transitioned to the Post-Occ state (RF RX:PostOcc AND PreOccTimerTimeout=True). In this case, the member has transitioned to the Post-Occ state and the lighting fixture 110 should do so as well. The light level will transition from the occupied level to the unoccupied level. A transition from the On-Inactive state to the Off state may take place, generally in occupancy mode, if a message from a member indicates that the member has transitioned to the Off state from any other state (Group Member Ctl-Occ-State=Off). In this case, the member has transitioned to the Off state and the lighting fixture 110 should do so as well.

Also Dim Up and Dim Down commands are accepted from the switch modules 210 that are in the group while the lighting fixture is in the On-Active and On-Inactive states. From any state except the Off state, an Off command from any switch module 210 in the group will force the lighting fixtures 110 to transition to the Off state.

By operating in this manner, each lighting fixture 110 in the group will turn off after none of the members in the group have sensed activity for a while. After the lighting fixtures 110 in the group are turned off, a grace period is provided wherein any activity sensed by any of the lighting fixtures 110 in the group will trigger the lighting fixtures 110 to turn back on. If there is no activity sensed during the grace period by any of the lighting fixtures 110 in the group, all of the lighting fixtures 110 will turn off, wherein a command from the switch module 210 will be required to turn the lighting fixtures 110 in the group back on.

IX. Overlapping Control and Occupancy Groups

Figure 73:
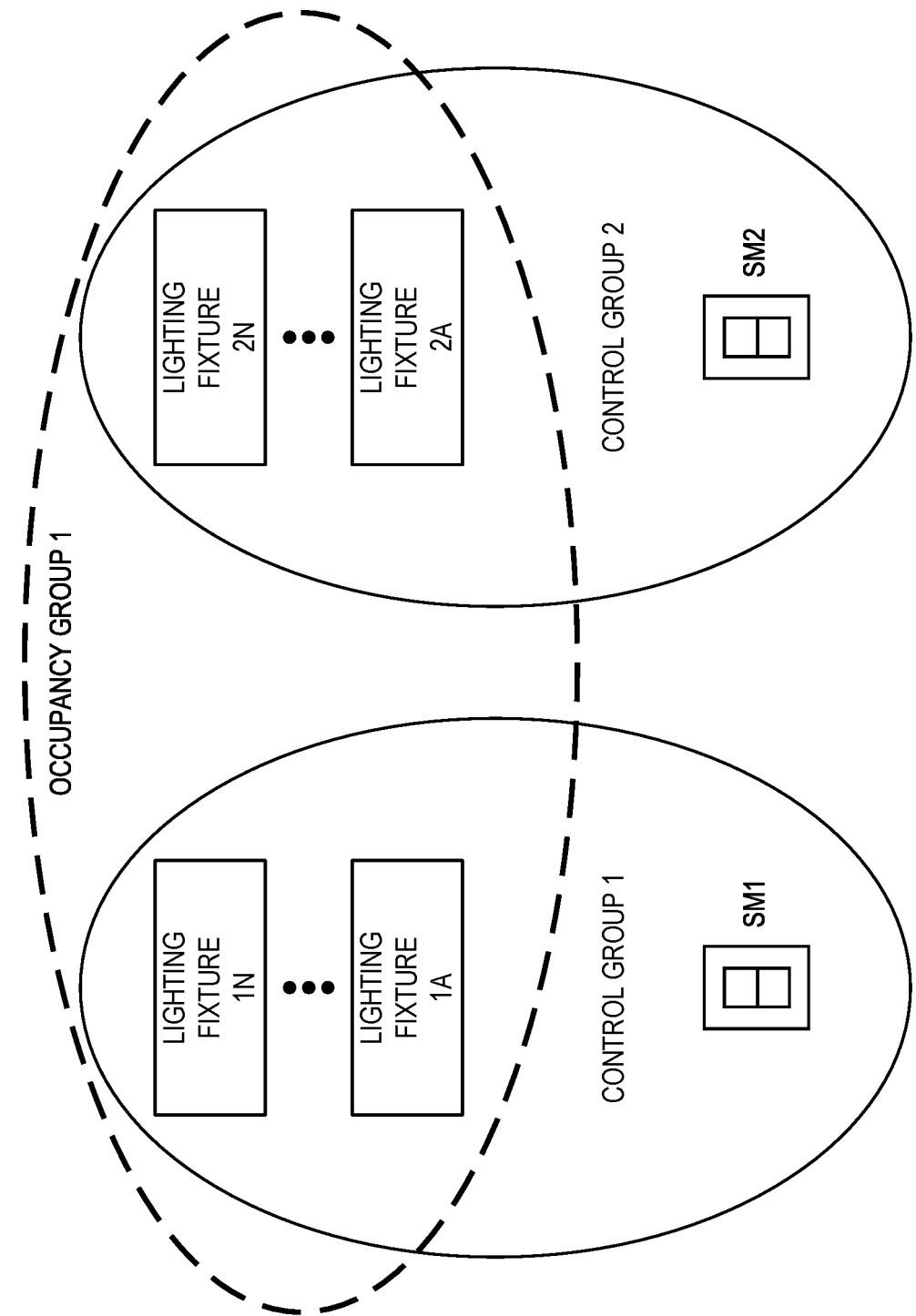
FIG. 73 is a diagram illustrating overlapping control and occupancy groups according to one embodiment.

In one embodiment, the lighting network may be configured such that one or more control groups overlay one or more occupancy groups, wherein any lighting fixtures 110 that are in different control groups reside in the same occupancy group. An illustrative example is shown in FIG. 73 and involves two control groups, referred to as control group 1 and control group 2. Control group 1 has one switch module SM1, and one or more lighting fixtures 1A-1N. Similarly, control group 2 has one switch module SM2, and one or more lighting fixtures 2A-2N. Overlaying part of both control groups 1 and 2 is a single occupancy group 1, which includes the lighting fixtures 1A-1N of control group 1 and lighting fixtures 2A-2N of control group 2. Switch module SM1 and switch module SM2 are not part of the occupancy group 1. For the following discussion, 'lighting fixture 1' generally refers to any lighting fixture 1A-1N in control group 1, and 'lighting fixture 2' generally refers to any lighting fixture 1A-1N in control group 2.

For vacancy mode operation in such an overlapping scenario, the lighting fixtures 1 or 2 can be turned on or off by the switch module SM1 or SM2 of the corresponding control group 1 or 2. In other words, lighting fixtures 1 of control group 1 are turned on and off by switch module SM1. Switch module SM2 has no impact on the operation of the lighting fixtures 1 of control group 1. Similarly, lighting fixtures 2 of control group 2 are turned on and off by switch module SM2. Switch module SM1 has no impact on the operation of the lighting fixtures 2 of control group 2. For this example, turning on or dimming up from an off state is considered turning on. The off state may include light output being off or at an unoccupied level.

If lighting fixtures 1 of control group 1 are turned on and the lighting fixtures 2 of control group 2 remain off, the lighting fixtures 1 of group 1 will stay on if any of the lighting fixtures 1 and 2 of the occupancy group 1 sense activity before the respective occupancy timers expire. Thus, even though the lighting fixtures 2 remain off, they will still monitor activity, reset their occupancy timers upon detecting activity, and share their occupancy information with each other as well as the lighting fixtures 1 of control group 1, because lighting fixtures 1 and 2 are part of occupancy group 1.

The same process of monitoring, sharing, and responding to activity for lighting fixtures 1 and 2 will continue if the lighting fixtures 2 are turned on by switch module SM2. If lighting fixtures 1 are turned off by switch module SM1, lighting fixtures 1 will turn off. However, the lighting fixtures 1 will still monitor activity and share occupancy information with all lighting fixtures 1 and 2 of the occupancy group, until the lighting fixtures 2 are turned off by the switch module SM2 or turn off due to lack of activity and expiration of the grace period. In essence, the state of the switch module SM1 or SM2 will control the light output of the lighting fixtures 1 and 2; however, these lighting fixtures 1 and 2 may continue to monitor activity and share occupancy information with other lighting fixtures 1 and 2 that are in the same and different control groups 1 and 2 even if their light output is set to off or an unoccupied level by the switch modules 1 or 2.

If the corresponding switch module SM1 or SM2 is used to turn off the lighting fixtures 1 or 2, the lighting fixtures 1 and 2 will need to be turned back on by the corresponding switch module SM1 or SM2. Detection of an occupancy event will not trigger the lighting fixtures 1 and 2 to turn back on. If the lighting fixtures 1 and 2 turn off due to lack of activity and expiration of the grace period, the lighting fixtures 1 and 2 will need to be turned back on by the corresponding switch module SM1 or SM2. However, if activity is detected prior to the grace period expiring, the lighting fixtures 1 and 2 may turn back on if any member of the occupancy group (lighting fixtures 1 or 2) detects activity (assuming they have not been turned off by the corresponding switch module SM1 and SM2).

The following provides the basic rules for operation in this situation:

1. An 'On' or Dim Up' command from a switch module 210 turns on the lighting fixtures 110 that are in the associated control group regardless of (occupancy) activity.
2. The 'On' or Dim Up' command from a switch module 210 also enables occupancy based operation of the lighting fixtures 110 that are in the associated control group, until the post occupancy grace period has expired.
3. An 'Off' command from a switch module SM1 or SM2 turns the lighting fixtures 110 that are in the associated control group off and disables occupancy based operation of the lighting fixtures in the associated control group.
4. Once turned on by a switch module 210, the lighting fixtures 110 in the associated control group will stay on as long as the lighting fixture 110 itself or any member of the occupancy group senses activity and the lighting fixtures 110 are not turned off by the switch module 210.
5. All of the lighting fixtures 110 in the occupancy group will turn off as a group after all of the members in the occupancy group 1 fail to detect activity.

Another mode that is possible is vacancy-retriggerable mode, which is a hybrid of the vacancy and occupancy modes. Vacancy-retriggerable mode works similarly to occupancy mode. Once an initial on command is received from the switch module 210, the lighting fixtures 110 will effectively operate in occupancy mode until an off command is received from the switch module 210. As such, the lighting fixtures 110 in the occupancy group will indefinitely turn on and off (such as that described for the occupancy mode state machine) based on activity within the group after an on command is received and until an off command is received. This mode essentially allows occupancy mode to be selected by the switch module 210.

In certain embodiments, some lighting fixtures 110 within a group may be configured for occupancy mode, while other lighting fixtures 110 within the same group may be configured for vacancy mode. The main behavioral difference is that, when no occupancy is detected and occupancy timeout occurs, vacancy mode devices will transition to "Post-Occ" while occupancy mode devices will transition to "Off."

Those skilled in the art will recognize improvements and modifications to the preferred embodiments of the present disclosure. Further, all of the processes and functionality described herein may be incorporated as software instructions on a computer readable medium, such as a memory, solid state drives, hard drives, optical disks and the like, and may be downloaded from a remote device to the lighting fixtures or handheld devices through wired or wireless means. All such improvements and modifications are considered within the scope of the concepts disclosed herein and the claims that follow.

What is claimed is:

1. A lighting fixture, comprising:
   an emitter array comprising a plurality of solid-state light emitters, wherein each one of the plurality of solid-state light emitters is configured to provide light suitable for general illumination within a field of view such that light emitted from a first subset of the plurality of solid-state light emitters is provided to a different portion of the field of view than light emitted from a second subset of the plurality of solid-state light emitters;
   driver circuitry coupled to the emitter array and configured to multiplex a plurality of drive signals to the emitter array such that the light provided from each one of the plurality of solid-state light emitters is independently controllable; and
   control circuitry coupled to the driver circuitry and configured to cause the driver circuitry to multiplex the plurality of drive signals based on received information.

2. The lighting fixture of claim 1, further comprising sensor circuitry;
   wherein the control circuitry is further coupled to the sensor circuitry and configured to cause the driver circuitry to multiplex the plurality of drive signals based on measurements from the sensor circuitry.

3. The lighting fixture of claim 1, further comprising communication circuitry configured to communicate with a commissioning tool;
   wherein the control circuitry is further coupled to the communication circuitry and configured to:
      receive an instruction from the commissioning tool; and
      cause the driver circuitry to multiplex the plurality of drive signals based on the instruction.

4. The lighting fixture of claim 1, wherein:
   the plurality of solid-state light emitters is arranged in a grid comprising a plurality of rows and a plurality of columns; and
   the driver circuitry is configured to:
      provide a drive signal to each one of the plurality of rows; and
      selectively provide a path for current flow through each one of the plurality of columns such that when the path for current flow is provided the drive signal may flow through the solid-state light emitters in the column.

5. The lighting fixture of claim 4, wherein the driver circuitry is configured to multiplex the plurality of drive signals to each one of the plurality of rows and each one of the plurality of columns in order to selectively provide the paths for current flow such that each one of the plurality of solid-state light emitters is independently controllable.

6. The lighting fixture of claim 1, wherein the driver circuitry is configured to multiplex a plurality of control signals provided to the plurality of solid-state light emitters in time.

7. The lighting fixture of claim 1, wherein each one of the plurality of solid-state light emitters in the emitter array is configured to provide light to a different portion of the field of view.

8. The lighting fixture of claim 1, further comprising one or more optical elements configured to transmit the light emitted from each one of the plurality of solid-state light emitters such that light from each one of the plurality of solid-state light emitters is provided to a different portion of the field of view.

9. The lighting fixture of claim 8, wherein the one or more optical elements include one or more lenses.

10. The lighting fixture of claim 1, wherein the emitter array is a monolithic integrated circuit.

11. The lighting fixture of claim 1, wherein:
   a number of drive signals in the plurality of drive signals is less than a number of solid-state light emitters in the plurality of solid-state light emitters;
   in a first mode, only a first area is illuminated by the emitter array; and
   in a second mode, only a second area is illuminated by the emitter array.

12. The lighting fixture of claim 1, wherein the control circuitry is further configured to provide a pattern of illumination within the field of view.

13. The lighting fixture of claim 12, wherein the pattern of illumination corresponds with one or more alphanumeric characters.

14. The lighting fixture of claim 12, wherein the pattern of illumination indicates a desired path for movement through the field of view.

15. The lighting fixture of claim 2, wherein the control circuitry is further configured to detect a location of a target object within the field of view based on the measurements from the sensor circuitry and provide illumination only in a subsection of the field of view determined by the location of the target object.

16. The lighting fixture of claim 1, wherein the driver circuitry comprises a plurality of driver elements, each of which provides a portion of each one of the plurality of drive signals.

17. The lighting fixture of claim 16, wherein the plurality of driver elements are coupled in parallel.

18. The lighting fixture of claim 1, wherein the plurality of drive signals is configured to drive each one of the plurality of solid-state light emitters in the emitter array such that a current density through each solid-state light emitter is greater than 5 A/mm$^2$ when illuminated.

19. The lighting fixture of claim 18, wherein the driver circuitry is configured to drive each one of the plurality of solid-state light emitters such that a current density through each solid-state light emitter is less than 110 A/mm$^2$ when illuminated.

20. The lighting fixture of claim 1, wherein solid-state light emitters of the plurality of solid-state light emitters are arranged in a grid comprising a plurality of rows and a plurality of columns such that anodes of solid-state light emitters that are in each row of the plurality of rows are coupled to one another, and cathodes of solid-state light emitters that are in each column of the plurality of columns are coupled to one another.

* * * * *